United States Patent
Snydacker et al.

(10) Patent No.: US 12,370,468 B2
(45) Date of Patent: Jul. 29, 2025

(54) LITHIUM EXTRACTION ENHANCED BY AN ALTERNATE PHASE

(71) Applicant: Lilac Solutions, Inc., Oakland, CA (US)

(72) Inventors: David Henry Snydacker, San Francisco, CA (US); Nicolás Andrés Grosso Giordano, Oakland, CA (US); Amos Indranada, Oakland, CA (US); Alysia Lukito, Emeryville, CA (US); Sean Utan, Oakland, CA (US); Mustafa Juzer Bootwala, Oakland, CA (US); Daniel Keane Laporte, Menlo Park, CA (US); Andrew Bolt Barber, San Francisco, CA (US); Christina Fleming, Naperville, IL (US); Garrett Lau, Castro Valley, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 18/476,195

(22) Filed: Sep. 27, 2023

(65) Prior Publication Data
US 2024/0026495 A1    Jan. 25, 2024

Related U.S. Application Data

(63) Continuation of application No. PCT/US2023/016438, filed on Mar. 27, 2023.
(Continued)

(51) Int. Cl.
*B01D 15/22* (2006.01)
*B01D 15/10* (2006.01)
(Continued)

(52) U.S. Cl.
CPC ............ *B01D 15/22* (2013.01); *B01D 15/10* (2013.01); *B01D 15/203* (2013.01);
(Continued)

(58) Field of Classification Search
CPC .......... B01D 15/22; B10J 49/60; B01J 47/015
See application file for complete search history.

(56) References Cited

U.S. PATENT DOCUMENTS

| | | |
|---|---|---|
| 2,608,465 A | 8/1952 | Henderson |
| 2,609,341 A | 9/1952 | Walter |
| (Continued) | | |

FOREIGN PATENT DOCUMENTS

| | | |
|---|---|---|
| AR | 092617 A1 | 4/2015 |
| CN | 87103431 A | 11/1987 |
| (Continued) | | |

OTHER PUBLICATIONS

Anonymous. Pure Energy Minerals Reports High Lithium Recoveries From Successful Mini-Pilot Testing Campaign. (Dec. 13, 2016) Retrieved from the Internet: URL:https://pureenergyminerals.com/pure-energy-minerals-reports-high-lithium-recoveries-from-successful-mini-pilot/.

(Continued)

*Primary Examiner* — Colin W. Slifka
(74) *Attorney, Agent, or Firm* — WILSON SONSINI GOODRICH & ROSATI

(57) ABSTRACT

The present invention relates to the extraction of lithium from liquid resources such as natural and synthetic brines, leachate solutions from clays and minerals, and recycled products with the assistance of an alternate phase.

17 Claims, 10 Drawing Sheets

Related U.S. Application Data

(60) Provisional application No. 63/401,453, filed on Aug. 26, 2022, provisional application No. 63/324,559, filed on Mar. 28, 2022.

(51) Int. Cl.

| | | |
|---|---|---|
| *B01D 15/20* | (2006.01) | |
| *B01D 15/36* | (2006.01) | |
| *B01D 25/164* | (2006.01) | |
| *B01D 25/30* | (2006.01) | |
| *B01J 39/02* | (2006.01) | |
| *B01J 39/10* | (2006.01) | |
| *B01J 47/018* | (2017.01) | |
| *B01J 47/022* | (2017.01) | |
| *B01J 49/06* | (2017.01) | |
| *B01J 49/57* | (2017.01) | |
| *B01J 49/60* | (2017.01) | |
| *C01D 15/00* | (2006.01) | |
| *C22B 3/06* | (2006.01) | |
| *C22B 3/22* | (2006.01) | |
| *C22B 3/42* | (2006.01) | |
| *C22B 3/44* | (2006.01) | |
| *C22B 26/12* | (2006.01) | |

(52) U.S. Cl.
CPC ......... *B01D 15/361* (2013.01); *B01D 15/362* (2013.01); *B01D 25/164* (2013.01); *B01D 25/302* (2013.01); *B01J 39/02* (2013.01); *B01J 39/10* (2013.01); *B01J 47/018* (2017.01); *B01J 47/022* (2013.01); *B01J 49/06* (2017.01); *B01J 49/57* (2017.01); *B01J 49/60* (2017.01); *C01D 15/00* (2013.01); *C22B 3/06* (2013.01); *C22B 3/22* (2013.01); *C22B 3/42* (2013.01); *C22B 3/44* (2013.01); *C22B 26/12* (2013.01); *B01D 2251/302* (2013.01); *B01D 2259/4146* (2013.01); *B01D 2313/40* (2013.01)

(56) References Cited

U.S. PATENT DOCUMENTS

| | | |
|---|---|---|
| 3,207,577 A | 9/1965 | Mizuma |
| 3,793,433 A | 2/1974 | Seeley et al. |
| 3,920,544 A | 11/1975 | Weiss |
| 4,058,585 A | 11/1977 | MacKay et al. |
| 4,116,858 A | 9/1978 | Lee et al. |
| 4,159,311 A | 6/1979 | Bauman et al. |
| 4,287,163 A | 9/1981 | Garrett et al. |
| 4,291,001 A | 9/1981 | Repsher et al. |
| 4,347,327 A | 8/1982 | Lee et al. |
| 4,382,124 A | 5/1983 | Meitzner et al. |
| 4,665,049 A | 5/1987 | Miyai et al. |
| 4,747,949 A | 5/1988 | Barkey |
| 5,039,382 A | 8/1991 | Suzuki et al. |
| 5,242,119 A | 9/1993 | Jariyasunant |
| 5,626,750 A | 5/1997 | Chinn |
| 5,639,861 A | 6/1997 | Steflier |
| 5,968,285 A | 10/1999 | Ferrell et al. |
| 6,048,507 A | 4/2000 | Amouzegar et al. |
| 6,171,489 B1 | 1/2001 | Ballard et al. |
| 6,207,126 B1 | 3/2001 | Boryta et al. |
| 6,325,976 B1 | 12/2001 | Small et al. |
| 6,403,257 B1 | 6/2002 | Christian et al. |
| 6,749,648 B1 | 6/2004 | Kumar et al. |
| 7,390,466 B2 | 6/2008 | Boryta et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 7,943,113 B2 | 5/2011 | Chung et al. |
| 8,287,829 B2 | 10/2012 | Harrison et al. |
| 8,454,816 B1 | 6/2013 | Harrison et al. |
| 8,506,851 B2 | 8/2013 | Ravet et al. |
| 8,574,519 B2 | 11/2013 | Harrison et al. |
| 8,641,992 B2 | 2/2014 | Galli et al. |
| 8,679,224 B2 | 3/2014 | Brown et al. |
| 8,741,150 B2 | 6/2014 | Chung et al. |
| 8,778,289 B2 | 7/2014 | Chon et al. |
| 8,926,874 B2 | 1/2015 | Chung et al. |
| 9,034,294 B1 | 5/2015 | Harrison |
| 9,074,265 B2 | 7/2015 | Harrison et al. |
| 9,598,291 B2 | 3/2017 | Chon et al. |
| 9,677,181 B2 | 6/2017 | Bourassa et al. |
| 9,795,943 B2 | 10/2017 | Chung et al. |
| 9,994,931 B2 | 6/2018 | Chon et al. |
| 10,017,838 B2 | 7/2018 | Chon et al. |
| 10,056,656 B2 | 8/2018 | Song |
| 10,150,056 B2 | 12/2018 | Snydacker |
| 10,322,950 B2 | 6/2019 | Snydacker et al. |
| 10,336,624 B2 | 7/2019 | Song |
| 10,392,258 B2 | 8/2019 | Song |
| 10,439,200 B2 | 10/2019 | Snydacker et al. |
| 10,450,633 B2 | 10/2019 | Lien |
| 10,478,751 B2 | 11/2019 | Chung et al. |
| 10,505,178 B2 | 12/2019 | Snydacker et al. |
| 10,604,414 B2 | 3/2020 | Featherstone et al. |
| 10,648,061 B2 | 5/2020 | Cheng et al. |
| 10,648,090 B2 | 5/2020 | Snydacker et al. |
| 10,695,694 B2 | 6/2020 | Snydacker |
| 11,174,532 B1 | 11/2021 | Harrison et al. |
| 11,235,282 B2 | 2/2022 | Harrison et al. |
| 11,253,820 B2 | 2/2022 | Bhave et al. |
| 11,253,848 B2 | 2/2022 | Snydacker |
| 11,339,457 B2 | 5/2022 | Snydacker |
| 11,358,875 B2 | 6/2022 | Snydacker et al. |
| 11,365,128 B2 | 6/2022 | Marston et al. |
| 11,377,362 B2 | 7/2022 | Snydacker et al. |
| 11,530,133 B2 | 12/2022 | Chung et al. |
| 11,583,830 B2 | 2/2023 | Brown |
| 11,638,916 B1 | 5/2023 | Jones |
| 11,964,876 B2 | 4/2024 | Snydacker et al. |
| 11,975,317 B2 | 5/2024 | Snydacker et al. |
| 11,986,816 B2 | 5/2024 | Snydacker et al. |
| 12,076,662 B2 | 9/2024 | Grosso Giordano et al. |
| 12,162,773 B2 | 12/2024 | Snydacker et al. |
| 2003/0231996 A1 | 12/2003 | Shiu et al. |
| 2004/0005267 A1 | 1/2004 | Boryta et al. |
| 2005/0139549 A1 | 6/2005 | Yoshida et al. |
| 2005/0196370 A1 | 9/2005 | Yu et al. |
| 2007/0138020 A1 | 6/2007 | Balagopal et al. |
| 2009/0013829 A1 | 1/2009 | Harris et al. |
| 2009/0142255 A1 | 6/2009 | Chung et al. |
| 2010/0116748 A1 | 5/2010 | Rasmussen et al. |
| 2011/0044882 A1 | 2/2011 | Buckley et al. |
| 2011/0067230 A1 | 3/2011 | Tan et al. |
| 2011/0174739 A1 | 7/2011 | Chung et al. |
| 2011/0203929 A1 | 8/2011 | Buckley et al. |
| 2013/0001168 A1 | 1/2013 | Kim et al. |
| 2013/0306565 A1 | 11/2013 | Davis |
| 2014/0102946 A1 | 4/2014 | Harrison et al. |
| 2014/0113197 A1 | 4/2014 | Xiao et al. |
| 2014/0239221 A1 | 8/2014 | Harrison et al. |
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2015/0258501 A1 | 9/2015 | Chung et al. |
| 2016/0115040 A1 | 4/2016 | Yi et al. |
| 2016/0161453 A1 | 6/2016 | De |
| 2016/0230250 A1 | 8/2016 | Chung et al. |
| 2016/0289154 A1 | 10/2016 | Scates et al. |
| 2016/0311917 A1 | 10/2016 | Beatty et al. |
| 2017/0022617 A1 | 1/2017 | Magnan et al. |
| 2017/0028395 A1 | 2/2017 | Bewsey |
| 2017/0175228 A1 | 6/2017 | Hunwick |
| 2017/0189855 A1 | 7/2017 | Xiang et al. |
| 2017/0217796 A1 | 8/2017 | Snydacker et al. |
| 2017/0233261 A1 | 8/2017 | Sharma |
| 2017/0339286 A1 | 11/2017 | Kogure |
| 2018/0016153 A1 | 1/2018 | Sharma |

(56) References Cited

U.S. PATENT DOCUMENTS

| | | |
|---|---|---|
| 2018/0080133 A1 | 3/2018 | Smith |
| 2018/0133619 A1 | 5/2018 | Snydacker |
| 2018/0222760 A1 | 8/2018 | Reed |
| 2018/0245180 A1 | 8/2018 | Cheng et al. |
| 2018/0280831 A1 | 10/2018 | Chung et al. |
| 2018/0304202 A1 | 10/2018 | Kariveti |
| 2018/0318755 A1 | 11/2018 | Aines et al. |
| 2018/0339286 A1 | 11/2018 | Bazzi et al. |
| 2019/0024212 A1 | 1/2019 | Lien |
| 2019/0044126 A1 | 2/2019 | Snydacker et al. |
| 2019/0062207 A1 | 2/2019 | Jin |
| 2019/0225854 A1 | 7/2019 | Harrison et al. |
| 2019/0233297 A1 | 8/2019 | Kim et al. |
| 2019/0248667 A1 | 8/2019 | Featherstone et al. |
| 2019/0256987 A1 | 8/2019 | Snydacker et al. |
| 2019/0273245 A1 | 9/2019 | Snydacker et al. |
| 2019/0275473 A1 | 9/2019 | Bhave et al. |
| 2019/0276327 A1 | 9/2019 | Brown |
| 2020/0086271 A1 | 3/2020 | Harrison et al. |
| 2020/0165699 A1 | 5/2020 | Snydacker et al. |
| 2020/0189925 A1 | 6/2020 | Featherstone et al. |
| 2020/0232105 A1 | 7/2020 | Snydacker et al. |
| 2020/0289958 A1 | 9/2020 | Snydacker |
| 2020/0298207 A1 | 9/2020 | Brown |
| 2020/0399137 A1 | 12/2020 | Harrison |
| 2021/0077990 A1 | 3/2021 | Snydacker et al. |
| 2021/0188652 A1 | 6/2021 | Chung et al. |
| 2021/0206651 A1 | 7/2021 | Napier et al. |
| 2021/0222270 A1 | 7/2021 | Napier et al. |
| 2021/0246529 A1 | 8/2021 | Jariwala et al. |
| 2021/0300774 A1 | 9/2021 | Kim et al. |
| 2021/0346822 A1 | 11/2021 | Ireland |
| 2021/0380429 A1 | 12/2021 | Snydacker et al. |
| 2022/0010408 A1 | 1/2022 | Harrison et al. |
| 2022/0055910 A1 | 2/2022 | Jariwala et al. |
| 2022/0105466 A1 | 4/2022 | Harrison et al. |
| 2022/0121470 A1 | 4/2022 | Saxena et al. |
| 2022/0134291 A1 | 5/2022 | Bhave et al. |
| 2022/0194796 A1 | 6/2022 | Kim et al. |
| 2022/0212184 A1 | 7/2022 | Snydacker |
| 2022/0235436 A1 | 7/2022 | Snydacker |
| 2022/0274062 A1 | 9/2022 | Moxon et al. |
| 2022/0290272 A1 | 9/2022 | Kölbel et al. |
| 2022/0340440 A1 | 10/2022 | Wang |
| 2022/0348475 A1 | 11/2022 | Snydacker et al. |
| 2022/0349027 A1 | 11/2022 | Snydacker et al. |
| 2022/0364203 A1 | 11/2022 | Park et al. |
| 2022/0372594 A1 | 11/2022 | Chon |
| 2023/0019776 A1 | 1/2023 | Bishkin |
| 2023/0047281 A1 | 2/2023 | Bhattacharyya et al. |
| 2023/0064968 A1 | 3/2023 | Smith et al. |
| 2023/0079295 A1 | 3/2023 | Matsumoto et al. |
| 2023/0203619 A1 | 6/2023 | Wei et al. |
| 2023/0227937 A1 | 7/2023 | Zhao et al. |
| 2023/0234848 A1 | 7/2023 | Safarimohsenabad et al. |
| 2023/0234857 A1 | 7/2023 | Marston et al. |
| 2023/0338919 A1 | 10/2023 | Alessi et al. |
| 2023/0381687 A1 | 11/2023 | Grosso et al. |
| 2023/0399717 A1 | 12/2023 | Rubin et al. |
| 2023/0405492 A1 | 12/2023 | Snydacker |
| 2024/0001331 A1 | 1/2024 | Jastrzebska et al. |
| 2024/0017250 A1 | 1/2024 | Snydacker et al. |
| 2024/0018008 A1 | 1/2024 | Snydacker et al. |
| 2024/0035117 A1 | 2/2024 | Kudryavtsev et al. |
| 2024/0102131 A1 | 3/2024 | Floyd et al. |
| 2024/0216905 A1 | 7/2024 | Snydacker et al. |
| 2024/0217832 A1 | 7/2024 | Snydacker et al. |
| 2024/0309485 A1 | 9/2024 | Percak-Dennett et al. |
| 2024/0367152 A1 | 11/2024 | McNicoll et al. |
| 2024/0375971 A1 | 11/2024 | Takano et al. |
| 2024/0375972 A1 | 11/2024 | DuPont et al. |
| 2024/0391787 A1 | 11/2024 | Collias et al. |
| 2025/0002363 A1 | 1/2025 | Harrison et al. |
| 2025/0010258 A1 | 1/2025 | Snydacker et al. |
| 2025/0178915 A1 | 6/2025 | Snydacker et al. |

FOREIGN PATENT DOCUMENTS

| | | | | |
|---|---|---|---|---|
| CN | 101764209 A | 6/2010 | | |
| CN | 101961634 A | 2/2011 | | |
| CN | 102872792 A | 1/2013 | | |
| CN | 103276406 A | 9/2013 | | |
| CN | 103794779 A | 5/2014 | | |
| CN | 104577243 A | 4/2015 | | |
| CN | 105238927 A | 1/2016 | | |
| CN | 105251436 A | 1/2016 | | |
| CN | 105289455 A | 2/2016 | | |
| CN | 205151853 U | 4/2016 | | |
| CN | 105555978 A | 5/2016 | | |
| CN | 106311190 A | 1/2017 | | |
| CN | 106622103 A | 5/2017 | | |
| CN | 106673023 A | 5/2017 | | |
| CN | 107043116 A | 8/2017 | | |
| CN | 107376827 A | 11/2017 | | |
| CN | 107915239 A | 4/2018 | | |
| CN | 107949541 A | * 4/2018 | ............ | B01J 20/041 |
| CN | 209123481 U | 7/2019 | | |
| CN | 219262345 U | 6/2023 | | |
| DE | 102016212048 A1 | 1/2018 | | |
| EP | 0551002 A1 | 7/1993 | | |
| EP | 2945211 B1 | 11/2018 | | |
| FR | 3034781 A1 | 10/2016 | | |
| JP | H0626661 B2 | 4/1994 | | |
| JP | H08236114 A | 9/1996 | | |
| JP | 2002167626 A | 6/2002 | | |
| JP | 2003500318 A | 1/2003 | | |
| JP | 2004230215 A | 8/2004 | | |
| JP | 2005078800 A | 3/2005 | | |
| JP | 2005296811 A | 10/2005 | | |
| JP | 2006159039 A | 6/2006 | | |
| JP | 2009507839 A | 2/2009 | | |
| JP | 2010042395 A | 2/2010 | | |
| JP | 2012046794 A | 3/2012 | | |
| JP | 2014055312 A | 3/2014 | | |
| JP | 2015020090 A | 2/2015 | | |
| JP | 5898021 B2 | 4/2016 | | |
| JP | 2017131863 A | 8/2017 | | |
| JP | 2018535309 A | 11/2018 | | |
| JP | 2019099874 A | 6/2019 | | |
| KR | 20120015658 A | 2/2012 | | |
| KR | 20120063069 A | 6/2012 | | |
| KR | 20120063424 A | 6/2012 | | |
| KR | 20140082065 A | 7/2014 | | |
| KR | 20160126314 A | 11/2016 | | |
| WO | WO-2010035956 A2 | 4/2010 | | |
| WO | WO-2010056322 A1 | 5/2010 | | |
| WO | WO-2010103173 A1 | 9/2010 | | |
| WO | WO-2011133165 A1 | 10/2011 | | |
| WO | WO-2012005545 A2 | 1/2012 | | |
| WO | WO-2014047347 A1 | 3/2014 | | |
| WO | WO-2015121684 A1 | 8/2015 | | |
| WO | WO-2015123762 A1 | 8/2015 | | |
| WO | WO-2015171109 A1 | 11/2015 | | |
| WO | WO-2016064689 A2 | 4/2016 | | |
| WO | WO-2016172017 A1 | 10/2016 | | |
| WO | WO-2017005113 A1 | 1/2017 | | |
| WO | WO-2017020090 A1 | 2/2017 | | |
| WO | WO-2017039724 A1 | 3/2017 | | |
| WO | WO-2017136328 A1 | 8/2017 | | |
| WO | WO-2017137885 A1 | 8/2017 | | |
| WO | WO-2018089932 A1 | 5/2018 | | |
| WO | WO-2018129949 A1 | 7/2018 | | |
| WO | WO-2018223193 A1 | 12/2018 | | |
| WO | WO-2019000095 A1 | 1/2019 | | |
| WO | WO-2019028148 A1 | 2/2019 | | |
| WO | WO-2019028174 A2 | 2/2019 | | |
| WO | WO-2019084311 A1 | 5/2019 | | |
| WO | WO-2019126862 A1 | 7/2019 | | |
| WO | WO-2019160982 A1 | 8/2019 | | |
| WO | WO-2019168941 A1 | 9/2019 | | |
| WO | WO-2019173716 A1 | 9/2019 | | |
| WO | WO-2019199015 A1 | 10/2019 | | |
| WO | WO-2019221932 | 11/2019 | | |
| WO | WO-2020257937 A1 | 12/2020 | | |
| WO | WO-2021142147 A1 | 7/2021 | | |

(56) References Cited

FOREIGN PATENT DOCUMENTS

| | | |
|---|---|---|
| WO | WO-2021166479 A1 | 8/2021 |
| WO | WO-2021204375 A1 | 10/2021 |
| WO | WO-2021212214 A1 | 10/2021 |
| WO | WO-2021252381 A1 | 12/2021 |
| WO | WO-2022084145 A1 | 4/2022 |
| WO | WO-2022109156 A1 | 5/2022 |
| WO | WO-2022120494 A1 | 6/2022 |
| WO | WO-2022226219 A1 | 10/2022 |
| WO | WO-2022260542 A1 | 12/2022 |
| WO | WO-2023019184 A1 | 2/2023 |
| WO | WO-2023054258 A1 | 4/2023 |
| WO | WO-2023063928 A1 | 4/2023 |
| WO | WO-2023081448 A1 | 5/2023 |
| WO | WO-2013124792 A1 | 7/2023 |
| WO | WO-2023192192 A1 | 10/2023 |
| WO | WO-2023192195 A1 | 10/2023 |
| WO | WO-2023192623 A2 | 10/2023 |
| WO | WO-2023205073 A1 | 10/2023 |
| WO | WO-2023215313 A1 | 11/2023 |
| WO | WO-2023234156 A1 | 12/2023 |
| WO | WO-2023244964 A1 | 12/2023 |
| WO | WO-2024077269 A2 | 4/2024 |
| WO | WO-2024112604 A2 | 5/2024 |
| WO | WO-2024178545 A1 | 9/2024 |
| WO | WO-2024220812 A1 | 10/2024 |
| WO | WO-2024246677 A1 | 12/2024 |
| WO | WO-2025002219 A1 | 1/2025 |
| WO | WO-2025018051 A1 | 1/2025 |
| WO | WO-2025029953 A1 | 2/2025 |
| WO | WO-2025090864 A1 | 5/2025 |

OTHER PUBLICATIONS

Molnar et al. Preliminary Economic Assessment (Rev. 1) of the Clayton Valley Lithium Project. (Jan. 28, 2019) Retrieved from the Internet: URL:https://wp-pureenergyminerals-2023.s3.ca-central-1.amazonaws.com/media/2018/04/PureEnergy_ClaytonValleyPEA_Rev1_23March2018.pdf.

PCT/US2023/080369 International Invitation to Pay Additional Fees dated Jan. 26, 2024.

Renew et al. Geothermal Thermoelectric Generation (G-TEG) with Integrated Temperature Driven Membrane Distillation and Novel Manganese Oxide for Lithium Extraction. (Jun. 1, 2017) Retrieved from the Internet: URL:https://www.osti.gov/servlets/purl/1360976.

Alberti et al. Crystalline insoluble acid salts of tetravalent metals—IX: Thorium arsenate, a new inorganic ion exchanger specific for lithium. Journal of Inorganic and Nuclear Chemistry 32:1719-1727 (1970).

An et al., Recovery of lithium from Uyuni salar brine. Hydrometallurgy 117-118:64-70 (2012).

Anisimov et al., Band theory and Mott insulators: Hubbard U instead of Stoner I Phys. Rev. B. 44:943-954 (1991).

Anisimov et al., Density-functional theory and NiO photoemission spectra. Phys. Rev. B. 48:16929-16934 (1993).

Belharouak et al. Synthesis and electrochemical analysis of vapor-deposited carbon-coated $LiFePO_4$. Electrochemistry Communications 7(10):983-988 (2005).

Blochl., Projector augmented-wave method. Phys. Rev. B 50:17953 (1994).

Bretti et al., SIT parameters for 1: 1 electrolytes and correlation with Pitzer coefficients. J Solution Chem 35:1401-1415 (2006).

Chitrakar et al., A New Type of Manganese Oxide ($MnO_2 \cdot 0.5H_2O$) Derived from $Li_{1.6}Mn_{1.6}O_4$ and Its Lithium Ion-Sieve Properties. Chem. Mater. 12:3151-3157 (2000).

Chitrakar et al. Lithium recovery from salt lake brine by $H_2TiO_3$. Dalton Trans 43:8933-8939 (2014).

Chitrakar et al. Selective Uptake of Lithium Ion from Brine by $H_{1.33}Mn_{1.67}O_4$ and $H_{1.6}Mn_{1.6}O_4$. Chem Lett 41:1647-1649 (2012).

Cho et al. High-Performance $ZrO_2$-Coated $LiNiO_2$ Cathode Material. Electrochem Solid-State Lett 4(10):A159-A161 (2001).

Co-pending U.S. Appl. No. 18/199,494, inventor Snydacker; David Henry, filed May 19, 2023.

Co-pending U.S. Appl. No. 18/200,306, inventor Snydacker; David Henry, filed May 22, 2023.

Co-pending U.S. Appl. No. 18/365,090, inventors Grosso; Giordano Nicolas Andres et al., filed Aug. 3, 2023.

Co-pending U.S. Appl. No. 18/476,180, inventors Snydacker; David Henry et al., filed Sep. 27, 2023.

Co-pending U.S. Appl. No. 18/477,278, inventors Snydacker; David Henry et al., filed Sep. 28, 2023.

Department of Energy. Ion Exchange Materials for Lithium Extraction (Topic: 15, Subtopic: e)—Abstract. Available at https://www.sbir.gov/sbirsearch/detail/1307793 (3 pgs.) (2017).

Dlamini et al. Polymeric ion exchanger supported ferric oxide nanoparticles as adsorbents for toxic metal ions from aqueous solutions and acid mine drainage. J Environ Health Sci Eng 17(2):719-730 (2019).

Doan et al. Preparation of carbon coated $LiMnPO_4$ powders by a combination of spray pyrolysis with dry ball-milling followed by heat treatment. Advanced Powder Technology 21(2):187-196 (2010).

Dudarev et al., Electron-energy-loss spectra and the structural stability of nickel oxide: An LSDA+U study. Phys. Rev. B. 57:1505-1509 (1998).

Endres et al., Extraction of lithium from spinel phases of the system $Li_{1+x}Mn_2$—$xO_4$–d. Journal of Power Sources 69:145-156 (1997).

Grindy et al., Approaching chemical accuracy with density functional calculations: Diatomic energy corrections. Phys. Rev. B. 87:075150 (2013).

Hoshino., Innovative lithium recovery technique from seawater by using world-first dialysis with a lithium ionic superconductor. Desalination 359:59-63 (2014).

Hoshino., Lithium Recovery Technology for Stably Supplying Fuel to Fusion Reactors: World-First Dialysis Technique for Lithium Recovery from Seawater, JAEA R&D Review (pp. 116) (2015).

Hui et al., Preparation of new lithium adsorbents. Inorganic Chemicals Industry, Feb. 2014 (English abstract).

Jain. et al. Commentary: The Materials Project: A materials genome approach to accelerating materials innovation. APL Mater. 1:011002-11 (2013).

Jain et al. Formation enthalpies by mixing GGA and GGA+U calculations. Phys. Rev. B 84:045115 (2011).

Jiang. Synthesis of Spinel $Li_2MnO_3$ and Its Ion-exchange Property for Li+. Advanced Materials Research 554-556:860-863 (Jul. 2012).

Kesler et al. Global lithium resources: Relative importance of pegmatite, brine and other deposits. Ore Geology Reviews 48:55-69 (2012).

Kirklin et al., The Open Quantum Materials Databse (OQMD): assessing the accuracy of DFT formation energies. Nature Publishing Group 1:1-15 (2015).

Kresse et al., Ab Initio Molecular Dynamics for Liquid Metals. Phys. Rev. B 7:558-561 (1993).

Kresse et al., Ab initio molecular-dynamics simulation of the liquid-metal–amorphous-semiconductor transition in germanium. Phys. Rev. B. 49:14251-14269 (1994).

Kresse et al., Efficiency of ab-initio total energy calculations for metals and semiconductors using a plane-wave basis set. Computational Materials Science 6(1):15-50(1996).

Kresse et al., Efficient iterative schemes for ab initio total-energy calculations using a plane-wave basis set. Phys Rev B Condens Matter 54(16):11169-11186 (1996).

Kresse et al., From ultrasoft pseudopotentials to the projector augmented-wave method. Phys. Rev. B. 59:1758-1774 (1999).

Larumbe et al. Effect of a $SiO_2$ coating on the magnetic properties of $Fe_3O_4$ nanoparticles. J Phys Condens Matter 24(26):266007 (2012).

Liechtenstein et al., Density-functional theory and strong interactions: Orbital ordering in Mott-Hubbard insulators. Phys. Rev. B 52:5467-5470 (1995).

Liu et al. Recent developments in electrolytic devices for ion chromatography. J Biochem Biophys Methods 60(3):205-232 (2004).

(56) References Cited

OTHER PUBLICATIONS

Lu et al. Soft chemical synthesis and adsorption properties of MnO2 center dot 0.5H(2)O, a high performance ion sieve for lithium. Acta Chimica Sinica 65(12):1135-1139 (2007).
Ma et al. CN 105251436 A Supplemental Machine Translation, original document published Jan. 20, 2016, translated Aug. 10, 2023.
Meshram et al., Extraction of lithium from primary and secondary sources by pre-treatment, leaching and separation: A comprehensive review. Hydrometallurgy 150:192-208 (2014).
Miyai et al. Bench scale studies on lithium recovery from sea water. Nippon Kaisui Gakkai-Shi—Bulletin of the Society of Sea Waterscience, Japan 49(4):226-230 (1995) (English Abstract).
Nishihama et al. Selective recovery process of lithium from seawater using integrated ion exchange methods. Solvent Extraction and Ion Exchange 29:421-431 (2011).
Oh et al. Double Carbon Coating of LifePO4 as High Rate Electrode for Rechargeable Lithium Batteries. Adv. Mater. 22:4842-4845 (2010).
Ong et al., Li—Fe—P—O2 phase diagram from first principles calculations. Chem. Mater., 20:1798-1807 (2008).
Onodera et al., Preparation method and lithium adsorption propety of LAMBDA.—MnO2-silica composite. Chem. Lett., 19(10):1801-1804 (1990).
Ooi et al., Mechanism of lithium (1+) insertion in spinel-type manganese oxide. Redox and ion-exchange reactions. Langmuir 7:1167-1171 (1991).
Pareja et al. Corrosion behaviour of zirconia barrier coatings on galvanized steel. Surface and Coatings Technology 200(22-23):6606-6610 (2006).
Patel et al. Ionic and electronic conductivities of atomic layer deposition thin film coated lithium ion battery cathode particles. RSC Advances 6:98768-98776 (2016).
PCT/US2017/015790 International Search Report and Written Opinion dated Apr. 20, 2017.
PCT/US2017/061384 International Search Report and Written Opinion dated Feb. 14, 2018.
PCT/US2018/044821 International Search Report and Written Opinion dated Oct. 12, 2018.
PCT/US2018/044868 International Search Report and Written Opinion dated Mar. 6, 2019.
PCT/US2019/017885 International Search Report and Written Opinion dated Jun. 14, 2019.
PCT/US2019/019780 International Search Report and Written Opinion dated Jun. 14, 2019.
PCT/US2021/012534 International Search Report and Written Opinion dated Apr. 27, 2021.
PCT/US2021/036227 International Search Report and Written Opinion dated Nov. 2, 2021.
PCT/US2021/059921 International Search Report and Written Opinion dated Mar. 14, 2022.
PCT/US2022/025810 International Search Report and Written Opinion dated Sep. 30, 2022.
PCT/US2022/025810 Invitation to Pay Additional Fees dated Jul. 5, 2022.
PCT/US2023/016438 International Search Report and Written Opinion dated Jun. 27, 2023.
PCT/US2023/016443 International Search Report and Written Opinion dated Jul. 25, 2023.
PCT/US2023/017172 International Search Report and Written Opinion dated Sep. 19, 2023.
PCT/US2023/018806 International Search Report and Written Opinion dated Jun. 30, 2023.
PCT/US2023/020726 International Search Report and Written Opinion dated Aug. 25, 2023.
Perdew et al. Generalized gradient approximation made simple. Phys. Rev. Lett. 77:3865-3868 (1996).
Reichel et al. Lithium recovery from lithium-containing micas using sulfur oxidizing microorganisms. Minerals Engineering 106:18-21 (2017).

Rioyo et al. Lithium Extraction from Spodumene by the Traditional Sulfuric Acid Process: A Review. Mineral Processing and Extractive Metallurgy Review 43(1):97-106 (2020).
Saal et al., Materials Design and Discovery with High-Throughput Density Functional Theory: The Open Quantum Materials Database (OQMD). JOM 65:1501-1509 (2013).
Schultze et al. Recovering Lithium Chloride From a Geothermal Brine. US Department of the Interior, Bureau of Mines. vol. 8883 (18 pgs) (1984).
Swain., Recovery and recycling of lithium: A review, Separation and Purification Technology 172:388-40 (2016).
Tarakina et al. Defect crystal structure of new TiO(OH)2 hydroxide and related lithium salt Li2TiO3. Dalton Trans 39:8168-8176 (2010).
Thackeray et al., Li 2 MnO 3-stabilized LiMO 2 (M=Mn, Ni, Co) electrodes for lithium-ion batteries. J Mat Chem., 17:3112 (2007).
Umeno et al. Preparation and Adsorptive Properties of Membrane-Type Adsorbents for Lithium Recovery from Seawater. Ind Eng Chem Res 41(17):4281-4287 (2002).
Xiao et al. Adsorption and desorption behavior of lithium ion in spherical PVC—MnO2 ion sieve. Industrial & engineering chemistry research, 51(33):10921-10929 (2012).
Xiao et al. Lithium ion recovery from brine using granulated polyacrylamide-MnO 2 ion-sieve. Chemical Engineering Journal 279:659-666 (2015).
Xie et al. Preparation and Lithium Extraction of Li1.6Mn1.6O4/PVDF Porous Film. Chinese Journal of Chemical Engineering pp. 1-3 2014) Retrieved from the Internet: URL:https://d.wanfangdata.com.cn/periodical/ChlQZXJpb2RpY2FsQ0hJTmV3UzlwMjlwND E1Eg1oZ3hiMjAxNDAxMDMxG ghva3phOTl2ZQ°/O3D°/O3D.
Xu et al. Extraction of lithium with functionalized lithium ion-sieves. Progress in Materials Science 84:276-313 (2016).
Yang et al., TiO2 Coating Modification for Lithium Ion Sieve. Material Reports 31:435-438 (2017) (English Abstract).
Zaghib et al. Safe and fast-charging Li-ion battery with long shelf life for power applications. J Power Sources 196:3949-3954 (2011).
Zandvakili et al. Preparation and characterisation of lithium ion exchange composite for the recovery of lithium from brine. Mineral Processing and Extractive Metallurgy 127(3):176-181 (2017).
Zhang et al. Li2SnO3 derived secondary Li—Sn alloy electrode for lithium-ion batteries. J. Alloys Compd. 415:229-233 (2006).
Zhu et al. Adsorption and desorption properties of Li+ on PVC—H1.6Mn1.6O4 lithium ion-sieve membrane. Chemical Engineering Journal 235:340-348 (2014).
Co-pending U.S. Appl. No. 18/484,213, inventors Snydacker; David Henry et al., filed Oct. 10, 2023.
Co-pending U.S. Appl. No. 18/484,217, inventors Snydacker; David Henry et al., filed Oct. 10, 2023.
PCT/US2023/076285 International Invitation to Pay Additional Fees dated Jan. 8, 2024.
U.S. Appl. No. 16/843,641 Office Action dated Dec. 27, 2023.
AAT BioQuest. Sodium Borate Buffer (1 M, pH 8.5) Preparation and Recipe :pp. 1-4 (2018). Retrieved from Internet URL: https://www.aatbio.com/resources/buffer-preparations-and-recipes/sodium-borate-buffer-ph-8-5. Retrieved from the Internet on Jun. 7, 2024.
Co-pending U.S. Appl. No. 18/441,779, inventors Snydacker; David Henry et al., filed Feb. 14, 2024.
Herrmann, Laura., et al, Lithium recovery from geothermal brine—an investigation into the desorption of lithium ions using manganese oxide adsorbents. Energy Adv 1: 877-885 (2022).
PCT/US2023/076285 International Search Report and Written Opinion dated Mar. 13, 2024.
PCT/US2023/080369 International Search Report and Written Opinion dated May 3, 2024.
PCT/US2024/025420 International Search Report and Written Opinion dated Jul. 26, 2024.
Shin, Junho et al. Preparation of lithium carbonate from waste lithium solution through precipitation and wet conversion methods. Hydrometallurgy 210:105863 (pp. 1-9) (2022).
Song et al. Lithium extraction from Chinese salt-lake brines: opportunities, challenges, and future outlook. Environ. Sci.: Water Res. Technol., 3:593-597 (2017).
PCT/US2024/040435 Invitation to Pay Additional Fees dated Sep. 30, 2024.

(56) References Cited

OTHER PUBLICATIONS

Grant, Alex, and Chris Doornbos. Much Ado About Unconfined Aquifers?. Jade Cove Partners, Nov. 2020; [retrieved on Dec. 18, 2024]. Available at URL:https://www.jadecove.com/research/muchado pp. 1-8.

Houston, John. et al. The Evaluation of Brine Prospects and the Requirement for Modifications to Filing Standards. Economic Geology 106(7):1225-1239 (2011).

PCT/US2024/040435 International Search Report and Written Opinion dated Dec. 3, 2024.

PCT/US2024/052957 International Search Report and Written Opinion dated Dec. 12, 2024.

Shi, Xichang. et al. Synthesis and properties of Li1.6Mn1.6O4 and its adsorption application. Hydrometallurgy 110(1-4):99-106 (2011).

Bell, G. S. et al. The evaluation of manganese dioxide for use in primary galvanic cells. Electrochimica Acta 14(6):453-457 (1969).

Masquelier, Christian, et al. Chemical and magnetic characterization of spinel materials in the $LiMn_2O_4$—$Li_2Mn_4O_9$—$Li_4Mn_5O_{12}$ System. Journal of solid state chemistry 123(2):255-266 (1996).

Noerochim, Lukman, et al. Synthesis and characterization of lithium manganese oxide with different ratio of mole on lithium recovery process from ge-othermal fluid of Lumpur Sidoarjo. Journal of Materials Science and Chemical Engineering 3(11):56-62 (2015).

Ryu, Taegong, et al. Development of multi-stage column for lithium recovery from an aqueous solution. Hrdometallurgy 157:39-43 (2015).

Urfer, A. et al. The role of particle size in cathode optimization in alkaline primary batteries. Journal of applied electrochemistry 31:341-347 (2001).

Yang, Xiaojing, et al. Synthesis of $Li_{1.33}Mn_{1.67}O_4$ spinels with different morphologies and their ion adsorptivities after delithiation. Journal of Materials Chemistry 10(8):1903-1909 (2000).

Co-pending U.S. Appl. No. 19/170,932, inventors Snydacker; David Henry et al., filed on Apr. 4, 2025.

Mauritz, Kenneth A. et al. State of understanding of nation. Chemical Reviews 104(10):4535-4585 (2004).

\* cited by examiner

LITHIUM EXTRACTION ENHANCED BY AN ALTERNATE PHASE

CROSS-REFERENCE

This application is a continuation of International Application No. PCT/US2023/016438, filed on Mar. 27, 2023, which claims the benefit of U.S. Provisional Application Ser. No. 63/324,559 filed Mar. 28, 2022 and U.S. Provisional Application Ser. No. 63/401,453 filed Aug. 26, 2022, each of which is hereby incorporated by reference in its entirety.

BACKGROUND OF THE INVENTION

Lithium is an essential element for high-energy rechargeable batteries and other technologies. Lithium can be found in a variety of liquid solutions, including natural and synthetic brines and leachate solutions from minerals and recycled products

SUMMARY OF THE INVENTION

Described herein is a process for extracting lithium from a liquid resource comprising: a) contacting a lithium selective sorbent with a liquid resource, wherein the liquid resource comprises lithium ions, and wherein lithium ions in the liquid resource are at least partially absorbed by the lithium selective sorbent to yield an enriched lithium selective sorbent; b) contacting said enriched lithium selective sorbent with an eluent such that lithium is at least partially eluted from said enriched lithium selective sorbent to yield an enriched eluate and the lithium selective sorbent; and c) contacting an alternate phase with said lithium selective sorbent, said enriched lithium selective sorbent, said liquid resource, said eluent, said enriched eluate, or any combination thereof, wherein the alternate phase is a non-aqueous liquid or gas. In some embodiments, the alternate phase of step c) at least partially removes the liquid resource from the enriched lithium selective sorbent following step a). In some embodiments, the alternate phase of step c) at least partially removes the enriched eluate from the lithium selective sorbet following step b). In some embodiments, the process further comprises contacting at least one of the lithium selective sorbent and enriched lithium selective sorbent with a wash solution. In some embodiments, the wash solution contacts the lithium selective sorbent and/or the enriched lithium selective sorbent after the alternate phase has contacted the lithium selected sorbent and/or enriched lithium selective sorbent. In some embodiments, a reduced amount of wash solution is required to at least partially remove the liquid resource, the eluent, or the enriched eluate, from the surface of the lithium selective sorbent or enriched lithium selective sorbent as compared to the process without the use of an alternate phase. In some embodiments, said lithium selective sorbent and/or said enriched lithium selective sorbent is contacted with said wash solution to at least partly remove said alternate phase from said lithium selective sorbent and/or said enriched lithium selective sorbent. In some embodiments, said alternate phase is contacted with said wash solution to at least partly remove said wash solution from said lithium selective sorbent and/or said enriched lithium selective sorbent. In some embodiments, said alternate phase is contacted with said liquid resource to at least partly remove said liquid resource from said lithium selective sorbent. In some embodiments, said alternate phase is contacted with said eluent to increase the rate of lithium desorption from the enriched lithium selective sorbent lithium selective sorbent. In some embodiments, said alternate phase is contacted with said enriched eluate to at least partly remove said enriched eluate from said lithium selective sorbent. In some embodiments, a first alternate phase is contacted with a second alternate phase to at least partially remove the first alternate phase from said lithium selective sorbent and/or said enriched lithium selective sorbent. In some embodiments, said alternate phase is contacted with said wash solution to enhance the removal of said liquid resource, said eluate, said enriched eluate, or said wash solution from said lithium selective sorbent and/or said enriched lithium selective sorbent. In some embodiments, said alternate phase is contacted with said liquid resource to enhance absorption of lithium during the contact of said liquid resource with said lithium selective sorbent. In some embodiments, said alternate phase is contacted with said eluent to enhance the desorption of lithium during the contact of said eluent with said enriched lithium selective sorbent. In some embodiments, said alternate phase is contacted with said enriched eluate to increase the amount of enriched eluate collected. In some embodiments, the increase is at least about 1%, 2%, 3%, 4%, 5%, 6%, 7%, 8%, 9%, 10%, 11%, 12%, 13%, 14%, 15%, or 20% by volume. In some embodiments, the increase is from about 1% to 20%, 5% to 15%, or 5% to 10% by volume. In some embodiments, said alternate phase comprises an organic liquid. In some embodiments, said alternate phase comprises an alkane, alcohol, ester, ether, oil, or any combination thereof. In some embodiments, said alternate phase is a gas. In some embodiments, said gas comprises air, nitrogen, argon, or any combinations thereof. In some embodiments, said gas comprises a compressed gas. In some embodiments, said gas is a gas under vacuum or partial vacuum. In some embodiments, the alternate phase is injected at a pressure of 0.01-1000 psig. In some embodiments, the gas is soluble in said liquid resource, said wash solution, or said eluent. In some embodiments, two or more additional alternate phases are contacted with said lithium selective sorbent and/or said enriched lithium selective sorbent. In some embodiments, lithium extraction occurs in one or more vessels, wherein the one or more vessels comprise i) said lithium selective sorbent housed in a bed and ii) one or more ports for the addition of said liquid resource, said eluent, and said alternate phase. In some embodiments, the one or more vessels is one or more filter banks. In some embodiments, the at least two or more filter banks are aligned in series to form a filter press. In some embodiments, said alternate phase is contacted with said lithium selective sorbent and/or said enriched lithium selective sorbent housed in said bed to repack the lithium selective sorbent and/or said enriched lithium selective sorbent. In some embodiments, the repack of the lithium selective sorbent and/or said enriched lithium selective sorbent results in improved flow characteristics of gases through the bed. In some embodiments, said lithium selective sorbent and/or said enriched lithium selective sorbent is housed in one or more packed beds. In some embodiments, the lithium extraction occurs in one or more fluidized beds comprising said lithium selective sorbent and/or said enriched lithium selective sorbent. In some embodiments, said lithium selective sorbent and/or said enriched lithium selective sorbent can be fluidized or packed in beds. In some embodiments, the fluidization of said lithium selective sorbent and/or said enriched lithium selective sorbent occurs by means of a mechanical agitator. In some embodiments, the fluidization of said lithium selective sorbent and/or said enriched lithium selective sorbent occurs by means of contact with one or more alternate phases. In some embodiments, the fluidization of said lithium selective sorbent and/or said enriched lithium selective sorbent occurs by means of contact with a liquid resource, a wash solution, the eluent, and one or more alternate phases or combinations thereof. In some embodiments, said liquid resource contacts said lithium selective sorbent in a plurality of vessels arranged in series. In some embodiments, said liquid resource contacts said lithium selective sorbent in a plurality of compartments arranged within a vessel. In some embodiments, said liquid resource contacts said lithium selective sorbent and the lithium selective sorbent is fluidized by contact with the alternate phase. In some embodiments, fluidization increases the rate of lithium absorption by the lithium selective sorbent. In some embodiments, the alternative phase reduces the time required for the liquid resource to drain from the one or more beds. In some embodiments, said eluent contacts said enriched lithium selective sorbent and the enriched lithium selective sorbent is fluidized by contact with the alternate phase. In some embodiments, fluidization increases the rate of lithium desorption into the enriched eluate. In some embodiments, the alternative phase reduces the time required for the enriched eluate to drain from the one or more beds. In some embodiments, the lithium selective sorbent comprises porous ion exchange beads. In some embodiments, said lithium selective sorbent comprises porous ion exchange beads with a mean diameter of 50 microns to 800 microns. In some embodiments, the process further comprises a pH modulating system for increasing the pH of the liquid resource in the system. In some embodiments, said lithium selective sorbent is a protonated ion exchange material and the enriched lithium selective sorbent is a lithiated ion exchange material. In some embodiments, said protonated ion exchange material is generated by treating a pre-activated ion exchange material with an acid. In some embodiments, said pre-activated ion exchange material comprises $LiFePO_4$, $LiMnPO_4$, $Li_2MTiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, said lithium selective sorbent is an adsorbent. In some embodiments, the adsorbent comprises a crystalline lithium salt aluminate, a lithium aluminum intercalate, $LiCl·2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the adsorbent comprises a lithium aluminum intercalate. In some embodiments, said lithium selective sorbent is coated with a coating that is selected from an oxide, a polymer, or combinations thereof. In some embodiments, said lithium selective sorbent is coated with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the eluent is an acidic solution. In some embodiments, the acidic solution comprises hydrochloric acid, sulfuric acid, nitric acid, phosphoric acid, hydrobromic acid, hydroiodic acid, perchloric acid, acetic acid, or a combination thereof. In some embodiments, the process further comprises a wetting stage wherein the lithium selective sorbent is wetted prior to contact with the liquid resource. In some embodiments, the lithium selective sorbent is submerged in water or an aqueous solution in a vessel, and wherein the vessel is pressurized with an alternate phases, wherein the alternate phase is a gas. In some embodiments, the vessel is pressurized between 10-100 psi for between 10 seconds and 60 mins. In some embodiments, the vessel is de-pressurized and the water or aqueous solution drained. In some embodiments, the process is repeated in two or more cycles. In some embodiments, contact is increased between the liquid resource, the eluent, the lithium selective sorbent, and the enriched lithium selective sorbent. In some embodiments, the lithium recovery is increased by at least about 1%, 2%, 3%, 4%, 5%, 6%, 7%, 8%, 9%, 10%, 11%, 12%, 13%, 14%, 15%, or 20%. In some embodiments, the increase is from about 1% to 20%, 5% to 15%, or 5% to 10% by volume.

Disclosed herein is one or more vessels, wherein each of the one or more vessels comprises: i) one or more compartments; ii) a lithium selective sorbent; iii) a device configured to inject an alternate phase into said compartments and said lithium selective sorbent; wherein said one or more vessels are configured to extract lithium ions from a liquid resource, and wherein said alternate phase comprises a non-aqueous solution or gas. In some embodiments, said lithium selective sorbent is configured to contact a liquid resource comprising lithium. In some embodiments, said lithium selective sorbent is configured to contact with a wash solution, wherein the wash solution is an aqueous solution or pure water. In some embodiments, said lithium selective sorbent is configured to contact an eluent to elute the loaded lithium while absorbing protons. In some embodiments, said alternate phase is configured to contact with said lithium selective sorbent. In some embodiments, said alternate phase is configured to contact with said lithium selective sorbent to repack an ion exchange bed with optimal flow characteristics. In some embodiments, the one or more vessels additionally comprises a mixing device. In some embodiments, the one or more vessels additionally comprises one or more pH modulating systems. In some embodiments, the lithium selective sorbent is loaded into said one or more compartments. In some embodiments, the one or more vessels additionally comprises a porous partition between said one or more compartments. In some embodiments, the one or more vessels are cylindrical vessels containing an interior compartment loaded with lithium selective sorbent, configured such that said liquid resource flows through said lithium selective sorbent in a direction that is oriented radially to said cylindrical vessels. In some embodiments, the one or more vessels are cylindrical vessel containing lithium selective sorbent located between two concentric porous cylindrical structures. In some embodiments, the one or more vessels additionally comprises a porous pipe near the center of the one or more vessels, wherein the porous pipe is configured to allow the flow of a liquid or alternate phase through the lithium selective sorbent in a direction oriented radially to the vessel. In some embodiments, the one or more vessels additionally comprises a vessel housing, wherein said vessel housing comprises an inner cylindrical vessel and an outer cylindrical vessel, wherein said lithium selective sorbent is housed between said inner cylindrical vessel and said outer cylindrical vessel. In some embodiments, said inner cylindrical vessel and said outer cylindrical vessel are permeable to facilitate flow of said liquid resource through said lithium selective sorbent. In some embodiments, said inner cylindrical vessel and/or said outer cylindrical vessel are fixed with holes, slits, nozzles, meshes, or a combination thereof to facilitate flow of a liquid resource, eluent, wash solution, or alternate phase through said lithium selective sorbent while containing said lithium selective sorbent inside of said vessel housing. In some embodiments, a liquid flow in a radial orientation through said lithium selective sorbent from near the outside of said vessel to near the inside of said vessel. In some embodiments, a liquid flow in a radial orientation through said lithium selective sorbent from near the inside of said vessel to near the outside of said vessel. In some embodiments, the one or more vessels additionally comprises one or more internal flow distributors. In some embodiments, the vessel is configured to be loaded with said lithium selective sorbent, said liquid resource, a wash solution, an eluent, and an alternate phase. In some embodiments, the liquid resource, the wash solution, the eluent, and the alternate phase enters into the one or more vessels from two or more flow distributors. In some embodiments, the two or more flow distributors are located at opposing ends of each of said one or more vessels. In some embodiments, the liquid resource, the wash solution, the eluent, and the alternate phase exit each of said one or more vessels from one or more flow distributors. In some embodiments, the one or more flow distributors are located near the center point between said two opposite ends of each of the one or more vessels. In some embodiments, the one or more vessels additionally comprises one or more candles, wherein each of said one or more candles comprises two concentric structures that are i) permeable to flow of said liquid resource, an eluent, a wash solution, or an alternate phase and ii) contain said lithium selective sorbent. In some embodiments, the one or more vessels additionally comprises: a) a volume filled with an alternate phase; b) a mechanism to control the fluid level inside said one or more vessels. In some embodiments, the fluid level of a liquid resource, a washing solution, or eluent is adjusted by adjusting a pressure of the alternate phase within the volume filled thereby. In some embodiments, the fluid level of a liquid resource, a washing solution, or eluent is adjusted by adjusting a flow rate of the alternate phase entering or exiting the one or more vessels. In some embodiments, the fluid level of a liquid resource, a washing solution, or an eluent is adjusted by adjusting an opening of a valve at the bottom of the one or more vessels. In some embodiments, the device comprises holes, slits, nozzles, meshes, spargers, or orifices to inject the alternate phase into the vessel. In some embodiments, said injection occurs below, above, or inside, a bed comprising the lithium selective sorbent. In some embodiments, said injection occurs in a combination of below, above, or inside the bed. In some embodiments, injection of an alternate phase improves the distribution of the flow of a liquid lithium resource, wash solution, or eluent. In some embodiments, injection of an alternate phase serves to adjust the pH of the liquid resource, wash solution, or eluent contacting the lithium selective sorbent. In some embodiments, injection of an alternate phase serves to adjust the oxidation-reduction potential of the liquid resource, wash solution, or eluent. In some embodiments, the one or more vessels are configured to flow the liquid resource, wash solution, eluent, or alternate phase from the top of the one or more vessels to the bottom of the one or more vessels. In some embodiments, the one or more vessels are configured to flow the liquid resource, wash solution, eluent, or alternate phase from the bottom of the one or more vessels to the top of the one or more vessels. In some embodiments, the one or more vessels additionally comprises a filler material. In some embodiments, there are at least two vessels in liquid contact to form a network of multiple vessels. In some embodiments, said liquid resource flows through one vessel and into another vessel sequentially. In some embodiments, said liquid resource flows through a first vessel, through a unit which adjusts the pH of the liquid resource, and into a second vessel. In some embodiments, the lithium selective sorbent comprises porous ion exchange beads. In some embodiments, said lithium selective sorbent comprises porous ion exchange beads with a mean diameter of 50 microns to 800 microns. In some embodiments, the one or more vessels additionally comprises a pH modulating unit for increasing the pH of the liquid resource in the system. In some embodiments, the one or more vessels additionally comprises a mesh material used to immobilize the lithium selective sorbent. In some embodiments, said lithium selective sorbent is selected from and ion exchange material and an adsorbent. In some embodiments, said ion exchange material comprises $LiFePO_4$, $LiMnPO_4$, $Li_2MTiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, the adsorbent comprises a crystalline lithium salt aluminate, a lithium aluminum intercalate, $LiCl \cdot 2Al(OH)_3$, crystalline aluminum trihydroxide $(Al(OH)_3)$, gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the adsorbent comprises a lithium aluminum intercalate. In some embodiments, said lithium selective sorbent is a coated with a coating that is selected from an oxide, a polymer, or combinations thereof. In some embodiments, said lithium selective sorbent is a coated with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the eluent is an acid comprising hydrochloric acid, sulfuric acid, nitric acid, phosphoric acid, hydrobromic acid, hydroiodic acid, perchloric acid, acetic acid, or a combination thereof. In some embodiments, the wash solution consists of an aqueous solution or pure water. In some embodiments, said alternate phase comprises an organic liquid. In some embodiments, said alternate phase comprises an alkane alcohol, ester, ether, oil, or any combination thereof. In some embodiments, the alternate phase is a gas. In some embodiments, said gas comprises air, nitrogen, argon, or any combinations thereof. In some embodiments, said gas is a compressed gas. In some embodiments, said gas is a gas under vacuum or partial vacuum. In some embodiments, the alternate phase is injected at a pressure of 0.01-1000 psig. In some embodiments, said gas is soluble in said liquid resource, said wash solution, or said eluent. In some embodiments, two or more additional alternate phases are contacted with said lithium selective sorbent. In some embodiments, the one or more vessels additionally comprises packed beds or fluidized beds to house the lithium selective sorbent. In some embodiments, fluidization of said lithium selective sorbent occurs by means of a mechanical agitator. In some embodiments, fluidization of said lithium selective sorbent occurs by means of contact with a liquid resource, a wash solution, an eluent, one or more alternate phases or combinations thereof. In some embodiments, two or more vessels are arranged in series. In some embodiments, said liquid resource contacts said lithium selective sorbent in a plurality of compartments arranged within a vessel.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 20A illustrates a filter press comprising filter plates stacked together; FIG. 20B illustrates the face of a filter bank; and FIG. 20C illustrates the interior of the filter banks.

DETAILED DESCRIPTION OF THE INVENTION

Figure 1:
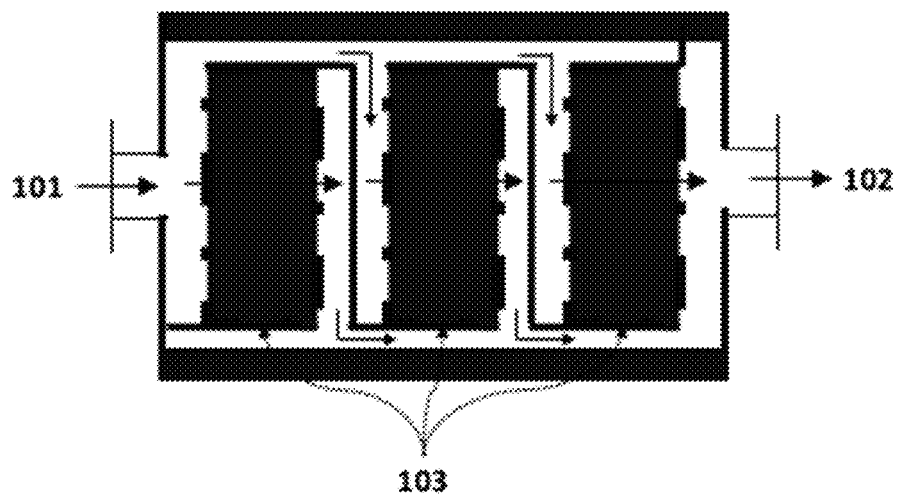
FIG. 1 illustrates a vessel comprising filter banks loaded with ion exchange beads, wherein an alternate phase comprising hexane is used to enhance lithium extraction by ion exchange.

The terms "lithium", "lithium ion", and "$Li^+$" are used interchangeably in the present specification and these terms are synonymous unless specifically noted to the contrary. The terms "hydrogen", "hydrogen ion", "proton", and "$H^+$" are used interchangeably in the present specification and these terms are synonymous unless specifically noted to the contrary.

As used herein, the words "column" and "vessel" are used interchangeably. In some embodiments described herein referring to a "vessel", the vessel is a column. In some embodiments described herein referring to a "column", the column is a vessel.

The term "the pH of the system" or "the pH of" a component of a system, for example one or more tanks, vessels, columns, pH modulating setups, or pipes used to establish fluid communication between one or more tanks, vessels, columns, or pH modulating setups, refers to the pH of the liquid medium contained or present in the system, or contained or present in one or more components thereof. In some embodiments, the liquid medium contained in the system, or one or more components thereof, is a liquid resource. In some embodiments, the liquid medium contained in the system, or one or more components thereof, is a brine. In some embodiments, the liquid medium contained in the system, or one or more components thereof, is an acid solution, an aqueous solution, a wash solution, a salt solution, a salt solution comprising lithium ions, or a lithium-enriched solution.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process is optionally repeated to extract lithium from a liquid resource and yield a concentrated lithium solution. The concentrated lithium solution is optionally further processed into chemicals for the battery industry or other industries.

In some embodiments of the systems and methods disclosed herein, a lithium selective sorbent is utilized. The term "lithium selective sorbent" is a chemical compound or material (e.g., a resin, a polymer, a composite, a mineral) that preferably uptakes or absorbs lithium from a liquid resource as compared to other metals (e.g., potassium, sodium, magnesium, etc.). In some embodiments, the lithium selective sorbent comprises an ion exchange material or an absorbent. In some embodiments, the lithium selective sorbent comprises an ion exchange material. In some embodiments, the lithium selective sorbent comprises ion exchange particles. In some embodiments, the lithium selective sorbent comprises ion exchange beads. In some embodiments, the lithium selective sorbent comprises an adsorbent such as a lithium aluminum intercalate. Accordingly, embodiments of the present disclosure directed to "ion exchange material" or "absorbent" are also operably directed to "lithium selective sorbent" unless specified otherwise.

In some embodiments of the systems and methods disclosed herein, a lithium selective sorbent is contacted with a liquid resource comprising lithium. The lithium in the liquid resource is absorbed by the lithium selective sorbent to yield and enriched lithium selective sorbent. In some embodiments, the enriched lithium selective sorbent contains a higher lithium content then the lithium selective sorbent. In some embodiments, the lithium selective sorbent is an ion exchange material. In some embodiments, the lithium selective sorbent is a protonated ion exchange material. In some embodiments, the protonated ion exchange material is contacted with a liquid resource comprising lithium. The lithium in the liquid resource is absorbed via an ion exchange process to yield a lithiated ion exchange material.

In some embodiments, the chemical formula of the ion exchange material may vary throughout the ion exchange systems and processes described herein in terms of hydrogen and lithium stoichiometries, as the ion exchange materials readily exchange lithium and hydrogen depending on the aqueous solutions and alternate phase that the ion exchange material is exposed to. In addition, fully lithiated or fully protonated ion exchange materials may not be the most stable form of the material and is therefore commercially sold as another form. For example, many commercially available ion exchange materials benefit from an activation step in which the material is wetted and activated with an acid wash to produce an ion exchange material that is in an ideal state for lithium absorption (termed pre-activated ion exchange materials herein). In some embodiments, the term "protonated ion exchange material" refers to material that has been activated and is capable of absorbing lithium. In some embodiments, the protonated ion exchange material is at least partially protonated. In some embodiments, the protonated ion exchange material is fully protonated. Following exposure to a liquid resource comprising lithium, the protonated ion exchange material absorbs lithium and releases hydrogen to form the lithiated ion exchange material. The stoichiometries of the ion exchange material and the lithiated ion exchange material may vary with both the lithium concentration of the liquid resource and the pH of the acidic solution. Therefore, in some embodiments, the material is in part best described by the solution or alternate phase the material has been exposed to most recently. As such, the term "ion exchange material" is meant to include the various states that the material may exist as throughout the ion exchange and preparatory process. In some embodiments, an ion exchange material comprises a protonated ion exchange material, a lithiated ion exchange material, and a pre-activated ion exchange material.

In some embodiments, the ion exchange materials may benefit from an activation process. An ion exchange material that benefits from an activation process is termed "pre-activated ion exchange material." In some embodiments, the pre-activated ion exchange material is selected from an oxide, a phosphate, an oxyfluoride, a fluorophosphate, and combinations thereof. In some embodiments, the pre-activated ion exchange material is selected $Li_4Mn_5O_{12}$, $Li_4Ti_5O_{12}$, $Li_2MO_3$ (M=Ti, Mn, Sn), $LiMn_2O_4$, $Li_{1.6}Mn1.6O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, solid solutions thereof, and combinations thereof. In some embodiments, the pre-activated ion exchange material is selected from the following list: $Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof.

In some embodiments, the processes described herein utilize ion exchange materials that are exposed to a liquid resource and an acidic solution over the course of two or more cycles. The ion exchange material may be protonated ion exchange material following exposure to an acidic solution and subsequently yield a lithiated ion exchange material following exposure to a liquid resource. Although the ion exchange materials described herein are expressed as compounds with discrete stoichiometries, it should be understood that variable amounts of lithium ions and hydrogen ions are envisioned in each ion exchange material during the cyclic ion exchange processes described herein. For example, the ion exchange material $Li_4Ti_5O_{12}$ may be $Li_4Ti_5O_{12}$, $Li_3HTi_5O_{12}$, $Li_2H_2Ti_5O_{12}$, $LiH_3Ti_5O_{12}$, or $H_4Ti_5O_{12}$. Combinations of such states are also envisioned, and may be expressed as averages, for example $Li_{2.1}H_{1.9}Ti_5O_{12}$, $Li_{2.2}H_{1.8}Ti_5O_{12}$, $Li_{2.3}H_{1.7}Ti_5O_{12}$, $Li_{2.4}H_{1.6}Ti_5O_{12}$, etc. Applicant envisions that the ion exchange materials listed below comprise the chemical entity listed, each compound that replaces one lithium ion for one hydrogen ion, and any combination of such states: $Li_4Mn_5O_{12}$, $Li_4Ti_5O_{12}$, $Li_2MO_3$ (M=Ti, Mn, Sn), $LiMn_2O_4$, $Li_{1.6}Mn1.6O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, and $Li_2CuP_2O_7$.

In some embodiments, ion exchange material comprises a chemical compound capable of exchanging lithium and hydrogen ions. In some embodiments, ion exchange material comprises a chemical compound capable of ion exchange of lithium and hydrogen, wherein the ion exchange material will uptake lithium selectively as opposed to uptaking other metals or metal ions (e.g., sodium, potassium, magnesium, other metal ions present in liquid resources). In some embodiments, ion exchange material is in the form of ion exchange particles. In some embodiments, ion exchange material or ion exchange beads comprise a coating material. In some embodiments, ion exchange material or ion exchange beads do not comprise a coating material. In some embodiments, ion exchange material is in the form of ion exchange beads. In some embodiments, ion exchange beads are porous. Embodiments of the present disclosure directed to "ion exchange beads" shall be understood to also be directed to "ion exchange material" unless specified otherwise. Embodiments of the present disclosure that specify use of "ion exchange beads" may also operably use "ion exchange material" unless specified otherwise.

In some embodiments, an absorbent is selected from a lithium aluminum intercalate (e.g., a lithium aluminate intercalate, a lithium salt aluminum intercalate, a lithium salt aluminate intercalate). In some embodiments the absorbent selectively absorbs lithium. In some embodiments, the absorbent comprises a crystalline lithium salt aluminate, a lithium aluminum intercalate, $LiCl\cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the absorbent comprises one or more of scandium, titanium, vanadium, chromium, manganese, iron, cobalt, nickel, copper, zinc, yttrium, zirconium, and niobium, mixtures thereof, compounds thereof, or combinations thereof.

The term "eluent" is used herein to describe a solution that can be used to release lithium absorbed by the lithium selective sorbent, also termed an enriched lithium selective sorbent. The lithium can be selectively absorbed and released through an ion exchange process (e.g., the exchange of $Li^+$ and $H^+$ ions via lithium manganese oxides) or an adsorption process (e.g., aluminum intercalates that bind and release discrete lithium salts). The eluents described herein may be acidic or non-acidic. An acidic eluent is termed an "acidic solution." An acidic solution may be required to remove lithium from the enriched lithium selective absorbent wherein the lithium selective sorbent is a lithiated ion exchange material.

An eluent that contains lithium following contact with an enriched lithium selective sorbent is termed an "enriched eluate." The term "enriched eluate" can be used interchangeably with the terms "lithium eluate," "synthetic lithium solution," and "synthetic lithium eluate." An enriched eluate that is acidic is termed an "acidic eluate" as used herein.

Ion exchange beads, including ion exchange particles, ion exchange material, ion exchange media, porous ion exchange beads, and/or coated ion exchange particles, can be loaded into ion exchange vessels. Alternating flows of brine, acid, and other solutions are optionally flowed through an ion exchange column or vessel to extract lithium from the brine and produce a lithium concentrate, which is eluted from the column or vessel using the acid. As brine flows through the ion exchange column or vessel, the beads absorb lithium while releasing hydrogen, where both the lithium and hydrogen are cations. After the beads have absorbed lithium, acid is used to elute the lithium from the ion exchange beads to produce an enriched eluate or lithium-enriched solution.

Ion exchange beads may have small diameters less than about one millimeter, causing a high-pressure difference across a packed bed of the beads during pumping of the liquid resource and other fluids through the bed. To minimize pressure across the packed bed and to minimize associated pumping energy, vessels with optimized geometries can be used to reduce the flow distance through the packed bed of ion exchange beads. These vessels may be networked with pH modulation units to achieve adequate control of the pH of the liquid resource.

In some embodiments a network of vessels loaded with ion exchange materials may comprise two vessels, three vessels, four vessels, five vessels, six vessels, seven vessels, eight vessels, nine vessels, 10 vessels, 11 vessels, 12 vessels, 13-14 vessels, 15-20 vessels, 20-30 vessels, 30-50 vessels, 50-70 vessels, 70-100 vessels, or more than 100 vessels.

Fresh water is a valuable resource, especially in desert environments where liquid resources comprising lithium are located. Minimizing the overall amount of water consumed by the ion exchange process is important to achieving an economical process while minimizing the environmental impact of water consumption. For example, ion exchange beads of average particle diameter of about 0.5 mm can be arranged in a bed with a flow path of 1 meter in length and 0.2 meters in diameter. After said beads have absorbed lithium, brine must be removed from said packed bed prior to elution of the lithium from the ion exchange beads; otherwise, said entrained brine will be dissolved in the eluent and result in impurities present in the eluted lithium. Typically, removal of said brine is achieved by ceasing the flow of brine and treating the ion exchange beads with an aqueous wash solution such as industrial water, which displaces entrained brine from the ion exchange beads. However, salts in said entrained brine dissolve in said aqueous wash solution, resulting in a high-salinity stream that cannot be used further in the ion exchange process; therefore, a constant stream of fresh water must be supplied to the ion exchange process to be used as a wash solution, resulting in the consumption of fresh water. In the case of the aforementioned bed, 200 L of water are needed to remove entrained brine to a total-dissolved-solids concentration of less than 1 g/L, resulting in a water consumption of 200 L per lithium absorption-desorption cycle. If, instead, an alternate phase that is immiscible with brine, such as air, is used to displace said entrained brine, no aqueous wash solution is needed to remove entrained brine, and elution can proceed immediately. Thus, the use of an alternate phase minimizes the consumption of water associated with removal of entrained brine.

Achieving efficient mixing of ion exchange beads and the liquid resource is essential to achieving efficient ion exchange performance. Mechanical agitation is one approach to achieving such efficient mixing; however, it requires a high energy consumption and constant maintenance of equipment. If, instead, an alternate phase is co-injected with the liquid resource into the ion-exchange bed, its different flow characteristics will result in the turbulence and agitation of the ion exchange bed and the liquid resource, resulting in efficient mixing without the need of mechanical agitation. This reduces the cost, energy consumption, and maintenance requirements associated with agitation of the ion exchange bed.

Exemplary embodiments of the present invention include devices for contacting an ion exchange material with an alternate phase to improve the efficiency of lithium extraction via ion exchange. Other exemplary embodiments of the present invention include processes whereby an ion exchange material is contacted with an alternate phase to improve the efficiency of lithium extraction via ion exchange. In some embodiments, said efficiency is improved by decreasing water requirements for ion exchange by using an alternate phase. In other embodiments, said efficiency is improved by improving mixing using an alternate phase.

Vessels for Packed Beds of Ion Exchange Beads

For commercial production of lithium using ion exchange, it is desirable to construct large-scale ion exchange modules (wherein such modules can comprise one or more vessels and/or one or more columns) containing large quantities of ion exchange beads. However, most large vessels capable of holding about one tonne or more of ion exchange beads have large fluid flow distances of about one meter or more. These fluid flow distances cause large pressure drops. To reduce the pressure drop across the ion exchange bed, the ion exchange beads can be loaded into vessels facilitating flow across the ion exchange beads with a shorter fluid flow distance. These vessels can be designed to evenly distribute flow of the liquid resource and other fluids through the ion exchange beads.

In some embodiments, the vessel can be oriented vertically, horizontally, or at any angle relative to the horizontal axis. In some embodiments, the vessel is oriented vertically, horizontally, or at any angle relative to the horizontal axis. In some embodiments, the vessel is oriented statically. In some embodiments, the vessel is configured in a manner that allows the orientation of the vessel to be adjusted or modulated as needed. In some embodiments, the vessel can be cylindrical, rectangular, spherical, another shape, or a combination thereof. In some embodiments, the vessel can have a constant cross-sectional area or a varying cross-sectional area. In some embodiments, the vessel is cylindrical, rectangular, spherical, another shape, or a combination thereof. In some embodiments, the vessel has a constant cross-sectional area or a varying cross-sectional area.

In some embodiments, the vessel has a height to diameter ratio of less than about 0.1, 0.5, less than about 1, less than about 2, less than about 5, less than about 10, more than about 0.1, more than about 0.5, more than about 1, more than about 2, more than about 5, more than about 10. In one embodiment, the vessel internal (e.g., the interior surface of the vessel) is coated with a polymeric or rubber material. In one embodiment the vessel is equipped with an outlet collector tray. In one embodiment the vessel has multiple injection ports for the inlet or outlet flow. In one embodiment the flow is introduced from the bottom, top, middle of the vessel, or a combination of thereof. In one embodiment the vessel is outfitted with baffles or plates to break fluid jets.

In some embodiments, the ion exchange beads contained within such a vessel have an average particle diameter less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the ion exchange beads have an average particle diameter more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the ion exchange beads have a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange material contained within such a vessel has an average particle diameter less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the ion exchange material has an average particle diameter more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the ion exchange material has a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

It is recognized that measurements of average particle diameter can vary according to the method of determination utilized. Determination of said average particle diameter according to one method to obtain one or more values shall be understood to inherently encompass all other values that may be obtained using other methods. The average particle diameter can be determined using sieve analysis. The average particle diameter can be determined using optical microscopy. The average particle diameter can be determined using electron microscopy. The average particle diameter can be determined using laser diffraction. The average particle diameter may be determined using laser diffraction using an Anton-Paar PSA instrument. The average particle diameter can be determined using dynamic light scattering. The average particle diameter may be determined using dynamic light scattering. In some embodiments, the average particle diameter can be determined using static image analysis. The average particle diameter can be determined using dynamic image analysis.

In some embodiments, the ion exchange beads contained within such a vessel are co-loaded with inert beads that do not undergo ion-exchange processes (e.g., the inert beads comprise materials or compounds that do not undergo ion exchange with ions present in liquid resource, wash solution, acid solution, and/or alternate phases as described herein). Such co-loading of ion-exchange beads with inert beads may aid in more optimal flow distribution of process fluids, and/or in decreasing the resistance to flow through a bed of ion-exchange beads. In some embodiments, the inert beads may be loaded into the vessel adjacent to the ion exchange beads, mixed with the ion exchange beads, or a combination thereof. In some embodiments, inert beads comprise a polymer, a ceramic, a metal, a carbide, a nitride, an oxide, a phosphate, a fluoride, a polymer, carbon, a carbonaceous material, or combinations thereof. In some embodiments, inert beads consist of a polymer, a ceramic, a metal, a carbide, a nitride, an oxide, a phosphate, a fluoride, a polymer, carbon, a carbonaceous material, or combinations thereof. In some embodiments, inert beads comprise a coating material. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, inert beads have an average particle diameter less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, inert beads have an average particle diameter more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, inert beads have a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange beads contained within such a vessel are co-loaded with a dissolvable particle. In some embodiments, dissolvable particles can include a carbonate, a sulfate, a chloride, a fluoride, a bromide, a phosphate, a nitrate, an organic anion, a polymer, or a combination thereof. In some embodiments, dissolvable particles comprise a chemical compound that is classified as a carbonate, a sulfate, a chloride, a fluoride, a bromide, a phosphate, a nitrate, an organic anion, a polymer, or any combination thereof. In some embodiments, dissolvable particles can include sodium, ammonium, potassium, magnesium, calcium, lithium, aluminum, or a combination thereof. In some embodiments, dissolvable particles comprise a chemical compound comprising sodium, ammonium, potassium, magnesium, calcium, lithium, aluminum, or any combination thereof. In some embodiments, the dissolvable particles are dissolved from the ion-exchange bed after co-loading into the bed. In some embodiments, dissolution is achieved by treatment with water, acid, base or a combination thereof. In some embodiments, dissolution is achieved by treatment with water, acid, base, or a combination thereof at elevated temperature. In some embodiments, acid used for dissolution includes hydrochloric, phosphoric, sulfuric, citric, acetic, nitric, carbonic acids, or a combination thereof. In some embodiments, base used for dissolution includes sodium hydroxide, lithium hydroxide, potassium hydroxide, magnesium hydroxide, calcium hydroxide, or a combination thereof.

In some embodiments, the vessel containing the above ion exchange beads and/or inert beads is comprised of three concentric walls: an outer-wall that contains all internal components of the vessel, an outer perforated wall, and an inner perforated wall. The dimensions of the outer wall is larger than the dimensions of the outer perforated wall, which is larger than the dimensions of the inner perforated wall. In some embodiments, ion exchange beads are contained in the compartment formed by the space between the inner- and outer-perforated walls. In some embodiments, flow of a liquid can occur through the space inside of the inner-perforated wall to and from the ion-exchange bead compartment. In some embodiments, liquid flow can occur through the space between the outer vessel wall and the outer perforated, to and from the ion-exchange bead compartment. In some embodiments, said vessel does not contain an inner perforated wall, such that all ion exchange media are contained within an outer perforated wall. In some embodiments, said vessel does not contain an outer perforated wall, such that all ion exchange media are contained within the outer wall of the vessel, surrounding an inner-perforated wall.

In some embodiments, flow of a liquid resource occurs in and out of the vessel as follows: from the top and bottom of the compartment formed by the outer-perforated wall the outer wall of the vessel, through the outer-perforated wall, into and through the compartment containing the ion-exchange beads, through the inner-perforated wall, and out of the top and bottom of the compartment formed by the inner-perforated walls. In some embodiments, flow of a liquid resource occurs in and out of the vessel as follows: from the top and bottom of the compartment formed by the inner-perforated wall, through the inner-perforated wall, into and through the compartment containing the ion-exchange beads, through the outer-perforated wall, and out of the compartment formed by the outer-perforated wall and the outside wall of the vessel.

In some embodiments, flow of an acidic solution occurs in and out of the vessel as follows: from the top and bottom of the compartment formed by the outer-perforated wall the outer wall of the vessel, through the outer-perforated wall, into and through the compartment containing the ion-exchange beads, through the inner-perforated wall, and out of the top and bottom of the compartment formed by the inner-perforated walls. In some embodiments, flow of an acidic solution occurs in and out of the vessel as follows: from the top and bottom of the compartment formed by the inner-perforated wall, through the inner-perforated wall, into and through the compartment containing the ion-exchange beads, through the outer-perforated wall, and out of the compartment formed by the outer-perforated wall and the outside wall of the vessel.

In some embodiments, the ion exchange beads are contacted with a liquid resource containing lithium, where flow occurs from the larger diameter perforated wall to the smaller diameter perforated wall through the shortest possible path across the ion exchange bead bed, resulting in absorption of lithium by said ion exchange beads. In some embodiments, the ion exchange beads are contacted with a liquid resource containing lithium, where flow occurs from the smaller diameter perforated wall to the larger diameter perforated wall, resulting in absorption of lithium by said ion exchange beads. In some embodiments, the ion exchange beads that have absorbed lithium are contacted with hydrogen ions from acid, where flow occurs from the larger diameter perforated wall to the smaller diameter perforated wall, resulting in release of absorbed lithium to produce a lithium eluate. In some embodiments, the ion exchange beads that have absorbed lithium are contacted with hydrogen ions from acid, where flow occurs from the smaller diameter perforated wall to the larger diameter perforated wall, resulting in release of absorbed lithium to produce a lithium eluate.

In some embodiments, the ion exchange beads are contacted with a liquid resource containing lithium, where flow occurs from the top and bottom of the compartment containing the ion exchange beads, and into the smaller-diameter perforated wall, resulting in absorption of lithium by said ion exchange beads. In some embodiments, the ion exchange beads are contacted with a liquid resource containing lithium, where flow occurs from the smaller-diameter perforated wall to the top and the bottom of the compartment containing the ion exchange beads, resulting in absorption of lithium by said ion exchange beads. In some embodiments, the ion exchange beads are contacted with a liquid resource containing lithium, where flow occurs from the smaller-diameter perforated wall to the top or the bottom of the compartment containing the ion exchange beads, resulting in absorption of lithium by said ion exchange beads. In some embodiments, the ion exchange beads that have absorbed lithium are contacted with hydrogen ions from acid, where flow occurs from the top and bottom of the compartment containing the ion exchange beads, and into the smaller-diameter perforated wall, resulting in release of absorbed lithium to produce a lithium eluate. In some embodiments, the ion exchange beads that have absorbed lithium are contacted with hydrogen ions from acid, where flow occurs from the smaller-diameter perforated wall to the top and the bottom of the compartment containing the ion exchange beads, resulting in release of absorbed lithium to produce a lithium eluate. In some embodiments, the ion exchange beads that have absorbed lithium are contacted with hydrogen ions from acid, where flow occurs from the smaller-diameter perforated wall to the top or the bottom of the compartment containing the ion exchange beads, resulting in release of absorbed lithium to produce a lithium eluate.

In some embodiments, the compartment containing the ion-exchange beads can consist of uniform inner- and outer-diameter perforated wall with constant radius along the vertical length of the vessel. In some embodiments, the compartment containing the ion-exchange beads can consist of inner- and outer-diameter perforated walls with changing diameter to result in a fluid flow distance that varies along the vertical length of the vessel, thus facilitating the even distribution of fluid flow the compartment containing the ion exchange beads. In one embodiment, the length of the ion exchange bed at the center of the vessel (relative to its longitudinal axis) is at a minimum, whereas the length of the ion exchange bed at the top and bottom of the vessel (relative to its longitudinal axis) is at a maximum. In another embodiment, the length of the ion exchange bed at the top and bottom of the vessel (relative to its longitudinal axis) is at a minimum, whereas the length of the ion exchange bed at the center of the vessel (relative to its longitudinal axis) is at a maximum.

In some embodiments, the compartment containing the ion-exchange beads comprises a uniform inner- and outer-diameter perforated wall with a constant radius along the vertical length of the vessel. In some embodiments, the compartment containing the ion-exchange beads comprises inner- and outer-diameter perforated walls with changing diameter to result in a fluid flow distance that varies along the vertical length of the vessel, thus facilitating the even distribution of fluid flow through the compartment containing the ion exchange beads. In one embodiment, the length of the ion exchange bed at the center of the vessel (relative to its longitudinal axis) is at a minimum, whereas the length of the ion exchange bed at the top and bottom of the vessel (relative to its longitudinal axis) is at a maximum. In another embodiment, the length of the ion exchange bed at the top and bottom of the vessel (relative to its longitudinal axis) is at a minimum, whereas the length of the ion exchange bed at the center of the vessel (relative to its longitudinal axis) is at a maximum.

In some embodiments, the compartment containing the ion-exchange beads can be contacted with fluid that flows across the shorter flow path, in the radial direction relative to the vessel. In some embodiments, the compartment containing the ion-exchange beads can be contacted with fluid that flows across the longer flow path, in the axial direction relative to the vessel. In some embodiments, the compartment containing the ion-exchange beads can be contacted with fluid in both the radial and the axial direction relative to the vessel. In some embodiments, the compartment containing the ion-exchange beads is contacted with fluid that flows across the shorter flow path, in the radial direction relative to the vessel. In some embodiments, the compartment containing the ion-exchange beads is contacted with fluid that flows across the longer flow path, in the axial direction relative to the vessel. In some embodiments, the compartment containing the ion-exchange beads is contacted with fluid in both the radial and the axial direction relative to the vessel.

In one embodiment, the ion exchange compartment is partially filled with ion exchange beads, such that ion exchange beads can freely move within their containing compartment during contacting with fluid. In some embodiments, the ion exchange compartment within the reactor vessel is filled to its capacity with ion exchange beads, such that ion exchange beads are fixed in place and cannot freely move within the containing compartment during contacting with fluid. In one embodiment, the ion exchange compartment within the reactor vessel is partially filled and becomes filled by the change in volume of ion exchange beads that occurs when contacting said beads with certain fluids. In some embodiments, the vessel is configured such that ion exchange beads may enter and leave the ion-exchange bead compartment conveyed by the fluid which they are contacting, whether this fluid flow happens in the axial or radial direction, in the out-in or in-out direction, in the top-down or down-top direction. In one embodiment, the ion exchange beads may be loaded into and unloaded from said compartments axially through the top or bottom, or radially through the inner- or outer-perforated walls.

In some embodiments, the typical length of the reactor vessel is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the reactor vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of the reactor vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the typical radius of the inner-perforated wall within the vessel is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the inner-perforated wall within the vessel is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the inner-perforated wall within the vessel is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical radius of the outer-perforated wall within the vessel is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the outer-perforated wall within the vessel is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the outer-perforated wall within the vessel is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the size of the openings in the inner-perforated walls are constant or almost-constant throughout the length and circumference of said wall. In some embodiments, the diameter of the openings in the inner-perforated walls vary along the length of said wall, being largest at the top and bottom and smallest at the center, largest at the center and smallest at the top and bottom, largest at the top and smallest at the bottom, smallest at the top and largest at the bottom, a combination thereof, or randomly distributed. In some embodiments, the dimension of the openings in the inner-perforated wall also varies along the circumference of said wall. In some embodiments, the choice of pore opening size along the length and circumference of inner-perforated wall, relative to the inlet- and outlet-streams, benefits the even distribution of flow throughout the bed of ion-exchange beads and ensures minimum flow resistance. In some embodiments, the number of perforations per square centimeter in the outer-perforated walls is varied along the outer-perforated walls to achieve optimal flow distribution through the vessel and through the ion exchange beads. In some embodiments, the openings on the outer-perforated walls are shaped as vertical or horizontal slits, squares, crosses, rectangles, triangles, irregular shapes, or a combination thereof. In some embodiments, the openings in inner-perforated walls are of dimension of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the perforated openings in inner-perforated walls are of dimension of more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 µm, more than about 500 µm, more than about 600 µm, more than about 700 µm, more than about 800 µm, more than about 900 µm, more than about 1000 µm, more than about 2000 µm. In some embodiments, the perforated openings in inner-perforated walls are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the dimension of the openings in the outer-perforated walls are constant or almost-constant throughout the length and circumference of said wall. In some embodiments, the dimension of the openings in the outer-perforated walls vary along the length of said wall, being largest at the top and bottom and smallest at the center, largest at the center and smallest at the top and bottom, largest at the top and smallest at the bottom, smallest at the top and largest at the bottom, a combination thereof, or randomly distributed. In some embodiments, the dimension of the openings in the outer-perforated wall also varies along the circumference of said wall. In some embodiments, the choice of pore opening dimension along the length and circumference of outer-perforated wall, relative to the inlet- and outlet-streams, benefits the even distribution of flow throughout the bed of ion-exchange beads and ensures minimum flow resistance. In some embodiments, the number of holes per square centimeter in the outer-perforated walls is varied along the outer-perforated walls to achieve optimal flow distribution through the vessel and through the ion exchange beads. In some embodiments, the openings on the outer-perforated walls are shaped as circles, ovals, vertical or horizontal slits, squares, crosses, rectangles, triangles, irregular shapes, or a combination thereof.

In some embodiments, the openings in outer-perforated walls have an opening of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the perforated openings in outer-perforated walls are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the perforated openings in outer-perforated walls are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, the outer- and inner-perforated walls are surrounded by a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, a titanium mesh, or a combination thereof, wherein the mesh is a coarse mesh, a fine mesh, or a combination thereof.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the porous partition comprises openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition comprises openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition comprises openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition comprises openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition comprises openings in that are of a typical characteristic size of from about 1 µm to about 10 µm, from about 10 µm to about 100 µm, from about 100 µm to about 1000 µm, from about 1000 µm to about 10000 µm.

In some embodiments, the typical characteristic opening of the porous polymer partition varies along the length of the porous partition. In some embodiments, the variation in the characteristic opening of the porous partition is chosen such that uniform perpendicular flow is maintained along the entire length of the porous polymer partition. In some embodiments, the variation in the characteristic opening of the porous partition is chosen to direct flow to certain areas of the ion exchange bed. In some embodiments, the pore size of the porous polymer partition varies along the porous partition. In some embodiments, the pore density of the porous polymer partition varies along the porous partition. In some embodiments, the flow resistance of the porous polymer partition varies along the porous partition. In some embodiments, the number of pores of the porous polymer partition varies along the porous partition. In some embodiments, the thickness of the porous polymer partition varies along the porous partition. In some embodiments, the porous polymer partition is varied along one or more axes to control pressure drop through the porous polymer partition.

In some embodiments, the dimension of openings (e.g., pores) in the porous partition varies along the length of the porous partition. In some embodiments, the variation in the dimension of openings in the porous partition is chosen such that uniform flow is maintained along the entire length of the porous partition. In some embodiments, the variation in the openings of the porous partition is chosen to direct flow to certain areas of the ion exchange bed. In some embodiments, the pore size of the porous partition varies along the porous partition. In some embodiments, the pore density of the porous partition varies along the porous partition. In some embodiments, the flow resistance of the porous partition varies along the porous partition. In some embodiments, the number of pores of the porous partition varies along the porous partition. In some embodiments, the thickness of the porous partition varies along the porous partition. In some embodiments, the porous partition is varied along one or more axes to control pressure drop through the porous partition.

In some embodiments, the porous partition is typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the porous partition comprises pores of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition comprises openings that are of a typical characteristic size of more than about 1 µm, more than about 2 µm, more than about 5 µm, more than about 10 µm, more than about 20 µm, more than about 30

µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition comprises openings that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition comprises openings that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition comprises openings that are of a typical characteristic size of from about 1 µm to about 10 µm, from about 10 µm to about 100 µm, from about 100 µm to about 1000 µm, from about 1000 µm to about 10000 µm.

In some embodiments, the internal components of the vessel are configured to provide optimal distribution of fluid flow for the liquid resource containing lithium, the acid containing hydrogen ions, and any other fluid required for optimal operation of the vessel. In some embodiments, the compartment formed between the outer-perforated wall and the outer wall of the vessel serves to distribute flow entering or exiting the ion exchange bead compartment through the outer-perforated wall; this compartment is hereby referred to as the outer-flow distribution compartment. In some embodiments, the compartment formed inside the inner-perforated wall serves to distribute flow entering or exiting the ion exchange bead compartment through the inner-perforated wall; this compartment is hereby referred to as the inner-flow distribution compartment.

In one embodiment, the outer-flow distribution and/or the inner-flow distribution compartments are empty, partially filled, or fully filled with fluid, or a combination thereof. In some embodiments, the outer-flow distribution and/or the inner-flow distribution compartments can be cylindrical, rectangular, spherical, or a combination thereof. In some embodiments, the outer-flow distribution and/or the inner-flow distribution compartments have a constant cross-sectional area or a varying cross-sectional area.

In one embodiment, the outer-flow distribution and/or the inner-flow distribution compartments contain internal beams to provide structural support for the vessel, while also providing more optimal flow distribution. In one embodiment, the outer-flow distribution and/or the inner-flow distribution compartments contain pipes and tubes that direct flow into individual perforations in the inner- and outer-perforated walls. In one embodiment, the outer-flow distribution and/or the inner-flow distribution compartments contain trays that direct flow.

In some embodiments, the outer-flow distribution and/or the inner-flow distribution compartments contain packing material to provide structural support for the vessel, while also providing more optimal flow distribution. In some embodiments, the packing material comprises a polymer, ceramic, metal, ion-exchange beads, or a combination thereof. In some embodiments, the packing material contained within the outer-flow distribution and/or the inner-flow distribution compartments has an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, flow into and out from the outer-flow distribution compartment occurs from the top, the side, the bottom of said compartment, or a combination thereof. In some embodiments, flow into and out from the inner-flow distribution compartment occurs from the top, the side, or the bottom of said compartment, or a combination thereof.

In some embodiments, the vessel contains an additional flow distribution manifold at the top, bottom, or side of the vessel. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, the vessel containing ion-exchange beads is comprised of multiple and separate ion-exchange compartments (e.g., compartments containing ion exchange material or ion exchange beads) arranged within a single vessel. In some embodiments, a liquid resource flows into one side of each ion-exchange compartment, and exits on the other side of exchange compartment, having undergone an ion-exchange process. In some embodiments, the vessel is constructed such that a flow distribution network delivers the liquid resource to each one of these ion-exchange compartments independently. In some embodiments, the vessel is constructed such that a flow distribution network recovers the liquid resource that underwent ion-exchange from each one of these ion-exchange compartments independently. In some embodiments, this allows for multiple simultaneous and concurrent ion exchange processes within the same vessel. In some embodiments, the separation of ion-exchange media into several independent ion-exchange compartments results in minimal flow distance through ion exchange beads.

In some embodiments, such a vessel can be constructed by using a series of filter banks wherein the filters (e.g., filter banks) contain ion exchange beads. In some embodiments, such a vessel can be constructed where multiple ion-exchange compartments are arranged vertically or horizontally. In some embodiments, such filter banks can be separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank togethers can be increased, decreased, or maintained during the ion exchange process.

In some embodiments, two or more filter banks are aligned in series to form a filter press. In some embodiments, a filter press comprises (i) lithium selective sorbent that selectively absorbs lithium from the liquid resource; and (ii) one or more filter banks; wherein each of the one or more filter banks comprises: (a) two opposing filter plates that, when placed together, form a compartment; (b) one or more permeable partitions, wherein the one or more permeable partitions line the interior of the compartment and contain the lithium selective sorbent; and (c) one or more inlets and one or more outlets, wherein the one or more inlets and one or more outlets are configured to allow the liquid and alternate phase to pass through the one or more filter banks. In some embodiments, the one or more filter banks are arranged such that the filter banks share a common axis of symmetry. In some embodiments, said axis is oriented parallel, perpendicular, or at an angle relative to the ground foundation onto which said filter press is mounted. In some embodiments, the one or more filter banks are mechanically compressed together. In some embodiments, said mechanical compression is applied at one end of the filter press. In some embodiments, said mechanical compression is applied by a hydraulic system. In some embodiments, the pressure of said compressive force is from about 1 psi to about 10,000 psi. In some embodiments, said lithium selective sorbent is loaded into said filter banks prior to flow of said liquid resource. In some embodiments, the filter press is configured to allow an alternate phase such as gas to flow through the one or more filter banks. In some embodiments, said gas comprises air, oxygen, nitrogen, or combinations thereof.

In one embodiment, there is only one ion-exchange compartment in the vessel for packed beds of ion exchange beads with minimal flow distance. In some embodiments, there is more than one ion-exchange compartments in the vessel for packed beds of ion exchange beads with minimal flow distance. In some embodiments, there are less than about two, less than about three, less than about five, less than about ten, less than about twenty, less than about thirty, less than about fifty, less than about one-hundred, more than about two, more than about three, more than about five, more than about ten, more than about twenty, more than about thirty, more than about fifty, more than about one-hundred ion-exchange compartments in the vessel.

In some embodiments, ion-exchange compartments can be added or removed from the vessel by mechanical means, such that the number of ion-exchange compartments can be adjusted. In some embodiments, ion-exchange compartments and their components can be mechanically separated to clean out, replace, and fill in compartments and partitions between compartments.

In some embodiments, the flow distribution compartment can be optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet- and outlet-flows to and from the flow distribution compartment. In some embodiments, the inlet- and outlet flows to and from the flow distribution compartments can be located at the top, bottom, or side of said compartments. In some embodiments, the inlet- and outlet flows to and from the flow distribution compartments can be injected and remove from the internal space of said compartments by means of piping, tubing, or other internal components that protrude into said compartment.

In some embodiments, the compartment containing the ion-exchange beads can be optionally treated with water or other solutions for the purposes of adjusting the concentration, composition, pH, or contaminant level of the fluid flowing through the vessel. This is achieved by means of an optional inlet- and outlet-flows to and from said compartment. In some embodiments, an ion exchange compartment is configured to allow inlet and outlet flows to and from said ion exchange compartment. In some embodiments, such inlet- and outlet flows can be located at the top, bottom, or side of said compartments. In some embodiments, the inlet- and outlet flows to and from said compartment can be injected and remove from the internal space of said compartments by means of piping, tubing, or other internal components that protrude into said compartment.

In some embodiments, the ion-exchange beads in the compartment containing the ion-exchange beads can be optionally contacted with an alternate phase at one or multiple points of the lithium extraction process. This is achieved by means of an optional inlet- and outlet-flows to and from said compartment for injecting and optionally removing the alternate phase. In some embodiments, such inlet- and outlet flows can be located at the top, bottom, or side of said compartments. In some embodiments, the inlet- and outlet flows to and from said compartment can be injected and removed from the internal space of said compartments by means of piping, tubing, or other internal components that protrude into said compartment.

In one embodiment, the volume within each ion-exchange compartment is partially filled with ion exchange beads, such that ion exchange beads can freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the height and width of the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical thickness of the distribution compartment (e.g., outer-flow distribution compartment, inner-flow distribution compartment) within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the typical thickness of the compartment containing ion-exchange beads within the vessel containing the ion-exchange compartments (e.g., containing said compartment) is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the partition between the flow distribution compartment and the compartment containing the ion-exchange beads consists of a porous partition that provides support for the ion-exchange bead bed, chemical protection, aids filtration, or a combination thereof. In some embodiments, the partition between the flow distribution compartment and the compartment containing the ion-exchange beads comprises a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm.

In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the porous partition comprises openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition comprises openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition comprises openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition comprises openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition comprises openings in that are of a typical characteristic size of from about 1 μm to about 10 μm, from about 10 μm to about 100 μm, from about 100 μm to about 1000 μm, from about 1000 μm to about 10000 μm.

In one embodiment, the flow distribution compartment (e.g., inner-flow distribution compartment, outer-flow distribution compartment) and/or ion-exchange bead compartment is empty, partially filled, or fully filled with fluid, or a combination thereof. In some embodiments, the flow distribution compartment and/or ion-exchange bead compartment can be cylindrical, rectangular, irregular, or a combination thereof. In some embodiments, the flow distribution compartment has a constant cross-sectional area or a varying cross-sectional area.

In one embodiment, the flow distribution compartment and/or ion-exchange bead compartment contains internal beams to provide structural support for the vessel. In some embodiments, internal beams can be positioned to optimize flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, the flow distribution compartment and/or ion-exchange bead compartment contain packing material to provide structural support for the vessel, while also providing more optimal flow distribution. In some embodiments, the packing material comprises a polymer, ceramic, metal, ion-exchange beads, or a combination thereof. In some embodiments, the packing material contained within the outer-flow distribution and/or the inner-flow distribution compartments can have an average particle diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm; more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm; from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

In some embodiments, the vessel containing ion exchange beads comprises one or more ion-exchange compartments. In some embodiments, flow distributors are located at the top, bottom, and at one or more additional locations within each of these ion exchange compartments. In some embodiments, the number of flow distributors within the vessel is about one, about two, about three, about four, about five, about six, about seven, about eight, about nine, about ten, about fifteen, about twenty, about twenty-five, about thirty, about forty, about fifty. In some embodiments, the arrangement of these flow distributors can be uniformly spaced or irregularly spaced.

In some embodiments, the fluid enters said vessel from multiple flow distributors, and exits said vessel from multiple flow distributors. In some embodiments, flow enters the vessel from 1, from 2, from 4, from 8, from 12, from 20, from 1 to 2, from 2 to 4, from 4 to 8, from 8 to 12, from 12 to 20 independent flow distributors. In some embodiments, flow exits the vessel from 1, from 2, from 4, from 8, from 12, from 20, from 1 to 2, from 2 to 4, from 4 to 8, from 8 to 12, from 12 to 20 independent flow distributors.

In some embodiments, the flow distributor comprises perforated tubes or plates that are connected to each other. In some embodiments, these tubes or plates are of circular cross-section, oval cross-section, square cross-section, rectangular cross-section, cross-shaped cross-section, star-shaped cross-section, irregular cross-section, another geometric cross-section, or a combination thereof. In some embodiments, all flow distributors in the vessel are of the same shape and type. In some embodiments, different flow distributors in the vessel vary in their shape and size.

In some embodiments, the openings or perforations in the flow distributor are shaped as circles, ovals, vertical or horizontal slits, squares, crosses, rectangles, triangles, irregular shapes, or a combination thereof. In some embodiments, the openings in the flow distributor have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings in flow distributor are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings in the flow distributor are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, the tubes or plates of the flow distributor are surrounded by a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered plastic screen, a cylindrical wire screen, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the porous partition comprises openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition comprises openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition comprises openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition comprises openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition comprises openings in that are of a typical characteristic size of from about 1 µm to about 10 µm, from about 10 µm to about 100 µm, from about 100 µm to about 1000 µm, from about 1000 µm to about 10000 µm.

In some embodiments, one or more flow distributors are used to inject a liquid resource, hydrogen ion containing acid, water, or other process fluid into the ion exchange compartment. In some embodiments, one or more flow distributors are used to retrieve a liquid resource, hydrogen ion containing acid, water, or other process fluid from the ion exchange compartment. In some embodiments, said one or more flow distributors can be used to introduce an alternate phase into the ion exchange compartment, as described herein.

In some embodiments, the vessel contains an additional flow distribution manifold at the top, bottom, or side of the vessel. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, the flow distributors described above comprise candles, where each comprises two concentric structures that are permeable to flow. In some embodiments, a candle comprises two concentric structures that are permeable to flow. In some embodiments, a candle comprises an ion exchange compartment. In some embodiments, one or more candles are contained within each vessel. In some embodiments, said candles act as flow distributors. In some embodiments, said candles are filled with ion exchange material. In some embodiments candles are shaped as cylinders, spheres, squares, rectangles, are scalloped, or a combination thereof. In some embodiments, said candles are oriented horizontally, vertically, at an angle with respect to the length of the vessel, or a combination thereof. In some embodiments said candles comprise a porous pipe, a polymer mesh, a filter bag, a screen, or a combination thereof. In some embodiments, said candles number more than two. In some embodiments, for a device described herein, said candles number more than four. In some embodiments, for a device described herein, said candles number more than eight. In some embodiments, for a device described herein, said candles number more than 20. In some embodiments, for a device described herein, said candles number more than 50. In some embodiments, for a device described herein, said candles number more than 100.

In some embodiments, the vessel containing ion exchange beads is comprised of a tank partially filled with ion exchange beads. In some embodiments, said tank contains a fluid which can be a lithium containing liquid resource, hydrogen ion-containing acid, water, or other solutions for the purposes of adjusting the concentration, composition, pH, or contaminant level of the fluid flowing through the vessel. In some embodiments, the fluid level is carefully controlled to maintain a fluid level that is higher than the level of ion-exchange beads in the tank.

In some embodiments, the compartment containing the ion-exchange beads can be optionally treated with an alternate phase consisting of a non-aqueous liquid at one or multiple events of the lithium extraction process. In some embodiments, the alternate phase reduces the time required to absorb hydrogen to generate hydrogen-enriched beads and release lithium to generate a lithium-enriched solution; reduces the time and water required for washing the hydrogen-enriched beads with water to generate hydrogen-enriched beads substantially free of residual acid; reduces the time required for treating the hydrogen-enriched beads with the liquid resource under conditions suitable to absorb lithium to generate lithium-enriched beads; reduces the time and water required for washing the lithium-enriched beads with water to generate lithium-enriched beads substantially free of liquid resource; improves the life-time and total lithium produce by the ion exchange material; improves the time needed for pH-adjustment within the ion-exchange medium to occurs; reduces the time required to drain liquids from the ion exchange vessel; or a combination thereof. In some embodiments, the pressure of the alternate phase is used to control the draining rate from the vessel and thereby to control the fluid level such that it is maintained at a level that is higher than that of the ion exchange beads.

Exemplary embodiments of ion exchange devices wherein the compartment containing the ion exchange beads is treated with an alternate phase to enhance the performance of the ion exchange process are included in Examples 1 to 19.

Injection of the alternate phase is achieved by means of an optional inlet and outlet flows paths to and from said compartment. In some embodiments, such inlet and outlet flows can be located at the top, bottom, or side of said compartments. In some embodiments, the inlet and outlet flows to and from said compartment can be injected and removed from the internal space of said compartments by means of piping, tubing, or other internal components that protrude into said compartment. In some embodiments, the vessel contains an additional flow distribution manifold at the top, bottom, or side of the tank. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In embodiments, the vessel is designed or configured to evenly distribute flow of the alternate phase throughout the ion exchange beads. In some embodiments, the vessel has flow distributors for the alternate phase in the form of a hub & lateral distributor, header & lateral distributors, filter plates, spray nozzle, splash plates, distributor trays, concentric perforated pipes, or a combination of thereof. In one embodiment the lateral distributors are outfitted with resin retaining mesh, membrane, screen, or filter nozzle. In one embodiment, the mesh is supported with a secondary support layer for strength. In one embodiment the porous mesh is wrapped around a cylindrical support at the center of the vessel. In one embodiment, the mesh is made out of a polymer, ceramic, or metal. In one embodiment, the flow distributor is located at the top, bottom, middle, at any other location within the vessel, or a combination of thereof. In one embodiment the vessel has a plate with nozzles attached to it.

In some embodiments, flow distribution of the alternate phase within the ion-exchange vessel occurs via one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In one embodiment, the vessel has an internal nozzle designed to distribute flow of the alternate phase evenly. In one embodiment, the vessel has nozzles placed equidistant with each other on a support plate. In one embodiment the nozzles are spaced out so that the alternate phase output by each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm. In some embodiments, the openings or perforations in one or more for the flow distribution components, such as pipes, tubing, channels, slits, beams, baffles, baskets, scallops, nozzles, or a mesh, have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, the alternate phase is introduced into the compartment containing the ion exchange beads. In some embodiments, the alternate phase is introduced into the compartment containing the ion exchange beads and remains within said compartment during the ion exchange process. In some embodiments, the alternate phase is introduced into the compartment containing the ion exchange beads continuously at one or more stages during the ion exchange process. In some embodiments, such as that described in Example 2, said alternate phase remains in the ion exchange compartment during the absorption of lithium from the liquid resource, and provides an enhanced contact of the ion exchange beads with the liquid resource. In some embodiments, the alternate phase is removed from the compartment containing the ion exchange beads through a flow path that results in the alternate phase flowing through a bed of ion exchange beads. In some embodiments, the alternate phase is removed from the compartment containing the ion exchange beads through a flow path that avoids flow of the alternate phase through a bed of ion exchange beads. In some embodiments, the alternate phase introduced into the compartment containing the ion exchange beads at multiple stages of the ion exchange process. In some embodiments, the alternate phase removed from the compartment containing the ion exchange beads at multiple stages of the ion exchange process. In some embodiments, the mode in which the alternate phase is introduced and removed from the compartment containing the ion exchange beads remains the same at the one or more stages of the ion exchange process. In some embodiments, the mode in which the alternate phase is introduced and removed from the compartment containing the ion exchange beads varies at the one or more stages of the ion exchange process.

In some embodiments, the flow path of the alternate phase crosses a fixed bed of ion exchange material, such that entrained liquid is removed from the bed of ion exchange material by conveyance of said liquid by the alternate phase. In some embodiments, said crossing of an ion exchange material by an alternate phase is understood to comprise a treatment by said alternate phase, the treatment conveying said liquid out of the compartment containing the ion exchange material. In some embodiments, said liquid is a liquid resource, aqueous solution, wash solution, or an acidic eluent solution. In some embodiments, the flow path of the alternate phase crosses a fluidized bed of suspended ion exchange material in a liquid, such that the alternate phase creates turbulence, agitation, and efficient mixing of said ion exchange material in said liquid.

In some embodiments, the flow path of the alternate phase crosses a fixed bed of ion exchange material during absorption of lithium by said ion exchange material. In some embodiments, the flow path of the alternate phase crosses a fixed bed of ion exchange material during elution of lithium by said ion exchange material by an eluent solution. In some embodiments, the flow path of the alternate phase crosses a fluidized bed of ion exchange material suspended in a liquid resource, during absorption of lithium by said ion exchange material. In some embodiments, the flow path of the alternate phase crosses a fluidized bed of ion exchange material suspended in an acidic eluent solution, during elution of lithium by said ion exchange material.

In some embodiments, the vessel is configured such that an alternate phase crosses a fixed bed ion exchange material to remove entrained liquid remaining in said bed, and the same or a different alternate phase crosses a fluidized bed of the same ion exchange material in a different step of the ion exchange process. In some embodiments, a fixed bed of ion exchange is crossed by an alternate phase to remove the entrained liquid resource, and said bed is subsequently fluidized into an acidic eluent solution with the aid of an alternate phase that crosses said fluidized bed. In some embodiments, a fixed bed of ion exchange is crossed by an alternate phase to remove the entrained liquid resource, and said bed is subsequently fluidized into a washing solution with the aid of an alternate phase that crosses said fluidized bed. In some embodiments, a fixed bed of ion exchange is crossed by an alternate phase to remove the entrained liquid resource, and said bed is subsequently fluidized into a liquid resource in a subsequent lithium extraction cycle with the aid of an alternate phase that crosses said fluidized bed. In some embodiments, the alternate phase can cross a fixed or fluidized bed of ion exchange material at any of the steps of a) contacting an ion exchange material with a liquid resource, wherein the liquid resource comprises lithium ions, and wherein lithium ions in the liquid resource are absorbed by the ion exchange material to yield a lithiated ion exchange material; to b) contacting said lithiated ion exchange material with an acidic solution such that lithium is eluted from said the lithiated ion exchange material into said acidic solution.

In some embodiments, the level of fluid is monitored by visual inspection of the tank or automated measuring of a tank level based on a float sensor, capacitance sensor, infrared sensor, ultrasonic sensor, pressure sensor, radar sensor, any other fluid sensor or a combination thereof. In some embodiments, level control is achieved by careful control of fluid flow into the tank and out of the tank, by means of mechanical adjustment of valves, pumps, pressures, and any other parameters that affect fluid flow into and out of the vessel. In some embodiments, the pressure of gas inside of the tank is used to control the rate of discharge from the tank and therefore the fluid level in the tank.

In one embodiment, the ion exchange beads are agitated and can freely move within their containing compartment during contacting with fluid. In some embodiments, agitation occurs with a mechanical agitator, an eductor, fluid recirculation, baffles, shaking, or a combination thereof.

In some embodiments, the ion exchange beads are not agitated, such that they remain fixed in place during contacting with fluid. In some embodiments, a screen, mesh or other partition is included within the tank in order to control the location and restrict the movement of ion exchange beads during the contact with fluid. In some embodiments, the tank is configured such that ion exchange beads may enter and leave the ion-exchange compartment conveyed by the fluid which they are contacting, in the top-down or down-top direction. In one embodiment, the ion exchange beads may be loaded into and unloaded from said tank through the top or bottom of the tank or through its sides.

In some embodiments, the tank containing ion-exchange beads can be optionally treated with a lithium containing liquid resource, hydrogen ion-containing acid, alkali, water, or other solutions for the purposes of adjusting the concentration, composition, pH, or contaminant level of the fluid flowing through the vessel. This is achieved by means of an optional inlet- and outlet-flows to and from the tank. In some embodiments, the inlet- and outlet flows to and from the tank can be located at the top, bottom, or side of said tank. In some embodiments, the inlet- and outlet flows to and from the tank can be injected and removed from the internal space of said tank by means of piping, tubing, or other internal components that protrude into said compartment.

In some embodiments, the typical length of the tank containing the ion-exchange beads is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the tank containing the ion-exchange beads is less than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of the tank containing the ion-exchange beads is less than about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the typical radius or width of the tank containing the ion-exchange beads is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m. In some embodiments, the typical radius or width of the tank containing the ion-exchange beads is less than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m. In some embodiments, the typical radius or width of the tank containing the ion-exchange beads is less than about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m In some embodiments, the vessel containing ion exchange beads comprises one or more ion-exchange compartments. In some embodiments, the vessel containing ion exchange beads comprises one or more flow distribution compartments. In some embodiments, any of the compartments within the vessel can be cylindrical, rectangular, spherical, cross-shaped, scalloped, concave, convex, torus-shaped, any another shape, or a combination thereof. In some embodiments, the compartments can occupy the partial length of the vessel or only a sub-part. In some embodiments, the compartments can occupy the full length of the vessel.

In some embodiments, the number of compartments (e.g., ion exchange compartments, flow distributor compartments) within the vessel is about one, about two, about three, about four, about five, about six, about seven, about eight, about nine, about ten, about fifteen, about twenty, about twenty-five, about thirty, about forty, about fifty. In some embodiments, the arrangement of compartments can be uniformly spaced or irregularly spaced. In some embodiments, one or more flow distribution compartments are located within one or more of the ion-exchange compartments. In some embodiments, one or more flow ion-exchange compartments are located within one or more of the flow-distribution compartments.

In some embodiments, a screen, mesh or other partition is optionally included within the tank in order to control the location and restrict the movement of ion exchange beads during the contact with fluid. In some embodiments, said partition separates the ion-exchange compartments from the flow-distribution compartments. In some embodiments, said partition separates the flow-distribution compartments from the ion-exchange compartments. In some embodiments, this porous partition optionally provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises polyether ether ketone, polypropylene, polyethylene, polysulfone, polyester, polyamide, polytetrafluoroethylene, ethylene tetrafluoroethylene polymer, stainless-steel, stainless steel coated in polymer, stainless steel mesh coated in ceramic, coated steel, titanium, Hastelloy C276 mesh or a combination thereof, wherein the opening in the partition is coarse, a fine, or a combination thereof.

In some embodiments, said porous partition is fixed into the vessel-compartment walls (e.g., the walls that make up the vessel and/or compartment). In some embodiments, the porous partition is flexibly and not physically bonded to the vessel-compartment walls. In some embodiments, the porous partition is free to move, shake, wave, rotate, expand, or contract within one or more of the compartments within the vessel. In some embodiments, the porous partition expands throughout operation. In some embodiments, the porous partition contracts throughout operation.

In some embodiments, the porous partition has a thickness of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition has a thickness of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition has a thickness of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the porous partition consists of openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. The porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the porous partition comprises openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 µm, less than about 1000 µm, less than about 2000 µm. In some embodiments, the porous partition comprises openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition comprises openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition comprises openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the tank containing the ion-exchange beads contains internal beams to provide structural support for the vessel, while also providing more optimal flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, tank containing the ion-exchange beads contains packing material to provide structural support for the vessel, while also providing more optimal flow distribution. In some embodiments, the packing material comprises a polymer, ceramic, metal, ion-exchange beads, or a combination thereof. In some embodiments, the packing material contained within the outer-flow distribution and/or the inner-flow distribution compartments can have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the vessel contains an additional flow distribution manifold at the top, bottom, or side of the tank. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In embodiments, the vessel is designed to evenly distribute flow throughout the ion exchange beads. In some embodiments, the vessel has flow distributors in the form of a hub & lateral distributor, header & lateral distributors, filter plates, spray nozzle, distributor trays, concentric perforated pipes, or a combination of thereof. In one embodiment the lateral distributors are outfitted with resin retaining mesh, membrane, screen, or filter nozzle. In one embodiment, the mesh is supported with a secondary support layer for strength. In one embodiment the porous mesh is wrapped around a cylindrical support at the center of the vessel. In one embodiment, the mesh is made out of a polymer, ceramic, or metal. In one embodiment, the flow distributor is located at the top, bottom, middle, at any other location within the vessel, or a combination of thereof. In one embodiment the vessel has a plate with nozzles attached to it.

In some embodiments, flow distribution within the ion-exchange vessel occurs via one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In one embodiment, the vessel has an internal nozzle designed to distribute flow evenly. In one embodiment, the vessel has nozzles placed equidistant with each other on a support plate. In one embodiment the nozzles are spaced out so that the flow output from each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm.

In some embodiments, the openings or perforations in one or more of the flow distribution components, such as pipes, tubing, channels, slits, beams, baffles, baskets, scallops, nozzles, or a mesh, have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforations in one or more of the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforations in one or more of the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, efficient flow distribution within the ion-exchange vessel occurs via one or more shaped objects or particles that are packed within one or more of the compartments that comprise the ion-exchange vessel. In some embodiments, the vessel is filled with filler material for bed support and/or flow distribution. In one embodiment, the filler material comprises glass, silica, gravel, activated carbon, ceramic, alumina, zeolite, calcite, polymers, copolymers, a mixture thereof or a combination of thereof. In some embodiments, the filler material comprises polyvinyl chloride, high density polyethylene, low density polyethylene, polypropylene, polyvinylidene difluoride, polytetrafluoroethylene, polystyrene, Acrylonitrile butadiene styrene, Polyether ether ketone, copolymers thereof, mixture thereof, or combinations thereof. In one embodiment, the filler material is placed on top of the vessel, on the bottom of the vessel, or both. In one embodiment, the filler material is mixed with the ion-exchange material or ion exchange beads. In an aspect, described herein is a device for lithium extraction from a liquid resource, comprising a vessel loaded with one or more beds of ion exchange material and a filler material, wherein the filler material is mixed with the one or more beds of ion exchange material, thereby providing support for the one or more beds and/or enabling for better flow distribution for said liquid resource or another fluid entering the vessel.

In some embodiments, the packing (e.g., filler material) is shaped as a sphere, spheroid, ovaloid, cross, tube, torus, ring, saddle ring, tubes, triangles, other complex geometric shape, or a combination thereof. In some embodiments, the packing is distributed random particle density. In some embodiments, the packing is distributed with uniform particle density. In some embodiments, the packing consists of one or more types of packing, randomly added and distributed within the distribution chamber. In some embodiments, the packing consists of one or more types of packing, added and distributed within the fluid distribution chamber within well-defined regions. In some embodiments, the packing comprises one or more types of packing, randomly added and distributed within the distribution chamber. In some embodiments, the packing comprises one or more types of packing, added and distributed within the fluid distribution chamber within well-defined regions. In some embodiments, parts of the of fluid distribution chamber are empty, and parts of the same chamber contain packing material. In some embodiments, the packing material (e.g., filler material) can have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange beads are loaded into the ion-exchange vessel as a slurry. In some embodiments, the liquid component of such slurry is water, acid, base, or a solvent. In some embodiments, the percentage of liquid in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the ion exchange beads are loaded into the ion-exchange vessel as a dry powder.

In some embodiments, one or more of the vessels containing ion-exchange beads described above are arranged such that the outlet stream of one vessel is directed into the inlet of another vessel. In some embodiments, such streams can be optionally treated between ion exchange vessels. In some embodiments, the treatment occurs with a lithium containing resource, hydrogen ion-containing acid, water, or other solutions for the purposes of adjusting the concentration, composition, pH, or contaminant level of the fluid in the stream.

In some embodiments, the vessel containing ion exchange beads is comprised of a wound ion exchange element. In some embodiments, said element is constructed by stacking (a) a non-porous membrane, (b) optionally a first flow distribution scaffold, a (c) optionally a first porous membrane, (d) a bed of ion exchange material, (e) optionally a second porous membrane, (f) optionally a second flow distribution scaffold. This stack is wound into a spiral to form an ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow can be distributed over a large surface area and flown through an ion exchange bed with minimal flow distance, resulting in minimum driving force for fluid flow. By winding the stack into a spiral, the physical footprint of the ion exchange element can be minimized. In some embodiments, one or more of the elements (a)-(f) are not present.

In some embodiments, the vessel containing ion exchange beads is comprised of an ion exchange element. In some embodiments, said ion exchange element is a wound ion exchange element. In some embodiments, said ion exchange element comprises membranes. In some embodiments, said ion exchange element comprises one or more porous membranes. In some embodiments, said ion exchange element comprises one or more non-porous membranes. In some embodiments, said ion exchange element comprises a stack of membranes. In some embodiments, said ion exchange element comprises a stack of membranes and ion-exchange material. In some embodiments, said element is constructed by stacking (a) a non-porous membrane, (b) optionally a first flow distribution scaffold, a (c) optionally a first porous membrane, (d) a bed of ion exchange material, (e) optionally a second porous membrane, (f) optionally a second flow distribution scaffold, in the stated order or in a different order of the components (a)-(f). In some embodiments, one or more components are wound into a spiral to form an ion exchange element. In some embodiments, fluid flows through a one or more flow distribution scaffolds. In some embodiments, fluid flows through one or more porous membranes. In some embodiments, fluid flows through the ion exchange bed. In some embodiments, flow is distributed over a large surface area using the flow distribution scaffold, resulting in minimal flow distance. In some embodiments, the element is wound into a spiral to minimize the physical footprint of the ion exchange element. In some embodiments, the element is a flat ion exchange element.

In some embodiments, the vessel containing ion exchange beads comprises a wound ion exchange element. In some embodiments, said wound ion exchange element is constructed by stacking (a) a non-porous polymer membrane, (b) a first flow distribution scaffold comprising a large-opening polymer mesh, a (c) a first porous polymer membrane, (d) a thin bed of ion exchange material, (e) a second porous polymer membrane, (f) and a second flow distribution scaffold. This stack is then wound around a perforated tube with holes whose internal diameter is the same as the thickness of the ion exchange bed. This wound stack is the ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow is distributed over a large surface area and flown through an ion exchange bed with minimal flow distance, resulting in minimum driving force for fluid flow. By winding the stack into a spiral, the physical footprint of the ion exchange element can be minimized.

In some embodiments, the vessel containing ion exchange beads comprises a tightly wound ion exchange element. In some embodiments, said wound ion exchange element is constructed by stacking (a) a non-porous polymer membrane, (b) a flow distribution scaffold comprising a polymer mesh with openings of about 1 to about 5 mm, a (c) a first porous polymer membrane with pore sizes smaller than about 5 microns, (d) a bed of ion exchange material about 5 mm long, (e) a second porous polymer membrane with a pore size of about 5 microns, (f) and a second flow distribution scaffold with mesh openings of about 4 mm. The elements of the stack are glued together using a polyurethane adhesive. The second flow distribution scaffold (f) is glued to a perforated pipe with 3 mm round holes. The stack is then spun around this center pipe, such that the second flow distribution scaffold (f) completely encircles the perforated pipe and then contacts one of the sides of the non-porous membrane (a). This wound stack is the ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow is distributed over a large surface area and flown through an ion exchange bed with minimal flow distance, resulting in minimum driving force for fluid flow. By winding the stack into a spiral, the physical footprint of the ion exchange element can be minimized.

In some embodiments, the vessel containing ion exchange beads is comprised of a rightly wound ion exchange element. In some embodiments, said wound ion exchange element is constructed by stacking (a) a non-porous polymer membrane, (b) a flow distribution scaffold comprising a polymer mesh with openings of about 1 to about 5 mm, a (c) a first porous polymer membrane with pore sizes smaller than about 5 microns, (d) a bed of ion exchange material about 5 mm long, (e) a second porous polymer membrane with a pore size of about 5 microns, (f) and a second flow distribution scaffold with mesh openings of about 4 mm. Some elements of the stack are glued together using a polyurethane adhesive. The second flow distribution scaffold (f) is glued to a perforated pipe with 3 mm round holes. The stack is then spun around this center pipe, such that the second flow distribution scaffold (f) completely encircles the perforated pipe and then contacts one of the sides of the non-porous membrane (a). This wound stack is the ion exchange element. In some embodiments, fluid flows through a first flow distribution scaffold, through the first porous membrane and into the ion exchange bed, and out of the second porous membrane, where it is collected and exits the vessel through the second flow distribution scaffold. By containing the ion exchange membrane between two porous membranes, flow is distributed over a large surface area and flown through an ion exchange bed with minimal flow distance, resulting in minimum driving force for fluid flow. By winding the stack into a spiral, the physical footprint of the ion exchange element can be minimized.

In some embodiments, the vessel containing ion exchange beads is comprised of a tightly wound ion exchange element. In some embodiments, said wound ion exchange element is constructed by stacking several thin elements that are 8' by 12". First, (a) a non-porous polymer membrane is laid flat, (b) then a flow distribution mesh comprising polypropylene with openings of about 5 mm is laid on top of this, then a (c) a porous polymer microfiltration polyvinyl difluoride membrane with pore sizes smaller than about 5 microns is laid on top of this, then (d) a bed of ion exchange material about 5 mm thick is laid on top of this, then (e) a porous polymer microfiltration polyvinyl difluoride membrane with pore sizes smaller than about 1 microns is laid on top of this, finally (f) a second polypropylene flow distribution scaffold with mesh openings of about 2 mm is laid on top of this. Elements (c)-(e) are glued together and sealed around all using a polyurethane adhesive. The short side of the second flow distribution scaffold (f) is glued to a perforated pipe with 3 mm round holes, which is 12" long and ½" in diameter. The stack is then spun around this center pipe around~30 times, such that the second flow distribution scaffold (f) completely encircles the perforated pipe and then contacts one of the sides of the non-porous membrane (a) many times. This wound stack is the ion exchange element. This element is placed in a vessel that is 14" long and 6" in diameter. In some embodiments, fluid flows through into the top of the vessel in the axial direction of the cylindrical wound element, and enters in a direction axial to the cylinder through the (b) flow distribution mesh; this fluid flows through the first porous membrane and into the ion exchange bed, and out of the second porous membrane, where it is collected through the second flow distribution scaffold; because the second flow distribution scaffold is connected to the perforated tube, the perforated tube collects all effluent and removes it through the vessel through a pipe. By containing the ion exchange membrane between two porous membranes, flow is distributed over a large surface area and flown through an ion exchange bed with minimal flow distance, resulting in minimum driving force for fluid flow during the ion exchange process. By winding the stack into a spiral, the physical footprint of the ion exchange element can be minimized.

In some embodiments, the length of the ion exchange element is less than 5 cm, less than 10 cm, less than 20 cm, less than 50 cm, less than 100 cm, less than 200 cm, less than 500 cm. In some embodiments, the length of the ion exchange element is more than 5 cm, more than 10 cm, more than 20 cm, more than 50 cm, more than 100 cm, more than 200 cm, more than 500 cm. In some embodiments, the length of the ion exchange element is between about 5 cm and about 10 cm, between about 10 cm and about 20 cm, between about 20 cm and about 50 cm, between about 50 cm and about 100 cm, between about 100 cm and about 200 cm, between about 200 cm and about 500 cm.

In some embodiments, the diameter of the wound ion exchange element is less than 1 cm, less than 2 cm, less than 4 cm, less than 6 cm, less than 10 cm, less than 20 cm, less than 50 cm, less than 100 cm. In some embodiments, the diameter of the wound ion exchange element is more than 1 cm, more than 2 cm, more than 4 cm, more than 6 cm, more than 10 cm, more than 20 cm, more than 50 cm, more than 100 cm. In some embodiments, the diameter of the would ion exchange element is between about 1 cm and about 2 cm, between about 2 cm and about 4 cm, between about 4 cm and about 6 cm, between about 6 cm and about 10 cm, between about 10 cm and about 20 cm, between about 20 cm and about 50 cm, between about 50 cm and about 100 cm.

In some embodiments, the width of the membrane stack before it is wound is less than 10 cm, less than 20 cm, less than 40 cm, less than 60 cm, less than 100 cm, less than 200 cm, less than 500 cm, less than 1000 cm. In some embodiments, the width of the membrane stack before it is wound is more than 10 cm, more than 20 cm, more than 40 cm, more than 60 cm, more than 100 cm, more than 200 cm, more than 500 cm, more than 1000 cm. In some embodiments, the width of the membrane stack before it is wound is between about 10 cm and about 20 cm, between about 20 cm and about 40 cm, between about 40 cm and about 60 cm, between about 60 cm and about 100 cm, between about 100 cm and about 200 cm, between about 200 cm and about 500 cm, between about 500 cm and about 1000 cm.

In some embodiments, the number of windings in the ion exchange element is more than about 1, more than about 2, more than about 4, more than about 10, more than about 50, more than about 100. In some embodiments, the number of windings in the ion exchange element is less than about 1, less than about 2, less than about 4, less than about 10, less than about 50, less than about 100. In some embodiments, the number of windings in the ion exchange element is from about 1 to about 2, from about 2 to about 4, from about 4 to about 6, from about 10 to about 50, from about 50 to about 100.

In some embodiments, the non-porous membrane is comprised of low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the porous membranes comprise low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the porous membranes comprise openings. In some embodiments, the porous membranes comprise openings that are circular, tubular, square, rectangular, rhomboidal, star-shaped, slit-shaped, irregularly shaped, or a combination thereof. In some embodiments, the porous membranes comprise openings of less than about 0.02 µm, less than about 0.1 µm, less than about 0.2 µm, less than about 1 µm, less than about 2 µm, less than about 5 µm, less than about 10 µm, less than about 25 µm, less than about 100 µm, less than about 1000 µm. In some embodiments, the porous membranes comprise openings of more than about 0.02 µm, more than about 0.1 µm, more than about 0.2 µm, more than about 1 µm, more than about 2 µm, more than about 5 µm, more than about 10 µm, more than about 25 µm, more than about 100 µm. In some embodiments, the porous membranes have openings of about 0.02 µm to about 0.1 µm, from about 0.1 µm to about 0.2 µm, from about 0.2 µm to about 0.5 µm, from about 0.5 µm to about 1 µm, from about 1 µm to about 5 µm, from about 5 µm to about 10 µm, from about 10 µm to about 25 µm, from about 25 µm to about 100 µm.

In some embodiments, the flow distribution scaffolds comprise low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, flow distribution scaffolds are open so as to allow flow. In some embodiments, the flow distribution scaffolds have openings that are circular, tubular, square, rectangular, rhomboidal, star-shaped, slit-shaped, irregularly shaped, or a combination thereof. In some embodiments, the flow distribution scaffolds have openings of less than about 2 µm, less than about 10 µm, less than about 100 µm, less than about 1 mm, less than about 1 cm, less than about 5 cm, less than about 10 cm. In some embodiments, the flow distribution scaffolds have openings of more than about 2 µm, more than about 10 µm, more than about 100 µm, more than about 1 mm, more than about 1 cm, more than about 5 cm, more than about 10 cm. In some embodiments, the flow distribution scaffolds have openings of between about 2 µm and about 10 µm, between about 10 µm and about 100 µm, between about 100 µm and about 1 mm, between about 1 cm and about 5 cm, between about 5 cm about 10 cm.

In some embodiments, the ion-exchange elements are placed in an ion-exchange vessel. In some embodiments, two or more ion-exchange elements are placed in an ion-exchange vessel. In some embodiments, two or more ion-exchange elements are connected in series. In some embodiments, two or more ion-exchange elements are connected in parallel. In some embodiments, two or more ion-exchange vessels containing one or more ion-exchange elements are connected in series. In some embodiments, two or more ion-exchange vessels containing one or more ion-exchange elements are connected in parallel.

In some embodiments, the ion-exchange vessel contains flow diversion devices to distribute flow into the ion-exchange element. In some embodiments, said flow diversion devices comprise polytetrafluoroethylene (PTFE), polychloroprene (neoprene), ethylene propylene dine monomer (EPDM), Viton, nitrile rubber (Buna-N), silicone, fluoropolymer, polyurethane, fluorosilicone, or a combination thereof.

In some embodiments, the ion-exchange vessel contains a flow distributor tube to collect the effluent from the ion-exchange element. In some embodiments, said flow distributor tube is porous. In some embodiments, the porous flow distributor tube comprises a polymer, metal, or ceramic. In some embodiments, the porous partition comprises polyether ether ketone, polypropylene, polyethylene, polysulfone, polyester, polyamide, polytetrafluoroethylene, ethylene tetrafluoroethylene polymer, stainless steel, stainless steel coated in polymer, stainless steel coated in ceramic, titanium, Hastelloy, zirconium, tantalum, a composite thereof, a copolymer thereof, or a combination thereof. In some embodiments, the flow distributor tube consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the flow distributor tube consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the flow distributor tube consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the flow distributor tube comprises openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the flow distributor tube comprises openings in that are of a typical characteristic size of more than about 1 µm, more than about 2 µm, more than about 5

µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the flow distributor tube comprises openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, fluid such as a liquid resource, wash solution, or acid flows through the wound ion-exchange element. In some embodiments, the fluid that has passed through the wound ion-exchange element is discarded. In some embodiments, the fluid that has passed through the wound ion-exchange element is recirculated to the inlet of the ion-exchange element. In some embodiments, flow is reversed such that the outlet of the ion-exchange element becomes the inlet, and the inlet becomes the outlet.

In some embodiments, the pressure at the inlet of the wound ion-exchange element is less than about 1 psi, less than about 2 psi, less than about 5 psi, less than about 10 psi, less than about 50 psi, less than about 100 psi, less than about 500 psi, less than about 1000 psi, less than about 5000 psi. In some embodiments, the pressure at the inlet of the wound ion-exchange element is more than about 1 psi, more than about 2 psi, more than about 5 psi, more than about 10 psi, more than about 50 psi, more than about 100 psi, more than about 500 psi, more than about 1000 psi, more than about 5000 psi. In some embodiments, the pressure at the inlet of the wound ion-exchange element is from about 1 psi to about 2 psi, from about 2 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi.

In some embodiments, the pressure at the outlet of the wound ion-exchange element is less than about 1 psi, less than about 2 psi, less than about 5 psi, less than about 10 psi, less than about 50 psi, less than about 100 psi, less than about 500 psi, less than about 1000 psi, less than about 5000 psi. In some embodiments, the pressure at the outlet of the wound ion-exchange element is more than about 1 psi, more than about 2 psi, more than about 5 psi, more than about 10 psi, more than about 50 psi, more than about 100 psi, more than about 500 psi, more than about 1000 psi, more than about 5000 psi. In some embodiments, the pressure at the outlet of the wound ion-exchange element is from about 1 psi to about 2 psi, from about 2 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi.

Activating Treatments of the Ion Exchange Material

In some embodiments, the ion exchange material is subject to an initial treatment prior to lithium extraction (e.g., cycles, lithium extraction cycles, the practice of any method disclosed herein). In some embodiments, the ion exchange particles are subject to an initial treatment prior to lithium extraction. In some embodiments, the coated ion exchange particles are subject to an initial treatment prior to lithium extraction. In some embodiments, the ion exchange beads are subject to an initial treatment prior to lithium extraction.

In some embodiments, said initial treatment comprises treating said ion exchange material with a treatment solution. In some embodiments, said treatment solution comprises an acid. In some embodiments, said acid comprises hydrochloric acid. In some embodiments, said acid comprises nitric acid. In some embodiments, said acid comprises hydrochloric acid, nitric acid, sulfuric acid, phosphoric acid, acetic acid, a mineral acid, an organic acid, or a mixture thereof.

In some embodiments, said initial treatment comprises treatment of the ion exchange material (e.g., particle, bead) with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. In some embodiments, said initial treatment comprises treatment with an acid solution prepared with hydrochloric acid, sulfuric acid, nitric acid, or combinations thereof wherein the concentration of the acid solution is less than about 0.1 M, less than about 1.0 M, less than about 5 M, less than about 10 M, or combinations thereof. In some embodiments, said initial treatment comprises treatment with an acid solution prepared with hydrochloric acid, sulfuric acid, nitric acid, or combinations thereof wherein the concentration of the acid solution is from about 0.01 M to about 0.1 M, from about 0.1 M to about 1.0 M, from about 1.0 M to about 5 M, from about 5 M to about 10 M, or combinations thereof.

In some embodiments, during initial treatment, the ion exchange material absorbs hydrogen while releasing lithium. In some embodiments, the ion exchange material is converted to a hydrated state with a hydrogen-rich composition during the initial treatment. In some embodiments, the coating material that may be present on the ion exchange material allows diffusion of hydrogen and lithium respectively to and from the ion exchange material while providing a protective barrier that limits dissolution of the ion exchange material. In some embodiments, during initial treatment, the lithium is released from the ion exchange material. In some embodiments, less than about 5%, less than about 10%, less than about 25%, less than about 50%, less than about 75%, or less than about 99% of the lithium is released. In some embodiments, more than about 5%, more than about 10%, more than about 25%, more than about 50%, more than about 75%, or more than about 99% of the lithium is released.

In some embodiments, after initial treatment in acid, the ion exchange material (e.g., bead, particles) is treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the ion exchange material absorbs lithium while releasing hydrogen.

In some embodiments, the ion exchange beads are fluidized inside said vessel during the initial treatment described above. In some embodiments, the ion exchange beads are stirred inside said vessel during the initial treatment described above. In some embodiments, the ion exchange beads are stirred by a mixer. In some embodiments, the ion exchange beads are stirred by one or more agitators. In some embodiments, said agitators comprise one or more impellers. In some embodiments, said one or more impellers comprise propellers, anchor impellers, hydrofoils, pitched blade turbines, curved blade turbines, spiral turbine, flat blade turbines, radial blades, or a combination thereof. In some embodiments, said impellers contain one or more blades. In some embodiments, the shaft and impellers are comprised of carbon steel, stainless steel, titanium, Hastelloy, or a combination thereof. In some embodiments, the shaft and impellers are coated with glass, epoxy, rubber, a polymer coating, or combinations thereof.

In some embodiments, the fluidization of the ion exchange material (e.g., beads, particles) by means of said agitator is aided by baffles mounted inside of said tank. Said fluidization may be configured to take place or may be desirable at any stage or point of any method disclosed herein. In some embodiments, said baffles comprise flat rectangular structures mounted onto the side of the tank. In some embodiments said baffles are oriented perpendicular to the plane of agitator of the impeller. In some embodiment, the presence of one or more baffles aid with the fluidization of the ion exchange material inside the vessel. In some embodiments, the presence of one or more baffles reduces the swirling and vortexing associated with fluidization of the particles with an impeller. In some embodiments, the presence of said baffles results in more uniform suspension of ion exchange material. In some embodiments, the presence of said baffles results in reduce attrition of ion exchange material being fluidized. In some embodiments, said baffles are constructed to span the entire vertical length of the vessel. In some embodiments, the baffles are constructed to span from about the height of the settled bed of ion exchange material to the top of the vessel. In some embodiments, the baffles are constructed to span from about 6" from the bottom of the vessel to the top of the vessel. In some embodiments, there is a gap between the wall of the vessel and the baffle. In some embodiments, said gap measures less than ⅛", less than ¼", less than ½", or less than 1". In some embodiments, said baffles measure a width that is equivalent to approximately one twelfth of the width of the vessel. In some embodiments, said baffles measure a width that is equivalent to approximately less than one tenth of the width of the vessel. In some embodiments, said baffles measure a width that is equivalent to more than approximately one fifteenth of the width of the vessel. In some embodiments, all baffles are of equivalent dimensions. In some embodiments, baffles are not of the same dimensions. In some embodiments, the tank contains two baffles. In some embodiments, the tank contains three baffles. In some embodiments, the tank contains four baffles. In some embodiments, the tank contains more than four baffles.

In some embodiments, the ion exchange beads are fluidized by pumping solution into the tank near the bottom of the tank. In some embodiments, the ion exchange beads are fluidized by pumping solution from the tank back into the tank near the bottom of the tank. In some embodiments, the ion exchange beads are fluidized by pumping a slurry of the ion exchange beads from near the bottom of the tank to a higher level in the tank.

In some embodiments, the ion exchange beads are loaded into an ion exchange device during the initial treatment described above. In some embodiments, the ion exchange beads are immobilized in said device, such that the treatment solution enters and exits the ion exchange vessel, while the treatment solution contacts said ion exchange beads. In some embodiments, the treatment solution is recirculated through the ion exchange device.

In some embodiments, the duration of the initial treatment of the ion exchange material with the treatment solution is less than about 5 minutes, less than about 15 minutes, less than about 30 minutes, less than about 60 minutes, less than about 2 hours, less than about 4 hours, less than about 12 hours, or less than about 24 hours. In some embodiments, the duration of the initial treatment of the ion exchange material with the treatment solution is more than about 5 minutes, more than about 15 minutes, more than about 30 minutes, more than about 60 minutes, more than about 2 hours, more than about 4 hours, more than about 12 hours, or more than about 24 hours.

In some embodiments, during initial treatment, the ion exchange material (e.g., particles, beads) absorbs hydrogen while releasing lithium. In some embodiments, the ion exchange material is converted to a hydrated state with a hydrogen-rich composition. In some embodiments, acid treatment causes changes to the morphology of the ion exchange material. In some embodiments, acid treatment causes changes to the crystal structure of the material. In some embodiments, acid treatment causes dissolution of a cationic species in the material into the acidic solution. In some embodiments, acid treatment causes dissolution of a metallic species in the material into the acidic solution. In some embodiments, the dissolved species comprises one or more of: Ti, Sn, Mn, Al, Cu, V, or Si. In some embodiments, the dissolution of said species impacts the lithium extraction performance of the ion exchange material that has undergone the initial treatment. In some embodiments, the dissolution of said species impacts the durability of the ion exchange material that has undergone the initial treatment. In some embodiments, the dissolution of said species impacts the lifetime of the ion exchange material that has undergone the initial treatment.

In some embodiments, the ion exchange material is contacted with a chemical additive as part of the initial treatment process. In some embodiments, the ion exchange material is contacted with a chemical additive before the initial treatment process. In some embodiments, the ion exchange material is contacted with a chemical additive during the initial treatment process. In some embodiments, the ion exchange material is contacted with a chemical additive after the initial treatment process. In some embodiments, the ion exchange material is contacted with one or more chemical additives. In some embodiments, the ion exchange material is contacted with a chemical additive during the lithium extraction process.

In some embodiments, the initial treatment is carried out before or between ion exchange cycles, wherein each cycle comprises lithium extraction and lithium elution.

System for Loading Vessels with Ion Exchange Beads

It is desirable to achieve uniform flow distribution throughout the ion exchange bed to ensure optimal performance of ion exchange beads. The ion exchange beads can be packed into uniform ion exchange beds to improve flow distribution uniformity.

In order to shape the ion exchange beads into ion exchange beds, said beads are first loaded into an ion exchange vessel. In some embodiments, the ion exchange beads are loaded into the vessel by flowing into the vessel as a slurry, applying vacuum through the vessel and pulling the beads into the vessel, pouring the slurry into the vessel with a slurry transfer device, pumping the slurry into the vessel with a slurry transfer device, or a combination thereof. In some embodiments, the ion exchange beads are loaded as a dry powder. In some embodiments, the ion exchange beads are loaded as a solid. In some embodiments, the ion exchange beads are loaded as a dry powder by pouring them into the ion exchange vessel as a powder. In some embodiments, the ion exchange beads are loaded as a dry powder by pouring them into the ion exchange vessel while tapping the loading container. In some embodiments, the ion exchange beads are loaded as a dry powder by pneumatically conveying them into the ion exchange vessel using a blower, a vacuum, compressed air, a conveyor belt, a fan, or combinations thereof.

In some embodiments, the loaded beads are packed to shape the ion exchange bed into an optimal flow distribution. In some embodiments, packing can be done by flowing fluid through ion exchange beads. In some embodiments, a certain flow rate and pressure are maintained during flow across the ion exchange bed to achieve uniform packing of the ion exchange beads. In some embodiments, the fluid for packing is water, aqueous solution, brine, acidic solution, organic solvents, air, nitrogen gas, argon gas, or a combination thereof.

In some embodiments, the fluid velocity used for packing is less than 1 cm/min, less than 5 cm/min, less than 10 cm/min, less than 20 cm/min, less than 30 cm/min, less than 40 cm/min, less than 50 cm/min, less than 100 cm/min, less than 200 cm/min, less than 500 cm/min, less than 10 m/min, less than 100 m/min, or a combination thereof. In some embodiments, the fluid velocity used for packing is more than 1 cm/min, more than 5 cm/min, more than 10 cm/min, more than 20 cm/min, more than 30 cm/min, more than 40 cm/min, more than 50 cm/min, more than 100 cm/min, more than 200 cm/min, more than 500 cm/min, more than 10 m/min, more than 100 m/min, or a combination thereof. In some embodiments, the fluid velocity is from about 1 cm/min to about 5 cm/min, from about 5 cm/min to about 20 cm/min, from about 20 cm/min to about 100 cm/min, from about 100 cm/min to about 200 cm/min, from about 200 cm/min to about 500 cm/min, from about 500 cm/min to about 10 m/min, from about 10 m/min to about 100 m/min, or a combination thereof. In some embodiments, the fluid velocity is varied throughout the packing process to shape the ion exchange beds. In some embodiments, the fluid velocity is increased throughout the packing process. In some embodiments, the fluid velocity is decreased throughout the packing process. In some embodiments, the fluid velocity is first increased and then decreased. In some embodiments, the fluid velocity varies sinusoidally with time. In some embodiments, the fluid velocity is varied up, down, sinusodially, with varying speed, or a combination thereof.

In one embodiment, packing can be done by flowing an alternate phase through ion exchange beads. In some embodiments, packing is done by flowing an alternate phase through ion exchange beads. In some embodiments, contact between the ion exchange beads and the alternate phase is maximized and made possible by the design of this ion exchange bead packing device.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate is a gas such as air, nitrogen, argon, or a combination thereof. In some embodiments, the alternate phase comprises a compressed or pressurized gas. In some embodiments, the alternate phase is air. In some embodiments, the alternate phase is nitrogen. In some embodiments, the alternate phase is argon.

In some embodiments, flow is directed in the same direction as fluid flow during the ion-exchange process, in the opposite direction as fluid flow during the ion-exchange process, in a tangential direction as fluid flow during the ion-exchange process, in an orthogonal direction as fluid flow during the ion-exchange process, in an intermediate direction as fluid flow during the ion-exchange process, or in a combination thereof. In some embodiments, the fluid is flown across ion exchange beads, axially along the longest orientation of the ion exchange bed. In some embodiments, the fluid is flown across ion exchange beads, radially across the radial orientation of the ion exchange bed. In some embodiments, the fluid is flown across ion exchange beads, along the shortest orientation of the ion exchange bed. In some embodiments, the fluid is flown in a combination of axially along the longest orientation of the ion exchange bed, along the shortest orientation of the ion exchange bed, or radially across the radial orientation of the ion exchange bed.

In some embodiments, the ion exchange beads are packed in the same chamber where the ion exchange process occurs. In some embodiments, the ion exchange beads are packed in a separate chamber from where ion exchange process occurs.

In some embodiments, the ion exchange beads are packed by applying pressure on the ion exchange bed. In some embodiments, pressure is applied to the ion exchange bed with weights or hydraulic force caused by fluid flow.

In some embodiments, the weight applied to the ion exchange bed is less than 1 kg, less than 5 kg, less than 10 kg, less than 50 kg, less than 100 kg, less than 500 kg or less than 1000 kg. In some embodiments, the weight applied to the ion exchange bed is more than 1 kg, more than 5 kg, more than 10 kg, more than 50 kg, more than 100 kg, more than 500 kg, or more than 1000 kg. In some embodiments, the weight applied to the ion exchange bed is from 1 kg to 5 kg, from 5 kg to 10 kg, from 10 kg to 50 kg, from 50 kg to 100 kg, from 100 kg to 500 kg, or from 500 kg to 1000 kg.

In some embodiments the hydraulic force applied to the ion exchange bead is less than 50 psi, less than 150 psi, less than 500 psi, less than 1000 psi, less than 2500 psi, or less than 5000 psi. In some embodiments the hydraulic force applied to the ion exchange bead is more than 50 psi, more than 150 psi, more than 500 psi, more than 1000 psi, more than 2500 psi, or more than 5000 psi. In some embodiments, the hydraulic force applied to the ion exchange bead is from 50 psi to 150 psi, from 150 psi to 500 psi, from 500 psi to 1000 psi, from 1000 psi to 2500 psi, from 2500 psi to 5000 psi.

In an aspect, described herein is a fluid diversion device that forms ion exchange beads into ion exchange beads with uniform and optimal flow properties for lithium extraction by ion exchange. In an aspect, described herein is a fluid diversion device that forms ion exchange beads into ion exchange beds with homogenous density or near-homogenous density. In an aspect, described herein is a fluid diversion device that forms ion exchange beads into ion exchange beds with homogenous density or near-homogenous density.

In some embodiments, said fluid diversion device is cylindrical, square, rectangular, triangular, oval-shaped, star-shaped, irregularly shaped, mixtures thereof or combinations thereof. In some embodiments, said fluid diversion device conforms to the shape of the vessel where it is used. In some embodiments, said fluid diversion device conforms to the shape of the pipe where it is placed. In some embodiments, said fluid diversion device changes shape depending on the fluid that is flowing into it, from it, or through it. In some embodiments, said fluid diversion device changes shape before, during, at several points, or after the ion-exchange bed shaping process. In some embodiments, said fluid diversion device changes shape depending on the pressure being applied on it by a fluid.

In some embodiments, the fluid diversion device blocks fluid flow by sealing compartments of the vessel. In some embodiments, this device blocks flow with O-rings, gaskets, expanding flexible rings, balloons, or a combination of thereof. In some embodiments, the fluid diversion device seals comprise polytetrafluoroethylene (PTFE), polychloroprene (neoprene), ethylene propylene dine monomer (EPDM), Viton, nitrile rubber (Buna-N), silicone, fluoropolymer, polyurethane, fluorosilicone, or a combination thereof.

In some embodiments, the fluid diversion device blocks sections of the ion exchange bed so as to direct flow to specific sections of the ion exchange bed that are to be formed and packed. In some embodiments, said fluid diversion device blocks flow by occupying the space inside a flow distributor in order to prevent flow through said flow distributor and into the ion exchange bed. In some embodiments, said fluid diversion device blocks flow through sections of the flow distributor that delivers fluid to the ion exchange bed. In some embodiments, said fluid diversion device blocks flow through sections of the flow distributor that collects fluid the ion exchange bed. In some embodiments, said fluid diversion device blocks flow by blocking the pores of the porous partition dividing compartments in the ion exchange vessel.

In some embodiments, one, two, three, four, five, six, seven, eight, nine, or ten fluid diversion devices are used within a single vessel, on their own, in combination, or changing in number and type throughout the duration of the packing treatment.

In some embodiments, more than one fluid diversion device is present within the same ion exchange vessel. In some embodiments, more than about two, more than about four, more than about six, more than about 10, more than about 20, more than about 50 fluid diversion device is present within the same ion exchange vessel. In some embodiments, less than about two, less than about four, less than about six, less than about 10, less than about 20, less than about 50 fluid diversion device is present within the same ion exchange vessel. In some embodiments, between about one and about two, between about two and about four, between about four and about six, between about four and about 10, between about 10 and about 20, between about 20 and about 50 fluid diversion device is present within the same ion exchange vessel.

In some embodiments, forming of the ion exchange bed occurs by using said fluid diversion device to pack sections of the ion exchange bed, until the entirety of the ion exchange chamber is packed. In some embodiments, forming of the ion exchange bed occurs by continuously moving the fluid diversion device along the length of the ion exchange vessel. In some embodiments, the ion exchange bed is packed in less than 4 sections, less than 8 sections, less than 20 sections, less than 50 sections, less than 100 sections. In some embodiments, the ion exchange bed is packed in more than 1 section, more than 4 sections, more than 8 sections, more than 20 sections, more than 50 sections, more than 100 sections. In some embodiments, the ion exchange bed is packed from about 1 to about 4 sections, about 4 sections to about 8 sections, from about 8 sections to about 20 sections, from about 20 sections to about 50 sections, from about 50 sections to about 100 sections.

In some embodiments, fluid can flow up, down, at an angle, through, or across said fluid diversion device. In some embodiments, said fluid diversion device contains a pipe through which fluid can flow. In some embodiments, said fluid diversion device can move along a pipe. In some embodiments, the fluid can move to different positions of a vessel. In some embodiments, the fluid moves to different positions in the vessel in response to fluid flow. In some embodiments, the fluid moves to different positions in the vessel in response to pressure. In some embodiments, the fluid moves to different positions in the vessel in response to the liquid level in the vessel.

In some embodiments, the fluid diversion device blocks sections with lengths less than 1 cm, less than 5 cm, less than 15 cm, less than 50 cm, less than 100 cm, or less than 200 cm. In some embodiments, the fluid diversion device blocks sections with lengths more than 1 cm, more than 5 cm, more than 15 cm, more than 50 cm, more than 100 cm, or more than 200 cm. In some embodiments, the fluid diversion device blocks sections with lengths from 1 cm to 5 cm, from 5 cm to 15 cm, from 15 cm to 50 cm, from 50 cm to 100 cm, from 100 cm to 200 cm.

In some embodiments, the fluid diversion device has a length of less than 1 cm, less than 5 cm, less than 15 cm, less than 50 cm, less than 100 cm, or less than 200 cm. In some embodiments, the fluid diversion has a length of more than 1 cm, more than 5 cm, more than 15 cm, more than 50 cm, more than 100 cm, or more than 200 cm. In some embodiments, the fluid diversion device has a length of from 1 cm to 5 cm, from 5 cm to 15 cm, from 15 cm to 50 cm, from 50 cm to 100 cm, from 100 cm to 200 cm. In some embodiments, the fluid diversion device has a width of less than 1 cm, less than 5 cm, less than 15 cm, less than 50 cm, less than 100 cm, or less than 200 cm. In some embodiments, the fluid diversion has a width of more than 1 cm, more than 5 cm, more than 15 cm, more than 50 cm, more than 100 cm, or more than 200 cm. In some embodiments, the fluid diversion device has a width of from 1 cm to 5 cm, from 5 cm to 15 cm, from 15 cm to 50 cm, from 50 cm to 100 cm, from 100 cm to 200 cm. In some embodiments, the fluid diversion device has a radius of less than 1 cm, less than 5 cm, less than 15 cm, less than 50 cm, less than 100 cm, or less than 200 cm. In some embodiments, the fluid diversion has a radius of more than 1 cm, more than 5 cm, more than 15 cm, more than 50 cm, more than 100 cm, or more than 200 cm. In some embodiments, the fluid diversion device has a radius of from 1 cm to 5 cm, from 5 cm to 15 cm, from 15 cm to 50 cm, from 50 cm to 100 cm, from 100 cm to 200 cm.

In some embodiments, packing is aided by using inert beads to restrict the fluid flow path from certain sections of the vessel. In some embodiments, the inert beads are loaded on a separate compartment from the ion exchange beads; this restricts fluid flow in the compartment that contains said inert beads and directs flow to the compartment containing ion-exchange beads. In some embodiments, the inert beads are loaded on the same compartment with the ion exchange beads; this restricts fluid flow in areas of the compartment that contain said inert beads and directs flow to the ion-exchange beads.

In some embodiments, the inert beads are loaded into the vessel by flowing into the vessel as a slurry, applying vacuum through the vessel and pulling the beads into the vessel, pouring the slurry into the vessel with a slurry transfer device, or a combination thereof. In some embodiments, the inert beads are unloaded into the vessel by flowing into the vessel as a slurry, applying vacuum through the vessel and pulling the beads into the vessel, pouring the slurry into the vessel with a slurry transfer device, or a combination thereof. In some embodiments, the inert beads are loaded as a dry powder. In some embodiments, the inert beads are loaded as a solid. In some embodiments, the inert beads are loaded as a dry powder by pouring them into the ion exchange vessel as a powder. In some embodiments, the inert beads are loaded as a dry powder by pouring them into the ion exchange vessel while tapping them loading container. In some embodiments, the inert beads are loaded as a dry powder by pneumatically conveying them into the ion exchange vessel using a blower, a vacuum, compressed air, a conveyor belt, a fan, or combinations thereof.

In some embodiments, the inert beads consist of a polymer, a ceramic, a metal, a carbide, a nitride, an oxide, a phosphate, a fluoride, a polymer, carbon, a carbonaceous material, or combinations thereof. In some embodiments, the inert beads comprise a polymer, a ceramic, a metal, a carbide, a nitride, an oxide, a phosphate, a fluoride, a polymer, carbon, a carbonaceous material, or combinations thereof. In some embodiments, the inert beads comprise a chloro-polymer, a fluoro-polymer, a chloro-fluoro-polymer, a hydrophilic polymer, a hydrophobic polymer, co-polymers thereof, mixtures thereof, or combinations thereof. In a further embodiment, a coating is applied to these inert beads. In some embodiments, the inert beads comprise a coating material. In some embodiments, the coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the inert beads are shaped as a sphere, spheroid, ovaloid, cross, tube, torus, ring, saddle ring, tubes, triangles, cylinders, rhombus, square, rectangle, other complex geometric shapes, or a combination thereof.

In some embodiments, the inert beads have an average particle diameter less than about 1 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, inert beads have an average particle diameter more than about 1 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, inert beads have a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, said filler material is inert to acid and brine. In some embodiments, said filler is constructed from a polymer or ceramic. In some embodiments, said filler material has pores containing ion exchange material. In some embodiments, said filler material has pores larger smaller than 10 microns containing ion exchange material. In some embodiments, said material filler has pores larger smaller than 100 microns containing ion exchange material. In some embodiments, said filler material has pores larger smaller than 1 millimeter containing ion exchange material. In some embodiments, said filler material has pores larger smaller than 1 centimeter containing ion exchange material. In some embodiments, said filler material has pores larger than 1 centimeter containing ion exchange material. In some embodiments, said filler material has pores larger than 10 centimeters containing ion exchange material. In some embodiments, said filler material has pores larger than about 10 microns or about 100 microns containing ion exchange material. In some embodiments, said filler material has pores larger than about 1 millimeter, about 1 centimeter, or about 10 centimeters containing ion exchange material. In some embodiments, said filler material has pores larger than about 10 centimeters or about 25 centimeters containing ion exchange material. In some embodiments, said filler material has pores smaller than about 10 microns or about 100 microns containing ion exchange material. In some embodiments, said filler material has pores smaller larger than about 1 millimeter, about 1 centimeter, or about 10 centimeters containing ion exchange material. In some embodiments, said filler material has pores smaller larger than about 10 centimeters or about 25 centimeters containing ion exchange material. In some embodiments, said filler material is a rigid scaffolding.

In some embodiments, a screen, mesh, or other partition is optionally included within the ion exchange vessel, in order to control the location and restrict the movement of ion exchange beads during the contact with fluid. In some embodiments, said partition separates the ion-exchange compartments from the flow-distribution compartments. In some embodiments, said partition separates the flow-distribution compartments from the ion-exchange compartments. In some embodiments, this porous partition provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless-steel mesh, a stainless steel mesh coated in polymer, a stainless steel mesh coated in ceramic, a titanium mesh, or a combination thereof, wherein the mesh is a coarse mesh, a fine mesh, or a combination thereof.

In some embodiments the porous partition is a porous pipe. In some embodiment the porous pipe comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments the porous pipe comprises sintered metals, stainless steel, titanium, stainless steel coated in ceramic, hastelloy, monel, inconel, or a combination thereof.

In some embodiments the porous pipe consists of openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm.

In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments the porous pipe comprises openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition comprises openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition comprises openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition comprises openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400

μm, from about 400 μm to about 1000 μm, from about 1000 μm to about 2000 μm. In some embodiments, the porous partition comprises openings in that are of a typical characteristic size of from about 1 μm to about 10 μm, from about 10 μm to about 100 μm, from about 100 μm to about 1000 μm, from about 1000 μm to about 10000 μm.

System of Modulating pH for the Extraction of Lithium

The release of hydrogen during lithium uptake by ion exchange material will acidify the brine (e.g., liquid resource) and limit said lithium uptake unless the pH of the brine is optionally maintained in a suitable range to facilitate thermodynamically favorable lithium uptake and concomitant hydrogen release. To control the pH of the brine and maintain the pH in a range that is suitable for lithium uptake in an ion exchange column, bases such as NaOH, $Ca(OH)_2$, CaO, KOH, or $NH_3$ are optionally added to the brine as solids, aqueous solutions, or in other forms. For brines (e.g., liquid resources) that contain divalent ions such as Mg, Ca, Sr, or Ba, addition of base to the brine can cause precipitation of solids, such as $Mg(OH)_2$ or $Ca(OH)_2$, which can cause problems for the ion exchange reaction. These precipitates cause problems in at least three ways. First, precipitation can remove base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from brine, an ideal pH range for the brine is optionally 6 to 9, a preferred pH range is optionally 4 to 9, and an acceptable pH range is optionally 2 to 9.

In an aspect, described herein is an ion exchange reactor for lithium extraction with a form (e.g., in a configuration) that allows for pH control during lithium uptake from a brine or other lithium ion-containing liquid resource. This reactor functions to neutralize hydrogen that is released during lithium uptake, while solving the problems associated with precipitation from base addition.

In an aspect, described herein is a system for the extraction of lithium ions from a liquid resource, comprising: a) an ion exchange material; and b) a pH modulating setup for increasing pH of the liquid resource in the system. The ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Recirculating Batch System

In an embodiment of the system, the ion exchange material is loaded in a column. In an embodiment of the system, the pH modulating setup is connected to the column loaded with the ion exchange material. In an embodiment of the system, the pH modulating setup comprises one or more tanks.

In some embodiments of the systems described herein, the ion exchange material is loaded in a vessel. In some embodiments, the pH modulating setup is in fluid communication with the vessel loaded with the ion exchange material. In some embodiments, the pH modulating setup is in fluid communication with the column loaded with the ion exchange material.

In one embodiment of the system, one or more ion exchange columns are loaded with a fixed or fluidized bed of ion exchange beads. In one embodiment of the system, the ion exchange column is a cylindrical construct with entry and exit ports. In a further embodiment, the ion exchange column is optionally a non-cylindrical construct with entry and exit ports. In a further embodiment, the ion exchange column optionally has entry and exit ports for brine pumping, and additional doors or hatches for loading and unloading ion exchange beads to and from the column. In a further embodiment, the ion exchange column is optionally equipped with one or more security devices to decrease the risk of theft of the ion exchange beads. In one embodiment, these beads contain ion exchange material that can reversibly absorb lithium from brine and release lithium in acid. In one embodiment, the ion exchange material comprises particles that are optionally protected with coating material such as $SiO_2$, $ZrO_2$, or $TiO_2$ to limit dissolution or degradation of the ion exchange material. In one embodiment, ion exchange beads contain a structural component such as an acid-resistant polymer that binds the ion exchange particles. In one embodiment, the ion exchange beads contain pores that facilitate penetration of brine, acid, aqueous, and other solutions into the beads to deliver lithium and hydrogen to and from the ion exchange bead or to wash the bead. In one embodiment, the ion exchange bead pores are structured to form a connected network of pores with a distribution of pore sizes and are structured by incorporating filler materials during ion exchange bead formation and later removing that filler material in a liquid or gas.

In one embodiment of the system, the system is a recirculating batch system, which comprises an ion exchange column that is connected to one or more tanks for mixing base into the brine (e.g., liquid resource), settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the beads. In one embodiment, base is added to the brine in such a way that pH is maintained at an adequate level for lithium uptake and in such a way that the amount of base-related precipitates in the ion exchange column is minimized.

In one embodiment, as the brine is pumped through the recirculating batch system, the brine pH drops in the ion exchange column due to hydrogen release from the ion exchange beads during lithium uptake, and the brine pH is adjusted upward by the addition of base as a solid, aqueous solution, or other form. In one embodiment, the ion exchange system drives the ion exchange reaction to near completion, and the pH of the brine leaving the ion exchange column approaches the pH of the brine entering the ion exchange column. In one embodiment, the amount of base added is optionally controlled to neutralize the hydrogen released by the ion exchange beads in such a way that no basic precipitates form. In one embodiment, an excess of base or a transient excess of base is optionally added in such a way that basic precipitates form. In one embodiment, the basic precipitates form transiently and then are redissolved partially or fully by the hydrogen that is released from the ion exchange column. In one embodiment of the system, base is optionally added to the brine flow prior to the ion exchange column, after the ion exchange column, prior to one or more tanks, or after one or more tanks.

In one embodiment of the recirculating batch system, the tanks include a mixing tank where the base is mixed with the brine (e.g., liquid resource). In one embodiment, the tanks include a settling tank, where precipitates such as $Mg(OH)_2$ optionally settle to the bottom of the settling tank to avoid injection of the precipitates into the ion exchange column. In one embodiment, the tanks include a storage tank where the brine is stored prior to reinjection into the ion exchange column, mixing tank, settling tank, or other tanks. In one embodiment, the tanks include an acid recirculation tank. In one embodiment, some tanks in the recirculating batch reactor optionally serve a combination of purposes including base mixing tank, settling tank, acid recirculation tank, or storage tank. In any embodiment, a tank optionally does not fulfil two functions at the same time. For example, a tank is not a base mixing tank and a settling tank.

In one embodiment of the recirculating batch system, base is added to a mixing tank, which is optionally a continuous stirred tank system, a confluence of acidified brine flow and base flow followed by a static mixer, a confluence of acidified brine flow and base flow followed by a paddle mixer, a confluence of acidified brine flow and base flow followed by a turbine impeller mixer, or a continuous stirred tank system in the shape of a vertical column which is well mixed at the bottom and settled near the top. In one embodiment, the base is optionally added as a solid or as an aqueous solution. In one embodiment, the base is optionally added continuously at a constant or variable rate. In one embodiment, the base is optionally added discretely in constant or variable aliquots or batches. In one embodiment, the base is optionally added according to one or more pH meters, which optionally samples brine downstream of the ion exchange column or elsewhere in the recirculating batch system. In one embodiment, filters are optionally used to prevent precipitates from leaving the mixing tank. In one embodiment, the filters are optionally plastic mesh screens, small packed columns containing granular media such as sand, silica, or alumina, small packed columns containing porous media filter, or a membrane.

In one embodiment of the recirculating batch system, the settling tank is optionally a settling tank with influent at bottom and effluent at top or a settling tank with influent on one end and effluent on another end. In one embodiment, chambered weirs are used to fully settle precipitates before brine is recirculated into reactor. In one embodiment, solid base precipitates are collected at the bottom of the settling tank and recirculated into the mixer. In one embodiment, precipitates such as $Mg(OH)_2$ optionally settle near the bottom of the tank. In one embodiment, brine is removed from the top of the settling tank, where the amount of suspended precipitates is minimal. In one embodiment, the precipitates optionally settle under forces such as gravity, centrifugal action, or other forces. In one embodiment, filters are optionally used to prevent precipitates from leaving the settling tank. In one embodiment, the filters are optionally plastic mesh screens, small packed columns containing granular media such as sand, silica, or alumina, small packed columns containing porous media filter, or a membrane. In one embodiment, baffles are optionally used to ensure settling of the precipitate and to prevent the precipitate from exiting the settling tank and entering the column.

In one embodiment of the recirculating batch system, basic precipitates are optionally collected from the settling tank and reinjected into the brine in a mixing tank or elsewhere to adjust the pH of the brine.

In one embodiment of the recirculating batch system, one or more ion exchange columns are optionally connected to one or more tanks or set of tanks. In one embodiment of the recirculating batch system, there are optionally multiple ion exchange columns recirculating brine through a shared set of mixing, settling, and storage tanks. In one embodiment of the recirculating batch system, there is optionally one ion exchange column recirculating brine through multiple sets of mixing, settling, and storage tanks.

Column Interchange System

An aspect of the invention described herein is a system wherein the ion exchange material is loaded in a plurality of columns. In an embodiment, the pH modulating setup comprises a plurality of tanks connected to the plurality of columns, wherein each of the plurality of tanks is immediately connected to one of the plurality of columns. In an embodiment, two or more of the plurality of tanks connected to the plurality of columns forms at least one circuit. In an embodiment, three or more of the plurality of tanks connected to the plurality of columns forms at least two circuits. In an embodiment, three or more of the plurality of tanks connected to the plurality of columns forms at least three circuits. In an embodiment, at least one circuit is a liquid resource circuit. In an embodiment, at least one circuit is a water washing circuit. In an embodiment, at least one circuit is an acid solution circuit. In an embodiment, at least two circuits are water washing circuits.

In one embodiment of the ion exchange system, the system is a column interchange system where a series of ion exchange columns are connected to form a brine circuit, an acid circuit, a water washing circuit, and optionally other circuits. In one embodiment of the brine circuit, brine flows through a first column in the brine circuit, then into a next column in the brine circuit, and so on, such that lithium is removed from the brine as the brine flows through one or more columns. In one embodiment of the brine circuit, base is added to the brine before or after each ion exchange column or certain ion exchange columns in the brine circuit to maintain the pH of the brine in a suitable range for lithium uptake by the ion exchange beads. In one embodiment of the acid circuit, acid flows through a first column in the acid circuit, then into the next column in the acid circuit, and so on, such that lithium is eluted from the columns with acid to produce a lithium concentrate. In one embodiment of the acid circuit, acid flows through a first column in the acid circuit, then optionally into a next column in the acid circuit, and so on, such that lithium is eluted from the columns with acid to produce a lithium concentrate. In one embodiment of the water washing circuit, water flows through a first column in the water washing circuit, then optionally into a next column in the water washing circuit, and so on, such that brine in the void space, pore space, or head space of the columns in the water washing circuit is washed out.

In one embodiment of the column interchange system, ion exchange columns are interchanged between the brine circuit, the water washing circuit, and the acid circuit. In one embodiment, the first column in the brine circuit is loaded with lithium and then interchanged into the water washing circuit to remove brine from the void space, pore space, or head space of the column. In one embodiment, the first column in the water washing circuit is washed to remove brine, and then interchanged to the acid circuit, where lithium is eluted with acid to form a lithium concentrate. In one embodiment, the first column in the acid circuit is eluted with acid and then interchanged into the brine circuit to absorb lithium from the brine. In one embodiment of the column interchange system, two water washing circuits are used to wash the columns after both the brine circuit and the acid circuit. In one embodiment of the column interchange system, only one water washing circuit is used to wash the columns after the brine circuit, whereas excess acid is neutralized with base or washed out of the columns in the brine circuit.

In one embodiment of the column interchange system, the first column in the brine circuit is interchanged to become the last column in the water washing circuit. In one embodiment of the column interchange system, the first column in the water washing circuit is interchanged to become the last column in the acid circuit. In one embodiment of the column interchange system, the first column in the acid circuit is interchanged to become the last column in the brine circuit.

In one embodiment of the column interchange system, each column in the brine circuit contains one or more tanks or junctions for mixing base into the brine and optionally settling any basic precipitates that form following base addition. In one embodiment of the column interchange system, each column in the brine circuit has associated one or more tanks or junctions for removing basic precipitates or other particles via settling or filtration. In one embodiment of the column interchange system, each column or various clusters of columns have associated one or more settling tanks or filters that remove particles including particles that detach from ion exchange beads.

In one embodiment of the column interchange system, the number of the columns in the brine circuit is optionally less than about 3, less than about 10, less than about 30, or less than about 100. In one embodiment of the column interchange system, the number of the columns in the acid circuit is optionally less than about 3, less than about 10, less than about 30, or less than about 100. In one embodiment of the column interchange system, the number of the columns in the water washing circuit is optionally less than about 3, less than about 10, less than about 30, or less than about 100. In certain embodiments, the number of columns in the brine circuit is 1 to 10. In some embodiments, the number of columns in the acid circuit is 1 to 10. In some embodiments, the number of columns in washing circuit is 1 to 10.

In one embodiment of the column interchange system, there is optionally one or more brine circuits, one or more acid circuits, and one or more water washing circuits. In one embodiment of the column interchange system, ion exchange columns are optionally supplied with fresh ion exchange beads without interruption to operating columns. In one embodiment of the column interchange system, ion exchange columns with beads that have been depleted in capacity is optionally replaced with ion exchange columns with fresh ion exchange beads without interruption to operating columns.

In one embodiment of the column interchange system, the columns contain fluidized beds of ion exchange material. In one embodiment of the column interchange system, the columns have means of created a fluidized bed of ion exchange material such as overhead stirrers or pumps. In one embodiment of the column interchange system, the columns contain fluidized beds of ion exchange material. In one embodiment of the ion exchange system, the system is an interchange system and the vessels are stirred tank reactors. In one embodiment of the interchange system, base may be added directly to the columns or other tanks containing the ion exchange material. In one embodiment of the interchange system, base may be added to the brine or another solution in a separate mixing tank and then added to the columns or other tanks containing the ion exchange material.

In one embodiment of the ion exchange system, ion exchange beads are loaded into ion exchange columns and following lithium uptake from brine, lithium is eluted from the ion exchange columns using an acid recirculation loop. In one embodiment of the acid recirculation loop, acid is flowed through an ion exchange column, into a tank, and then recirculated through the ion exchange column to optimize lithium elution. In one embodiment of the ion exchange system, ion exchange beads are loaded into ion exchange columns and following lithium uptake from brine, lithium is eluted from each ion exchange column using a once-through flow of acid. In one embodiment of the ion exchange system, ion exchange beads are loaded into an ion exchange column and following lithium uptake from brine, lithium is eluted from the ion exchange column using a column interchange circuit.

In one embodiment of the ion exchange system, ion exchange columns are loaded with lithium by flowing brine through the columns using a recirculating batch system and then lithium is eluted from the columns using a column interchange system. In one embodiment of the ion exchange system, ion exchange columns are loaded with lithium by flowing brine through the columns using a column interchange system and then lithium is eluted from the columns using a recirculating batch system. In one embodiment of the ion exchange system, ion exchange columns are loaded with lithium by flowing brine through the columns using a recirculating batch system and then lithium is eluted from the columns using a recirculating batch system. In one embodiment of the ion exchange system, ion exchange columns are loaded with lithium by flowing brine through the columns using a column interchange system and then lithium is eluted from the columns using a column interchange system.

Stirred Tank System

An aspect of the invention described herein is a system wherein the pH modulating setup is a tank comprising: a) one or more compartments; and b) a means for moving the liquid resource through the one or more compartments. In an embodiment, the ion exchange material is loaded in at least one compartment. In an embodiment, the means for moving the liquid resource through the one or more compartments is a pipe. In a further embodiment, the means for moving the liquid resource through the one or more compartments is a pipe and suitably a configured pump. In an embodiment, the tank further comprises a means for circulating the liquid resource throughout the tank. In an embodiment, the means for circulating the liquid resource throughout the tank is a mixing device. In an embodiment, the tank further comprises an injection port.

In some embodiments, the tank further comprises one or more injection ports. In some embodiments, the tank further comprises a plurality of injection ports.

An aspect described herein is a system for the extraction of lithium ions from a liquid resource, comprising a tank, wherein the tank further comprises: a) one or more compartments; b) an ion exchange material; c) a mixing device; and d) a pH modulating setup for changing the pH of the system, wherein the ion exchange material is used to extract lithium ions from the liquid resource. In one embodiment, the pH modulating setup changes the pH of the liquid resource in the system.

In some embodiments, the ion exchange material is loaded in at least one of the one or more compartments. In some embodiments, the ion exchange material is fluidized in at least one of the one or more compartments. In some embodiments, the ion exchange material is non-fluidized in at least one of the one or more compartments. In some embodiments, the ion exchange material occupies a fixed position in at least one of the one or more compartments.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In one embodiment of the ion exchange system, the system is a stirred tank system comprised of a tank of brine containing permeable bead compartments such as permeable pallets, cases, boxes, or other containers that are loaded with ion exchange beads, and the brine is stirred through the tank in a batch process. In one embodiment of the stirred tank system, the base is optionally added directly to the tank gradually or all at once as a solid or in an aqueous solution. In one embodiment of the stirred tank system, after a brine uptake stage is complete, the permeable bead containers are optionally moved to another tank for acid elution. In one embodiment of the stirred tank system, the permeable bead compartments are located at the bottom of the stirred tank during the brine stage and after the brine stage is completed, then brine is removed, and the bottom of the stirred tank is filled with acid to elute lithium in such a way that the permeable bead compartments are covered with an optimal volume of acid.

In one embodiment of the stirred tank system, the ion exchange beads are suspended using plastic structural supports in a tank with an internal mixing device. In one embodiment of the stirred tank system, a stream of brine is removed from the tank and passed through a column where hydrogen ions in the brine produced by ion exchange are neutralized using sacrificial base in solution or added as solid, or by an ion exchange resin. This pH-corrected stream is sent back into the system where the lithium can continue to be removed. In one embodiment of the stirred tank system, brine that has passed through the bead compartment is returned to the opposite end of the tank through a pipe that is optionally internal or external to the tank. In one embodiment of the stirred tank system, base is optionally added to the brine inside the tank or in a base addition tank outside the tank.

In one embodiment of the stirred tank system, fresh brine is fed to the system so as to operate in continuous stirred tank system mode instead of batch mode. In one embodiment of the recirculating batch system, fresh brine is fed to the system so as to operate in continuous stirred tank system mode instead of batch mode.

In one embodiment of the ion exchange system, the ion exchange material is mixed with a liquid resource in a stirred tank reactor. In some embodiments, the ion exchange material comprises coated particles, uncoated particles, porous ion exchange beads, or combinations thereof.

In one embodiment of the ion exchange system, a stirred tank reactor is used to fluidize the ion exchange material in a liquid resource to enable absorption of lithium from the liquid resource into the ion exchange material. In one embodiment, a stirred tank reactor is used to fluidize the ion exchange material in a washing fluid to remove residual brine, acid, or other contaminants from the ion exchange materials. In one embodiment, a stirred tank reactor is used to fluidize the ion exchange material in an acid solution to elute lithium from the ion exchange material while replacing the lithium in the ion exchange material with protons. In one embodiment, a single stirred tank reactor is used to mix ion exchange material with a liquid resource, washing fluid, and acid solution.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises another tank, wherein the other tank further comprises: a) one or more compartments; b) an ion exchange material; c) a mixing device; and d) a pH modulating setup for changing the pH of the liquid resource in the system. In some embodiments, the tank is in fluid communication with the other tank.

In some embodiments, the system for the extraction of lithium ions from a liquid resource, comprising a tank, wherein the system further comprises another tank, wherein the other tank further comprises: a) one or more compartments; b) an ion exchange material; c) a mixing device; and d) an acid inlet for adding acid to the system. In a further embodiment, the ion exchange material is moved between the tank and the other tank.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises a plurality of tanks, each tank further comprising: a) one or more compartments; b) an ion exchange material; c) a mixing device; and d) a pH modulating setup for changing the pH of the liquid resource in the system. In some embodiments, each tank of the system is in fluid communication with each other tank of the system.

In some embodiments, the system further comprises another plurality of tanks, wherein each tank further comprises: a) one or more compartments; b) an ion exchange material; and c) a mixing device.

In some embodiments, the system is configured to operate in a batch mode. In some embodiments, the system is configured to operate in a continuous mode. In some embodiments, the system is configured to operate in a batch mode and a continuous mode. In some embodiments, one or more tanks in the system are configured to operate in a batch mode and one or more tanks in the system are configured to operate in a continuous mode. In some embodiments, one or more tanks in the system are configured to operate in a batch mode and one or more tanks in the system are configured to operate in a semi-continuous mode. In some embodiments, one or more tanks in the system are configured to operate in a semi-continuous mode and one or more tanks in the system are configured to operate in a continuous mode. In some embodiments, one or more tanks in the system are configured to operate in a batch mode, one or more tanks in the system are configured to operate in a semi-continuous mode, and one or more tanks in the system are configured to operate in a continuous mode. In some embodiments, the system is configured to operate in a semi-continuous mode, a batch mode, a continuous mode, or combinations thereof.

In one embodiment of the ion exchange system, a plurality of stirred tank reactors are used to mix ion exchange material with a liquid resource, washing fluid, and acid solution. In one embodiment, the stirred tank reactors may be different sizes and may contain different volumes of a liquid resource, washing fluid, and acid solution. In one embodiment, the stirred tanks may be cylindrical, conical, rectangular, pyramidal, or a combination thereof. In one embodiment of the ion exchange system, the ion exchange material may move through the plurality of stirred tank reactors in the opposite direction of the liquid resource, the washing fluid, or the acid solution.

In one embodiment of the ion exchange system, a plurality of stirred tank reactors may be used where one or more stirred tank reactors mix the ion exchange material with a liquid resource, one or more stirred tank reactors mix the ion exchange material with a washing fluid, and one or more stirred tank reactors mix the ion exchange material with an acid solution.

In one embodiment of the ion exchange system, stirred tank reactors may be operated in a continuous, semi-continuous, or batch mode where a liquid resource flows continuously, semi-continuously, or batch-wise through the stirred tank reactor. In one embodiment of the ion exchange system, stirred tank reactors may be operated in a continuous, semi-continuous, or batch mode where the ion exchange material flows continuously, semi-continuously, or batch-wise through the stirred tank reactor. In one embodiment of the ion exchange system, stirred tank reactors may be operated in a mode where the ion exchange material remains in the tank while flows of liquid resource, washing fluid, or acid solution are flowed through the tank in continuous, semi-continuous, or batch flows.

In one embodiment, ion exchange material is loaded into or removed from the stirred tank reactors through the top, the bottom, or the side of the tank.

In one embodiment of the ion exchange system, stirred tank reactors comprise one or more compartments. In one embodiment, the compartments contain ion exchange material in a bed that is fluidized, fixed, partially fluidized, partially fixed, alternatively fluidized, alternatively fixed, or combinations thereof. In one embodiment, the compartments may comprise a porous support at the bottom of the compartment, the sizes of the compartment, the top of the compartment, or combinations thereof. In one embodiment, the compartments may be conical, cylindrical, rectangular, pyramidal, other shapes, or combinations thereof. In one embodiment, the compartment may be located at the bottom of the tank. In one embodiment, the shape of the compartment may conform to the shape of the stirred tank reactor. In one embodiment, the compartment may be partially or fully comprised of the tank of the stirred tank reactor.

In one embodiment, the compartment may be comprised of a porous structure. In one embodiment, the compartment may be comprised of a polymer, a ceramic, a metal, or combinations thereof. In one embodiment, the compartment may be comprised be comprised partially or fully of a porous material or a mesh. In one embodiment, the compartment may be at the top of the tank. In one embodiment, the compartment may be separated from the rest of the tank with one or more porous materials. In one embodiment, the compartment may be at the top of the tank. In one embodiment, the compartment may be separated from the rest of the tank with a bilayer mesh comprising one layer of coarse mesh for strength and one layer of fine mesh to contain smaller particles in the compartment. In one embodiment, the compartment may allow liquid to flow freely through the stirred tank reactor and through the compartment. In one embodiment, the compartment may be open on the top. In one embodiment, the compartment may contain the ion exchange material in the tank but allow the ion exchange material to move throughout the tank. In one embodiment, the compartment may comprise a majority or minority of the tank volume. In one embodiment, the compartment may represent a fraction of the volume of the tank that is greater than 1 percent, greater than 10 percent, greater than 50 percent, greater than 90 percent, greater than 99 percent, or greater than 99.9 percent. In one embodiment, one or more devices for stirring, mixing, or pumping may be used to move fluid through the compartment, the stirred tank reactor, or combinations thereof.

In one embodiment of the ion exchange system, stirred tank reactors may be arranged into a network where flows of brine, washing fluid, and acid solutions are directly through different columns. In one embodiment, a network of stirred tank reactors may involve physical movement of the ion exchange material through the various stirred tank reactors. In one embodiment, a network of stirred tank reactors may involve no physical movement of the ion exchange material through the various stirred tank reactors. In one embodiment, a network of stirred tank reactors may involve switching of flows of brine, washing fluid, and acid solutions through the various stirred tank reactors. In one embodiment, brine may into stirred tank reactors in continuous or batch mode. In one embodiment, brine may be mixed with ion exchange material in one or more reactors before exiting the system. In one embodiment, a network of stirred tank reactors may involve a brine circuit with counter-current exposure of ion exchange material to flows of brine. In one embodiment, a network of stirred tank reactors may involve a washing circuit with counter-current exposure of ion exchange material to flows of washing fluid. In one embodiment, a network of stirred tank reactors may involve an acid circuit with counter-current exposure of ion exchange material to flows of acid solution. In one embodiment, the washing fluid may be water, an aqueous solution, or a solution containing an anti-scalant.

In one embodiment of the stirred tank reactor, acid is added at the beginning of elution. In one embodiment of the stirred tank reactor, acid is added at the beginning of elution and again during elution. In one embodiment of the stirred tank reactor, an acid of lower concentration is added at the start of elution and additional acid of high concentration is added to continue elution.

In an aspect, described herein is a system for the extraction of lithium ions from a liquid resource, comprising: a) an ion exchange material; b) a tank comprising one or more compartments; and c) a mixing device, wherein the ion exchange material is used to extract lithium ions from the liquid resource.

In some embodiments, the ion exchange material is loaded in at least one of the one or more compartments. In some embodiments, the ion exchange material is fluidized or partially fluidized in at least one of the one or more compartments. In some embodiments, the ion exchange material occupies a fixed position in at least one of the one or more compartments. In some embodiments, the ion exchange material is mounted in at least one of the one or more compartments.

In an aspect, described herein is a system for the extraction of lithium ions from a liquid resource, comprising: a) a column comprising an ion exchange material; and b) a pH modulating setup for changing the pH of the liquid resource in the system, wherein the pH modulating setup is in fluid communication with the column, wherein the ion exchange material is used to extract lithium ions from the liquid resource.

Other Types of Systems

In an aspect, described herein is a system for the extraction of lithium ions from a liquid resource, comprising: a) a plurality of columns, wherein each of the plurality of columns comprises an ion exchange material; and b) a pH modulating setup for changing the pH of the liquid resource in the system, wherein the pH modulating setup is in fluid communication with each of the plurality of columns, wherein the ion exchange material is used to extract lithium ions from the liquid resource. In some embodiments, an alternate phase is contacted with the ion exchange material in step a).

In some embodiments, the pH modulating setup comprises a plurality of tanks, wherein each of the plurality of tanks is immediately connected to one of the plurality of columns. In one embodiment, the pH modulating setup comprises a plurality of tanks, wherein each of the plurality of tanks is in immediate liquid communication with one of the plurality of columns. In some embodiments, two or more of the plurality of tanks connected to two or more of the plurality of columns forms at least one circuit. In some embodiments, two or more of the plurality of tanks connected to two or more of the plurality of columns forms at least two circuits. In some embodiments, three or more of the plurality of tanks connected to three or more of the plurality of columns forms at least two circuits. In some embodiments, three or more of the plurality of tanks connected to three or more of the plurality of columns forms at least three circuits.

In some embodiments, the pH modulating setup comprises a plurality of tanks, wherein each of the plurality of tanks is connected to the of the plurality of columns through a filtration system. In some embodiments, two or more of the plurality of tanks are connected to two or more of the plurality of columns through a filter system to form at least one circuit. In some embodiments, two or more of the plurality of tanks are connected to two or more of the plurality of columns through a filter system to form at least two circuits. In some embodiments, three or more of the plurality of tanks are connected to two or more of the plurality of columns through a filter system to form at least two circuits. In some embodiments, three or more of the plurality of tanks are connected to two or more of the plurality of columns through a filter system (e.g., filtration system) to form at least three circuits.

In some embodiments, the filtration system comprises a bag filter, a candle filter, a cartridge filter, a media filter, a depth filter, a sand filter, a membrane filter, an ultrafiltration system, a microfiltration filter, a nanofiltration filter, a cross-flow filter, a dead-end filter, a drum filter, a filter press, or a combination thereof. In some embodiments, the openings in this filter are of less than about 0.02 µm, less than about 0.1 µm, less than about 0.2 µm, less than about 1 µm, less than about 2 µm, less than about 5 µm, less than about 10 µm, less than about 25 µm, less than about 100 µm, less than about 1000 µm. In some embodiments, the perforated openings in outer-perforated walls are of dimension of more than about 0.02 µm, more than about 0.1 µm, more than about 0.2 µm, more than about 1 µm, more than about 2 µm, more than about 5 µm, more than about 10 µm, more than about 25 µm, more than about 100 µm. In some embodiments, the perforated openings in outer-perforated walls are of dimension of about 0.02 µm to about 0.1 µm, from about 0.1 µm to about 0.2 µm, from about 0.2 µm to about 0.5 µm, from about 0.5 µm to about 1 µm, from about 1 µm to about 5 µm, from about 5 µm to about 10 µm, from about 10 µm to about 25 µm, from about 25 µm to about 100 µm. In some embodiments, the filter martial comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly (ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, the filter martial comprises iron, stainless steel, nickel, carbon steel, titanium, Hastelloy, Inconel, zirconium, tantalum, alloys thereof, mixtures thereof, or combinations thereof.

In some embodiments, at least one circuit is a liquid resource circuit. In some embodiments, at least one circuit is a water washing circuit. In some embodiments, at least two circuits are water washing circuits. In some embodiments, at least one circuit is an acid solution circuit.

An aspect described herein is a system for the extraction of lithium ions from a liquid resource comprising an ion exchange material and a plurality of vessels, wherein each of the plurality of vessels is configured to transport the ion exchange material along the length of the vessel and the ion exchange material is used to extract lithium ions from the liquid resource. In some embodiments, at least one of the plurality of vessels comprises an acidic solution. In some embodiments, at least one of the plurality of vessels comprises the liquid resource. In some embodiments, each of the plurality of vessels is configured to transport the ion exchange material by a pipe system or an internal conveyer system.

In an aspect, described herein is a system for the extraction of lithium ions from a liquid resource comprising an ion exchange material and a plurality of columns, wherein each of the plurality of columns is configured to transport the ion exchange material along the length of the column and the ion exchange material is used to extract lithium ions from the liquid resource.

In some embodiments, at least one of the plurality of columns comprises an acidic solution. In some embodiments, at least one of the plurality of columns comprises the liquid resource. In some embodiments, each of the plurality of columns is configured to transport the ion exchange material by a pipe system or an internal conveyer system.

In some embodiments, the ion exchange material comprises ion exchange particles. In some embodiments, at least a portion of the ion exchange material is in the form of ion exchange particles. In some embodiments, the ion exchange particles are selected from uncoated ion exchange particles, coated ion exchange particles, and combinations thereof. In some embodiments, the ion exchange particles comprise uncoated ion exchange particles. In some embodiments, the ion exchange particles comprise coated ion exchange particles. In some embodiments, the ion exchange particles comprise a mixture of uncoated and coated ion exchange particles.

In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, solid solutions thereof, and combinations thereof; wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, solid solutions thereof, and combinations thereof; wherein x is from 0.1-10; and y is from 0.1-10.

In some embodiments, the ion exchange material is porous. In some embodiments, the porous ion exchange material comprises a network of pores that allows liquids to move quickly from the surface of the porous ion exchange material to a plurality of ion exchange particles. In some embodiments, the porous ion exchange material comprises a network of pores that allows a liquid to move from the surface of the porous ion exchange material to a plurality of ion exchange particles. In some embodiments, the porous ion exchange material comprises a network of pores that allows a liquid to move quickly from the surface of the porous ion exchange material to a plurality of ion exchange particles. In some embodiments, the porous ion exchange material is porous ion exchange beads. In some embodiments, the porous ion exchange material is comprised of porous ion exchange beads.

In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the systems described herein, the liquid resource is a brine. In some embodiments of the systems described herein, the liquid resource comprises a natural brine, a synthetic brine, or a mixture of a natural and a synthetic brine. In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

In an aspect, described herein is a system, wherein the column further comprises a plurality of injection ports, wherein the plurality of injection ports are used to increase the pH of the liquid resource in the system In one embodiment of the ion exchange system, the system is a mixed base system comprising an ion exchange column and a mixing chamber where base is mixed into the brine (e.g., the liquid resource) immediately prior to injection of the brine into the column.

In one embodiment of the ion exchange system, the system is a ported ion exchange column system with multiple ports for injection of aqueous base spaced at intervals along the direction of brine flow through the column. As brine (e.g., the liquid resource) flows through the column, there is a region of the column where the beads experience the greatest rate of lithium absorption, and this region moves through the column in the direction of brine flow. In the ported ion exchange column system, base is injected near that region to neutralize protons released by the ion exchange reaction. In regions of the columns where the beads have been saturated with lithium and the rate of release of protons has slowed, base injected is decreased or terminated to avoid formation of basic precipitates.

In one embodiment of the ion exchange system, the system has a moving bed of beads that moves in a direction opposite to the flow of brine and base is injected at one or more fixed points in the column in a region near where the ion exchange reaction occurs at a maximum rate in the column to neutralize the protons released from the ion exchange reaction. In one embodiment of the ion exchange system, the base added to the brine (e.g., the liquid resource) is optionally NaOH, KOH, $Mg(OH)_2$, $Ca(OH)_2$, CaO, $NH_3$, $Na_2SO_4$, $K_2SO_4$, $NaHSO_4$, $KHSO_4$, NaOCl, KOCl, $NaClO_4$, $KClO_4$, $NaH_2BO_4$, $Na_2HBO_4$, $Na_3BO_4$, $KH_2BO_4$, $K_2HBO_4$, $K_3BO_4$, $MgHBO_4$, $CaHBO_4$, $NaHCO_3$, $KHCO_3$, $NaCO_3$, $KCO_3$, $MgCO_3$, $CaCO_3$, $Na_2O$, $K_2O$, $Na_2CO_3$, $K_2CO_3$, $Na_3PO_4$, $Na_2HPO_4$, $NaH_2PO_4$, $K_3PO_4$, $K_2HPO_4$, $KH_2PO_4$, $CaHPO_4$, $MgHPO_4$, sodium acetate, potassium acetate, magnesium acetate, poly(vinylpyridine), poly(vinylamine), polyacrylonitrile, other bases, or combinations thereof. In one embodiment, the base is optionally added to the brine in its pure form or as an aqueous solution. In one embodiment, the base is optionally added in a gaseous state such as gaseous $NH_3$. In one embodiment, the base is optionally added to the brine in a steady stream, a variable stream, in steady aliquots, or in variable aliquots. In one embodiment, the base is optionally created in the brine by using an electrochemical cell to remove $H_2$ and $Cl_2$ gas, which is optionally combined in a separate system to create HCl acid to be used for eluting lithium from the system or for other purposes.

In some embodiments, a solid base is mixed with a liquid resource to create a basic solution. In some embodiments, a solid base is mixed with a liquid resource to create a basic solution, and the resulting basic solution is added to a second volume of a liquid resource to increase the pH of the second volume of the liquid resource. In some embodiments, solid base is mixed with a liquid resource to create a basic solution, wherein the resulting basic solution is used to adjust or control the pH of a second solution. In some embodiments, a solid base is mixed with a liquid resource to create a basic slurry. In some embodiments, a solid base is mixed with a liquid resource to create a basic slurry, and the resulting basic slurry is added to a second volume of a liquid resource to increase the pH of the second volume of the liquid resource. In some embodiments, solid base is mixed with a liquid resource to create a basic slurry, wherein the resulting basic slurry is used to adjust or control the pH of a second solution. In some embodiments, base may be added to a liquid resource as a mixture or slurry of base and liquid resource.

In one embodiment of the ion exchange system, the brine flows through a pH control column containing solid sacrificial base particles such as NaOH, CaO, or $Ca(OH)_2$, which dissolve into the brine (e.g., the liquid resource) and raise the pH of the brine. In one embodiment of the ion exchange system, the brine flows through a pH control column containing immobilized regeneratable OH-containing ion exchange resins which react with hydrogen ions, or regeneratable base species such as immobilized polypyridine, which conjugate HCl, thereby neutralizing the acidified brine. When the ion exchange resin has been depleted of its OH groups or is saturated with HCl, it is optionally regenerated with a base such as NaOH.

In one embodiment of the ion exchange system, pH meters are optionally installed in tanks, pipes, column, and other components of the system to monitor pH and control the rates and amounts of base addition at various locations throughout the system.

In one embodiment of the ion exchange system, the columns, tanks, pipes, and other components of the system are optionally constructed using plastic, metal with a plastic lining, or other materials that are resistant to corrosion by brine (e.g., the liquid resource) or acid.

In one embodiment of the ion exchange system, the ion exchange columns are optionally washed with water that is mildly acidic, optionally including a buffer, to remove any basic precipitates from the column prior to acid elution.

After the ion exchange column is saturated or nearly saturated with lithium, the lithium is flushed out of the ion exchange column using acid. The acid is optionally flowed through the column one or more times to elute the lithium. In one embodiment, the acid is optionally flowed through the ion exchange column using a recirculating batch system comprised of the ion exchange column connected to a tank. In one embodiment, the tank used for acid flows is optionally the same tank used for the brine flows. In a further embodiment, the tank used for acid flows is optionally a different tank than the one used for brine flows. In a further embodiment, the acid is distributed at the top of the ion exchange column and allowed to percolate through and immediately recirculated into the column with no extra tank. In an embodiment, acid addition optionally occurs without a tank used for acid flows.

In one embodiment of the ion exchange system, the column is optionally washed with water after the brine and/or acid steps, and the effluent water from washing is optionally treated using pH neutralization and reverse osmosis to yield process water.

In one embodiment of the ion exchange system, the ion exchange column is optionally shaped like a cylinder, a rectangle, or another shape. In one embodiment, the ion exchange column optionally has a cylinder shape with a height that is greater or less than its diameter. In one embodiment, the ion exchange column optionally has a cylinder shape with a height that is less than 10 cm, less than 1 meter, or less than 10 meters. In one embodiment, the ion exchange column optionally has a cylinder shape with a diameter that is less than 10 cm, less than 1 meter, or less than 10 meters.

In one embodiment of the ion exchange system, the system is optionally resupplied with fresh ion exchange beads by swapping out an ion exchange column with a new column loaded with fresh ion exchange beads. In one embodiment of the ion exchange system, the system is optionally resupplied with fresh ion exchange beads by removing the beads from the column and loading new beads into the column. In one embodiment of the ion exchange system, new beads are optionally supplied to all columns in the system simultaneously. In one embodiment of the ion exchange system, new beads are optionally supplied to one or more columns at a time. In one embodiment of the ion exchange system, new beads are optionally supplied to one or more columns without interruption to other columns that optionally continue operating.

In one embodiment of the ion exchange system, brine (e.g., the liquid resource) pumping optionally continues until the ion exchange beads approach a point of lithium saturation over a period of time that is less than about 1 hours, less than about 2 hours, less than about 4 hours, less than about 8 hours, less than about 24 hours, less than about 48 hours, or less than about one week. In one embodiment of the ion exchange system, brine pumping optionally continues until the ion exchange beads approach a point of lithium saturation over a period of time that is greater than about one week. In certain embodiments of the ion exchange system, brine pumping optionally continues until the ion exchange beads approach a point of lithium saturation over a period of time that is between 30 minutes and 24 hours. In one embodiment of the ion exchange system, acid pumping optionally continues until the ion exchange beads approach a point of hydrogen saturation over a period of time that is less than about 1 hours, less than about 2 hours, less than about 4 hours, less than about 8 hours, less than about 24 hours, or less than about 48 hours. In one embodiment of the ion exchange system, brine pumping optionally continues until the ion exchange beads approach a point of hydrogen saturation over a period of time that is greater than about one 48 hours. In certain embodiments of the ion exchange system, brine pumping optionally continues until the ion exchange beads approach a point of hydrogen saturation over a period of time that is between 30 minutes and 24 hours.

Device for Contacting Ion Exchange Beads with an Alternate Phase

In one aspect described herein, an alternate phase is contacted with the ion exchange material within an ion exchange device. In some embodiments, the ion exchange device comprises a vessel (e.g., ion exchange vessel), compartment (e.g., ion exchange compartment), candle, filter bed, and/or one or more other components as detailed in the present disclosure. In some embodiments, contact between the ion exchange beads and the alternate phase is maximized and made possible by the design of this ion exchange device.

In some embodiments, the alternate phase improves lithium extraction performance by reducing the time required to absorb hydrogen to generate hydrogen-enriched beads and release lithium to generate a lithium-enriched solution; reducing the time and water required for washing the hydrogen-enriched beads with water to generate hydrogen-enriched beads substantially free of residual acid; reducing the time required for treating the hydrogen-enriched beads with the liquid resource under conditions suitable to absorb lithium to generate lithium-enriched beads; reducing the time and water required for washing the lithium-enriched beads with water to generate lithium-enriched beads substantially free of liquid resource; improving the life-time and total lithium produce by the ion exchange material; improving the speed of pH adjustment using alkali; improving the solid-liquid mixing efficiency; and reducing the time required to drain liquids from the ion exchange vessel.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate phase is a gas such as air, nitrogen, argon, or a combination thereof. In some embodiments, the alternate phase comprises a compressed or pressurized gas.

In some embodiments, the ion exchange bed is a fixed bed that does move during the ion exchange process. In some embodiments, the ion exchange bed is a fluidized bed that is agitated at one or more periods during the ion exchange process.

In some embodiments, the compartment containing the ion-exchange beads can be optionally treated with an alternate phase consisting of a non-aqueous liquid at one or multiple periods of the lithium extraction process. In some embodiments, the alternate phase reduces the time required for ion exchange beads to absorb hydrogen and release lithium to generate a lithium-enriched solution. In some embodiments, the alternate phase reduces the time required for washing the hydrogen-enriched beads with water to generate hydrogen-enriched beads substantially free of residual acid. In some embodiments, the alternate phase reduces the amount of water required for washing the hydrogen-enriched beads with water to generate hydrogen-enriched beads substantially free of residual acid. In some embodiments, the alternate phase reduces the time required for treating the hydrogen-enriched beads with the liquid resource under conditions suitable to absorb lithium to generate lithium-enriched beads. In some embodiments, the alternate phase reduces the time required for washing the lithium-enriched beads with water to generate lithium-enriched beads substantially free of liquid resource. In some embodiments, the alternate phase reduces the water required for washing the lithium-enriched beads with water to generate lithium-enriched beads substantially free of liquid resource. In some embodiments, the alternate phase eliminates the need for water to remove entrained liquid form the ion-exchange beads. In some embodiments, the alternate phase improves the total lithium produced by the ion exchange material over its lifetime. In some embodiments, the alternate phase reduces the time needed for pH-adjustment within the ion-exchange medium to occurs. In some embodiments, the alternate phase reduces the time needed for dispersing the ion exchange beads in liquid. In some embodiments, the alternate phase reduces the time required to drain liquids from the ion exchange vessel. In some embodiments, the pressure of the alternate phase is used to control the draining rate from the vessel and thereby to control the fluid level such that it is maintained at a level that is higher than that of the ion exchange beads.

In some embodiments, injection of the alternate phase is achieved by means of an optional inlet- and outlet-flows paths to and from said compartment. In some embodiments, such inlet- and outlet flows can be located at the top, bottom, or side of said compartments. In some embodiments, the inlet- and outlet flows to and from said compartment can be injected and removed from the internal space of said compartments by means of piping, tubing, or other internal components that protrude into said compartment. In some embodiments, the vessel contains an additional flow distribution manifold at the top, bottom, or side of the tank. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In embodiments, the vessel is designed to evenly distribute flow of the alternate phase throughout the ion exchange beads. In some embodiments, the vessel has flow distributors for the alternate phase in the form of a hub & lateral distributor, header & lateral distributors, filter plates, spray nozzle, splash plates, distributor trays, concentric perforated pipes, or a combination of thereof. In one embodiment the lateral distributors are outfitted with resin retaining mesh, membrane, screen, or filter nozzle. In one embodiment, the mesh is supported with a secondary support layer for strength. In one embodiment the porous mesh is wrapped around a cylindrical support at the center of the vessel. In one embodiment, the mesh is made out of a polymer, ceramic, or metal. In one embodiment, the flow distributor is located at the top, bottom, middle, at any other location within the vessel, or a combination of thereof. In one embodiment the vessel has a plate with nozzles attached to it. In some embodiments, more than one type of flow distributor is found within the same vessel.

In some embodiments, flow distribution of the alternate phase within the ion-exchange vessel occurs via one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In some embodiments, flow of the alternate phase occurs from the top to the bottom of the ion exchange device. In some embodiments, flow of the alternate phase occurs from the bottom to the top of the ion exchange device. In some embodiments, flow of the alternate phase occurs from the inside to the outside of the ion exchange device. In some embodiments, flow of the alternate phase occurs from the outside to the inside of the ion exchange device.

In one embodiment, the vessel has an internal nozzle designed to distribute flow of the alternate phase evenly. In one embodiment, the vessel has nozzles placed equidistant with each other on a support plate. In one embodiment the nozzles are spaced out so that the outflow from each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm. In some embodiments, the openings or perforation in one or more for the flow distribution components, such as pipes, tubing, channels, slits, beams, baffles, baskets, scallops, nozzles, or a mesh, have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, an alternate phase is contacted with the ion exchange beads for more than about 10 milliseconds, more than about 100 milliseconds, more than about 1 second, more than about 10 seconds, more than about 100 seconds, more than about 1 minute, more than about 10 minutes, more than about 100 minutes, more than about 1 hour, more than about 10 hours, more than about 100 hours. In some embodiments, an alternate phase is contacted with the ion exchange beads for less than about 10 milliseconds, less than about 100 milliseconds, less than about 1 second, less than about 10 seconds, less than about 100 seconds, less than about 1 minute, less than about 10 minutes, less than about 100 minutes, less than about 1 hour, less than about 10 hours, less than about 100 hours. In some embodiments, an alternate phase is contacted with the ion exchange beads from about 10 milliseconds to about 100 milliseconds, from about 100 milliseconds to about 1 second, from about 1 second to about 10 seconds, from about 10 seconds to about 100 seconds, from about 100 seconds to about 1 minute, from about 1 minute to about 10 minutes, from about 10 minutes to about 100 minutes, from about 1 hour to about 10 hours, from about 10 hours to about 100 hours.

In some embodiments, an alternate phase is injected to contact the ion exchange beads at a pressure of more than about 0.1 psi, more than about 1 psi, more than about 5 psi, more than about 10 psi, more than about 50 psi, more than about 100 psi, more than about 500 psi, more than about 1000 psi, more than about 500 psi, more than about 1000 psi. In some embodiments, an alternate phase is injected to contact the ion exchange beads at a pressure of less than about 0.1 psi, less than about 1 psi, less than about 5 psi, less than about 10 psi, less than about 50 psi, less than about 100 psi, less than about 500 psi, less than about 1000 psi, less than about 500 psi, less than about 1000 psi. In some embodiments, an alternate phase is injected to contact the ion exchange beads at a pressure from about 0.1 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi, from about 5000 psi to about 10,000 psi.

Ion Exchange Material

In an aspect, described herein is a system wherein the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads. Accordingly, embodiments and aspects of the present disclosure directed to "ion exchange beads" and embodiments thereof are also operably directed to "ion exchange material" and embodiments thereof unless specified otherwise. In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. Accordingly, embodiments and aspects of the present disclosure directed to "brine" are also operably directed to "liquid resource" unless specified otherwise.

In some embodiments, ion exchange materials are typically small particles, which together constitute a fine powder. In some embodiments, small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $MoO_2$, $Li_2TiO_3$, $Li_2ZrO_3$, $LiNbO_3$, $AlF_3$, SiC, $Si_3N_4$, graphitic carbon, amorphous carbon, diamond-like carbon, or combinations thereof. In some embodiments, the coated ion exchange particles have an average diameter less than about 100 nm, less than about 1,000 nm, or less than about 10,000 nm, and the coating thickness is less than about 1 nm, less than about 10 nm, or less than about 100 nm. In some embodiments, the particles are created by first synthesizing the ion exchange material using a method such as hydrothermal, solid state, or microwave. In some embodiments, the coating material is then deposited on the surface of the ion exchange material using a method such as chemical vapor deposition, hydrothermal, solvothermal, sol-gel, precipitation, or microwave. In some embodiments, the coated ion exchange particles are treated with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. In some embodiments, during acid treatment, the particles absorb hydrogen while releasing lithium. In some embodiments, the ion exchange material is converted to a hydrated state with a hydrogen-rich composition. In some embodiments, the coating material allows diffusion of hydrogen and lithium respectively to and from the ion exchange material while providing a protective barrier that limits dissolution of the ion exchange material. In some embodiments, after treatment in acid, the hydrated coated ion exchange particles are treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the coated ion exchange particles absorb lithium while releasing hydrogen. In some embodiments, the lithium salt solution is then collected. In some embodiments, the coated ion exchange particles are then capable toperform the ion exchange reaction repeatedly over a number of cycles greater than about 10 cycles, greater than about 30 cycles, greater than about 100 cycles, or greater than about 300 cycles.

In some embodiments, one major challenge for lithium extraction using inorganic ion exchange particles is the loading of the particles into an ion exchange column in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles.

In some embodiments, the ion exchange beads are formed by mixing ion exchange particles, a matrix material, and a filler material. In some embodiments, these components are mixed and formed into a bead. In some embodiments, the filler material is then removed from the bead to leave behind pores. In some embodiments, the filler material is dispersed in the bead in such a way to leave behind a pore structure that enables transport of lithium and hydrogen with fast kinetics. This method optionally involves multiple ion exchange materials, multiple polymer (e.g., matrix) materials, and multiple filler materials.

Figure 7:
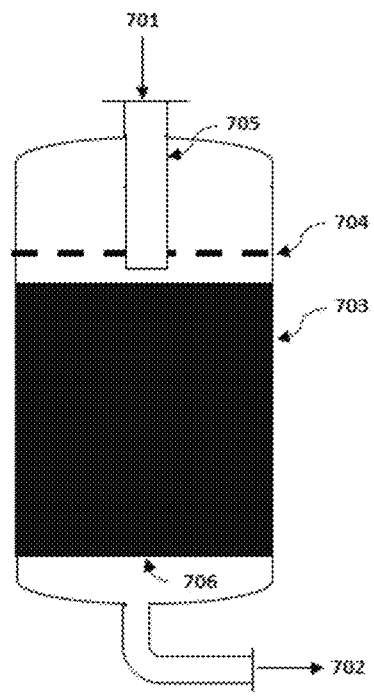
FIG. 7 illustrates a vessel comprising fluid level controllers loaded with ion exchange beads, wherein an alternate phase comprising air is used to enhance lithium extraction by ion exchange.

In some embodiments, another major challenge for lithium extraction using inorganic ion exchange materials is dissolution and degradation of the materials, especially during lithium elution in acid but also during lithium uptake in liquid resources. In some embodiments, to yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. Therefore, the porous ion exchange beads optionally contain coated ion exchange particle for lithium extraction that are comprised of an ion exchange material and a coating material protecting the particle surface. In some embodiments, the coating protects the ion exchange material from dissolution and degradation during lithium elution in acid, during lithium uptake from a liquid resource, and during other aspects of an ion exchange process. In some embodiments, this coated particle enables the use of concentrated acids in the ion exchange process to yield concentrated lithium solutions. One example of a coated ion exchange particle is shown in FIG. 7.

In some embodiments, the ion exchange material is selected for high lithium absorption capacity, high selectivity for lithium uptake from a liquid resource relative to uptake of other ions such as sodium and magnesium, strong lithium uptake in liquid resources including those with low concentrations of lithium, facile elution of lithium with a small excess of acid, and fast ionic diffusion. A coating material is optionally selected to protect the particle from dissolution and chemical degradation during lithium recovery in acid and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

In some embodiments, when the porous ion exchange beads are used in an ion exchange column, the liquid resource containing lithium is pumped through the ion exchange column so that the ion exchange particles absorb lithium from the liquid resource while releasing hydrogen. In some embodiments, after the beads have absorbed lithium, an acid solution is pumped through the column so that the particles release lithium into the acid solution while absorbing hydrogen. The column is optionally operated in co-flow mode with the liquid resource and acid solution alternately flowing through the column in the same direction, or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. The beads optionally form a fixed or moving bed, and the moving bed optionally moves in counter-current to the brine and acid flows. The beads are optionally moved between multiple columns with moving beds where different columns are used for brine, acid, water, or other flows. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium, to remove other chemical species, or to otherwise treat the brine.

In some embodiments, when the ion exchange particles are treated with acid, a lithium solution is produced. This lithium solution is optionally further processed to produce lithium chemicals. These lithium chemicals are optionally supplied for an industrial application. In some embodiments, an ion exchange material is selected from the following list: an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In some embodiments, the coating material facilitates diffusion of lithium and hydrogen between the particles and the liquid resources, enables adherence of the particles to a structural support, and suppresses structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the coated ion exchange particles have an average diameter less than about 10 nm, less than about 100 nm, less than about 1,000 nm, less than about 10,000 nm, or less than about 100,000 nm. In a further aspect, the coated ion exchange particles have an average size less than about 100 nm, less than about 1,000 nm, or less than about 10,000 nm. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating.

In some embodiments described herein, the coating material has a thickness less than about 1 nm, less than about 10 nm, less than about 100 nm, less than about 1,000 nm, or less than about 10,000 nm. In further embodiments, the coating material has a thickness less than about 5 nm, less than about 50 nm, or less than about 500 nm. In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm. In certain embodiments, the coating material has a thickness between about 0.5 nm to about 1000 nm. In some embodiments, the coating material has a thickness between about 1 nm to about 100 nm.

In some embodiments, coating thickness may be measured by any one or more of electron microscopy, optical microscopy, couloscopy, nanoindentation, atomic force microscopy, and X-ray fluorescence. In some embodiments, coating thickness may be inferred or extrapolated from data obtained according to an analytical method that indicates the bulk composition of the coated ion exchange particle, or the ion exchange material that further comprises the coating material. In some embodiments, coating thickness may be inferred by differential analysis of data obtained by analysis of ion exchange material that further comprises a coating material and data obtained by analysis of ion exchange material that does not further comprise a coating material. In some embodiments, coating thickness may be inferred by differential analysis of data obtained by analysis of one or more coated ion exchange particles and data obtained by analysis of one or more uncoated ion exchange particles.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm.

In a further aspect described herein, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method such as chemical precipitation, hydrothermal, solid state, or combinations thereof.

In a further aspect described herein, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix material is selected from the following list: a polymer, an oxide, a phosphate, or combinations thereof. In some embodiments, a structural support (e.g., a structural support to which ion exchange material can be adhered, a support structure within which an ion exchange material can be embedded) is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid, a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 μm, less than 100 μm, less than 1 mm, less than 1 cm, or less than 10 cm. In some embodiments, the porous ion exchange bead is approximately spherical with an average diameter selected from the following list: less than 200 μm, less than 2 mm, or less than 20 mm. In certain embodiments, the porous ion exchange bead is approximately spherical with an average diameter between 10 μm and 2 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In certain embodiments, the porous ion exchange bead is tablet-shaped with a diameter between 500 μm and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource enters the ion exchange reactor without any pre-treatment following removal from its source.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

An aspect of the invention described herein is a system wherein the ion exchange material comprises a lithium aluminate intercalate. In some embodiments, said lithium aluminate intercalate is mixed with a polymer material. In some embodiments, said polymer comprises a chloro-polymer, a fluoro-polymer, a chloro-fluoro-polymer, a hydrophilic polymer, a hydrophobic polymer, co-polymers thereof, mixtures thereof, or combinations thereof. In a further embodiment, a polymer material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further embodiment, a polymer material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly (ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further embodiment, a polymer material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further embodiment, said polymer is mixed onto the lithium aluminate intercalate particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further embodiment, said polymer is mixed onto the lithium aluminate intercalate particle using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the lithium aluminate intercalate particles have an average diameter less than about 10 nm, less than about 100 nm, less than about 1,000 nm, less than about 10,000 nm, or less than about 100,000 nm. In a further aspect, the lithium aluminate intercalate particles have an average size less than about 100 nm, less than about 1,000 nm, or less than about 10,000 nm. In a further aspect, the lithium aluminate intercalate particles are optionally secondary particles comprised of smaller primary particles that have an average diameter less than about 10 nm, less than about 100 nm, less than about 1,000 nm, less than about 10,000 nm, or less than about 100,000 nm.

Device for Extracting Lithium from a Liquid Resource

In one aspect described herein, is a device for lithium extraction from a liquid resource comprising one or more vessels independently configured to simultaneously accommodate porous ion exchange beads moving in one direction and alternately acid, brine, and optionally other solutions moving in the net opposite direction.

In one aspect described herein, there is a device for lithium extraction from a liquid resource comprising a stirred tank reactor, an ion exchange material, and a pH modulating setup for increasing the pH of the liquid resource in the stirred tank reactor.

In one aspect described herein, is a device for lithium extraction from a liquid resource comprising a stirred rank reactor, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the stirred tank reactor.

In one embodiment, at least one of the one or more vessels are fitted with a conveyer system suitably outfitted to move porous ion exchange beads upward and simultaneously allow a net flow of acid, brine, and optionally other solutions, downward. In one embodiment, the conveyor system comprises fins with holes. In one embodiment, wherein the fins slide upward over a sliding surface that is fixed in place. In one embodiment, the fins slide upward over a sliding surface that is fixed in place. In one embodiment, all of the one or more vessels are fitted with a conveyor system suitably outfitted to move porous ion exchange beads upward and simultaneously allow a net flow of acid, brine, and optionally other solutions, downward. In one embodiment, there are an even number of vessels. In one embodiment, there are an odd number of vessels. In one embodiment, the vessels are columns.

In some embodiments, structures with holes are used to move the ion exchange material through one or more vessels. In some embodiments, the holes in the structures may be less than 10 microns, less than 100 microns, less than 1,000 microns, or less than 10,000 microns. In some embodiments, the structures may be attached to a conveyer system. In some embodiments, the structures may comprise a porous compartment, porous partition, or other porous structure. In some embodiments, the structures may contain a bed of fixed or fluidized ion exchange material. In some embodiments, the structures may contain ion exchange material while allowing brine, aqueous solution, or acid solution to pass through the structures.

In one embodiment, the porous ion exchange beads comprise ion exchange particles that reversibly exchange lithium and hydrogen and a structural matrix material and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

Methods of Modulating pH for the Extraction of Lithium

An aspect of the invention described herein is a method of extracting lithium ions from a liquid resource, comprising: flowing the liquid resource through the column of the system described above to produce a lithiated ion exchange material; and treating the resulting lithiated ion exchange material with an acid solution to produce a salt solution comprising lithium ions.

An aspect of the invention described herein is a method of extracting lithium ions from a liquid resource, comprising: flowing the liquid resource through the plurality of columns of the system described above to produce a lithiated ion exchange material; and treating the resulting lithiated ion exchange material with an acid solution to produce a salt solution comprising lithium ions.

An aspect of the invention described herein is a method of extracting lithium ions from a liquid resource, comprising: flowing the liquid resource through the tank of the system described above to produce a lithiated ion exchange material; and treating the resulting lithiated ion exchange material with an acid solution to produce a salt solution comprising lithium ions.

An aspect of the invention described herein is a method of extracting lithium ions from a liquid resource, comprising: flowing the liquid resource through the column of the system described above to produce a lithiated ion exchange material; and treating the resulting lithiated ion exchange material with an acid solution to produce a salt solution comprising lithium ions.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally entered the ion exchange reactor without any pre-treatment following from its source.

In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the ion exchange reactor is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In an embodiment, the acid solution comprises hydrochloric acid, sulfuric acid, phosphoric acid, hydrobromic acid, chloric acid, perchloric acid, nitric acid, formic acid, acetic acid, or combinations thereof.

In some embodiments, the acid used for recovering lithium from the ion exchange system has a concentration selected from the following list: less than 0.1 M, less than 1.0 M, less than 5 M, less than 10 M, or combinations thereof. In some embodiments, the acid used for recovering lithium from the porous ion exchange beads has a concentration greater than 10 M.

In an embodiment, acids with distinct concentrations are used during the elution process. In an embodiment, acid with a lower concentration is first added to elute lithium from the ion exchange material and then additional acid of a greater concentration is added to elute more lithium into the solution and increase the concentration of lithium in the eluate.

In some embodiments, the ion exchange beads perform the ion exchange reaction repeatedly while maintaining adequate lithium uptake capacity over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles. In some embodiments, adequate lithium uptake capacity is optionally defined as a percentage of initial uptake capacity selected from the following list: greater than 95%, greater than 90%, greater than 80%, greater than 60%, or greater than 20%. In some embodiments, adequate lithium uptake capacity is optionally defined as a percentage of initial uptake capacity such as less than 20%.

In some embodiments, the concentrated lithium solution that is yielded from the ion exchange reactor is further processed into lithium raw materials using methods selected from the following list: solvent extraction, ion exchange, chemical precipitation, electrodialysis, electrowinning, electrolysis, evaporation with direct solar energy, evaporation with concentrated solar energy, evaporation with a heat transfer medium heated by concentrated solar energy, evaporation with heat from a geothermal brine, evaporation with heat from combustion, pH neutralization, or combinations thereof. In some embodiments, the concentrated lithium solution that is yielded from the ion exchange reactor is concentrated using reverse osmosis or membrane technologies.

In some embodiments, the concentrated lithium solution that is yielded from the ion exchange reactor is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the ion exchange reactor are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

In some embodiments, the ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Another aspect described herein is a method of extracting lithium ions from a liquid resource, comprising: a) flowing the liquid resource into a system comprising a tank to produce a lithiated ion exchange material, wherein the tank further comprises (i) one or more compartments, (ii) an ion exchange material, (iii) a mixing device, and (iv) a pH modulating setup for changing the pH of the liquid resource in the system; and b) treating the lithiated ion exchange material from a) with an acid solution to produce a hydrogen-rich ion exchange material and a salt solution comprising lithium ions.

In some embodiments, the method further comprises, prior to b), washing the lithiated ion exchange material with an aqueous solution. In some embodiments, the method further comprises, subsequent to b), washing the hydrogen-rich ion exchange material with an aqueous solution. In some embodiments, the aqueous solution is water.

In some embodiments, the method further comprises, prior to b), flowing the lithiated ion exchange material into a washing system. In some embodiments, the method further comprises, prior to b), transferring a suspension comprising the lithiated ion exchange material. In some embodiments, the method further comprises, prior to b), flowing the lithiated ion exchange material into a washing system and washing the lithiated ion exchange material with a solution. In some embodiments, the method further comprises, prior to b), flowing the lithiated ion exchange material into a washing system and washing the lithiated ion exchange material with a solution comprising water. In some embodiments, the method further comprises, prior to b), flowing the lithiated ion exchange material into a washing system and washing the lithiated ion exchange material with an aqueous solution. In some embodiments, the lithiated ion exchange material is washed with an aqueous solution.

In some embodiments, the method further comprises, prior to b), flowing the lithiated ion exchange material into a stripping system. In some embodiments, the method further comprises, prior to b), flowing the lithiated ion exchange material into a stripping system and stripping the lithiated ion exchange material. In some embodiments, the method further comprises, prior to b), flowing the lithiated ion exchange material into a stripping system and stripping volatile components from the lithiated ion exchange material. In some embodiments, the method further comprises, prior to b), flowing the lithiated ion exchange material into a stripping system and stripping volatile components comprising water from the lithiated ion exchange material.

In some embodiments, the pH modulating setup comprises a pH measuring device and an inlet for adding base to the tank. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the measured change in pH triggers adding a base to maintain lithium uptake. In some embodiments, a change in pH to below a pH value of about 2 to about 9 triggers the addition of a base to maintain lithium uptake. In some embodiments, a change in pH to below a pH value of about 2, of about 3, of about 4, of about 5, of about 6, of about 7, of about 8, or of about 9 triggers the addition of a base to maintain lithium uptake. In some embodiments, a change in pH to below a pH of about 2 to about 4, of about 3 to about 5, of about 4 to about 6, of about 5 to about 7, of about 6 to about 8, or of about 7 to about 9 triggers the addition of a base to maintain lithium uptake. In some embodiments, base is added to the liquid resource to maintain the pH of the liquid resource in a range of about 2-3, 3-4, 4-5, 5-6, 6-7, 7-8, or 8-9. In some embodiments, base is added to the liquid resource to maintain the pH of the liquid resource in a range of about 4-5, 5-6, 6-7, or 7-8. In some embodiments, base is added to the liquid resource to maintain the pH of the liquid resource in a range of about 4.0-4.5, 4.5-5.0, 5.0-5.5, 5.5-6.0, 6.0-6.5, 6.5-7.0, 7.0-7.5, or 7.5-8.0. In some embodiments, the pH of a liquid resource is maintained in a target range that is high enough to facilitate lithium uptake and low enough to avoid precipitation of metal salts from the liquid resource. In some embodiments, the pH of a liquid resource is maintained below a pH of about 8 to avoid precipitation of Mg salts. In some embodiments, the pH of a liquid resource is maintained below a pH of about 2, below a pH of about 3, below a pH of about 4, below a pH of about 5, below a pH of about 6, below a pH of about 7, below a pH of about 8, or below a pH of about 9 to avoid precipitation of metal salts. In some embodiments, the pH of the liquid resource may drop out of a target pH range due to release of protons from an ion exchange material and a pH modulating setup may adjust the pH of the liquid resource back to within a target pH range. In some embodiments, the pH of the liquid resource may be adjusted above a target pH range prior to the liquid resource entering the system and then protons released from the ion exchange material may decrease the pH of the system into the target range. In some embodiments, the pH of the liquid resource may be controlled in a certain range and the range may be changed over time. In some embodiments, the pH of the liquid resource may be controlled in a certain range and then the pH of the liquid resource may be allowed to drop. In some embodiments, the pH of the liquid resource may be controlled in a certain range and then the pH of the liquid resource may be allowed to drop to solubilize colloids or solids. In some embodiments, base may be added to a liquid resource to neutralize protons without measuring pH. In some embodiments, base may be added to a liquid resource to neutralize protons with monitoring of volumes or quantities of the base. In some embodiments, the pH of the liquid resource may be measured to monitor lithium uptake by an ion exchange material. In some embodiments, the pH of the liquid resource may be monitored to determine when to separate a liquid resource from an ion exchange material. In some embodiments, the rate of change of the pH of the liquid resource may be measured to monitor the rate of lithium uptake. In some embodiments, the rate of change of the pH of the liquid resource may be measured to determine when to separate a liquid resource from an ion exchange material.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In some embodiments, the method further comprises, after a), draining the liquid resource through the porous partition after the production of the lithiated ion exchange material.

In some embodiments, the method further comprises, after b), draining the salt solution comprising lithium ions through the porous partition after the production of the hydrogen-rich ion exchange material.

In some embodiments, the method further comprises, subsequent to a), flowing the lithiated ion exchange material into another system comprising a tank to produce the hydrogen-rich ion exchange material and the salt solution comprising lithium ions, wherein the tank of the other system further comprises (i) one or more compartments, and (ii) a mixing device.

In some embodiments, the system comprises a plurality of tanks and each of the plurality of tanks further comprises (i) one or more compartments, (ii) an ion exchange material, (iii) a mixing device, and (iv) a pH modulating setup for changing the pH of the system.

An aspect described herein is a method of extracting lithium ions from a liquid resource, comprising: a) flowing the liquid resource into a first system comprising a tank, wherein the tank of the first system further comprises (i) one or more compartments, (ii) an ion exchange material, (iii) a mixing device, and (iv) a pH modulating setup for changing the pH of the liquid resource in the first system, to produce a lithiated ion exchange material; b) flowing the lithiated ion exchange material of a) into a second system comprising a tank, wherein the tank of the second system further comprises (i) one or more compartments, and (ii) a mixing device; and c) treating the lithiated ion exchange from b) with an acid solution to produce a hydrogen-rich ion exchange material and a salt solution comprising lithium ions.

In some embodiments, the method further comprises, subsequent to a), washing the lithiated ion exchange material with an aqueous solution.

In some embodiments, the method further comprises, prior to b), adding an aqueous solution to the lithiated ion exchange material to form a fluidized lithiated ion exchange material.

In some embodiments, the method further comprises, subsequent to c), washing the hydrogen-rich ion exchange material with an aqueous solution. In some embodiments, the aqueous solution is water.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a plurality of tanks to produce a lithiated ion exchange material, wherein each of the plurality of tanks in the first system is in fluid communication with every other one of the plurality of tanks in the first system and, each of the plurality of tanks in the first system further comprises (i) one or more compartments, (ii) an ion exchange material, (iii) a mixing device, and (iv) a pH modulating setup for changing the pH of each of the plurality of tanks in the first system; b) flowing the lithiated ion exchange material into a second system comprising a plurality of tanks, wherein each of the plurality of tanks in the second system is in fluid communication with every other one of the plurality of tanks in the second system and, each of the plurality of tanks in the second system further comprises (i) one or more compartments, and (ii) a mixing device; and c) treating the lithiated ion exchange material from b) with an acid solution in at least one of the plurality of tanks in the second system to produce a hydrogen-rich ion exchange material and a salt solution comprising lithium ions.

In some embodiments, the method further comprises, subsequent to c), washing the hydrogen-rich ion exchange material with an aqueous solution in at least one of the plurality of tanks in the second system.

In some embodiments, the method is operated in a batch mode. In some embodiments, the method is operated in a continuous mode. In some embodiments, the method is operated in continuous and batch mode. In some embodiments, the method is operated in continuous mode, a batch mode, a semi-continuous mode, or combinations thereof.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a tank to produce a lithiated ion exchange material, wherein the tank further comprises (i) one or more compartments, (ii) ion exchange material, and (iii) a mixing device; b) flowing the lithiated ion exchange material from a) into a second system comprising a tank, wherein the tank further comprises (i) one or more compartments, (ii) an acid solution, and (iii) a mixing device; and c) stripping the lithiated ion exchange material to produce hydrogen-rich ion exchange material and a salt solution comprising lithium ions.

In some embodiments, prior to b), the lithiated ion exchange material is washed. In some embodiments, the lithiated ion exchange material is washed with an aqueous solution.

An aspect described herein is a method of extracting lithium ions from a liquid resource, comprising: a) providing a system comprising an ion exchange material, a tank comprising one or more compartments; and a mixing device, wherein (i) the ion exchange material is oxide-based and exchanges hydrogen ions with lithium ions, and (ii) the mixing device is capable of moving the liquid resource around the tank comprising one or more compartments; b) flowing the liquid resource into the system of a), thereby contacting the liquid resource with the ion exchange material, wherein the ion exchange material exchanges hydrogen ions with lithium ions in the liquid resource to produce lithiated ion exchange material; c) removing the liquid resource from the system of b); d) flowing an acid solution into the system of c) thereby contacting the acid solution with the lithiated ion exchange material, wherein the lithiated ion exchange material exchanges lithium ions with the hydrogen ions in the acid solution to produce the ion exchange material and a salt solution comprising lithium ions from the lithiated ion exchange material; and e) collecting the salt solution comprising the lithium ions for further processing.

In some embodiments, the salt solution comprising lithium ions undergoes crystallization.

A method of extracting lithium ions from a liquid resource, comprising: a) flowing the liquid resource through a system comprising an ion exchange material and a plurality of columns, wherein the plurality of columns is configured to transport the ion exchange material along the length of the column, to produce a lithiated ion exchange material; and b) treating the lithiated ion exchange material from a) with an acid solution to produce a salt solution comprising lithium ions.

An aspect described herein is a method of extracting lithium ions from a liquid resource, comprising: a) providing a system comprising an ion exchange material and a plurality of columns, wherein each of the plurality of columns is configured to transport the ion exchange material along the length of the column; b) flowing the liquid resource through a first one of the plurality of columns to produce a lithiated ion exchange material; c) flowing the lithiated ion exchange material from b) into a second one of the plurality of columns; and d) treating the lithiated ion exchange material from c) with an acid solution to produce a hydrogen-rich ion exchange material and a salt solution comprising lithium ions.

In some embodiments, the method further comprises, subsequent to b), flowing the lithiated ion exchange material into another one of the plurality of columns and washing the lithiated ion exchange material with an aqueous solution. In some embodiments, the method further comprises, subsequent to d), flowing the hydrogen-rich ion exchange material into another one of the plurality of columns and washing the hydrogen-rich ion exchange material with an aqueous solution.

An aspect described herein is a method of extracting lithium ion from a liquid resource, comprising: a) providing a system comprising an ion exchange material and a plurality of columns, wherein each of the plurality of columns is configured to transport the ion exchange material along the length of the column; b) flowing the liquid resource through a first one of the plurality of columns to produce a lithiated ion exchange material; c) flowing the lithiated ion exchange material from b) into a second one of the plurality of columns; d) washing the lithiated ion exchange material from c) with an aqueous solution; e) flowing the lithiated ion exchange material from d) into a third one of the plurality of columns; and f) treating the lithiated ion exchange material from e) with an acid solution to produce a hydrogen-rich ion exchange material and a salt solution comprising lithium ions.

In some embodiments, the method further comprises: g) flowing the hydrogen-rich ion exchange material into a fourth one of the plurality of columns; and h) washing the hydrogen-rich ion exchange material with an aqueous solution. In some embodiments, each of the plurality of columns is configured to transport the ion exchange material by a pipe system or an internal conveyer system. In some embodiments, each of the plurality of columns is configured to transport the ion exchange material by a pipe system. In some embodiments, each of the plurality of columns is configured to transport the ion exchange material by an internal conveyer system.

In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the methods described herein, the liquid resource is a brine. In some embodiments of the methods described herein, the liquid resource comprises a natural brine, a synthetic brine, or a mixture of a natural and a synthetic brine. In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

In some embodiments of the methods described herein, the acid solution comprises hydrochloric acid, sulfuric acid, phosphoric acid, hydrobromic acid, chloric acid, perchloric acid, nitric acid, formic acid, acetic acid, or combinations thereof. In some embodiments of the methods described herein, the acid solution comprises hydrochloric acid, sulfuric acid, phosphoric acid, nitric acid, or combinations thereof. In some embodiments of the methods described herein, the acid solution comprises hydrochloric acid, sulfuric acid, phosphoric acid, or combinations thereof. In some embodiments of the methods described herein the acid solution comprises hydrochloric acid. In some embodiments of the methods described herein the acid solution comprises sulfuric acid. In some embodiments of the methods described herein the acid solution comprises phosphoric acid.

Process of Extracting Lithium from a Liquid Resource Aided by an Alternate Phase In one aspect described herein, is a process for lithium extraction from a liquid resource comprising treating porous ion exchange beads alternately with acid, brine, optionally other solutions, and optionally an alternate phase, in a configuration where the beads move in the net opposite direction to the acid, brine, optionally other solutions, and optionally an alternate phase, thereby producing a lithium-enriched solution from the liquid resource. In one embodiment, the process comprises: (a) treating the porous ion exchange beads with acid under conditions suitable to absorb hydrogen to generate hydrogen-enriched beads and release lithium to generate a lithium-enriched solution; (b) optionally, washing the hydrogen-enriched beads with water to generate hydrogen-enriched beads substantially free of residual acid; (c) treating the hydrogen-enriched beads with the liquid resource under conditions suitable to absorb lithium to generate lithium-enriched beads; (d) optionally, washing the lithium-enriched beads with water to generate lithium-enriched beads substantially free of liquid resource; and (e) repeating the cycle to produce a lithium-enriched solution from the liquid resource. In one aspect of this invention, an alternate phase is contacted with the ion exchange beads during on ore more of the steps of the process step (a)-(e) to aid in the ion exchange process.

In some embodiments, contact between the ion exchange beads and the alternate phase is maximized and made possible by the design of the ion exchange device. In some embodiments, the ion exchange bed is a fixed bed that does move during the ion exchange process. In some embodiments, the ion exchange bed is a fluidized bed that is agitated at one or more periods during the ion exchange process.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate is a gas such as air, nitrogen, argon, or a combination thereof. In some embodiments, the alternate phase comprises a compressed or pressurized gas.

In some embodiments, the ion-exchange beads can be optionally treated with an alternate phase consisting of a non-aqueous liquid at one or multiple periods of the lithium extraction process. In some embodiments, the alternate phase reduces the time required for ion exchange beads to absorb hydrogen and release lithium to generate a lithium-enriched solution. In some embodiments, the alternate phase reduces the time required for washing the hydrogen-enriched beads with water to generate hydrogen-enriched beads substantially free of residual acid. In some embodiments, the alternate phase reduces the amount of water required for washing the hydrogen-enriched beads with water to generate hydrogen-enriched beads substantially free of residual acid. In some embodiments, the alternate phase reduces the time required for treating the hydrogen-enriched beads with the liquid resource under conditions suitable to absorb lithium to generate lithium-enriched beads. In some embodiments, the alternate phase reduces the time required for washing the lithium-enriched beads with water to generate lithium-enriched beads substantially free of liquid resource. In some embodiments, the alternate phase reduces the water required for washing the lithium-enriched beads with water to generate lithium-enriched beads substantially free of liquid resource. In some embodiments, the alternate phase eliminates the need for water to remove entrained liquid form the ion-exchange beads. In some embodiments, the alternate phase improves the total lithium produced by the ion exchange material over its lifetime. In some embodiments, the alternate phase reduces the time needed for pH-adjustment within the ion-exchange medium to occurs. In some embodiments, the alternate phase reduces the time needed for dispersing the ion exchange beads in liquid. In some embodiments, the alternate phase reduces the time required to drain liquids from the ion exchange vessel. In some embodiments, the pressure of the alternate phase is used to control the draining rate from the vessel and thereby to control the fluid level such that it is maintained at a level that is higher than that of the ion exchange beads.

In some embodiments, the alternate phase is introduced into the compartment containing the ion exchange beads. In some embodiments, this results in the advantages described above. In some embodiments, the alternate phase is introduced into the compartment containing the ion exchange beads and remains within said compartment during the ion exchange process. In some embodiments, the alternate phase is introduced into the compartment containing the ion exchange beads continuously at one or more stages during the ion exchange process. In some embodiments, such as that described in Example 2, said alternate phase remains in the ion exchange compartment during the absorption of lithium from the liquid resource, and provides an enhanced contact of the ion exchange beads with the liquid resource. In some embodiments, the alternate phase is removed from the compartment containing the ion exchange beads through a flow path that results in the alternate phase flowing through a bed of ion exchange beads. In some embodiments, the alternate phase is removed from the compartment containing the ion exchange beads through a flow path that avoids flow of the alternate phase through a bed of ion exchange beads. In some embodiments, the alternate phase is introduced into the compartment containing the ion exchange beads at multiple stages of the ion exchange process. In some embodiments, the alternate phase is removed from the compartment containing the ion exchange beads at multiple stages of the ion exchange process. In some embodiments, the mode in which the alternate phase is introduced and removed from the compartment containing the ion exchange beads remains the same at the one or more stages of the ion exchange process. In some embodiments, the mode in which the alternate phase is introduced and removed from the compartment containing the ion exchange beads varies at the one or more stages of the ion exchange process.

In some embodiments, the flow path of the alternate phase crosses a fixed bed of ion exchange material, such that entrained liquid is removed from the bed of ion exchange material by conveyance of said liquid by the alternate phase. In some embodiments, said crossing of an ion exchange material by an alternate phase is understood to comprise a treatment by said alternate phase, the treatment conveying said liquid out of the compartment containing the ion exchange material. In some embodiments, said liquid is a liquid resource, aqueous solution, wash solution, or an acidic eluent solution. In some embodiments, the flow path of the alternate phase crosses a fluidized bed of suspended ion exchange material in a liquid, such that the alternate phase creates turbulence, agitation, and efficient mixing of said ion exchange material in said liquid.

In some embodiments, the flow path of the alternate phase crosses a fixed bed of ion exchange material during absorption of lithium by said ion exchange material. In some embodiments, the flow path of the alternate phase crosses a fixed bed of ion exchange material during elution of lithium by said ion exchange material by an eluent solution. In some embodiments, the flow path of the alternate phase crosses a fluidized bed of ion exchange material suspended in a liquid resource, during absorption of lithium by said ion exchange material. In some embodiments, the flow path of the alternate phase crosses a fluidized bed of ion exchange material suspended in an acidic eluent solution, during elution of lithium by said ion exchange material.

In some embodiments, the vessel is configured such that an alternate phase crosses a fixed bed ion exchange material to remove entrained liquid remaining in said bed, and the same or a different alternate phase crosses a fluidized bed of the same ion exchange material in a different step of the ion exchange process. In some embodiments, a fixed bed of ion exchange is crossed by an alternate phase to remove the entrained liquid resource, and said bed is subsequently fluidized into an acidic eluent solution with the aid of an alternate phase that crosses said fluidized bed. In some embodiments, a fixed bed of ion exchange is crossed by an alternate phase to remove the entrained liquid resource, and said bed is subsequently fluidized into a washing solution with the aid of an alternate phase that crosses said fluidized bed. In some embodiments, a fixed bed of ion exchange is crossed by an alternate phase to remove the entrained liquid resource, and said bed is subsequently fluidized into a liquid resource in a subsequent lithium extraction cycle with the aid of an alternate phase that crosses said fluidized bed. In some embodiments, the alternate phase can cross a fixed or fluidized bed of ion exchange material at any of the steps of a) contacting an ion exchange material with a liquid resource, wherein the liquid resource comprises lithium ions, and wherein lithium ions in the liquid resource are absorbed by the ion exchange material to yield a lithiated ion exchange material; to b) contacting said lithiated ion exchange material with an acidic solution such that lithium is eluted from said the lithiated ion exchange material into said acidic solution.

In some embodiments, the alternate phase is contacted with the enriched eluate to increase the amount of enriched eluate collected and therefore increase the yield of the lithium collected. In some embodiments, the amount of enriched eluate that is collected is increased by about 1 to 25% by volume. In some embodiments, the amount of enriched eluate that is collected is increased by about 1% to about 12%. In some embodiments, the amount of enriched eluate that is collected is increased by about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 1% to about 11%, about 1% to about 12%, about 2% to about 3%, about 2% to about 4%, about 2% to about 5%, about 2% to about 6%, about 2% to about 7%, about 2% to about 8%, about 2% to about 9%, about 2% to about 10%, about 2% to about 11%, about 2% to about 12%, about 3% to about 4%, about 3% to about 5%, about 3% to about 6%, about 3% to about 7%, about 3% to about 8%, about 3% to about 9%, about 3% to about 10%, about 3% to about 11%, about 3% to about 12%, about 4% to about 5%, about 4% to about 6%, about 4% to about 7%, about 4% to about 8%, about 4% to about 9%, about 4% to about 10%, about 4% to about 11%, about 4% to about 12%, about 5% to about 6%, about 5% to about 7%, about 5% to about 8%, about 5% to about 9%, about 5% to about 10%, about 5% to about 11%, about 5% to about 12%, about 6% to about 7%, about 6% to about 8%, about 6% to about 9%, about 6% to about 10%, about 6% to about 11%, about 6% to about 12%, about 7% to about 8%, about 7% to about 9%, about 7% to about 10%, about 7% to about 11%, about 7% to about 12%, about 8% to about 9%, about 8% to about 10%, about 8% to about 11%, about 8% to about 12%, about 9% to about 10%, about 9% to about 11%, about 9% to about 12%, about 10% to about 11%, about 10% to about 12%, or about 11% to about 12%. In some embodiments, the amount of enriched eluate that is collected is increased by about 1%, about 2%, about 3%, about 4%, about 5%, about 6%, about 7%, about 8%, about 9%, about 10%, about 11%, or about 12%. In some embodiments, the amount of enriched eluate that is collected is increased by at least about 1%, about 2%, about 3%, about 4%, about 5%, about 6%, about 7%, about 8%, about 9%, about 10%, or about 11%. In some embodiments, the amount of enriched eluate that is collected is increased by at most about 2%, about 3%, about 4%, about 5%, about 6%, about 7%, about 8%, about 9%, about 10%, about 11%, or about 12%. In some embodiments, the amount of enriched eluate that is collected is increased by about 1% to about 25%. In some embodiments, the amount of enriched eluate that is collected is increased by about 1% to about 5%, about 1% to about 10%, about 1% to about 13%, about 1% to about 15%, about 1% to about 18%, about 1% to about 20%, about 1% to about 25%, about 5% to about 10%, about 5% to about 13%, about 5% to about 15%, about 5% to about 18%, about 5% to about 20%, about 5% to about 25%, about 10% to about 13%, about 10% to about 15%, about 10% to about 18%, about 10% to about 20%, about 10% to about 25%, about 13% to about 15%, about 13% to about 18%, about 13% to about 20%, about 13% to about 25%, about 15% to about 18%, about 15% to about 20%, about 15% to about 25%, about 18% to about 20%, about 18% to about 25%, or about 20% to about 25%. In some embodiments, the amount of enriched eluate that is collected is increased by about 1%, about 5%, about 10%, about 13%, about 15%, about 18%, about 20%, or about 25%. In some embodiments, the amount of enriched eluate that is collected is increased by at least about 1%, about 5%, about 10%, about 13%, about 15%, about 18%, or about 20%. In some embodiments, the amount of enriched eluate that is collected is increased by at most about 5%, about 10%, about 13%, about 15%, about 18%, about 20%, or about 25%.

Injection of the alternate phase is achieved by means of an optional inlet- and outlet-flows paths to and from the ion-exchange compartment. In some embodiments, such inlet- and outlet flows can be located at the top, bottom, or side of said compartments. In some embodiments, the inlet- and outlet flows to and from said compartment can be injected and removed from the internal space of said compartments by means of piping, tubing, or other internal components that protrude into said compartment. In some embodiments, the vessel contains an additional flow distribution manifold at the top, bottom, or side of the tank. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, an alternate phase is contacted with the ion exchange beads for more than about 10 milliseconds, more than about 100 milliseconds, more than about 1 second, more than about 10 seconds, more than about 100 seconds, more than about 1 minute, more than about 10 minutes, more than about 100 minutes, more than about 1 hour, more than about 10 hours, more than about 100 hours. In some embodiments, an alternate phase is contacted with the ion exchange beads for less than about 10 milliseconds, less than about 100 milliseconds, less than about 1 second, less than about 10 seconds, less than about 100 seconds, less than about 1 minute, less than about 10 minutes, less than about 100 minutes, less than about 1 hour, less than about 10 hours, less than about 100 hours. In some embodiments, an alternate phase is contacted with the ion exchange beads from about 10 milliseconds to about 100 milliseconds, from about 100 milliseconds to about 1 second, from about 1 second to about 10 seconds, from about 10 seconds to about 100 seconds, from about 100 seconds to about 1 minute, from about 1 minute to about 10 minutes, from about 10 minutes to about 100 minutes, from about 1 hour to about 10 hours, from about 10 hours to about 100 hours.

In some embodiments, an alternate phase is injected to contact the ion exchange beads at a pressure of more than about 0.1 psi, more than about 1 psi, more than about 5 psi, more than about 10 psi, more than about 50 psi, more than about 100 psi, more than about 500 psi, more than about 1000 psi, more than about 500 psi, more than about 1000 psi. In some embodiments, an alternate phase is injected to contact the ion exchange beads at a pressure of less than about 0.1 psi, less than about 1 psi, less than about 5 psi, less than about 10 psi, less than about 50 psi, less than about 100 psi, less than about 500 psi, less than about 1000 psi, less than about 500 psi, less than about 1000 psi. In some embodiments, an alternate phase is injected to contact the ion exchange beads at a pressure from about 0.1 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi, from about 5000 psi to about 10,000 psi.

In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the liquid resource. In one aspect described herein, is a process for lithium extraction from a liquid resource comprising treating ion exchange material alternately with acid, the liquid resource, and optionally other solutions, in a configuration where the ion exchange material moves in the net opposite direction to the acid, liquid resource, and optionally other solutions, thereby producing a lithium-enriched solution from the liquid resource. In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the brine. In one embodiment, the process comprises: (a) treating the ion exchange material with acid under conditions suitable to absorb hydrogen to generate hydrogen-enriched material and release lithium to generate a lithium-enriched solution; (b) optionally, washing the hydrogen-enriched material with water to generate hydrogen-enriched material substantially free of residual acid; (c) treating the hydrogen-enriched material with the liquid resource under conditions suitable to absorb lithium to generate lithium-enriched material; (d) optionally, washing the lithium-enriched beads with water to generate lithium-enriched beads substantially free of liquid resource; and (e) repeating the cycle to produce a lithium-enriched solution from the liquid resource.

In one embodiment, the porous ion exchange beads comprise ion exchange particles that reversibly exchange lithium and hydrogen and a structural matrix material, and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays leachate from recycled products, leachate from recycled materials, or combinations thereof.

In some embodiments herein, is a process for lithium extraction from a liquid resource comprising treating porous ion exchange beads alternately with acid, brine, and optionally other solutions, in a configuration where the beads move in the net opposite direction to the acid, brine, and optionally other solutions, thereby producing a lithium-enriched solution from the liquid resource, wherein the process comprises: a) treating the porous ion exchange beads with acid under conditions suitable to absorb hydrogen to generate hydrogen-enriched beads and release lithium to generate a lithium-enriched solution; b) optionally, washing the hydrogen-enriched beads with water to generate hydrogen-enriched beads substantially free of residual acid; c) treating the hydrogen-enriched beads with the liquid resource under conditions suitable to absorb lithium to generate lithium-enriched beads; d) optionally, washing the lithium-enriched beads with water to generate lithium-enriched beads substantially free of liquid resource; and e) repeating the cycle to produce a lithium-enriched solution from the liquid resource.

In one aspect described herein, is a process for lithium extraction from a liquid resource comprising treating ion exchange particles alternately with the liquid resource, washing fluid, and acid, in a system for the extraction of lithium ions from a liquid resource, comprising: a. an ion exchange material; b. a stirred tank reactor; and c. a pH modulating setup for increasing the pH of the liquid resource in the system.

In one aspect described herein, is a process for lithium extraction from a liquid resource comprising treating ion exchange particles alternately with the liquid resource, a washing fluid, and an acid solution, with a system for the extraction of lithium ions from a liquid resource, comprising a stirred rank reactor, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the stirred tank reactor.

Process of Modulating pH for the Extraction of Lithium

An aspect of the invention described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material and combinations thereof.

Another aspect described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material, or combinations thereof. In some embodiments of the process, increasing the pH of the liquid resource is before contacting the ion exchange material with the liquid resource. In some embodiments of the process, increasing the pH of the liquid resource is during contacting the ion exchange material with the liquid resource. In some embodiments of the process, increasing the pH of the liquid resource is after contacting the ion exchange material with the liquid resource. In some embodiments of the process, increasing the pH of the liquid resource is before and during contacting the ion exchange material with the liquid resource. In some embodiments of the process, increasing the pH of the liquid resource is before and after contacting the ion exchange material with the liquid resource. In some embodiments of the process, increasing the pH of the liquid resource is during and after contacting the ion exchange material with the liquid resource. In some embodiments of the process, increasing the pH of the liquid resource is before, during, and after contacting the ion exchange material with the liquid resource.

An aspect of the invention described herein is a process, wherein the ion exchange material is loaded into a column. In an embodiment, the process further comprises: a) loading a liquid resource into one or more liquid resource tanks; b) connecting the column to the one or more liquid resource tanks; and c) passing the liquid resource from the one or more liquid resource tanks through the column, wherein the passing of the liquid resource occurs at least once. In an embodiment, the process further comprises increasing the pH of the liquid resource in one or more pH increasing tanks. In an embodiment, the process further comprises settling precipitates in one or more settling tanks. In an embodiment, the process further comprises storing the liquid resource in one or more storing tanks prior to or after circulating the liquid resource through the column.

An aspect of the invention described herein is a process, wherein the process further comprises: a) loading the liquid resource into one or more liquid resource tanks; b) connecting the column to the one or more liquid resource tanks; c) passing the liquid resource from the one or more liquid resource tanks through the column, wherein the passing of the liquid resource occurs at least once; d) increasing the pH of the liquid resulting from c. in one or more pH increasing tanks; e) settling precipitates of the liquid resulting from d. in one or more settling tanks; and f) storing the liquid resulting from e. in one or more storing tanks.

In one embodiment, an alternate phase is contacted with the ion exchange beads during on ore more of the steps of the process step (a)-(f). In some embodiments, the use of alternate phase speeds up pH modulation kinetics, enhances agitation, controls liquid level height, or a combination thereof. In some embodiments, contact between the ion exchange beads and the alternate phase is maximized and made possible by the design of this ion exchange device.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate is a gas such as air, nitrogen, argon, or a combination thereof. In some embodiments, the alternate phase comprises a compressed or pressurized gas.

An aspect of the invention described herein is a process, wherein the ion exchange material is loaded in a plurality of columns. In an embodiment, a plurality of tanks is connected to the plurality of columns, wherein each of the plurality of tanks is immediately connected to one of the plurality of columns. In an embodiment, two or more of the plurality of columns forms at least one circuit. In an embodiment, at least one circuit is selected from a liquid resource circuit, a water washing circuit and an acid solution circuit. In an embodiment, the pH of the liquid resource is increased in the plurality of tanks connected to the plurality of columns in the liquid resource circuit. In an embodiment, the liquid resource circuit includes a plurality of columns connected to a plurality of tanks, wherein each of the plurality of tanks is immediately connected to one of the plurality of columns.

An aspect of the invention described herein is a process, wherein the process further comprises: a) passing the liquid resource through a plurality of columns in the liquid resource circuit; b) passing an acid solution through a plurality of columns in the acid solution circuit one or more times; and c) passing water through a plurality of columns in the water washing circuit. In an embodiment, the process further comprises interchanging a plurality of columns between the liquid resource circuit, the water washing circuit and the acid solution circuit, such that: a) at least one of the plurality of columns in the liquid resource circuit becomes at least one of the plurality of columns in the water washing circuit and/or at least one of the plurality of columns in the acid solution circuit; b) at least one of the plurality of columns in the water washing circuit becomes at least one of the plurality of columns in the acid solution circuit and/or at least one of the plurality of columns in the liquid resource circuit; and/or c) at least one of the plurality of columns in the acid solution circuit becomes at least one of the plurality of columns in the liquid resource circuit and/or at least one of the plurality of columns in the water washing circuit.

An aspect of the invention described herein is a process, wherein the ion exchange material is loaded into one or more compartments in a tank. In an embodiment, the process further comprises moving the liquid resource through the one or more compartments in the tank. In an embodiment, the tank comprises injection ports. In an embodiment, the process further comprises using the injection ports to increase the pH of the liquid resource before contact with the ion exchange material, during contact with the ion exchange material, after contact with the ion exchange material and combinations thereof.

In some embodiments, the process further comprises using the injection ports to increase the pH of the liquid resource before contact with the ion exchange material, during contact with the ion exchange material, after contact with the ion exchange material, or combinations thereof.

An aspect of the invention described herein is a process, wherein the column further comprises a plurality of injection ports. In an embodiment, the process further comprises using the plurality of injection ports to increase the pH of the liquid resource before contact with the ion exchange material, during contact with the ion exchange material, after contact with the ion exchange material and combinations thereof.

In some embodiments, the process further comprises using the plurality of injection ports to increase the pH of the liquid resource before contact with the ion exchange material, during contact with the ion exchange material, after contact with the ion exchange material, or combinations thereof.

In an embodiment, the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads.

In an embodiment, the ion exchange material extracts lithium ions from a liquid resource. During the extraction of lithium ions from a liquid resource by the ion exchange material, the pH of the liquid resource optionally decreases. Increasing the pH of the liquid resource in the system maintains the pH in a range that is suitable for lithium ion uptake by the ion exchange material. In an embodiment, increasing the pH comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, increasing the pH comprises measuring the pH of the system and wherein the pH of the system is less than 6, less than 4, or less than 2, the pH of the system is adjusted to a pH of 2 to 9, a pH of 4 to 9, or a pH of 6 to 9.

Continuous Process for Lithium Extraction

Lithium is an essential element for batteries and other technologies. Lithium is found in a variety of liquid resources, including natural and synthetic brines and leachate solutions from minerals, clays, and recycled products. Lithium can be extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process can be repeated to extract lithium from a liquid resource and yield a concentrated lithium solution. The concentrated lithium solution can be further processed into chemicals for the battery industry or other industries.

Ion exchange materials are typically small particles, which together constitute a fine powder. Small particle size is required to minimize the diffusion distance that lithium must travel into the core of the ion exchange particles. In some cases, these particles may be coated with protective surface coatings to minimize dissolution of the ion exchange materials while allowing efficient transfer of lithium and hydrogen to and from the particles, as disclosed in co-pending U.S. provisional application 62/421,934, filed on Nov. 14, 2016, entitled "Lithium Extraction with Coated Ion Exchange Particles," and incorporated in its entirety by reference.

One major challenge for lithium extraction using inorganic ion exchange particles is the loading of the particles into an ion exchange column in such a way that brine and acid can be pumped efficiently through the column with minimal clogging. The materials can be formed into beads, and the beads can be loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads may become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In one embodiment, an alternate phase is contacted with the ion exchange beads during on ore more of the steps of the process step. In some embodiments, the use of alternate phase speeds up the kinetics of ion exchange, enhances the forming of the ion exchange bed, controls liquid level height in one or more process tanks, or a combination thereof. In some embodiments, contact between the ion exchange beads and the alternate phase is maximized and made possible by the design of this ion exchange device.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate is a gas such as air, nitrogen, argon, or a combination thereof. In some embodiments, the alternate phase comprises a compressed or pressurized gas.

In some embodiments, the ion exchange beads are porous ion exchange beads with networks of pores that facilitate the transport into the beads of solutions that are pumped through an ion exchange column. Pore networks can be strategically controlled to provide fast and distributed access for the brine and acid solutions to penetrate into the bead and deliver lithium and hydrogen to the ion exchange particles.

In some embodiments, the ion exchange beads are formed by mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decreases the performance and lifespan of the materials. Therefore, the porous ion exchange beads may contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In one aspect described herein, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. In one aspect described herein, a coating material is selected to protect the particle from dissolution and chemical degradation during lithium recovery in acid and also during lithium uptake in various liquid resources. In some embodiments, the coating material may also be selected to facilitate one or more of the following objectives: diffusion of lithium and hydrogen between the particles and the liquid resources, enabling adherence of the particles to a structural support, and suppressing structural and mechanical degradation of the particles.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column may be operated in co-flow mode with the liquid resource and acid solution alternately flowing through the column in the same direction, or the column may be operated in counter-flow mode with a liquid resource and acid solution alternately flowing through the column in opposite directions. Between flows of the liquid resource and the acid solution, the column may be treated or washed with water or other solutions for purposes such as adjusting pH in the column or removing potential contaminants. The beads may form a fixed or moving bed, and the moving bed may move in counter-current to the brine and acid flows. The beads may be moved between multiple columns with moving beds where different columns are used for brine, acid, water, or other flows. Before or after the liquid resource flows through the column, the pH of the liquid may be adjusted with NaOH or other chemicals to facilitate the ion exchange reaction as well as handling or disposal of the spent liquid resource. Before or after the liquid resource flows through the column, the liquid resource may be subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution may be further processed to produce lithium chemicals. These lithium chemicals may be supplied for an industrial application.

In some embodiments, an ion exchange material is selected from the following list: an oxide, a phosphate, an oxyfluoride, a fluorophosphate, or combinations thereof. In some embodiments, the ion exchange material selectively absorbs lithium in comparison to other metals or metal ions. In some embodiments, an ion exchange material is selected from the following list: $Li_4Mn_5O_{12}$, $Li_4Ti_5O_{12}$, $Li_2MO_3$ (M=Ti, Mn, Sn), $LiMn_2O_4$, $Li_{1.6}Mn1.6O4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In some embodiments, an ion exchange material is selected from the following list: $Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof.

In some embodiments, the ion exchange material is replaced by an absorbent. In some embodiments, an absorbent is selected from a lithium aluminum intercalate (e.g., a lithium aluminate intercalate, a lithium salt aluminum intercalate, a lithium salt aluminate intercalate). In some embodiments the absorbent selectively absorbs lithium. In some embodiments, the absorbent comprises a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the absorbent comprises one or more of scandium, titanium, vanadium, chromium, manganese, iron, cobalt, nickel, copper, zinc, yttrium, zirconium, and niobium, mixtures thereof, compounds thereof, or combinations thereof.

In some embodiments of the systems and methods disclosed herein, a lithium selective sorbent is comprised or used therein. The term "lithium selective sorbent" is a chemical compound or material (e.g., a resin, a polymer, a composite, a mineral) that selectively uptakes or absorbs lithium from a liquid resource as compared to other metals (e.g., potassium, sodium, magnesium, etc.). In some embodiments, the lithium selective sorbent comprises an ion exchange material or an absorbent. In some embodiments, the lithium selective sorbent comprises an ion exchange material. In some embodiments, the lithium selective sorbent comprises ion exchange particles. In some embodiments, the lithium selective sorbent comprises ion exchange beads. In some embodiments, the lithium selective sorbent comprises an adsorbent such as an lithium aluminum intercalate. Accordingly, embodiments of the present disclosure directed to "ion exchange material" or "absorbent" are also operably directed to "lithium selective sorbent" unless specified otherwise.

In some embodiments of the systems and methods disclosed herein, a lithium selective sorbent is contacted with a liquid resource comprising lithium. The lithium in the liquid resource is absorbed by the lithium selective sorbent to yield and enriched lithium selective sorbent. In some embodiments, the enriched lithium selective sorbent contains a higher lithium content then the lithium selective sorbent. In some embodiments, the lithium selective sorbent is an ion exchange material. In some embodiments, the ion exchange material is contacted with a liquid resource comprising lithium. The lithium in the liquid resource is absorbed via an ion exchange process to yield a lithiated ion exchange material.

In some embodiments, a coating material for protecting the surface of the ion exchange material is selected from the following list: a carbide, a nitride, an oxide, a phosphate, a fluoride, a polymer, carbon, a carbonaceous material, or combinations thereof. In some embodiments, a coating material is selected from the following list: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material is selected from the following list: $TiO_2$, $ZrO_2$, $MoO_2$, $SiO_2$, $Li_2TiO_3$, $Li_2ZrO_3$, $Li_2SiO_3$, $Li_2MnO_3$, $LiNbO_3$, $AlF_3$, SiC, $Si_3N_4$, graphitic carbon, amorphous carbon, diamond-like carbon, or combinations thereof.

In some embodiments, the ion exchange particles may have an average diameter that is selected from the following list: less than 10 nm, less than 100 nm, less than 1,000 nm, less than 10,000 nm, or less than 100,000 nm. In some embodiments, the ion exchange particles may have an average size that is selected from the following list: less than 200 nm, less than 2,000 nm, or less than 20,000 nm.

In some embodiments, the ion exchange particles may be secondary particles comprised of smaller primary particles that may have an average diameter selected from the following list: less than 10 nm, less than 100 nm, less than 1,000 nm, or less than 10,000 nm.

In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm.

In some embodiments, the ion exchange material and a coating material may form one or more concentration gradients where the chemical composition of the particle ranges between two or more compositions. In some embodiments, the ion exchange materials and the coating materials may form a concentration gradient that extends over a thickness selected from the following list: less than 1 nm, less than 10 nm, less than 100 nm, less than 1,000 nm, less than 10,000 nm, or less than 100,000 nm.

In some embodiments, the ion exchange material is synthesized by a method selected from the following list: hydrothermal, solvothermal, sol-gel, solid state, molten salt flux, ion exchange, microwave, ball milling, precipitation, or vapor deposition. In some embodiments, the ion exchange material is synthesized by a method selected from the following list: hydrothermal, solid state, or microwave.

In some embodiments, a coating material is deposited by a method selected from the following list: chemical vapor deposition, atomic layer deposition, physical vapor deposition, hydrothermal, solvothermal, sol-gel, solid state, molten salt flux, ion exchange, microwave, wet impregnation, precipitation, titration, aging, ball milling, or combinations thereof. In some embodiments, the coating material is deposited by a method selected from the following list: chemical vapor deposition, hydrothermal, titration, solvothermal, wet impregnation, sol-gel, precipitation, microwave, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings may be deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry may be formed using a solvent of n-methyl-2-pyrrolidone, dimethyl sulfoxide, tetrahydrofuran, dimethylformamide, dimethylacetamide, methyl ethyl ketone, or combinations thereof. The different liquid solution may be formed using water, ethanol, iso-propyl alcohol, acetone, or combinations thereof.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm.

In some embodiments, the porous ion exchange bead is embedded in a support structure, which may be a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the porous ion exchange beads is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In some embodiments, the acid used for recovering lithium from the porous ion exchange beads has a concentration selected from the following list: less than 0.1 M, less than 1.0 M, less than 5 M, less than 10 M, or combinations thereof.

In some embodiments, the porous ion exchange beads perform the ion exchange reaction repeatedly over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles.

In some embodiments, the concentrated lithium solution that is yielded from the porous ion exchange beads is further processed into lithium raw materials using methods selected from the following list: solvent extraction, ion exchange, chemical precipitation, electrodialysis, electrowinning, evaporation with direct solar energy, evaporation with concentrated solar energy, evaporation with a heat transfer medium heated by concentrated solar energy, evaporation with heat from a geothermal brine, evaporation with heat from combustion, or combinations thereof.

In some embodiments, the concentrated lithium solution that is yielded from the porous ion exchange beads is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the porous ion exchange beads are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

Use of an Alternate Phase to Enhance Surface Contact of Ion Exchange Beads with Liquids In some embodiments, the ion exchange beads are in contact with a liquid. In some embodiments, said liquid is a liquid resource, washing fluid, water, an acid solution, and/or an eluent solution. In some embodiments, a treatment is performed to ensure efficient surface contact of the ion exchange beads with a liquid. In some embodiments, said efficient contact leads to improved performance of the method for lithium extraction from a liquid resource. In some embodiments, said improved performance is due to enhanced surface contact between the liquid and the ion exchange beads. An exemplary embodiment of the use of an alternate phase to enhance the surface contact between the liquid and the ion exchange beads is described in Example 18.

In some embodiments, a treatment is performed to ensure efficient contact of the ion exchange beads with a liquid. In some embodiments, said treatment involves the introduction of an alternate phase into an ion exchange vessel (e.g., a vessel) containing ion exchange beads. In some embodiments, said treatment involves the modulation of the pressure inside of the ion exchange vessel. A non-limiting exemplary embodiment of said treatment is provided in Example 19 of the present disclosure. In some embodiments, said alternate phase is a gas. In some embodiments, said gas is air. In some embodiments, said gas is nitrogen. In some embodiments, said gas is argon. In some embodiments, said gas comprises air. In some embodiments, the gas is introduced into said vessel while the beads are dry. In some embodiments, the gas is introduced into said vessel while the beads are wet (e.g., the beads are coated with or mixed with a liquid). In some embodiments, the gas is introduced into said vessel while the beads are covered by a liquid (e.g., the beads are submerged in a liquid). In some embodiments, the gas is introduced into said vessel while the beads are covered by an aqueous solution (e.g., the beads are submerged in an aqueous solution).

In some embodiments, said aqueous solution comprises water. In some embodiments, said aqueous solution comprises an acid. In some embodiments, said acid is hydrochloric acid, nitric acid, sulfuric acid, or a mixture thereof. In some embodiments, said aqueous solution comprises a liquid resource containing lithium. In some embodiments, said aqueous solution comprises a surfactant. In some embodiments, said surfactant comprises an ionic surfactant. In some embodiments, said surfactant comprises a non-ionic surfactant. In some embodiments, said surfactant comprises an anionic surfactant. In some embodiments, said surfactant comprises a cationic surfactant. In some embodiments, said surfactant comprises a zwitterionic surfactant. In some embodiments, said surfactant comprises sodium lauryl sulfate. In some embodiments, said surfactant comprises an amine. In some embodiments, said surfactant comprises a long alkyl chain (e.g., a linear or branched hydrocarbon substituent comprising between 6 and 20 carbon atoms, between 12 and 18 carbon atoms, or more than 20 carbon atoms). In some embodiments, said surfactant is a pyridinium salt. In some embodiments, said surfactant comprises a fluoride, a chloride, a bromide, an iodide, or a mixture or combination thereof. In some embodiments, said surfactant comprises cetrimonium bromide, cetylpyridinium chloride, benzalkonium chloride, benzethonium chloride, dimethyldioctadecylammonium chloride, dioctadecyldimethylammonium bromide, ammonium lauryl sulfate, sodium laureth sulfate, perfluorooctanesulfonate, dioctyl sodium sulfosuccinate, sodium lauryl ether sulfate, sodium stearate, octenidine dihydrochloride, docusate, perfluorobutanesulfonate, an alkyl-aryl ether phosphate, an alkyl ether phosphate, an ethoxylate, mixtures thereof, or combinations thereof.

In some embodiments of the methods disclosed herein, the method comprises subjecting ion exchange beads to a treatment, wherein the treatment comprises modulating the pressure of the interior of a vessel that contains the ion exchange beads. In some embodiments, the pressure in said vessel is modulated to increase relative to the pressure at which the beads were originally loaded into said vessel. In some embodiments, the pressure in said vessel is modulated to decrease relative to the pressure at which the beads were originally loaded into said vessel.

In some embodiments, the pressure at which the beads were originally loaded into said vessel is ambient atmospheric pressure, and the absolute pressure to which the interior of the vessel is then modulated is 0.0001 to 1000 psi. In some embodiments, the absolute pressure is modulated to be greater than about 1 psi to about 100 psi. In some embodiments, the absolute pressure is modulated to be greater than about 1 psi to about 5 psi, about 1 psi to about 10 psi, about 1 psi to about 20 psi, about 1 psi to about 30 psi, about 1 psi to about 40 psi, about 1 psi to about 50 psi, about 1 psi to about 60 psi, about 1 psi to about 70 psi, about 1 psi to about 80 psi, about 1 psi to about 90 psi, about 1 psi to about 100 psi, about 5 psi to about 10 psi, about 5 psi to about 20 psi, about 5 psi to about 30 psi, about 5 psi to about 40 psi, about 5 psi to about 50 psi, about 5 psi to about 60 psi, about 5 psi to about 70 psi, about 5 psi to about 80 psi, about 5 psi to about 90 psi, about 5 psi to about 100 psi, about 10 psi to about 20 psi, about 10 psi to about 30 psi, about 10 psi to about 40 psi, about 10 psi to about 50 psi, about 10 psi to about 60 psi, about 10 psi to about 70 psi, about 10 psi to about 80 psi, about 10 psi to about 90 psi, about 10 psi to about 100 psi, about 20 psi to about 30 psi, about 20 psi to about 40 psi, about 20 psi to about 50 psi, about 20 psi to about 60 psi, about 20 psi to about 70 psi, about 20 psi to about 80 psi, about 20 psi to about 90 psi, about 20 psi to about 100 psi, about 30 psi to about 40 psi, about 30 psi to about 50 psi, about 30 psi to about 60 psi, about 30 psi to about 70 psi, about 30 psi to about 80 psi, about 30 psi to about 90 psi, about 30 psi to about 100 psi, about 40 psi to about 50 psi, about 40 psi to about 60 psi, about 40 psi to about 70 psi, about 40 psi to about 80 psi, about 40 psi to about 90 psi, about 40 psi to about 100 psi, about 50 psi to about 60 psi, about 50 psi to about 70 psi, about 50 psi to about 80 psi, about 50 psi to about 90 psi, about 50 psi to about 100 psi, about 60 psi to about 70 psi, about 60 psi to about 80 psi, about 60 psi to about 90 psi, about 60 psi to about 100 psi, about 70 psi to about 80 psi, about 70 psi to about 90 psi, about 70 psi to about 100 psi, about 80 psi to about 90 psi, about 80 psi to about 100 psi, or about 90 psi to about 100 psi. In some embodiments, the absolute pressure is modulated to be greater than about 1 psi, about 5 psi, about 10 psi, about 20 psi, about 30 psi, about 40 psi, about 50 psi, about 60 psi, about 70 psi, about 80 psi, about 90 psi, or about 100 psi. In some embodiments, the absolute pressure is modulated to be greater than at least about 1 psi, about 5 psi, about 10 psi, about 20 psi, about 30 psi, about 40 psi, about 50 psi, about 60 psi, about 70 psi, about 80 psi, or about 90 psi. In some embodiments, the absolute pressure is modulated to be greater than at most about 5 psi, about 10 psi, about 20 psi, about 30 psi, about 40 psi, about 50 psi, about 60 psi, about 70 psi, about 80 psi, about 90 psi, or about 100 psi. In some embodiments, the absolute pressure is modulated to be greater than about 5 psi to about 1,000 psi. In some embodiments, the absolute pressure is modulated to be greater than about 5 psi to about 10 psi, about 5 psi to about 25 psi, about 5 psi to about 50 psi, about 5 psi to about 100 psi, about 5 psi to about 250 psi, about 5 psi to about 300 psi, about 5 psi to about 400 psi, about 5 psi to about 500 psi, about 5 psi to about 600 psi, about 5 psi to about 750 psi, about 5 psi to about 1,000 psi, about 10 psi to about 25 psi, about 10 psi to about 50 psi, about 10 psi to about 100 psi, about 10 psi to about 250 psi, about 10 psi to about 300 psi, about 10 psi to about 400 psi, about 10 psi to about 500 psi, about 10 psi to about 600 psi, about 10 psi to about 750 psi, about 10 psi to about 1,000 psi, about 25 psi to about 50 psi, about 25 psi to about 100 psi, about 25 psi to about 250 psi, about 25 psi to about 300 psi, about 25 psi to about 400 psi, about 25 psi to about 500 psi, about 25 psi to about 600 psi, about 25 psi to about 750 psi, about 25 psi to about 1,000 psi, about 50 psi to about 100 psi, about 50 psi to about 250 psi, about 50 psi to about 300 psi, about 50 psi to about 400 psi, about 50 psi to about 500 psi, about 50 psi to about 600 psi, about 50 psi to about 750 psi, about 50 psi to about 1,000 psi, about 100 psi to about 250 psi, about 100 psi to about 300 psi, about 100 psi to about 400 psi, about 100 psi to about 500 psi, about 100 psi to about 600 psi, about 100 psi to about 750 psi, about 100 psi to about 1,000 psi, about 250 psi to about 300 psi, about 250 psi to about 400 psi, about 250 psi to about 500 psi, about 250 psi to about 600 psi, about 250 psi to about 750 psi, about 250 psi to about 1,000 psi, about 300 psi to about 400 psi, about 300 psi to about 500 psi, about 300 psi to about 600 psi, about 300 psi to about 750 psi, about 300 psi to about 1,000 psi, about 400 psi to about 500 psi, about 400 psi to about 600 psi, about 400 psi to about 750 psi, about 400 psi to about 1,000 psi, about 500 psi to about 600 psi, about 500 psi to about 750 psi, about 500 psi to about 1,000 psi, about 600 psi to about 750 psi, about 600 psi to about 1,000 psi, or about 750 psi to about 1,000 psi. In some embodiments, the absolute pressure is modulated to be greater than about 5 psi, about 10 psi, about 25 psi, about 50 psi, about 100 psi, about 250 psi, about 300 psi, about 400 psi, about 500 psi, about 600 psi, about 750 psi, or about 1,000 psi. In some embodiments, the absolute pressure is modulated to be greater than at least about 5 psi, about 10 psi, about 25 psi, about 50 psi, about 100 psi, about 250 psi, about 300 psi, about 400 psi, about 500 psi, about 600 psi, or about 750 psi. In some embodiments, the absolute pressure is modulated to be greater than at most about 10 psi, about 25 psi, about 50 psi, about 100 psi, about 250 psi, about 300 psi, about 400 psi, about 500 psi, about 600 psi, about 750 psi, or about 1,000 psi.

In some embodiments, the pressure at which the beads were originally loaded into said vessel is ambient atmospheric pressure, and the absolute pressure to which the interior of the vessel is then modulated is 0.0001 to 1000 psi. In some embodiments, the absolute pressure is modulated to be less than about 1 psi to about 100 psi. In some embodiments, the absolute pressure is modulated to be less than about 0.0001 psi to about 10 psi. In some embodiments, the absolute pressure is modulated to be less than about 0.0001 psi to about 0.001 psi, about 0.0001 psi to about 0.01 psi, about 0.0001 psi to about 0.1 psi, about 0.0001 psi to about 1 psi, about 0.0001 psi to about 2 psi, about 0.0001 psi to about 3 psi, about 0.0001 psi to about 5 psi, about 0.0001 psi to about 10 psi, about 0.001 psi to about 0.01 psi, about 0.001 psi to about 0.1 psi, about 0.001 psi to about 1 psi, about 0.001 psi to about 2 psi, about 0.001 psi to about 3 psi, about 0.001 psi to about 5 psi, about 0.001 psi to about 10 psi, about 0.01 psi to about 0.1 psi, about 0.01 psi to about 1 psi, about 0.01 psi to about 2 psi, about 0.01 psi to about 3 psi, about 0.01 psi to about 5 psi, about 0.01 psi to about 10 psi, about 0.1 psi to about 1 psi, about 0.1 psi to about 2 psi, about 0.1 psi to about 3 psi, about 0.1 psi to about 5 psi, about 0.1 psi to about 10 psi, about 1 psi to about 2 psi, about 1 psi to about 3 psi, about 1 psi to about 5 psi, about 1 psi to about 10 psi, about 2 psi to about 3 psi, about 2 psi to about 5 psi, about 2 psi to about 10 psi, about 3 psi to about 5 psi, about 3 psi to about 10 psi, or about 5 psi to about 10 psi. In some embodiments, the absolute pressure is modulated to be less than about 0.0001 psi, about 0.001 psi, about 0.01 psi, about 0.1 psi, about 1 psi, about 2 psi, about 3 psi, about 5 psi, or about 10 psi. In some embodiments, the absolute pressure is modulated to be less than at least about 0.0001 psi, about 0.001 psi, about 0.01 psi, about 0.1 psi, about 1 psi, about 2 psi, about 3 psi, or about 5 psi. In some embodiments, the absolute pressure is modulated to be less than at most about 0.001 psi, about 0.01 psi, about 0.1 psi, about 1 psi, about 2 psi, about 3 psi, about 5 psi, or about 10 psi. In some embodiments, the pressure inside the vessel is modulated to ambient atmospheric after the pressure has been modulated above or below this value as described above. In some embodiments, the pressure inside the vessel is modulated to be above ambient atmospheric after the pressure has been modulated above or below this value as described above. In some embodiments, the pressure inside the vessel is modulated to be below ambient atmospheric after the pressure has been modulated above or below this value as described above. In some embodiments, the lowered pressure is less than about 0.0001 psi to about 10 psi. In some embodiments, the lowered pressure is less than about 0.0001 psi to about 0.001 psi, about 0.0001 psi to about 0.01 psi, about 0.0001 psi to about 0.1 psi, about 0.0001 psi to about 1 psi, about 0.0001 psi to about 2 psi, about 0.0001 psi to about 3 psi, about 0.0001 psi to about 5 psi, about 0.0001 psi to about 10 psi, about 0.001 psi to about 0.01 psi, about 0.001 psi to about 0.1 psi, about 0.001 psi to about 1 psi, about 0.001 psi to about 2 psi, about 0.001 psi to about 3 psi, about 0.001 psi to about 5 psi, about 0.001 psi to about 10 psi, about 0.01 psi to about 0.1 psi, about 0.01 psi to about 1 psi, about 0.01 psi to about 2 psi, about 0.01 psi to about 3 psi, about 0.01 psi to about 5 psi, about 0.01 psi to about 10 psi, about 0.1 psi to about 1 psi, about 0.1 psi to about 2 psi, about 0.1 psi to about 3 psi, about 0.1 psi to about 5 psi, about 0.1 psi to about 10 psi, about 1 psi to about 2 psi, about 1 psi to about 3 psi, about 1 psi to about 5 psi, about 1 psi to about 10 psi, about 2 psi to about 3 psi, about 2 psi to about 5 psi, about 2 psi to about 10 psi, about 3 psi to about 5 psi, about 3 psi to about 10 psi, or about 5 psi to about 10 psi. In some embodiments, the lowered pressure is less than about 0.0001 psi, about 0.001 psi, about 0.01 psi, about 0.1 psi, about 1 psi, about 2 psi, about 3 psi, about 5 psi, or about 10 psi. In some embodiments, the lowered pressure is less than at least about 0.0001 psi, about 0.001 psi, about 0.01 psi, about 0.1 psi, about 1 psi, about 2 psi, about 3 psi, or about 5 psi. In some embodiments, the lowered pressure is less than at most about 0.001 psi, about 0.01 psi, about 0.1 psi, about 1 psi, about 2 psi, about 3 psi, about 5 psi, or about 10 psi.

In some embodiments, the treatment comprises modulating the pressure inside the vessel containing the ion exchange beads to more than one pre-determined pressures in a pre-determined sequence. In some embodiments, the pressure inside the vessel is first modulated to increase and then modulated to decrease. In some embodiments, the pressure inside the vessel is first modulated to increase and then modulated to decrease once, at which point the treatment is complete. In some embodiments, the pressure inside the vessel is first modulated to increase and then modulated to decrease in a cycle. In some embodiments, the treatment comprises performing the cycle in the inclusive range of one time to 100 times. In some embodiments, the treatment comprises performing the cycle once. In some embodiments, the treatment comprises performing the cycle twice. In some embodiments, the treatment comprises performing the cycle three times. In some embodiments, the treatment comprises performing the cycle four times. In some embodiments, the treatment comprises performing the cycle five times. In some embodiments, the treatment comprises performing the cycle six times. In some embodiments, the treatment comprises performing the cycle seven times. In some embodiments, the treatment comprises performing the cycle eight times. In some embodiments, the treatment comprises performing the cycle nine times. In some embodiments, the treatment comprises performing the cycle ten times. In some embodiments, the treatment comprises performing the cycle ten to fifteen times. In some embodiments, the treatment comprises performing the cycle ten to twenty times. In some embodiments, the treatment comprises performing the cycle about 20 times. In some embodiments, the treatment comprises performing the cycle about 20 times. In some embodiments, the treatment comprises performing the cycle about 30 times. In some embodiments, the treatment comprises performing the cycle about 40 times. In some embodiments, the treatment comprises performing the cycle about 50 times. In some embodiments, the treatment comprises performing the cycle about 60 times. In some embodiments, the treatment comprises performing the cycle about 70 times. In some embodiments, the treatment comprises performing the cycle about 80 times. In some embodiments, the treatment comprises performing the cycle about 90 times. In some embodiments, the treatment comprises performing the cycle about 100 times.

In some embodiments, the pressure inside the vessel is modulated by controlling the pressure of an alternate phase inside said vessel. In some embodiments, said alternate phase is a gas. In some embodiments, the pressure inside the vessel is modulated by means of fluid flow into said vessel. In some embodiments, the pressure in said vessel is modulated by pumping a liquid into said vessel. In some embodiments, the pressure in said vessel is modulated by pumping a liquid into said vessel while retaining a gas in the headspace of said vessel, thereby allowing the vessel to pressurize. In some embodiments, the pressure in said vessel is modulated by pumping an alternate phase into said vessel while retaining a gas in the headspace of said vessel, thereby allowing the vessel to pressurize. In some embodiments, the pressure in said vessel is modulated by introducing an alternate phase into said vessel, such that said alternate phase is at a different pressure than the pressure originally inside said vessel. In some embodiments, the pressure is modulated by modulating the flow rate of fluid across the bed of ion exchange beads.

In some embodiments, the ion exchange beads are fluidized inside said vessel during the treatment described above. In some embodiments, the ion exchange beads are stirred inside said vessel during the treatment described above. In some embodiments, the ion exchange beads are stirred by a mixer. In some embodiments, the ion exchange beads are stirred by one or more agitators. In some embodiments, said agitators comprise one or more impellers. In some embodiments, said one or more impellers comprise propellers, anchor impellers, hydrofoils, pitched blade turbines, curved blade turbines, spiral turbine, flat blade turbines, radial blades, or a combination thereof. In some embodiments, said impellers contain one or more blades. In some embodiments, the shaft and impellers are comprised of carbon steel, stainless steel, titanium, Hastelloy, or a combination thereof. In some embodiments, the shaft and impellers are coated with glass, epoxy, rubber, a polymer coating, or combinations thereof.

In some embodiments, the fluidization of the particle by means of said agitator is aided by baffles mounted inside of said tank. In some embodiments, said baffles comprise flat rectangular structures mounted onto the side of the tank. In some embodiments said baffles are oriented perpendicular to the plane of agitator of the impeller. In some embodiment, the presence of one or more baffles aid with the fluidization of the ion exchange beads inside the vessel. In some embodiments, the presence of one or more baffles reduce the swirling and vortexing associated with fluidization of the particles with an impeller. In some embodiments, the presence of said baffles results in more uniform suspension of particles. In some embodiments, the presence of said baffles results in reduce attrition of particles being fluidized. In some embodiments, said baffles are constructed to span the entire vertical length of the vessel. In some embodiments, the baffles are constructed to span from about the height of the settled bed of ion exchange beads to the top of the vessel. In some embodiments, the baffles are constructed to span from about 6" from the bottom of the vessel to the top of the vessel. In some embodiments, there is a gap between the wall of the vessel and the baffle. In some embodiments, said gap measures less than 1/8", less than 1/4", less than 1/2", or less than 1". In some embodiments, said baffles measure a width that is equivalent to approximately one twelfth of the width of the vessel. In some embodiments, said baffles measure a width that is equivalent to approximately less than one tenth of the width of the vessel. In some embodiments, said baffles measure a width that is equivalent to more than approximately one fifteenth of the width of the vessel. In some embodiments, all baffles are of equivalent dimensions. In some embodiments, baffles are not of the same dimensions. In some embodiments, the tank contains two baffles. In some embodiments, the tank contains three baffles. In some embodiments, the tank contains four baffles. In some embodiments, the tank contains more than four baffles.

In some embodiments, the ion exchange beads are fluidized by pumping solution into the tank near the bottom of the tank. In some embodiments, the ion exchange beads are fluidized by pumping solution from the tank back into the tank near the bottom of the tank. In some embodiments, the ion exchange beads are fluidized by pumping a slurry of the ion exchange beads from near the bottom of the tank to a higher level in the tank.

Other Embodiments of the Disclosure

In some embodiments of the present disclosure, a chelating agent or anti-scalant is used to form a soluble complex to avoid precipitation (e.g., formation of precipitates as described herein) in an acidic lithium solution. In one embodiment, a chelating agent or anti-scalant is used to form a soluble complex to avoid or redissolve precipitates. In one embodiment, a chelating agent or anti-scalants is used to limit or reduce precipitation of multivalent cations and the chelating agent or antiscalant is selected from the list of ethylenediaminetetraacetic acid (EDTA), disodium EDTA, calcium disodium EDTA, tetrasodium EDTA, citric acid, maleic acid, silicate compounds, amorphous silicate compounds, crystalline layered silicate compounds, phosphonic acid compounds, aminotris(methylenephosphonic acid) (ATMP), nitrilotrimethylphosphonic acid (NTMP), ethylenediamine tetra(methylene phosphonic acid) (EDTMP), diethylenetriamine penta(methylene phosphonic acid) (DTPMP), polyphosphonate, polyacrylate, polyacrylic acid, nitrilotriacetic acid (NTA), sodium hexametaphosphate (SHMP), or combinations thereof. In one embodiment, a threshold inhibitor is used to block development of nuclei in an acidic lithium solution. In one embodiment, a retarded is used to block the growth of precipitates in an acidic lithium solution. In one embodiment, compounds are used to limit, control, eliminate, or redissolve precipitates including phosphinopolycarboxylic acid, sulfonated polymer, polyacrylic acid, p-tagged sulfonated polymer, diethylenetriamine penta, bis-hexamethylene triamine, compounds thereof, modifications thereof, or combinations thereof.

In some embodiments of the present disclosure, an acidic lithium solution is processed to generate an acid gas. In some embodiments, a lithium salt obtained following a processing of an acidic lithium solution is further processed to generate an acid gas. In some embodiments, the acid gas utilized to generate an acid solution that can be used to elute lithium from ion exchange material as described herein.

In some embodiments, nitric acid is used to elute lithium from ion exchange particles to produce a lithium nitrate eluate. In some embodiments, the lithium nitrate eluate is concentrated and then heated to produce a lithium nitrate molten salt. In some embodiments, the lithium nitrate molten salt is heated above its decomposition temperature to convert the lithium nitrate into lithium oxide and nitrogen oxide gas. In some embodiments, the nitrogen oxide gas is a mixture of nitrogen monoxide, nitrogen dioxide, oxygen, and/or other nitrogen oxide gases. In some embodiments, the lithium nitrate is heated in the presence of a catalyst to aid nitrate decomposition. In some embodiments, the nitrogen oxide gas is absorbed into an aqueous solution to form nitric acid which can be reused to elute the ion exchange particles. In some embodiments, the lithium oxide is reacted with water to form lithium hydroxide. In some embodiments, the lithium is purified to remove sodium, magnesium, calcium, boron, transition metals, or other impurities before or after the nitrate is decomposed into nitrogen oxide gas.

In some embodiments, nitric acid is used to elute lithium from ion exchange particles to produce a lithium nitrate eluate. In some embodiments, the lithium nitrate eluate is mixed with sulfuric acid. In some embodiments, the mixture of lithium nitrate and sulfuric acid is heated to distill off nitric acid, which can be condensed and reused to elute lithium from the ion exchange particles. In some embodiments, the mixture of lithium nitrate and sulfuric acid is heated to distill off nitric acid leaving behind a lithium sulfate. In some embodiments, the lithium sulfate is in a solid form. In some embodiments, the lithium sulfate is combined with water to form an aqueous lithium sulfate solution. In some embodiments, the lithium sulfate is combined with sodium hydroxide to crystallize a lithium hydroxide product. In some embodiments, the lithium sulfate is combined with sodium hydroxide to crystallize a lithium hydroxide product. In some embodiments, this process yields a sodium sulfate byproduct.

In some embodiments, an acid selected from the list of HF, HCl, HBr, or HI is used to elute lithium from ion exchange particles to produce a lithium halide eluate. In some embodiments, the lithium halide eluate is mixed with sulfuric acid. In some embodiments, the mixture of lithium halide and sulfuric acid is heated to distill off HF, HCl, HBr, or HI acid, which can be condensed and reused to elute lithium from the ion exchange particles. In some embodiments, the mixture of lithium halide and sulfuric acid is heated to distill off acid leaving behind a lithium sulfate. In some embodiments, the lithium sulfate is in a solid form. In some embodiments, the lithium sulfate is combined with water to form an aqueous lithium sulfate solution. In some embodiments, the lithium sulfate is combined with sodium hydroxide to crystallize a lithium hydroxide product. In some embodiments, the lithium sulfate is combined with sodium hydroxide to crystallize a lithium hydroxide product. In some embodiments, this process yields a sodium sulfate byproduct.

In some embodiments, nitric acid is used to elute lithium from ion exchange particles to produce a lithium nitrate eluate. In some embodiments, the lithium nitrate eluate is mixed with sodium hydroxide to crystallize a lithium hydroxide product. In some embodiments, the lithium nitrate eluate is mixed with sodium carbonate to precipitate a lithium carbonate product. In some embodiments, the lithium nitrate eluate is mixed with calcium hydroxide to precipitate a lithium hydroxide product. In some embodiments, these processes yield a sodium nitrate or calcium nitrate byproduct that can be used in agricultural fertilizer or other applications.

In some embodiments, the lithium oxide is precipitated along with other oxides such as magnesium oxide, calcium oxide, or sodium oxide. In some embodiments, the lithium oxide contains impurities and is mixed with other to form lithium hydroxide with impurities. In some embodiments, the lithium oxide contains impurities and is mixed with other to form aqueous lithium hydroxide with impurities. In some embodiments, magnesium hydroxide and calcium hydroxide impurities can be removed from a lithium hydroxide solution through filtration.

In some embodiments, the lithium salts may be aqueous, solid, or molten. In some embodiments, the lithium salts may be hydrated. In some embodiments, the lithium hydroxide may be a lithium hydroxide monohydrate powder.

In some embodiments, a lithium salt is heated in a spray dryer to form lithium solids and a volatile acidic gas. In some embodiments, lithium nitrate is decomposed in a spray dryer to form lithium oxide solids and nitrogen oxide gases. In some embodiments, a mixture of lithium nitrate and sulfuric acid is heated in a spray dryer to form lithium sulfate solids and nitric acid gas. In some embodiments, a mixture of lithium chloride and sulfuric acid is heated in a spray dryer to form lithium sulfate solids and hydrochloric acid gas.

In some embodiments, a lithium salt is decomposed in a rotary kiln to form lithium solids and a volatile acidic gas. In some embodiments, lithium nitrate is decomposed in a rotary kiln to form lithium oxide solids and nitrogen oxide gases. In some embodiments, a mixture of lithium nitrate and sulfuric acid is heated in a rotary kiln to form lithium sulfate solids and nitric acid gas. In some embodiments, a mixture of lithium chloride and sulfuric acid is heated in a rotary kiln to form lithium sulfate solids and hydrochloric acid gas.

Additional Embodiments

Disclosed herein is a process for extracting lithium from a liquid resource comprising: a) contacting an ion exchange material with a liquid resource, wherein the liquid resource comprises lithium ions, and wherein lithium ions in the liquid resource are absorbed by the ion exchange material to yield a lithiated ion exchange material; to b) contacting said lithiated ion exchange material with an acidic solution such that lithium is eluted from the lithiated ion exchange material into said acidic solution; and c) contacting an alternate phase with said ion exchange material, said lithiated ion exchange material, said liquid resource, said acidic solution, or any combination thereof, wherein the alternate phase is a non-aqueous liquid or gas. In some embodiments, said ion exchange material or said lithiated ion exchange material is contacted with a wash solution to at least partly remove said liquid resource from said ion exchange material or said lithiated ion exchange material, wherein the wash solution is an aqueous solution or pure water. In some embodiments, said ion exchange material is contacted with said wash solution to at least partly remove said acidic solution from said ion exchange material. In some embodiments, said ion exchange material or said lithiated ion exchange material is contacted with said wash solution to at least partly remove said alternate phase from said ion exchange material or said lithiated ion exchange material. In some embodiments, said alternate phase is contacted with said liquid resource. In some embodiments, said alternate phase is contacted with said wash solution. In some embodiments, said alternate phase is contacted with said acidic solution. In some embodiments, said alternate phase is contacted with said ion exchange material or said lithiated ion exchange material. In some embodiments, said ion exchange material or said lithiated ion exchange material is housed in a bed. In some embodiments, said alternate phase is contacted with said ion exchange material or said lithiated ion exchange material housed in said bed to repack the ion exchange material or the lithiated ion exchange material. In some embodiments, the repack of the ion exchange material or the lithiated ion exchange material results in improved flow characteristics of gases or liquids through the bed. In some embodiments, said improved flow characteristics comprises a uniform reduction in pressure. In some embodiments, said alternate phase is contacted with said wash solution to at least partly remove said wash solution from said ion exchange material or said lithiated ion exchange material. In some embodiments, said alternate phase is contacted with said liquid resource to at least partly remove said liquid resource from said ion exchange material. In some embodiments, said alternate phase is contacted with said acidic solution to at least partly remove said acidic solution from said ion exchange material or said lithiated ion exchange material. In some embodiments, a first alternate phase is contacted with a second alternate phase to at least partially remove the first alternate phase from said ion exchange material or said lithiated ion exchange material. In some embodiments, said alternate phase is contacted with said wash solution to enhance the removal of said liquid resource, said acidic solution, or said wash solution from said ion exchange material. In some embodiments, said alternate phase is contacted with said liquid resource to enhance absorption of lithium during the contact of said liquid resource with said ion exchange material. In some embodiments, said alternate phase is contacted with said acidic solution to increase the elution of lithium. In some embodiments, said alternate phase comprises an organic liquid. In some embodiments, said alternate phase comprises an alkane. In some embodiments, said alternate phase comprises a modified alkane liquid. In some embodiments, said alternate phase comprises a hydrocarbon. In some embodiments, said alternate phase comprises an alcohol. In some embodiments, said alternate phase comprises an oil. In some embodiments, said oil comprises a bio-organic oil. In some embodiments, said bio-organic oil comprises vegetable oil. In some embodiments, said alternate phase comprises an ester. In some embodiments, said alternate phase comprises an ether. In some embodiments, said alternate phase comprises butane, pentane, hexane, acetone, diethyl ether, butanol, or combinations thereof. In some embodiments, said alternate phase comprises an acid. In some embodiments, said alternate phase comprises an alkali. In some embodiments, said alternate phase is a gas. In some embodiments, said gas comprises air. In some embodiments, said gas comprises nitrogen. In some embodiments, said gas comprises argon. In some embodiments, said gas comprises a combination of gasses. In some embodiments, said gas is a compressed gas. In some embodiments, said gas is a gas under vacuum or partial vacuum. In some embodiments, the alternate phase is injected at a pressure of 0.01-0.1 psig. In some embodiments, the alternate phase is injected at a pressure of 0.1-1 psig. In some embodiments, the alternate phase is injected at a pressure of 1-10 psig. In some embodiments, wherein the alternate phase is injected at a pressure of 10-100 psig. In some embodiments, the alternate phase is injected at a pressure of 100-1000 psig. In some embodiments, the gas is soluble in a liquid. In some embodiments, the gas is soluble in said liquid resource, said wash solution, or said acidic solution. In some embodiments, the gas is soluble in said liquid resource. In some embodiments, the gas is soluble in said wash solution. In some embodiments, the gas is soluble in said acidic solution. In some embodiments, two or more additional alternate phases are contacted with said ion exchange material or said lithiated ion exchange material. In some embodiments, lithium extraction occurs in one or more ion exchange vessel, wherein an ion exchange vessel comprises i) said ion exchange material and ii) one or more ports for the addition of said liquid resource, said acidic solution, and said alternate phase. In some embodiments, said ion exchange material is housed in one or more packed beds. In some embodiments, the lithium extraction occurs in one or more fluidized beds comprising said ion exchange material. In some embodiments, said ion exchange material can be fluidized or packed in beds. In some embodiments, the fluidization of said ion exchange material occurs by means of a mechanical agitator. In some embodiments, the fluidization of said ion exchange material occurs by means of contact with one or more alternate phases. In some embodiments, the fluidization of said ion exchange material occurs by means of contact with a liquid resource, a wash solution, an acidic solution, one or more alternate phases or combinations thereof. In some embodiments, said ion exchange material is fluidized during contact with said liquid resource. In some embodiments, said ion exchange material is fluidized during contact with said acidic solution. In some embodiments, said ion exchange material is fluidized during contact with said alternate phase. In some embodiments, said ion exchange material is fluidized during contact with said wash solution. In some embodiments, said liquid resource contacts said ion exchange material in a plurality of vessels arranged in series. In some embodiments, said liquid resource contacts said ion exchange material in a plurality of compartments arranged within a vessel. In some embodiments, the ion exchange material comprises porous ion exchange beads. In some embodiments, said ion exchange material comprises porous ion exchange beads with a mean diameter of 50 microns to 100 microns. In some embodiments, said ion exchange material comprises porous ion exchange beads with a mean diameter of 100 microns to 200 microns. In some embodiments, said ion exchange material comprises porous ion exchange beads with a mean diameter of 200 microns to 300 microns. In some embodiments, said ion exchange material comprises porous ion exchange beads with a mean diameter of 200 microns to 400 microns. In some embodiments, said ion exchange material comprises porous ion exchange beads with a mean diameter of 400 microns to 600 microns. In some embodiments, said ion exchange material comprises porous ion exchange beads with a mean diameter of 400 microns to 800 microns. In some embodiments, said ion exchange material comprises porous ion exchange beads with a mean diameter of 50 microns to 800 microns. In some embodiments, said ion exchange material comprises porous ion exchange beads with a mean diameter of 50 microns to 400 microns. In some embodiments, the process further comprises a pH modulating system for increasing the pH of the liquid resource in the system. In some embodiments, the process further comprises a pH modulating system for neutralizing the pH of the liquid resource. In some embodiments, a porous material is used to immobilize said ion exchange material. In some embodiments, ion exchange material comprises $LiFePO_4$, $LiMnPO_4$, $Li_2TiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, said ion exchange material is replaced with an absorbent, wherein the adsorbent comprises a lithium aluminum intercalate. In some embodiments, said ion exchange material is a coated ion exchange material with a coating that is selected from an oxide, a polymer, or combinations thereof. In some embodiments, said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acidic solution comprises hydrochloric acid, sulfuric acid, nitric acid, phosphoric acid, hydrobromic acid, hydroiodic acid, perchloric acid, acetic acid, or a combination thereof. In some embodiments, the wash solution consists of pure water.

Disclosed herein is one or more vessels, wherein each of the one or more vessels comprises: i) one or more compartments; ii) an ion exchange material; iii) a device configured to inject an alternate phase into said compartments and said ion exchange materials; wherein said one or more vessels are configured to extract lithium ions from a liquid resource, and wherein said alternate phase comprises a non-aqueous solution or gas. In some embodiments, said ion exchange material is configured contact a liquid resource comprising lithium. In some embodiments, said ion exchange material is configured contact with a wash solution, wherein the wash solution is an aqueous solution or pure water. In some embodiments, said ion exchange material is configured to contact an acidic solution to elute the loaded lithium while absorbing protons. In some embodiments, said alternate phase is configured to contact with said ion exchange material. In some embodiments, said alternate phase is configured to contact with said ion exchange material to form an ion exchange bed. In some embodiments, said alternate phase is configured to contact with said ion exchange material to form an ion exchange bed with optimal flow characteristics. In some embodiments, the one or more vessels further comprises a mixing device. In some embodiments, the one or more vessels further comprises one or more pH modulating systems. In some embodiments, the ion exchange material is loaded into said one or more compartments. In some embodiments, the one or more vessels further comprises a porous partition between said one or more compartments. In some embodiments, the one or more vessels are cylindrical vessels containing an interior compartment loaded with ion exchange material, configured such that said liquid resource flows through said ion exchange material in a direction that is oriented radially to said cylindrical vessels. In some embodiments, the one or more vessels are cylindrical vessel containing ion exchange material located between two concentric porous cylindrical structures. In some embodiments, the one or more vessels further comprises a porous pipe near the center of the one or more vessels, wherein the porous pipe is configured to allow the flow of a liquid or alternate phase through the ion exchange material in a direction oriented radially to the vessel. In some embodiments, the one or more vessels further comprises a vessel housing, wherein said vessel housing comprises an inner cylindrical vessel and an outer cylindrical vessel, wherein said ion exchange material is housed between said inner cylindrical vessel and said outer cylindrical vessel. In some embodiments, said inner cylindrical vessel and said outer cylindrical vessel are permeable to facilitate flow of said liquid resource through said ion exchange material. In some embodiments, said inner cylindrical vessel and/or said outer cylindrical vessel are fixed with holes, slits, nozzles, meshes, or a combination thereof to facilitate flow of a liquid resource, acidic solution, wash solution, or alternate phase through said ion exchange material while containing said ion exchange material inside of said vessel housing. In some embodiments, a liquid flows in a radial orientation through said ion exchange material from near the outside of said vessel to near the inside of said vessel. In some embodiments, a liquid flows in a radial orientation through said ion exchange material from near the inside of said vessel to near the outside of said vessel. In some embodiments, the one or more vessels further comprises internal flow distributors. In some embodiments, the vessel is configured to be loaded with said ion exchange material, said liquid resource, a wash solution, an acidic solution, and an alternate phase. In some embodiments, the liquid resource, the wash solution, the acidic solution, and the alternate phase enters into the one or more vessels from two or more flow distributors. In some embodiments, the two or more flow distributers are located at opposing ends of said one or more vessels. In some embodiments, the liquid resource, the wash solution, the acidic solution, and the alternate phase exits said vessel from one or more flow distributors. In some embodiments, the one or more flow distributors are located near the center point between said two opposite ends of the vessel. In some embodiments, the one or more vessels further comprises one or more candles, where each said one or more candles comprises two concentric structures that are permeable to flow of said liquid resource, an acidic solution, a wash solution, or an alternate phase and contain ion exchange material. In some embodiments, the one or more vessels further comprises a) a volume filled with an alternate phase; b) a mechanism to control the fluid level inside said one or more vessel. In some embodiments, the fluid level of a liquid resource, a washing solution, or an acidic solution is adjusted by adjusting a pressure of the alternate phase. In some embodiments, the fluid level of a liquid resource, a washing solution, or an acidic solution is adjusted by adjusting a flow rate of the alternate phase. In some embodiments, the fluid level of a liquid resource, a washing solution, or an acidic solution is adjusted by adjusting an opening of a valve at the bottom of the one or more vessels. In some embodiments, the ion exchange material is fully submerged in the liquid resource, acidic solution, wash solution, or alternate phase. In some embodiments, the ion exchange material is partially submerged in the liquid lithium resource, acidic solution, wash solution, or alternate phase. In some embodiments, device comprises holes, slits, nozzles, meshes, spargers, or orifices to inject the alternate phase into the vessel. In some embodiments, said injection occurs below a bed comprising the ion exchange material. In some embodiments, said injection occurs above a bed comprising the ion exchange material. In some embodiments, said injection occurs inside a bed comprising the ion exchange material. In some embodiments, said injection occurs below, above, or inside, a bed comprising the ion exchange material. In some embodiments, said injection occurs in a combination below, above, or inside the bed. In some embodiments, injection of an alternate phase improves the distribution of the flow of a liquid lithium resource, wash solution, or acidic solution. In some embodiments, injection of an alternate phase serves to adjust the pH of the liquid resource, wash solution, or acidic solution contacting the ion exchange medium. In some embodiments, injection of an alternate phase serves to adjust the oxidation-reduction potential of the liquid resource, wash solution, or acidic solution. In some embodiments, the one or more vessels are configured to flow the liquid resource, wash solution, acidic solution, or alternate phase from the top of the one or more vessels to the bottom of the one or more vessels. In some embodiments, the one or more vessels are configured to flow the liquid resource, wash solution, acidic solution, or alternate phase from the bottom of the one or more vessels to the top of the one or more vessels. In some embodiments, the one or more vessels further comprises filler material. In some embodiments, there are at least two vessels in liquid contact to form a network of multiple vessels. In some embodiments, said liquid resource flows through one vessel and into another vessel sequentially. In some embodiments, said liquid resource flows through a first vessel, through a unit which adjusts the pH of the liquid resource, and into a second vessel. In some embodiments, the ion exchange material comprises porous ion exchange beads. In some embodiments, said ion exchange material comprises porous ion exchange beads with a mean diameter of 50 microns to 100 microns. In some embodiments, said ion exchange material comprises porous ion exchange beads with a mean diameter of 100 microns to 200 microns. In some embodiments, said ion exchange material comprises porous ion exchange beads with a mean diameter of 200 microns to 300 microns. In some embodiments, said ion exchange material comprises porous ion exchange beads with a mean diameter of 200 microns to 400 microns. In some embodiments, said ion exchange material comprises porous ion exchange beads with a mean diameter of 400 microns to 600 microns. In some embodiments, said ion exchange material comprises porous ion exchange beads with a mean diameter of 400 microns to 800 microns. In some embodiments, said ion exchange material comprises porous ion exchange beads with a mean diameter of 50 microns to 800 microns In some embodiments, the one or more vessels further comprises a pH modulating unit for increasing the pH of the liquid resource in the system. In some embodiments, the one or more vessels further comprises a pH modulating unit for neutralizing the pH of the liquid resource. In some embodiments, the one or more vessels further comprises a mesh material used to immobilize the ion exchange material. In some embodiments, the ion exchange material absorbs lithium from the liquid resource while releasing protons. In some embodiments, said ion exchange material is loaded with lithium from the liquid resource, and then the lithium is eluted from said ion exchange material using an acid. In some embodiments, ion exchange material comprises $LiFePO_4$, $LiMnPO_4$, $Li_2TiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$ modifications thereof, solid solutions thereof, or a combination thereof. In some embodiments, said ion exchange material is a coated ion exchange material with a coating that is selected from an oxide, a polymer, or combinations thereof. In some embodiments, said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acidic solution is an acid comprising hydrochloric acid, sulfuric acid, nitric acid, phosphoric acid, hydrobromic acid, hydroiodic acid, perchloric acid, acetic acid, or a combination thereof. In some embodiments, the wash solution consists of pure water. In some embodiments, the wash solution consists of an aqueous solution. In some embodiments, said alternate phase comprises an organic liquid. In some embodiments, said alternate phase comprises an alkane. In some embodiments, said alternate phase comprises a modified alkane liquid. In some embodiments, said alternate phase comprises a hydrocarbon. In some embodiments, said alternate phase comprises an alcohol. In some embodiments, said alternate phase comprises an oil. In some embodiments, said alternate phase comprises a bio-organic oil. In some embodiments, said alternate phase comprises an ester. In some embodiments, said alternate phase comprises an ether. In some embodiments, said alternate phase comprises butane, pentane, hexane, acetone, diethyl ether, butanol, or combinations thereof. In some embodiments, said alternate phase comprises an acid. In some embodiments, said alternate phase comprises an alkali. In some embodiments, the alternate phase is a gas. In some embodiments, said gas comprises air. In some embodiments, said gas comprises nitrogen. In some embodiments, said gas comprises argon. In some embodiments, said gas comprises a combination of gasses. In some embodiments, said gas is a compressed gas. In some embodiments, said gas is a gas under vacuum or partial vacuum. In some embodiments, the alternate phase is injected at a pressure of 0.01-0.1 psig. In some embodiments, the alternate phase is injected at a pressure of 0.1-1 psig. In some embodiments, the alternate phase is injected at a pressure of 1-10 psig. In some embodiments, the alternate phase is injected at a pressure of 10-100 psig. In some embodiments, the alternate phase is injected at a pressure of 100-1000 psig. In some embodiments, said gas is soluble in said liquid resource, said wash solution, or said acidic solution. In some embodiments, the gas is soluble in said liquid resource. In some embodiments, the gas is soluble in said wash solution. In some embodiments, the gas is soluble in said acidic solution. In some embodiments, two or more additional alternate phases are contacted with said ion exchange material. In some embodiments, the one or more vessels further comprises packed beds to house the ion exchange material. In some embodiments, the one or more vessels further comprises fluidized beds to house the ion exchange material. In some embodiments, the one or more vessels further comprises packed beds or fluidized beds to house the ion exchange material. In some embodiments, fluidization of said ion exchange material occurs by means of a mechanical agitator. In some embodiments, fluidization of said ion exchange material occurs by means of contact with one or more alternate phases. In some embodiments, fluidization of said ion exchange material occurs by means of contact with a liquid resource, a wash solution, an acidic solution, one or more alternate phases or combinations thereof. In some embodiments, said ion exchange material is fluidized during contact with said liquid resource. In some embodiments, said ion exchange material is fluidized during contact with said acidic solution. In some embodiments, said ion exchange material is fluidized during contact with said alternate phase. In some embodiments, said ion exchange material is fluidized during contact with said wash solution. In some embodiments, two or more vessels are arranged in series. In some embodiments, said liquid resource contacts said ion exchange material in a plurality of compartments arranged within a vessel.

Disclosed herein is one or more vessels, wherein each of the one or more vessels comprises: i) one or more compartments; ii) a lithium aluminum intercalate; iii) a device configured to inject an alternate phase into said compartments and said ion exchange materials; wherein said one or more vessels are configured to extract lithium ions from a liquid resource.

Disclosed herein is a process for extracting lithium from a liquid resource comprising: (a) contacting a lithium selective sorbent with a liquid resource, wherein the liquid resource comprises lithium ions, and wherein lithium ions in the liquid resource are absorbed by the lithium selective sorbent; (b) contacting said lithium selective sorbent with an acidic solution; and (c) contacting an alternate phase with said lithium selective sorbent, said liquid resource, said acidic solution, or any combination thereof, wherein the alternate phase is a non-aqueous liquid or gas. In some embodiments, the alternate phase of step c) removes the liquid resource from the lithium selective sorbent following step a). In some embodiments, the alternate phase of step c) removes the acidic solution from the lithium selective sorbet following step b). In some embodiments, the process further comprises contacting the lithium selective sorbent with a wash solution. In some embodiments, the wash solution contacts the lithium selective sorbent after the alternate phase has contacted the lithium selected sorbet. In some embodiments, a reduced amount of wash solution is required to reduce the liquid resource or the acidic solution from the surface of the lithium select absorbent as compared to the process without the use of an alternate phase. In some embodiments, said lithium selective sorbent is contacted with said wash solution to at least partly remove said alternate phase from said lithium selective sorbent. In some embodiments, said alternate phase is contacted with said wash solution to at least partly remove said wash solution from said lithium selective sorbent. In some embodiments, said alternate phase is contacted with said liquid resource to at least partly remove said liquid resource from said lithium selective sorbent. In some embodiments, said alternate phase is contacted with said acidic solution to at least partly remove said acidic solution from said lithium selective sorbent. In some embodiments, a first alternate phase is contacted with a second alternate phase to at least partially remove the first alternate phase from said lithium selective sorbent. In some embodiments, said alternate phase is contacted with said wash solution to enhance the removal of said liquid resource, said acidic solution, or said wash solution from said ion exchange material. In some embodiments, said alternate phase is contacted with said liquid resource to enhance absorption of lithium during the contact of said liquid resource with said ion exchange material. In some embodiments, said alternate phase is contacted with said acidic solution to increase the amount of the acidic solution collected. In some embodiments, the increase is at least about 1%, 2%, 3%, 4%, 5%, 6%, 7%, 8%, 9%, 10%, 11%, 12%, 13%, 14%, 15%, or 20%. In some embodiments, the increase is from about 1% to 20%, 5% to 15%, or 5% to 10%. In some embodiments, said alternate phase comprises an organic liquid. In some embodiments, said alternate phase comprises an alkane, alcohol, ester, ether, oil, or any combination thereof. In some embodiments, said alternate phase is a gas. In some embodiments, said gas comprises air, nitrogen, argon, or any combinations thereof. In some embodiments, said gas comprises a compressed gas. In some embodiments, said gas is a gas under vacuum or partial vacuum. In some embodiments, the alternate phase is injected at a pressure of 0.01-1000 psig. In some embodiments, the gas is soluble in said liquid resource, said wash solution, or said acidic solution. In some embodiments, two or more additional alternate phases are contacted with said lithium selective sorbent. In some embodiments, lithium extraction occurs in one or more ion exchange vessels, wherein an ion exchange vessel comprises i) said lithium selective sorbent and ii) one or more ports for the addition of said liquid resource, said acidic solution, and said alternate phase. In some embodiments, said alternate phase is contacted with said lithium selective sorbent housed in said bed to repack the lithium selective sorbent. In some embodiments, the repack of the lithium selective sorbent results in improved flow characteristics of gases or liquids through the bed. In some embodiments, said improved flow characteristics comprises a uniform reduction in pressure. In some embodiments, said lithium selective sorbent is housed in one or more packed beds. In some embodiments, the lithium extraction occurs in one or more fluidized beds comprising said lithium selective sorbent. In some embodiments, said lithium selective sorbent can be fluidized or packed in beds. In some embodiments, the fluidization of said lithium selective sorbent occurs by means of a mechanical agitator. In some embodiments, the fluidization of said lithium selective sorbent occurs by means of contact with one or more alternate phases. In some embodiments, the fluidization of said lithium selective sorbent occurs by means of contact with a liquid resource, a wash solution, an acidic solution, one or more alternate phases or combinations thereof. In some embodiments, said liquid resource contacts said lithium selective sorbent in a plurality of vessels arranged in series. In some embodiments, said liquid resource contacts said lithium selective sorbent in a plurality of compartments arranged within a vessel. In some embodiments, said liquid resource contacts said lithium selective sorbent and the lithium selective sorbent is fluidized by contact with the alternate phase. In some embodiments, fluidization increases the rate of lithium absorption by the lithium selective sorbent. In some embodiments, the alternative phase accelerates the time required for the liquid resource or acidic solution to drain from the one or more beds. In some embodiments, the lithium selective sorbent comprises porous ion exchange beads. In some embodiments, said lithium selective sorbent comprises porous ion exchange beads with a mean diameter of 50 microns to 800 microns. In some embodiments, the process further comprises a pH modulating system for increasing the pH of the liquid resource in the system. In some embodiments, the process further comprises a pH modulating system for neutralizing the pH of the liquid resource. In some embodiments, a porous material is used to immobilize said lithium selective sorbent. In some embodiments, said lithium selective sorbent is selected from and ion exchange material and an adsorbent. In some embodiments, said ion exchange material comprises $LiFePO_4$, $LiMnPO_4$, $Li_2MTiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, the adsorbent comprises a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the adsorbent comprises a lithium aluminum intercalate. In some embodiments, said ion exchange material or adsorbent is a coated with a coating that is selected from an oxide, a polymer, or combinations thereof. In some embodiments, said ion exchange material or adsorbent is a coated with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acidic solution comprises hydrochloric acid, sulfuric acid, nitric acid, phosphoric acid, hydrobromic acid, hydroiodic acid, perchloric acid, acetic acid, or a combination thereof. In some embodiments, wherein the wash solution consists of an aqueous solution or pure water. In some embodiments, the pressure of the alternate phase is modulated. In some embodiments, said modulation results in more efficient contact between a liquid phase and the lithium selective sorbent. In some embodiments, said more efficient contact results in improved utilization of the lithium selective sorbent for lithium extraction.

Described herein is one or more vessels, wherein each of the one or more vessels comprises: (i) one or more compartments; (ii) a lithium selective sorbent; (iii) a device configured to inject an alternate phase into said compartments and said lithium selective sorbent; wherein said one or more vessels are configured to extract lithium ions from a liquid resource, and wherein said alternate phase comprises a non-aqueous solution or gas. In some embodiments, said lithium selective sorbent is configured to contact a liquid resource comprising lithium. In some embodiments, said lithium selective sorbent is configured to contact with a wash solution, wherein the wash solution is an aqueous solution or pure water. In some embodiments, wherein said lithium selective sorbent is configured to contact an acidic solution to elute the loaded lithium while absorbing protons. In some embodiments, said alternate phase is configured to contact with said lithium selective sorbent. In some embodiments, said alternate phase is configured to contact with said lithium selective sorbent to form an ion exchange bed. In some embodiments, said alternate phase is configured to contact with said lithium selective sorbent to form an ion exchange bed with optimal flow characteristics. In some embodiments, the one or more vessels additionally comprises a mixing device. In some embodiments, the one or more vessels additionally comprises one or more pH modulating systems. In some embodiments, the lithium selective sorbent is loaded into said one or more compartments. In some embodiments, the one or more vessels additionally comprises a porous partition between said one or more compartments. In some embodiments, the one or more vessels are cylindrical vessels containing an interior compartment loaded with lithium selective sorbent, configured such that said liquid resource flows through said lithium selective sorbent in a direction that is oriented radially to said cylindrical vessels. In some embodiments, the one or more vessels are cylindrical vessel containing lithium selective sorbent located between two concentric porous cylindrical structures. In some embodiments, the one or more vessels additionally comprises a porous pipe near the center of the one or more vessels, wherein the porous pipe is configured to allow the flow of a liquid or alternate phase through the lithium selective sorbent in a direction oriented radially to the vessel. In some embodiments, the one or more vessels additionally comprises a vessel housing, wherein said vessel housing comprises an inner cylindrical vessel and an outer cylindrical vessel, wherein said lithium selective sorbent is housed between said inner cylindrical vessel and said outer cylindrical vessel. In some embodiments, said inner cylindrical vessel and said outer cylindrical vessel are permeable to facilitate flow of said liquid resource through said lithium selective sorbent. In some embodiments, said inner cylindrical vessel and/or said outer cylindrical vessel are fixed with holes, slits, nozzles, meshes, or a combination thereof to facilitate flow of a liquid resource, acidic solution, wash solution, or alternate phase through said lithium selective sorbent while containing said lithium selective sorbent inside of said vessel housing. In some embodiments, a liquid flows in a radial orientation through said lithium selective sorbent from near the outside of said vessel to near the inside of said vessel. In some embodiments, a liquid flows in a radial orientation through said lithium selective sorbent from near the inside of said vessel to near the outside of said vessel. In some embodiments, the one or more vessels additionally comprises a internal flow distributors. In some embodiments, the vessel is configured to be loaded with said lithium selective sorbent, said liquid resource, a wash solution, an acidic solution, and an alternate phase. In some embodiments, the liquid resource, the wash solution, the acidic solution, and the alternate phase enters into the one or more vessels from two or more flow distributors. In some embodiments, the two or more flow distributors are located at opposing ends of each of said one or more vessels. In some embodiments, the liquid resource, the wash solution, the acidic solution, and the alternate phase exit each of said one or more vessels from one or more flow distributors. In some embodiments, the one or more flow distributors are located near the center point between said two opposite ends of each of the one or more vessels. In some embodiments, the one or more vessels further comprises one or more candles, wherein each of said one or more candles comprises two concentric structures that are i) permeable to flow of said liquid resource, an acidic solution, a wash solution, or an alternate phase and ii) contain lithium selective sorbent. In some embodiments, the one or more vessels further comprises a volume filled with an alternate phase; a mechanism to control the fluid level inside said one or more vessels. In some embodiments, the fluid level of a liquid resource, a washing solution, or an acidic solution is adjusted by adjusting a pressure of the alternate phase within the volume filled thereby. In some embodiments, the fluid level of a liquid resource, a washing solution, or an acidic solution is adjusted by adjusting a flow rate of the alternate phase entering or exiting the one or more vessels. In some embodiments, the fluid level of a liquid resource, a washing solution, or an acidic solution is adjusted by adjusting an opening of a valve at the bottom of the one or more vessels. In some embodiments, the lithium selective sorbent is fully submerged in the liquid resource, acidic solution, wash solution, or alternate phase. In some embodiments, the lithium selective sorbent is partially submerged in the liquid lithium resource, acidic solution, wash solution, or alternate phase. In some embodiments, the device comprises holes, slits, nozzles, meshes, spargers, or orifices to inject the alternate phase into the vessel. In some embodiments, said injection occurs below a bed comprising the lithium selective sorbent. In some embodiments, said injection occurs above a bed comprising the lithium selective sorbent. In some embodiments, said injection occurs inside a bed comprising the lithium selective sorbent. In some embodiments, said injection occurs below, above, or inside, a bed comprising the lithium selective sorbent. In some embodiments, said injection occurs in a combination of below, above, or inside the bed. In some embodiments, injection of an alternate phase improves the distribution of the flow of a liquid lithium resource, wash solution, or acidic solution. In some embodiments, injection of an alternate phase serves to adjust the pH of the liquid resource, wash solution, or acidic solution contacting the lithium selective sorbent. In some embodiments, injection of an alternate phase serves to adjust the oxidation-reduction potential of the liquid resource, wash solution, or acidic solution. In some embodiments, the one or more vessels are configured to flow the liquid resource, wash solution, acidic solution, or alternate phase from the top of the one or more vessels to the bottom of the one or more vessels. In some embodiments, the one or more vessels are configured to flow the liquid resource, wash solution, acidic solution, or alternate phase from the bottom of the one or more vessels to the top of the one or more vessels. In some embodiments, the one or more vessels further comprises filler material. In some embodiments, there are at least two vessels in liquid contact to form a network of multiple vessels. In some embodiments, said liquid resource flows through one vessel and into another vessel sequentially. In some embodiments, said liquid resource flows through a first vessel, through a unit which adjusts the pH of the liquid resource, and into a second vessel. In some embodiments, the lithium selective sorbent comprises porous ion exchange beads. In some embodiments, said lithium selective sorbent comprises porous ion exchange beads with a mean diameter of 50 microns to 800 microns In some embodiments, the one or more vessels further comprises a pH modulating unit for increasing the pH of the liquid resource in the system. In some embodiments, the one or more vessels further comprises a pH modulating unit for neutralizing the pH of the liquid resource. In some embodiments, the one or more vessels further comprises a mesh material used to immobilize the lithium selective sorbent. In some embodiments, the lithium selective sorbent absorbs lithium from the liquid resource while releasing protons. In some embodiments, said lithium selective sorbent is loaded with lithium from the liquid resource, and then the lithium is eluted from said lithium selective sorbent using an acid. In some embodiments, said lithium selective sorbent is selected from and ion exchange material and an adsorbent. In some embodiments, said ion exchange material comprises $LiFePO_4$, $LiMnPO_4$, $Li_2MTiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, the adsorbent comprises a crystalline lithium salt aluminate, a lithium aluminum intercalate, $LiCl·2Al(OH)_3$, crystalline aluminum trihydroxide $(Al(OH)_3)$, gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the adsorbent comprises a lithium aluminum intercalate. In some embodiments, said lithium selective sorbent is a coated with a coating that is selected from an oxide, a polymer, or combinations thereof. In some embodiments, said lithium selective sorbent is a coated with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acidic solution is an acid comprising hydrochloric acid, sulfuric acid, nitric acid, phosphoric acid, hydrobromic acid, hydroiodic acid, perchloric acid, acetic acid, or a combination thereof. In some embodiments, the wash solution consists of an aqueous solution or pure water. In some embodiments, said alternate phase comprises an organic liquid. In some embodiments, said alternate phase comprises an alkane alcohol, ester, ether, oil, or any combination thereof. In some embodiments, the alternate phase is a gas. In some embodiments, said gas comprises air, nitrogen, argon, or any combinations thereof. In some embodiments, said gas is a compressed gas. In some embodiments, said gas is a gas under vacuum or partial vacuum. In some embodiments, the alternate phase is injected at a pressure of 0.01-1000 psig. In some embodiments, said gas is soluble in said liquid resource, said wash solution, or said acidic solution. In some embodiments, two or more additional alternate phases are contacted with said lithium selective sorbent. In some embodiments, the one or more vessels further comprises packed beds or fluidized beds to house the lithium selective sorbent. In some embodiments, fluidization of said lithium selective sorbent occurs by means of a mechanical agitator. In some embodiments, sorbent occurs by means of contact with one or more alternate phases. In some embodiments, fluidization of said lithium selective sorbent occurs by means of contact with a liquid resource, a wash solution, an acidic solution, one or more alternate phases or combinations thereof. In some embodiments, two or more vessels are arranged in series. In some embodiments, said liquid resource contacts said lithium selective sorbent in a plurality of compartments arranged within a vessel.

EXAMPLES

Example 1: Lithium Extraction with a Vessel Comprising Filter Banks Loaded with Ion Exchange Materials Contacted with a Hexane Alternate Phase Lithium is extracted from a liquid resource (e.g. a brine) using a vessel comprising filter banks filled with ion exchange beads arranged along the length of the vessel, with parallel flow to and from each filter bank. (FIG. 1). Each filter bank acts as an individual ion-exchange compartment.

The internal characteristics of the vessel are shown in FIG. 1. The vessel is rectangular and arranged horizontally, is approximately 40 cm long, and has a width and height of approximately 20 cm. It is constructed of epoxy-coated carbon steel with ceramic internal divisions. The vessel consists of 3 filter banks that act as ion-exchange compartments (103) and empty pipes that distribute the flow to each of the three filter banks and collect the outlet flow from each of the three filter banks. The liquid delivery and collection systems are independent of each other. Inlet and outlet flow distribution systems connect to each other only through the ion-exchange compartments. The pipes that distribute flow are rectangular with a width and diameter of 2.5 cm.

The ion-exchange compartments (103) are 15 cm wide and 15 cm tall, with a length of 10 cm. The inlet and outlet of the ion-exchange bead compartment consists of a polyetherketone mesh with 25 micron pore size, to prevent escape of beads. In each ion exchange compartment, fluid is transported by pressure-driven flow through the ion exchange bed, through the polymer support, and into the fluid collection system. Even flow to each ion-exchange compartment is ensured because the pressure-drop across the ion-exchange bead is 120 times larger than pressure drop due to frictional losses in the inlet and outlet flow distribution systems.

The lithium selective sorbent are porous ion exchange beads. The porous ion-exchange beads are loaded into each of the ion-exchange compartments by mechanically separating each compartment, and loading the ion exchange beads in the interstitial space. The porous ion exchange beads are comprised of ion exchange particles and a polymer matrix. The ion exchange particles are coated ion exchange particles comprised of a $Li_2TiO_3$ core with a $ZrO_2$ coating. The particles are approximately spherical with a mean diameter of 10.0 microns to 30.0 microns, and the coating thickness is approximately 15.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 200 micron average diameter.

The brine from which lithium is extracted consists of a natural aqueous chloride solution containing approximately 1000 ppm Li, 80,000 mg/L Na, 5,000 mg/L Ca, and 10,000 mg/L Mg, and other chemical species including K and chloride. When this liquid resource enters the vessel, the pressure needed to flow said resource at a rate of 10 L/min is 5 psi. Flow through this ion exchange material results in an outlet flow that contains approximately 120 ppm Li, 80,000 mg/L Na, 5,000 mg/L Ca, and 10,000 mg/L Mg, and other chemical species including K and chloride.

The liquid resource flows into the vessel from a side flange (101), where it flows into the flow distribution pipes which delivers them to each one of the ion-exchange chambers. The liquid flows through the above-mentioned mesh, through the bed of ion-exchange beads (103), out of the above-mentioned mesh, and into the outlet flow distribution pipes. Lithium is extracted from said liquid resource during this flow, and protons are released. The collected effluent then exits through a flange (102) on the other side of the ion-exchange vessel.

After said brine is contacted with the ion exchange material for one hour, the contents of the tank are completely drained by injecting an alternate phase consisting of hexane through the side flange (101) and collecting the liquid resource and hexane through the outlet flange (102). This removes all the liquid resource entrained within the ion exchange beads. Hexane and the entrained brine are separated in a liquid-liquid separator, and the hexane is reused.

The enriched lithium selective sorbent, also termed lithiated ion exchange beads here, are then treated with an eluent, sulfuric acid, for 5 minutes to yield an enriched eluate, lithium sulfate in solution. This pure lithium sulfate liquid enriched eluate is then collected as the product through the bottom of the vessel (102). To drain said enriched eluate from said vessel completely, hexane is added through the side flange (101) and collected through the outlet flange (102). This removes all the enriched eluate entrained within the ion exchange beads without the need for an aqueous solution wash.

Figure 2:
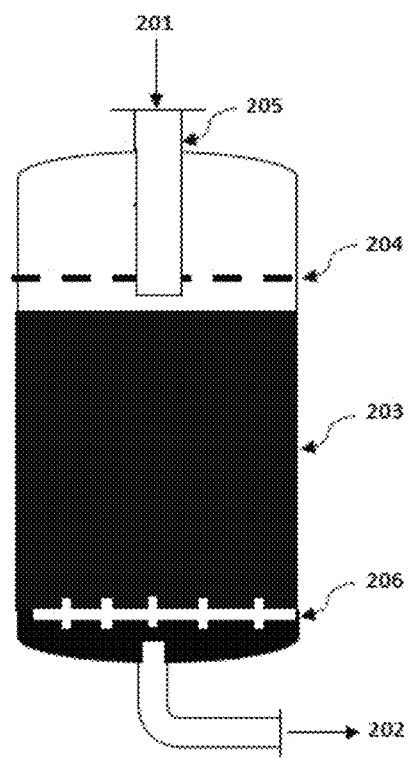
FIG. 2 illustrates a vessel comprising fluid level controllers loaded with ion exchange beads, wherein an alternate phase comprising air is used to enhance lithium extraction by ion exchange.

Example 2: Lithium Extraction with a Vessel Comprising Fluid Level Controllers Loaded with Ion Exchange Beads Contacted with an Air Alternate Phase Lithium was extracted from a brine using a vessel containing ion-exchange beads, where the fluid level in the vessel was controlled to fully submerge ion exchange beads (FIG. 2). The internal characteristics of the vessel comprising fluid level controllers is shown in FIG. 2. The vessel was cylindrical and arranged vertically, was approximately 150 cm tall, and has a diameter of approximately 20 cm. It was constructed of PVC.

Fluid flowed into the vessel from a top flange (201) into a dome at the top of the vessel, where it flows through a pipe (205), to the main fluid level (204). The fluid level was constantly monitored using a level switch, and the level was adjusted continuously to remain at a height such that the ion-exchange material was constantly submerged (204). The liquid level of the tank was maintained at 80 cm from the bottom of the vessel. Control of the fluid level was achieved via an on-off controller that controls a pump that flows fluid into the vessel. The top of the tank was maintained at a constant pressure of 15 psi by means of the pump delivering brine into the vessel. The bottom of the tank contains an air distribution manifold containing nozzles from which air could be injected into the bottom of the ion exchange bed (206).

The ion-exchange beads partially fill the volume of the vessel. The height of the ion exchange beads (203) was 70 cm from the bottom of the vessel, and the top 70 cm of the vessel are filled with gas. The outlet of the vessel comprises a porous polymer support consisting of a polyether ether ketone mesh with 35 micron pore size, to prevent escape of beads. Fluid was transported by pressure-driven flow through the ion exchange bed, through the polymer support, and through the bottom outlet of the vessel (202).

The ion-exchange beads were conveyed into the vessel when initially loaded, by mechanically removing the top-dome of the vessel which was attached through to the rest of the vessel through a bolted PVC flange. The ion exchange vessel was loaded with a packed bed of porous ion exchange beads. The porous ion exchange beads are comprised of coated ion exchange particles and a polymer matrix. The ion exchange particles are coated ion exchange particles comprised of a $Li_2Mn_2O_5$ core with a PVC coating. The particles are approximately spherical with a mean diameter of 5 microns to 10 microns, and the coating thickness was approximately 6.0 nm. The polymer matrix was comprised of polyvinylidene difluoride. The porous beads contain porous networks with a controlled distribution of pore sizes providing diffusion channels from the bead surface into the bead interior and to the ion exchange particles. The beads have a 200 micron average diameter.

The brine from which lithium was extracted consists of a natural aqueous chloride solution containing approximately 150 ppm Li, 80,000 mg/L Na, 5,000 mg/L Ca, and 5,000 mg/L Mg, and other chemical species including K and chloride. Flow through this ion exchange material resulted in an outlet flow that contains approximately 25 ppm Li, 80,000 mg/L Na, 5,000 mg/L Ca, and 5,000 mg/L Mg, and other chemical species including K and chloride While a liquid resource flowed into an initially empty vessel though the top dome (201) it contacted the ion exchange beads which absorb lithium and release protons. Concurrently, air pressurized at a pressure of 15 psi was injected through the bottom air distribution manifold (206) for a duration of 30 seconds. After this time, air flow was stopped, and the liquid resource flowed out from the bottom flange (202) by pressure driven flow, while the particles were maintained in suspension by use of an agitator. Said air injection results in turbulence and mixing between the ion exchange material and the liquid resource. This air injection helped suspend the ion exchange beads into the brine resource, and reduced the contact time required to achieve the aforementioned lithium recovery, to 30 minutes as compared to 90 minutes in the absence of contact with an air alternate phase.

Figure 3:
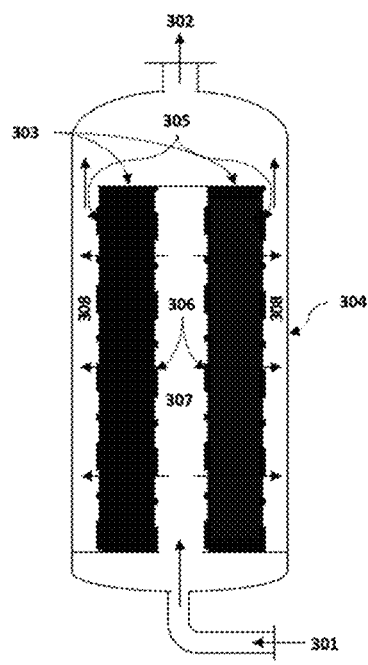
FIG. 3 illustrates a vessel comprising radial-flow ion-exchange packed beds, wherein an alternate phase comprising air is used to enhance lithium extraction by ion exchange.

Example 3: Lithium Extraction with a Bed of Coated Ion-Exchange Particles with Radial Flow Configuration Contacted and an Air Alternate Phase Lithium was extracted from a brine using a vessel containing ion-exchange beads packed in radial-flow beds with minimal flow resistance (FIG. 3). The internal characteristics of the radial-flow ion exchange vessel is shown in FIG. 3. The vessel was cylindrical and arranged vertically, was approximately 40 cm tall, and has a diameter of approximately 12 cm. It was constructed of stainless steel, polyethylene, and PVC plastic.

A liquid resource or other process fluid flowed into the ion exchange column from a flange at the bottom of the vessel (301). Fluid passes from the inner flow-distribution compartment (307), through the inner-perforated wall (306), through ion-exchange bead compartment (303), through the outer-perforated wall (305) and into the outer-flow distribution compartment (308). From there, the fluid flowed into the top of the vessel and exits the vessel through a tope flanged connection (302).

This inner-flow distribution compartment (307) was defined by a cylinder with a diameter of approximately 10 cm that lies within the inner porous partition (306). The outer-flow distribution compartment (308) was defined by the annular region between the outer-porous partition (308), with a diameter of approximately 8 cm, and the vessel-outer wall (304), with a diameter of 12 cm. The ion-exchange bead compartment was defined by the annular region between the outer-perforated wall, with a diameter of approximately 8 cm, and the inner-perforated wall, with a diameter of approximately 3 cm. Therefore, the total flow path through the annular ion-exchange bed was approximately 2.5 cm.

These compartments were separated by a porous polyethylene wall with 10 micron pore size. The porous polymer support contains the ion exchange beads within the ion-exchange compartment, and allows fluid to flow into and out from the ion-exchange bead compartment without conveying the ion-exchange beads from this compartment.

The ion exchange column was loaded with porous ion exchange beads. The porous ion exchange beads were comprised of ion exchange particles and a polymer matrix. The ion exchange particles were uncoated ion exchange particles comprised of an uncoated $LiMn_2O_4$ core. The particles were approximately spherical with a mean diameter of 5 to 10 microns. The polymer matrix was comprised of polyvinylidene difluoride. The porous beads contain porous networks with a controlled distribution of pore sizes providing diffusion channels from the bead surface into the bead interior and to the ion exchange particles. The beads have a 210 micron average diameter.

The brine from which lithium was extracted consists of a natural aqueous chloride solution containing approximately 300 ppm Li, 80,000 mg/L Na, 5,000 mg/L K, 500 mg/L Ca, and 5,000 mg/L Mg, and other chemical species including sulfates. Flow through this ion exchange material results in an outlet flow that contains 100 ppm Li, 80,000 mg/L Na, 5,000 mg/L K, 500 mg/L Ca, and 5,000 mg/L Mg, and other chemical species including sulfates. This flow results in the ion exchange beads becoming saturated in lithium.

After lithium uptake by the ion exchange beads ceases, the flow of the brine is terminated, and an alternate phase consisting of air was injected the top flanged connection (302) at a pressure of 5 psi, until all the entrained brine is removed from the ion exchange bed (303) through the bottom flange (301). This ensures that the ion exchange beads were devoid of residual brine. The ion exchange beads were then contacted with tap water flowing from the bottom flange (301), radially through the ion exchange bed (303) and out of the top flanged connection (302). Contacting the ion exchange beads with an alternate air phase prior to washing with a water solution results in enhanced removal of any residual entrained brine.

The lithium-saturated beads were then treated with hydrochloric acid for 5 minutes to yield lithium chloride in solution. Lithium in the acidic chloride solution was eluted at a lithium concentration of 1000 mg/L, while the concentration of sodium in the acidic chloride solution was below 400 mg/L. The use of an air alternate phase to aid the removal of entrained brine resulted in a consumption of 30 L of water to reach a sodium concentration below 400 mg/L in the enriched eluate, as compared to 200 L of water to reach the same sodium concentration in the absence of an alternate phase.

Figure 4:
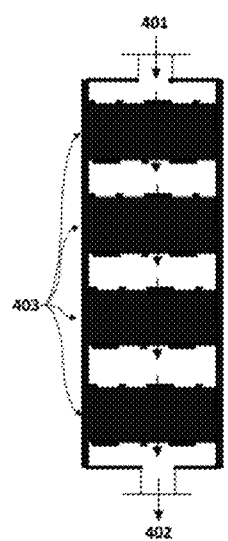
FIG. 4 illustrates a vessel comprising trays loaded with ion exchange beads, wherein an alternate phase comprising nitrogen is used to enhance lithium extraction by ion exchange.

Example 4: Lithium Extraction with a Vessel Comprising Trays Loaded with Ion Exchange Beads Contacted with a Nitrogen Alternate Phase Lithium is extracted from a brine using a vessel comprising trays loaded with ion exchange beads. The trays were stacked vertically along the height of the vessel (FIG. 4). Each tray acts as an individual ion-exchange compartment. The internal characteristics of the vessel are shown in FIG. 4. The vessel is rectangular and arranged vertically, is approximately 100 cm long, and has a width and height of approximately 10 cm. It is constructed of carbon steel that is coated with a 1 mm of polytetrafluoroethylene. The vessel consists of four trays that are loaded with ion-exchange beads (403).

The liquid resource flows into the vessel from a top flange (401), where it flows into the first ion-exchange tray. The liquid flows through the ion-exchange bed on the tray, and into the next tray, eventually flowing through all four ion-exchange trays. The collected effluent then exits through a flange on the bottom of the ion-exchange vessel (402).

The ion-exchange tray supports an ion-exchange bed that is approximately 15 cm thick and 10 cm in width. The tray is structurally reinforced with metal to support the pressure on the tray. The inlet and outlet of the ion-exchange bead tray consists of a polymer screen with 50 micron slits, to prevent escape of beads. The ion-exchange beads are loaded into each of the ion-exchange compartments by mechanically separating each tray, and loading the ion exchange beads mesh. In each tray, fluid is transported by pressure-driven flow through the ion exchange bed, through the slits and polymer mesh, and into the liquid collection system.

The porous ion exchange beads are comprised of ion exchange particles and a polymer matrix. The ion exchange particles are coated ion exchange particles comprised of a $Li_4Mn_5O_{12}$ core with a $TiO_2$ coating. The particles are approximately spherical with a mean diameter of 5 microns, the coating is approximately 2 nm thick. The porous beads contain porous networks with a controlled distribution of pore sizes providing diffusion channels from the bead surface into the bead interior and to the ion exchange particles. The polymer matrix is comprised of polyvinyl chloride. The beads have a 90 micron average diameter.

The brine from which lithium is extracted consists of a natural aqueous chloride solution containing approximately 2500 ppm Li, 60,000 mg/L Na, 1,000 mg/L K, 250 mg/L Ca, and 1,000 mg/L Mg, and other chemical species including sulphates. Flow through this ion exchange material results in an outlet flow that contains approximately 200 ppm Li, 60,000 mg/L Na, 1,000 mg/L K, 250 mg/L Ca, and 1,000 mg/L Mg, and other chemical species including sulphates.

After lithium uptake by the ion exchange beads ceases, the flow of the brine is terminated, and an alternate phase consisting of nitrogen is injected from the top flanged connection (401) at a pressure of 5 psi, until all brine entrained in the beads and interstitial space between the tray is removed from the vessel. This ensures that the ion exchange beads are devoid of residual brine. Contacting the ion exchange beads with an alternate nitrogen phase results in removal of any residual entrained brine without the use of water.

The lithium-saturated beads are then treated with hydrochloric acid for 25 minutes to yield lithium chloride in solution. Lithium in the acidic chloride solution is eluted at a lithium concentration of 1,500 mg/L, while the concentration of sodium in the acidic chloride solution was below 500 mg/L.

Figure 5:
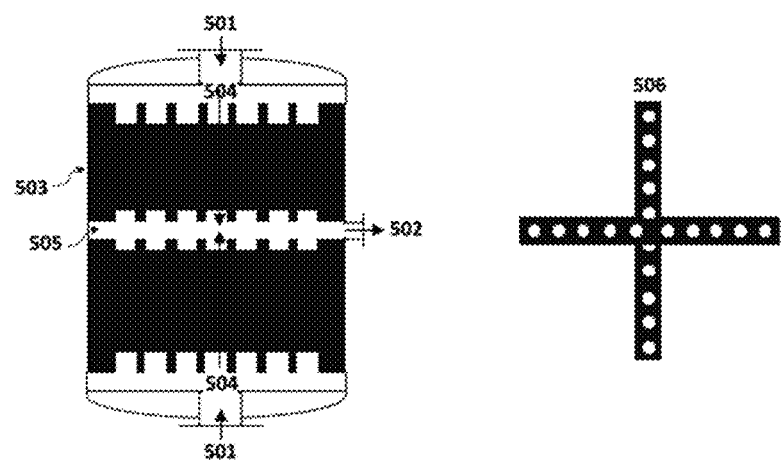
FIG. 5 illustrates a vessel comprising internal flow distributors loaded with ion exchange beads, wherein an alternate phase comprising air is used to enhance lithium extraction by ion exchange.

Example 5: Lithium Extraction with a Vessel Comprising Internal Flow Distributors Contacted with an Air Alternate Phase Lithium is extracted from a brine using a vessel comprising internal flow distributors. (FIG. 5). The internal characteristics of the vessel are shown in FIG. 5. The vessel is cylindrical and arranged vertically, is approximately 120 cm long, and has a diameter of 60 cm. It is constructed of fiberglass. The vessel is oriented vertically.

The vessel contains one internal compartment where ion-exchange beads are loaded (503). Said ion-exchange compartment further contains three flow distributors (top view shown in 506). Two flow distributors deliver brine into the top and the bottom of the ion-exchange compartment (504). One flow distributor located at the half-way vertical point of the ion-exchange bed collects liquid that has undergone ion-exchange and removes it from the ion-exchange bed (505). The flow distributors are composed of perforated polyvinyl chloride pipe. Each flow distributor is surrounded by a polyester mesh with an average 20 micron pore size, to prevent fluid from conveying beads out of the ion-exchange compartment.

The liquid resource flows into the vessel from top and bottom flanges (501), where it flows into the top and bottom flow distributors (504). This distributor ensures uniform flow of the liquid resource into the ion-exchange bead compartment. The liquid resource flows through the ion-exchange beads (503), and into the liquid distributor in the middle of the tank (505). This latter distributor collects the resource that has undergone ion-exchange, which exits the vessel through a flange at the side (502).

The ion exchange medium is loaded by opening up the top of the vessel through a flanged opening, and closing the vessel. The ion-exchange beads occupy the entirety of the vessel. The flow distributors are submerged within the ion-exchange beads. The porous ion exchange beads are comprised of ion exchange particles and a polymer matrix. The ion exchange particles are coated ion exchange particles comprised of a $Li_4Mn_5O_{12}$ core with a $TiO_2$ coating. The particles are approximately spherical with a mean diameter of 5 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 150 micron average diameter.

The brine from which lithium is extracted consists of a natural aqueous chloride solution containing approximately 850 ppm Li, 20,000 mg/L Na, 20,000 mg/L Ca, and 20,000 mg/L Mg, and other chemical species including K and sulphates. When this liquid resource enters the vessel, the pressure is 150 psi. Flow through this ion exchange material results in an outlet flow that contains approximately 85 ppm Li, 20,000 mg/L Na, 20,000 mg/L Ca, and 20,000 mg/L Mg, and other chemical species including K and sulphates.

After lithium uptake by the ion exchange beads ceases, the flow of the brine is terminated, and an alternate phase consisting of air is injected from the inlet connections (501) at a pressure of 10 psi, until all brine entrained in the beads and interstitial space is removed from the vessel through the outlet connection (502). This ensures that the ion exchange beads are devoid of residual brine. Contacting the ion exchange beads with an alternate nitrogen phase results in removal of any residual entrained brine without the use of water.

The lithium-saturated beads are then treated with sulfuric acid for 15 minutes to yield lithium sulfate in solution (termed enriched eluant or acidic eluant). Lithium in the acidic sulfate solution is eluted at a lithium concentration of 1,000 mg/L, while the concentration of sodium in the acidic sulfate solution was below 500 mg/L. The enriched eluent is removed from the vessel by pumping, followed by using an air alternate phase to displace enriched eluent that is entrained between the ion exchange beads. This results in a recovering 99% of enriched eluent with which the ion exchange beads are treated, as compared to 90% recovery of enriched eluent when draining occurs by pumping only.

Figure 6:
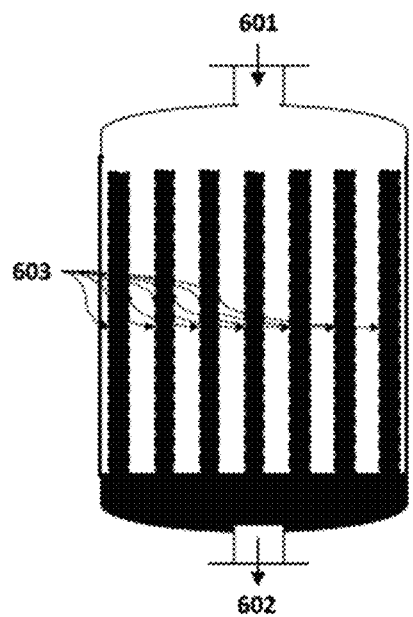
FIG. 6 illustrates a vessel comprising ion exchange beads loaded into flow distributors, wherein an alternate phase comprising air is used to enhance lithium extraction by ion exchange.

Example 6: Lithium Extraction with a Vessel Comprising Ion Exchange Beads Loaded into a Flow Distributor Contacted with an Air Alternate Phase Lithium is extracted from a brine using a vessel comprising internal flow distributors that are filled with ion exchange beads (FIG. 6). The internal characteristics of the vessel are shown in FIG. 6. The vessel is cylindrical, is approximately 100 cm long, and has a diameter of 120 cm. It is constructed of titanium. The vessel contains thirty narrow cylindrical compartments with perforated walls (603) that are connected to an outlet at the bottom of the ion exchange vessel (602).

The perforated compartments consist of a cylindrical perforated polyvinyl chloride pipe that is 15 cm in diameter. All pipes are surrounded by a polyether ketone mesh with an average 50 micron pore size, to prevent fluid from conveying beads out of the ion-exchange compartment. The ion exchange medium is loaded into the inside of the compartments by pumping a slurry of the ion-exchange material into the compartments.

Under operation, the liquid resource flows into the vessel from a top flange (601), where it flows into compartment that is spanned by the perforated compartments containing ion exchange beads. This compartment becomes filled with liquid, which is then pushed into the perforated pipes through the perforations and retaining mesh described above. The fluid then flows through the bed of ion exchange particles (603) and through the internal perforated pipes inside the compartments, and eventually exits the bottom of the vessel (602).

The porous ion exchange beads are comprised of ion exchange particles and a polymer matrix. The ion exchange particles are coated ion exchange particles comprised of a $Li_4Sn_5O_{12}$ core with a $ZrO_2$ coating. The particles are approximately spherical with a mean diameter of 5 microns, the coating is approximately 10 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 200 micron average diameter.

The brine from which lithium is extracted consists of a natural aqueous chloride solution containing approximately 250 ppm Li, 20,000 mg/L Na, 500 mg/L Ca, and 20,000 mg/L Mg, and other chemical species including K and sulphates. Flow through this ion exchange material results in an outlet flow that contains approximately 50 ppm Li, 20,000 mg/L Na, 500 mg/L Ca, and 20,000 mg/L Mg, and other chemical species including K and sulphates.

After lithium uptake by the ion exchange beads ceases, the flow of the brine is terminated, and an alternate phase consisting of air is injected from the inlet connections (601)

at a pressure of 5 psi, and liquid entrained in the beads is displaced by said air and through the outlet connection (602). This ensures that the ion exchange beads are devoid of residual brine. Contacting the ion exchange beads with an alternate phase results in removal of any residual entrained brine without the use of water.

The lithium-saturated beads are then treated with sulfuric acid for 5 minutes to yield lithium sulfate in solution (termed enriched eluant or acidic eluant). Lithium in the acidic sulfate solution is eluted at a lithium concentration of 2,000 mg/L, while the concentration of sodium in the acidic sulfate solution was below 500 mg/L. The enriched eluent is removed from the vessel by pumping, followed by using an air alternate phase to displace enriched eluent that is entrained between the ion exchange beads. This results in a recovering 99% of enriched eluent with which the ion exchange beads are treated, as compared to 90% recovery of enriched eluent when draining occurs by pumping only.

Example 7: Lithium Extraction with a Vessel Comprising Fluid Level Controllers Loaded with Ion Exchange Beads Contacted with an Air Gas Alternate Phase Lithium was extracted from a brine using a vessel containing ion-exchange beads, where the fluid level in the vessel was controlled to fully submerge said ion exchange beads (FIG. 7). The internal characteristics of the vessel comprising fluid level controllers is shown in FIG. 7. The vessel was cylindrical and arranged vertically, was approximately 110 cm tall, and has a diameter of approximately 20 cm. It was constructed of polyvinyl chloride and titanium.

Fluid flowed into the vessel from a top flange (701) into the top of the vessel, where it flowed through a 3 cm diameter and 5 cm long pipe (705), to the main fluid level (704). The fluid level was constantly monitored using an ultrasonic level switch, and the level was adjusted continuously to remain at a height such that the ion-exchange material was constantly submerged (704). The liquid level of the tank was maintained at 75 cm from the bottom of the vessel. Control of the fluid level was achieved via an on-off controller that controlled the pump that adds liquid into the tank. The top of the tank was maintained at a constant pressure of 14 psi by addition of liquid into the vessel until the backpressure regulator reached this set pressure and released gas in the tank's headspace.

The ion-exchange beads partially fill the volume of the vessel. The height of the ion exchange beads (703) was 15 cm from the bottom of the vessel, and the top 40 cm of the vessel were filled with an air alternate phase. The outlet of the vessel comprises a porous Hastelloy partition (706) with 20 micron opening to prevent escape of beads. Fluid was transported by pressure-driven flow through the ion exchange bed, through the porous partition, and through the bottom outlet of the vessel (702).

The ion-exchange beads (703) were conveyed into the vessel when initially loaded, by mechanically removing the top-dome of the vessel which was attached through to the rest of the vessel through a bolted carbon steel flange. The porous ion exchange beads were comprised of coated ion exchange particles and a polymer matrix. The ion exchange particles were coated ion exchange particles comprised of a $Li_2TiO_3$ core with a $ZrO_2$ coating. The particles were approximately spherical with a mean diameter of 25.0 microns to 40.0 microns, and the coating thickness was approximately 3.0 nm. The polymer matrix was comprised of polyvinylidene difluoride. The porous beads contain porous networks with a controlled distribution of pore sizes providing diffusion channels from the bead surface into the bead interior and to the ion exchange particles. The beads have a 400 micron average diameter.

The brine from which lithium was extracted consists of a natural aqueous chloride solution containing approximately 2100 ppm Li, 75,000 mg/L Na, 500 mg/L Ca, and 15,000 mg/L Mg, and other chemical species including K, chloride, and sulfate. The liquid resource was contacted with the ion exchange beads for 90 minutes. Contact of the liquid resource with the ion exchange beads resulted in an outlet flow that contains approximately 200 ppm Li, 75,000 mg/L Na, 500 mg/L Ca, and 15,000 mg/L Mg, and other chemical species including K, chloride, and sulfate.

After said liquid resource was contacted with the ion exchange material, the contents of the tank were completely drained by maintaining the 14 psi of pressure of the air alternate phase in the top of the vessel, until all the brine exits through the bottom of the vessel (702), and air blows through the bed of ion exchange beads to remove entrained brine. This ensures that the ion exchange medium was devoid of residual brine. The ion exchange beads were then contacted with industrial water to remove trace amounts of brine on the surface of the ion exchange breads.

The lithium-saturated beads were then treated with hydrochloric acid for 20 minutes to yield lithium chloride in solution. Lithium in the acidic chloride solution was eluted at a lithium concentration of 2,500 mg/L, while the concentration of sodium in the acidic chloride solution was below 500 mg/L.

The use of an air alternate phase at a pressure of 14 psi decreases the time to drain the vessel to 2 minutes, when compared with a drain time of 25 minute when the vessel was open to the atmosphere and the drain was driven by gravity only. Additionally, the blow of an air alternate phase through the bed of ion exchange material results in removal of brine entrained between the ion exchange beads after the brine is drained from the vessel, resulting in a decrease in the amount of industrial water necessary to remove trace of brine on the surface of the ion exchange beads, relative to the case where the alternate phase is not used.

Example 8: Lithium Extraction with a Vessel Comprising Fluid Level Controllers Loaded with Ion Exchange Beads and Inert Packing Contacted with an Air Gas Alternate Phase Lithium is extracted from a brine using a vessel containing ion-exchange beads, where the fluid level in the vessel is controlled to fully submerge ion exchange beads (FIG. 8).

Figure 8:
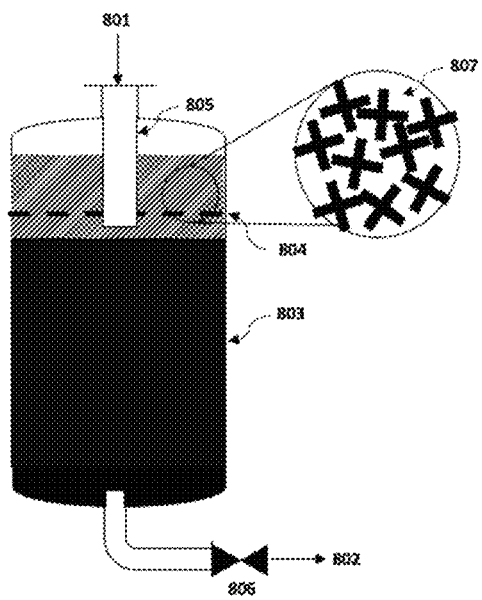
FIG. 8 illustrates a vessel comprising fluid level controllers loaded with ion exchange beads and inert packing, wherein an alternate phase comprising air is used to enhance lithium extraction by ion exchange.

The internal characteristics of the vessel comprising fluid level controllers is shown in FIG. 8. The vessel is cylindrical and arranged vertically, is approximately 180 cm tall, and has a diameter of approximately 120 cm. It is constructed of polyvinyl chloride.

Fluid flows into the vessel from a top flange (801) into a dome at the top of the vessel, where it flowed through a 5 cm diameter and 20 cm long pipe (805), to the main fluid level (804). The fluid level is constantly monitored using an ultrasonic level sensor, and the level is adjusted continuously to remain at a height such that the ion-exchange media is constantly submerged (804). The liquid level of the tank is maintained at 120 cm from the bottom of the vessel. Control of the fluid level is achieved via a proportional-integral-derivative controller that modulates the aperture of the valve (806) at the bottom of the tank. The tank is maintained at a constant pressure of 25 psi by means of the pump delivering brine into the vessel.

The ion-exchange beads partially fill the volume of the vessel. The height of the ion exchange beads (803) is 25 cm from the bottom of the vessel. The outlet of the vessel comprises a permeable tray comprising a polyether mesh with 45 micron pore size, to prevent escape of beads. Fluid is transported by pressure-driven flow through the ion exchange bed, through the polymer support, and through the bottom outlet of the vessel (802).

The ion-exchange beads are conveyed into the vessel when initially loaded, by mechanically removing the top-dome of the vessel which is attached through to the rest of the vessel through a bolted stainless-steel flange. Once ion-exchange beads are loaded, the remaining empty space within the vessel is filled up with an inert packing material (807), comprising titanium cross-shaped packing material with a width of 50 mm.

The porous ion exchange beads are comprised of coated ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 5.0 microns to 25.0 microns, and the coating thickness is approximately 10.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 600 micron average diameter.

The brine from which lithium is extracted consists of a natural aqueous chloride solution containing approximately 450 ppm Li, 70,000 mg/L Na, 500 mg/L Ca, and 15,000 mg/L Mg, and other chemical species including K, chloride, and sulfate. When this liquid resource enters the vessel, the pressure needed to flow said resource at a rate of 25 L/min. Contact of the liquid resource with the ion exchange beads results in an outlet flow that contains approximately 75 ppm Li, 70,000 mg/L Na, 500 mg/L Ca, and 15,000 mg/L Mg, and other chemical species including K, chloride, and sulfate.

After contact of the liquid resource with the ion exchange material for 120 minutes, the contents of the tank are completely drained by maintaining the 25 psi of pressure of the air alternate phase in the top of the vessel, until all liquid exits through the bottom of the vessel (802), and the alternate phase also exits the bottom of the vessel together with any entrained brine. This ensures that the ion exchange beads are devoid of residual brine. Contacting the ion exchange beads with an alternate nitrogen phase results in removal of any residual entrained brine without the use of water. The use of an air alternate phase at a pressure of 25 psi decreases the time to drain the vessel to 3 minutes, when compared with a drain time of 30 minute when the vessel was open to the atmosphere and the drain was driven by gravity only.

Figure 9:
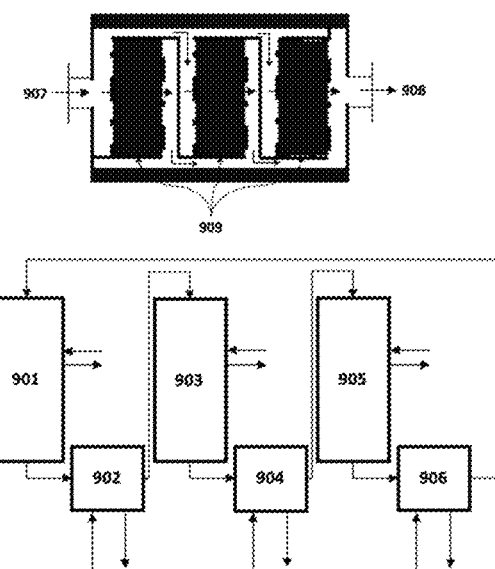
FIG. 9 illustrates a network of vessels comprising filter banks loaded with ion exchange beads, wherein an alternate phase comprising air is used to enhance lithium extraction by ion exchange.

The lithium-saturated beads are then treated with hydrochloric acid for 15 minutes to yield lithium chloride in solution. Lithium in the acidic chloride solution is eluted at a lithium concentration of 2,000 mg/L, while the concentration of sodium in the acidic chloride solution was below 750 mg/L Example 9: Lithium Extraction with a Network of Vessels Comprising Filter Banks Loaded with Ion Exchange Beads Connected with pH Modulating Units Contacted with an Air Alternate Phase Lithium is extracted from a liquid resource using a network of vessels containing ion-exchange beads (FIG. 9).

Each vessel comprises filter banks filled with ion exchange beads arranged along the length of the vessel, with parallel flow to and from each filter bank. Each filter bank acts as an individual ion-exchange compartment. The internal characteristics of the vessel are shown in FIG. 9. The vessel is rectangular and arranged horizontally, is approximately 90 cm long, and has a width and height of approximately 50 cm. It is constructed of stainless steel. The vessel consists of 3 filter banks that act as ion-exchange compartments (909), and flow channels that distribute the flow to each of the three filter banks and collect the outlet flow from each of the three filter banks. Inlet and outlet flow distribution systems connect to each other only through the ion-exchange compartments.

The ion-exchange compartments (909) are 40 cm wide and 40 cm tall, with a length of 25 cm. The inlet and outlet of each ion-exchange bead compartment consists of polymer nozzles with 100 micron slits. In each ion exchange compartment, fluid is transported by pressure-driven flow through the ion exchange bed, through the polymer support, and into the fluid collection system. Even flow to each ion-exchange compartment is ensured because the pressure-drop across the ion-exchange bead is approximately 100 times larger than pressure drop due to frictional losses in the inlet and outlet flow channels.

The ion-exchange beads are loaded into each of the ion-exchange compartments by mechanically separating each flow ion exchange compartment, and loading the ion exchange beads in the interstitial space. The porous ion exchange beads are comprised of ion exchange particles and a polymer matrix. The ion exchange particles are coated ion exchange particles comprised of a $Li_2TiO_3$ core with a $TiO_2$ coating. The particles are approximately spherical with a mean diameter of 10 microns, and the coating thickness is approximately 5 nm. The polymer matrix is comprised of polyvinyl chloride. The porous beads contain porous networks with a controlled distribution of pore sizes providing diffusion channels from the bead surface into the bead interior and to the ion exchange particles. The beads have a 200 microns average diameter.

The liquid resource flows into each vessel from a side flange (907), where it flows into the flow distribution pipes which delivers them to each one of the ion-exchange chambers. The liquid flows through the above-mentioned mesh, through the bed of ion-exchange beads (909), out of the above-mentioned mesh, and into the outlet flow distribution pipes. The collected effluent then exits through a flange (908) on the other side of the ion-exchange vessel.

The brine from which lithium is extracted consists of a natural aqueous chloride solution containing approximately 1000 ppm Li, 60,000 mg/L Na, 250 mg/L Ca, and 30,000 mg/L Mg, and other chemical species including K and chloride.

Three such vessels are connected to form a network. The vessels are connected via tanks where the pH of the brine is adjusted, as illustrated in FIG. 9. The network consists of ion exchange vessels (901, 903, 905), and mixing tanks for base and brine (902, 904, 906). For the mixing tanks in the brine circuit (902, 904, 906), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 902, then into vessel 903, into tank 904, into vessel 905, into tank 906 from which it leaves the system. Acid is concurrently flowed through vessel 901.

At any point during the operation of the network of three vessels, lithium is being extracted from brine with two vessels. Brine flows into a first mixing tank (e.g. 902) at pH of 6.5, and its pH is adjusted to a value of 7.5. This brine is fed to the first ion-exchange vessel (e.g. 903). The first vessel absorbs (e.g. 903) most of the lithium, releasing protons; this results in a drop in Li concentration from 1000 to 200 mg/L and a drop in pH to a value of 3.0. Subsequently, in the subsequent mixing tank (e.g. 904), the pH of said brine is raised to about 7.5, and the brine is flowed into a second column (e.g. 905) which absorbs remaining lithium, and the Li concentration drops from 200 to 90 g/L.

The third vessel (e.g. 901) is saturated with lithium from a previous ion-exchange cycle, and is therefore treated with nitric acid (eluent) to yield a lithium nitrate concentrate (termed enriched eluate or acidic eluant). The acid solution flows through the ion exchange vessel, where the protons from the acid enter the ion exchange beads and are exchanged for lithium. Lithium is thereby released from the beads and enters the acid solution. The pure lithium nitrate liquid eluate is then collected as the product with a lithium concentration of 1,000 mg/L and a sodium concentration below 250 mg/L. Lithium nitrate entrained in the ion exchange vessel is removed by pressurizing the inlet (907) with an air alternate phase at a pressure of 10 psi and collecting any entrained liquid through the outlet (908); this results in a recovery of liquid enriched eluate volume of 99%, as compared to 90% recovered when pumping is the only available means of removing enriched eluate from the vessel.

When the rate of lithium uptake by the ion exchange beads slows, pumping through the system is terminated. The liquid is completely drained by injecting an alternate phase consisting of air through the side flange (907) and collecting the liquid resource through the outlet flange (908). This removes all the liquid resource entrained within the ion exchange beads without the need of washing with water.

Following this, the flows of brine, water, and acid are redirected such that a new vessel is treated with acid and the others with brine. These system operations are repeated, loading lithium into each column until saturation, and redirecting flow to the next configuration of flows while the saturated column is treated with acid to release lithium. The process extracts lithium from brine and yield a lithium chloride concentrate which is then treated with sodium carbonate to precipitate a lithium carbonate product.

Figure 10:
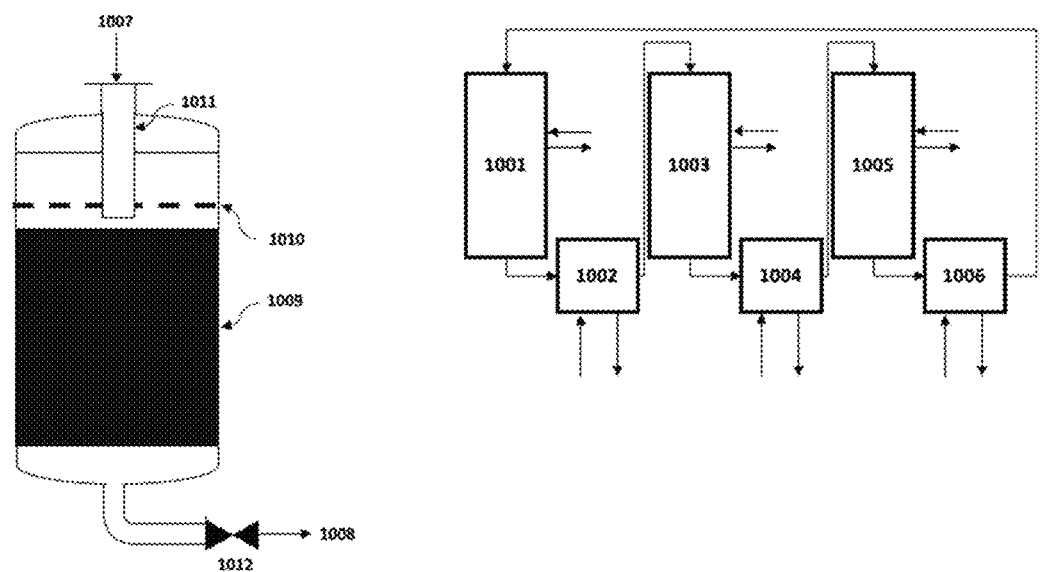
FIG. 10 illustrates a network of vessels comprising fluid level controllers loaded with ion exchange beads, wherein an alternate phase comprising air is used to enhance lithium extraction by ion exchange.

Example 10: Lithium Extraction with a Network of Vessels Comprising Fluid Level Controllers Loaded with Ion Exchange Beads Connected with pH Modulating Units Contacted with an Air Alternate Phase Lithium is extracted from a brine using a network of vessels containing ion-exchange beads, where the fluid level in the vessel is controlled to fully submerge ion exchange beads (FIG. 10). The vessels in the network are connected by pH modulating tanks.

The internal characteristics of the vessel comprising fluid level controllers is shown in FIG. 10. The vessel is cylindrical and arranged vertically, is approximately 150 cm tall, and has a diameter of approximately 300 cm. It is constructed of titanium.

Fluid flows into the vessel from a top flange (1007) into a dome at the top of the vessel, where it flows through a pipe (1011), to the main fluid level (1010). The fluid level is constantly monitored using an ultrasonic level sensor, and the level is adjusted continuously to remain at a height such that the ion-exchange media is constantly submerged (1010). The liquid level of the tank is maintained at 75 cm from the bottom of the vessel. Control of the fluid level is achieved via a proportional-integral-derivative controller that modulates the aperture of the valve (1012) at the bottom of the tank. Brine is pumped into the vessel at 80 psi.

The ion-exchange beads partially fill the volume of the vessel. The height of the ion exchange beads (1009) is 50 cm from the bottom of the vessel. The outlet of the vessel comprises a distributor with nozzles having 75 micron slits. Fluid is transported by pressure-driven flow through the ion exchange bed, through the polymer support, and through the bottom outlet of the vessel (1008).

The ion-exchange beads are conveyed into the vessel when initially loaded, by mechanically removing the top-dome of the vessel which is attached through to the rest of the vessel through a bolted stainless-steel flange.

The porous ion exchange beads are comprised of coated ion exchange particles and a polymer matrix. The ion exchange particles comprise a $Li_2Mn_2O_5$ core with a PVC coating. The particles are approximately spherical with a mean diameter of 5 microns. The polymer matrix is comprised of polyvinylidene difluoride. The porous beads contain porous networks with a controlled distribution of pore sizes providing diffusion channels from the bead surface into the bead interior and to the ion exchange particles. The beads have a 90 micron average diameter.

The brine from which lithium is extracted consists of a natural aqueous chloride solution containing approximately 1,000 ppm Li, 80,000 mg/L Na, 250 mg/L Ca, and 5,000 mg/L Mg, and other chemical species including K and chloride.

Three such vessels are connected to form a network. The vessels are connected via tanks where the pH of the brine is adjusted, as illustrated in FIG. 10. The network consists of ion exchange vessels (1001, 1003, 1005), and mixing tanks for base and brine (1002, 1004, 1006). For the mixing tanks in the brine circuit (1002, 1004, 1006), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 1002, then into vessel 1003, into tank 1004, into vessel 1005, into tank 1006 from which it leaves the system. Acid is flowed through vessel 1001.

At any point during the operation of the network of three vessels, lithium is being extracted from brine with two vessels. Brine flows into a first mixing tank (e.g. 1002) at pH of 6.5, and its pH is adjusted to a value of 7.5. This brine is fed to the first ion-exchange vessel (e.g. 1003). The first vessel absorbs (e.g. 1003) most of the lithium, releasing protons; this results in a drop in Li concentration from 1000 to 250 mg/L and a drop in pH to a value of 3.0. Subsequently, in the subsequent mixing tank (e.g. 1004), the pH of said brine is raised to about 7.5, and the brine is flowed into a second column (e.g. 1005) which absorbs remaining lithium, and the Li concentration drops from 250 to 100 g/L.

The third vessel (e.g. 1001) is saturated with lithium from a previous ion-exchange cycle, and is therefore treated with hydrochloric acid to yield a lithium chloride concentrate.

The acid solution flows through the ion exchange vessel, where the protons from the acid enter the ion exchange beads and are exchanged for lithium. Lithium is thereby released from the beads and enters the acid solution. The pure lithium chloride liquid eluate is then collected as the product with a lithium concentration of 1,500 mg/L and a sodium concentration below 500 mg/L.

Lithium chloride entrained in the ion exchange vessel is removed by pressurizing the inlet (1007) with an air alternate phase at a pressure of 15 psi and collecting any entrained liquid through the outlet (1008); this results in a recovery of liquid enriched eluate volume of 99%, as compared to 90% recovered when pumping is the only available means of removing enriched eluate from the vessel.

When the rate of lithium uptake by the ion exchange beads slows, pumping through the system is terminated. The liquid resource is completely drained by injecting an alternate phase consisting of air through the inlet (1007) and collecting the liquid resource through the outlet (1008). This removes all the liquid resource entrained within the ion exchange beads without the need of washing with water.

Following this, the flows of brine, water, and acid are redirected such that a new vessel is treated with acid and the others with brine. These system operations are repeated, loading lithium into each column until saturation, and redirecting flow to the next configuration of flows while the saturated column is treated with acid to release lithium. The process extracts lithium from brine and yield a lithium chloride concentrate which is then treated with sodium carbonate to precipitate a lithium carbonate product.

Figure 11:
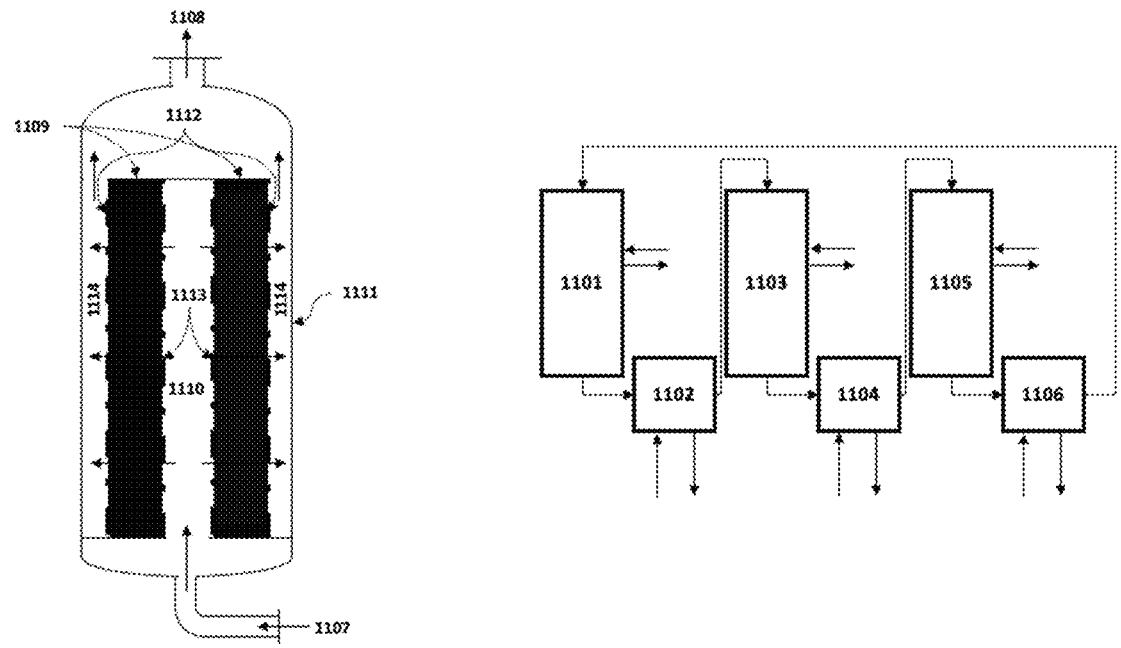
FIG. 11 illustrates a network of vessels comprising radial-flow beds of packed ion exchange beads, wherein an alternate phase comprising hexane is used to enhance lithium extraction by ion exchange.

Example 11: Lithium Extraction with a Network of Vessels Comprising Radial-Flow Packed Ion-Exchange Beds Connected with pH Modulating Units Contacted with a Hexane Alternate Phase Lithium is extracted from a brine using a network of vessels containing ion-exchange beads packed in radial-flow beds with minimal flow resistance (FIG. 11). The vessels in the network are connected by pH modulating tanks.

The internal characteristics of the radial-flow ion exchange vessel is shown in FIG. 11. The vessel is cylindrical and arranged vertically, is approximately 300 cm tall, and has a diameter of approximately 80 cm. It is constructed of polymer-coated stainless steel.

A liquid resource or other process fluid flows into the ion exchange vessel from a flange at the bottom of the vessel (1107). Fluid passes from the inner flow-distribution compartment (1110), through the inner-perforated wall (1113), through ion-exchange bead compartment (1109), through the outer-perforated wall (1112) and into the outer-flow distribution compartment (1114). From there, the fluid flows into the top of the vessel and exits the vessel through a tope flanged connection (1108).

This inner-flow distribution compartment (1110) is defined by a cylinder with a diameter of approximately 7.5 cm that lies within the inner-perforated wall (1113). The outer-flow distribution compartment (1114) is defined by the annular region between the outer-perforated wall (1112), with a diameter of approximately 75 cm, and the vessel-outer wall (1111), with a diameter of 80 cm. The ion-exchange bead compartment (is defined by the annular region between the outer-perforated wall, with a diameter of approximately 75 cm, and the inner-perforated wall, with a diameter of approximately 7.5 cm. Therefore, the total flow path through the annular ion-exchange bed is of 67.5 cm.

These compartments are separated by a perforated walls with evenly spaced perforations that are ⅛ inch in diameter. On the inside diameter of the outer perforated-wall, and the inside diameter of the inner perforated-wall, is a porous polymer support consisting of a polypropylene mesh with 50 micron pore size. The porous polymer support contains the ion exchange beads within the ion-exchange compartment, and allows fluid to flow into and out from the ion-exchange bead compartment without conveying the ion-exchange beads from this compartment.

The ion exchange vessel is loaded with a radial bed of porous ion exchange beads. The porous ion exchange beads are comprised of ion exchange particles and a polymer matrix. The ion exchange particles are coated ion exchange particles comprised of a $Li_2Mn_2O_5$ core with a $TiO_2$ coating. The particles are approximately spherical with a mean diameter of 20 microns, the coating is approximately 10 nm thick. The porous beads contain porous networks with a controlled distribution of pore sizes providing diffusion channels from the bead surface into the bead interior and to the ion exchange particles. The polymer matrix is comprised of polyvinyl chloride. The beads have a 350 microns average diameter.

The brine from which lithium is extracted consists of a natural aqueous chloride solution containing approximately 200 ppm Li, 100,000 mg/L Na, 3,000 mg/L Ca, and 3,000 mg/L Mg, and other chemical species including K and chloride.

Three such vessels are connected to form a network. The vessels are connected via tanks where the pH of the brine is adjusted, as illustrated in FIG. 11. The network consists of ion exchange vessels (1101, 1103, 1105), and mixing tanks for base and brine (1102, 1104, 1106). For the mixing tanks in the brine circuit (1102, 1104, 1106), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 1102, then into vessel 1103, into tank 1104, into vessel 1105, into tank 1106 from which it leaves the system. Acid is concurrently flowed through vessel 1101.

At any point during the operation of the network of three vessels, lithium is being extracted from brine with two vessels. Brine flows into a first mixing tank (e.g. 1102) at pH of 4, and its pH is adjusted to a value of 8. This brine is fed to the first ion-exchange vessel (e.g. 1103). The first vessel absorbs (e.g. 1103) most of the lithium, releasing protons; this results in a drop in Li concentration from 200 to 120 mg/L and a drop in pH to a value of 4. Subsequently, in the subsequent mixing tank (e.g. 1104), the pH of said brine is raised to about 8, and the brine is flowed into a second column (e.g. 1105) which absorbs remaining lithium, and the Li concentration drops from 120 to 40 g/L.

The third vessel (e.g. 1101) is saturated with lithium from a previous ion-exchange cycle, and is therefore treated with sulfuric acid to yield a lithium sulfate concentrate. The acid solution flows through the ion exchange vessel, where the protons from the acid enter the ion exchange beads and are exchanged for lithium. Lithium is thereby released from the beads and enters the acid solution. The pure lithium sulfate liquid eluate is then collected as the product with a lithium concentration of 1,000 mg/L and a sodium concentration below 250 mg/L.

Lithium sulfate entrained in the ion exchange vessel is removed by injecting an alternate phase consisting of hexane through the inlet (1107) and collecting the liquid resource and hexane through the outlet (1108). This removes all the eluate entrained within the ion exchange bed, resulting in a recovery of liquid enriched eluate volume of 99%, as compared to 90% recovered when pumping is the only available means of removing enriched eluate from the vessel. Hexane and the entrained enriched eluate are separated in a liquid-liquid separator, and the hexane is reused.

When the rate of lithium uptake by the ion exchange beads slows, pumping through the system is terminated. The liquid resource is completely drained by injecting an alternate phase consisting of hexane through the inlet (1107) and collecting the liquid resource through the outlet (1108). This removes all the liquid resource entrained within the ion exchange beads without the need of washing with water.

Following this, the flows of brine, water, and acid are redirected such that a new vessel is treated with acid and the others with brine. These system operations are repeated, loading lithium into each column until saturation, and redirecting flow to the next configuration of flows while the saturated column is treated with acid to release lithium. The process extracts lithium from brine and yield a lithium sulfate concentrate which is then treated with sodium carbonate to precipitate a lithium carbonate product.

Example 12: Lithium Extraction with a Network of Vessels Comprising Trays Loaded with Ion Exchange Beads Connected with pH Modulating Units Contacted with a Nitrogen Alternate Phase Lithium is extracted from a brine using a network of vessels comprising trays loaded with ion exchange beads. The vessels in the network are connected by pH modulating tanks.

Figure 12:
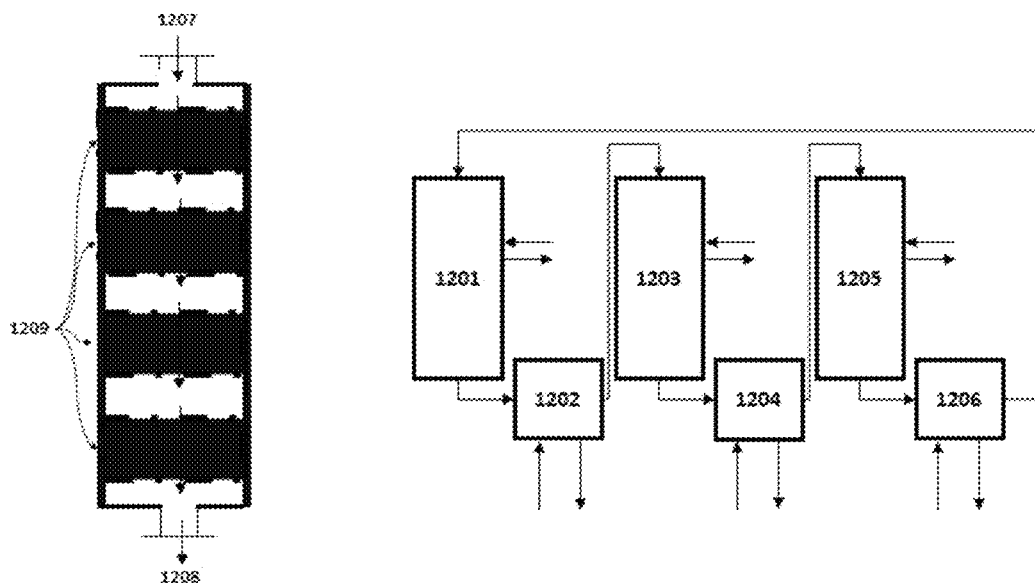
FIG. 12 illustrates a network of vessels comprising trays loaded with ion exchange beads, wherein an alternate phase comprising nitrogen is used to enhance lithium extraction by ion exchange.

Within each vessel, the trays are stacked vertically along the height of the vessel (FIG. 12). Each tray acts as an individual ion-exchange compartment. The internal characteristics of the vessel are shown in FIG. 12. The vessel is square and arranged vertically, is approximately 50 cm long, and has a width and height of approximately 10 cm. It is constructed of titanium. The vessel consists of four trays that are loaded with ion-exchange beads (1209).

The liquid resource flows into the vessel from a top flange (1207), where it flows into the first ion-exchange tray. The liquid flows through the ion-exchange bed on the tray, and into the next tray, eventually flowing through all four ion-exchange trays. The collected effluent then exits through a flange on the bottom of the ion-exchange vessel (1208).

The ion-exchange tray supports an ion-exchange bed that is approximately 7.5 cm thick and 10 cm in diameter. The thickness of metal constituting the tray is ¼ inch. The inlet and outlet of the ion-exchange bead compartment consists of a polyester mesh with 50 micron pore size, to prevent escape of beads. The bottom of the tray contains narrow slits that span the entire width of the tray. Each slit is ⅛ inch wide, and each slit is separated ¼ inch. The ion-exchange beads are loaded into each of the ion-exchange compartments by mechanically separating each tray, and loading the ion exchange beads within each tray lined with the containing mesh. In each tray, fluid is transported by pressure-driven flow through the ion exchange bed, through the slits and polymer mesh, and into the liquid collection system.

The porous ion exchange beads are comprised of ion exchange particles and a polymer matrix. The ion exchange particles are uncoated ion exchange particles comprised of an uncoated $Li_4Mn_5O_{12}$ core. The particles are approximately spherical with a mean diameter of 10 microns. The porous beads contain porous networks with a controlled distribution of pore sizes providing diffusion channels from the bead surface into the bead interior and to the ion exchange particles. The beads have a 250 micron average diameter.

The brine from which lithium is extracted consists of a natural aqueous chloride solution containing approximately 1000 ppm Li, 75,000 mg/L Na, 5,000 mg/L Ca, and 5,000 mg/L Mg, and other chemical species including K and chloride.

Three such vessels are connected to form a network. The vessels are connected via tanks where the pH of the brine is adjusted, as illustrated in FIG. 12. The network consists of ion exchange vessels (1201, 1203, 1205), and mixing tanks for base and brine (1202, 1204, 1206). For the mixing tanks in the brine circuit (1202, 1204, 1206), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration would be: a liquid resource flows into tank 1202, then into vessel 1203, into tank 1204, into vessel 1205, into tank 1206 from which it leaves the system. Acid is concurrently flowed through vessel 1201.

At any point during the operation of the network of three vessels, lithium is being extracted from brine with two vessels. Brine flows into a first mixing tank (e.g. 1202) at pH of 6.5, and its pH is adjusted to a value of 7.5. This brine is fed to the first ion-exchange vessel (e.g. 1203). The first vessel absorbs (e.g. 1203) most of the lithium, releasing protons; this results in a drop in Li concentration from 1000 to 300 mg/L and a drop in pH to a value of 3.0. Subsequently, in the subsequent mixing tank (e.g. 1204), the pH of said brine is raised to about 7.5, and the brine is flowed into a second column (e.g. 1205) which absorbs remaining lithium, and the Li concentration drops from 300 to 100 g/L.

The third vessel (e.g. 1201) is saturated with lithium from a previous ion-exchange cycle, and is therefore treated with hydrochloric acid to yield a lithium chloride concentrate. The acid solution flows through the ion exchange vessel, where the protons from the acid enter the ion exchange beads and are exchanged for lithium. Lithium is thereby released from the beads and enters the acid solution. The pure lithium chloride liquid eluate is then collected as the product with a lithium concentration of 3,500 mg/L and a sodium concentration below 1000 mg/L.

Lithium chloride entrained in the ion exchange vessel is removed by pressurizing the inlet (1207) with a nitrogen alternate phase at a pressure of 25 psi and collecting any entrained liquid through the outlet (1208); this results in a recovery of liquid enriched eluate volume of 99%, as compared to 90% recovered when pumping is the only available means of removing enriched eluate from the vessel.

When the rate of lithium uptake by the ion exchange beads slows, pumping through the system is terminated. The liquid resource is completely drained by injecting an alternate phase consisting of nitrogen through the inlet (1207) and collecting the liquid resource through the outlet (1208). This removes all the liquid resource entrained within the ion exchange beads without the need of washing with water. The use of an inert nitrogen atmosphere to displace entrained brine also prevents formation of precipitates caused by exposure of the liquid resource to air.

Following this, the flows of brine, water, and acid are redirected such that a new vessel is treated with acid and the others with brine. These system operations are repeated, loading lithium into each column until saturation, and redirecting flow to the next configuration of flows while the saturated column is treated with acid to release lithium. The process extracts lithium from brine and yield a lithium chloride concentrate which is then treated with sodium carbonate to precipitate a lithium carbonate product.

Figure 13:
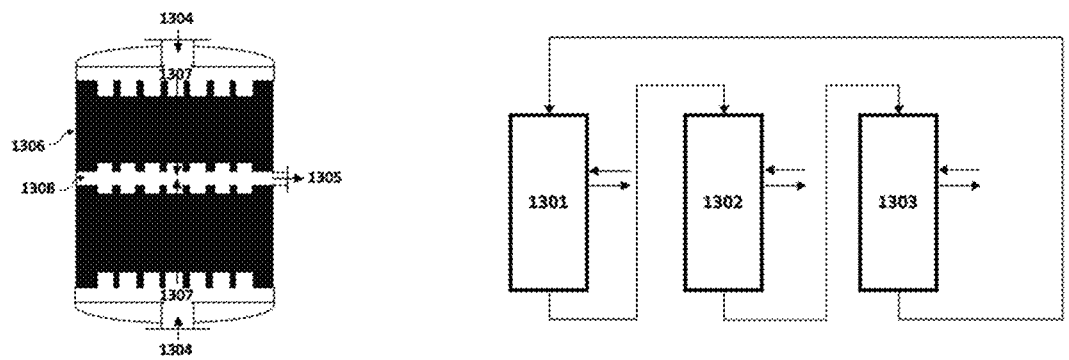
FIG. 13 illustrates a network of vessels comprising internal flow distributors loaded with ion exchange beads, wherein an alternate phase comprising nitrogen is used to enhance lithium extraction by ion exchange.

Example 13: Lithium Extraction with a Network of Vessels Loaded with Ion Exchange Beads with Internal Flow Distributors Contacted with a Nitrogen Alternate Phase Lithium is extracted from a brine using a network of vessels comprising internal flow distributors. (FIG. 13). The internal characteristics of the vessel are shown in FIG. 13. The vessel is cylindrical and arranged vertically, is approximately 150 cm long, and has a diameter of 120 cm. It is constructed of fiber-glass reinforced polymer. The vessel is oriented vertically.

The vessel contains one internal compartment where ion-exchange beads are loaded (1306). Two flow distributors deliver brine into the top and the bottom of the ion-exchange compartment (1307). One flow distributor located at the half-way vertical point of the ion-exchange bed collects liquid that has undergone ion-exchange and removes it from the ion-exchange bed (1308). The flow distributors are composed of perforated polyvinyl chloride pipe that is 2-4 cm in diameter, with polymer nozzles with 100 micron slits to facilitate flow while immobilizing the beads.

The liquid resource flows into the vessel from a top and bottom flanges (1304), where it flows into the top and bottom flow distributors (1307). This distributor ensures uniform flow of the liquid resource into the ion-exchange bead compartment. The liquid resource flows through the ion-exchange beads (1306), and into the liquid distributor in the middle of the tank (1308). This latter distributor collects the resource that has undergone ion-exchange, which exits the vessel through a flange at the side (1305).

The ion exchange medium is loaded by opening up the top of the vessel through a flanged opening, and closing the vessel. The ion-exchange beads occupy the entirety of the vessel. The flow distributors are submerged within the ion-exchange beads.

The porous ion exchange beads are comprised of ion exchange particles and a polymer matrix. The ion exchange particles are coated ion exchange particles comprised of a $Li_4Ti_5O_{12}$ core with a $ZrO_2$ coating. The particles are approximately spherical with a mean diameter of 10 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a distribution of shapes with a 100 micron mm average diameter.

The brine from which lithium is extracted consists of a natural aqueous chloride solution containing approximately 300 ppm Li, 100,000 mg/L Na, 1,000 mg/L Ca, and 2,000 mg/L Mg, and other chemical species including K and chloride.

Three such vessels are connected to form a network, as illustrated in FIG. 13. The network consists of ion exchange vessels (1301, 1302, 1303). For the purposes of this example, a flow configuration would be: a liquid resource flows into vessel 1301, into vessel 1302, from which it leaves the system. Acid is concurrently flowed through vessel 1303.

At any point during the operation of the network of three vessels, lithium is being extracted from brine with two vessels. This brine is fed to the first ion-exchange vessel (e.g. 1301). The first vessel absorbs (e.g. 1301) most of the lithium, releasing protons; this results in a drop in Li concentration from 300 to 180 mg/L, and the brine is flowed into a second column (e.g. 1302) which absorbs remaining lithium, and the Li concentration drops from 180 to 50 g/L.

The third vessel (e.g. 1303) is saturated with lithium from a previous ion-exchange cycle, and is therefore treated with sulfuric acid to yield a lithium sulfate concentrate. The acid solution flows through the ion exchange vessel, where the protons from the acid enter the ion exchange beads and are exchanged for lithium. Lithium is thereby released from the beads and enters the acid solution. The pure lithium sulfate liquid eluate is then collected as the product with a lithium concentration of 1,500 mg/L and a sodium concentration below 800 mg/L.

Lithium sulfate entrained in the ion exchange vessel is removed by pressurizing the inlet (1304) with a nitrogen alternate phase at a pressure of 15 psi and collecting any entrained liquid through the outlet (1305); this results in a recovery of liquid enriched eluate volume of 99%, as compared to 90% recovered when pumping is the only available means of removing enriched eluate from the vessel.

When the rate of lithium uptake by the ion exchange beads slows, pumping through the system is terminated. The liquid resource is completely drained by injecting an alternate phase consisting of nitrogen through the inlet (1304) and collecting the liquid resource through the outlet (1305). This removes all the liquid resource entrained within the ion exchange beads without the need of washing with water. The use of an inert nitrogen atmosphere to displace entrained brine also prevents formation of precipitates caused by exposure of the liquid resource to air.

Following this, the flows of brine, water, and acid are redirected such that a new vessel is treated with acid and the others with brine. These system operations are repeated, loading lithium into each column until saturation, and redirecting flow to the next configuration of flows while the saturated column is treated with acid to release lithium. The process extracts lithium from brine and yield a lithium sulfate concentrate which is then treated with sodium carbonate to precipitate a lithium carbonate product.

Figure 14:
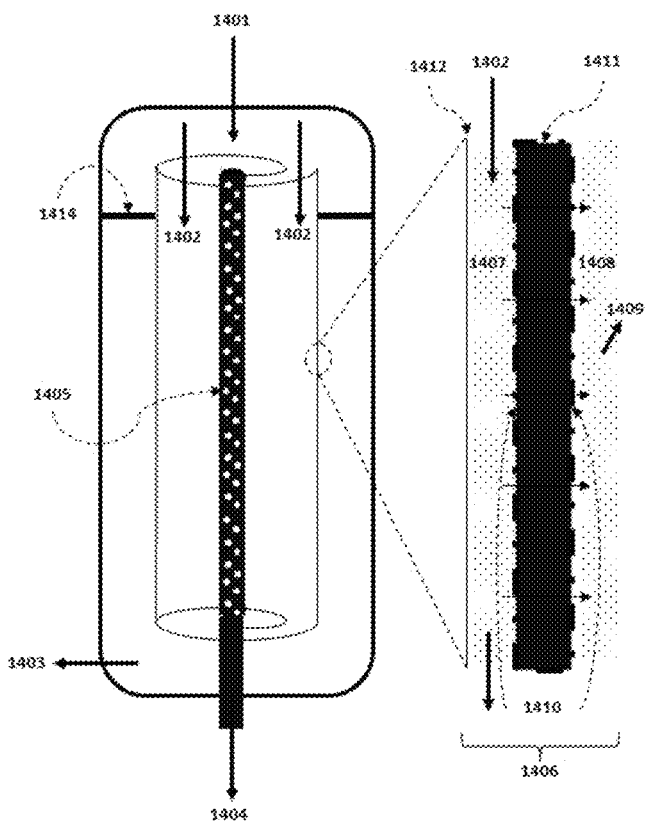
FIG. 14 illustrates a vessels comprising ion-exchange beads contained between two membranes, wherein an alternate phase comprising air is used to enhance lithium extraction by ion exchange.

Example 14. Lithium Extraction Using a Vessel with Packed Ion-Exchange Beds Contained Between Membranes for Minimal Flow Distance Contacted with an Air Alternate Phase Lithium is extracted from a brine using a vessel containing ion-exchange beads contained between two membranes that form a wound ion-exchange element, resulting in a minimal flow distance (FIG. 14). The internal characteristics of the ion-exchange vessel is shown in FIG. 14. The vessel is cylindrical and arranged vertically, is approximately 60 cm tall, and has a diameter of approximately 12 cm. It is constructed of fiber-reinforced plastic.

A liquid resource or other process fluid flows into the ion-exchange vessel from an inlet at the top of the vessel (1401) into a top-fluid distribution chamber separated from the bottom of the vessel by an EPDM gasket (1414), where flow is distributed to flow through the wound ion exchange element flow channels (1402) tangentially along the axial direction of said element.

The membrane cross section 1406 is shown in FIG. 14. The membrane is constructed by stacking several constituent components. First, a non-permeable membrane comprising polyethylene 1412 is laid, followed by a spacer with 5 mm rhomboidal openings composed of polyethylene (1407) and a porous microfiltration membrane composed of polyvinyl fluoride with 0.2 micron porous openings (1410). Following this, a thin 4 mm layer of porous ion exchange particles is deposited (1411) and covered by another microfiltration membrane (1410) and a downstream collection spacer with 7 mm rhomboidal openings composed of polyethylene (1408). One side of this stack is attached to a perforated collection tube (1405), and the element is wound into a spiral. In this example, the membrane is 50 cm and 10 cm wide, and spun around one and a half times around its short end.

A lithium-rich brine passes through the flow channels (1402) at a flow rate of 1 L/s and is discharged from the bottom of the vessel through outlet 1403 at a flow rate of 800 mL/s; fluid enters through 1401 and exits the membrane element through 1403 at pressures of 10 and 8 psi, respectively. As fluid passes through the flow channel 1402, a portion (200 mL/s) permeates through the microfiltration membranes (1410), through the ion exchange beads (1411) and into the downstream collection space (1408). The lithium-depleted brine flows angularly (1409) around the spiral wound element through this collection space and into the perforated collection tube from where it exits the vessel (1404). The total pressure drop across the ion exchange beads is therefore less than 10 psi. Any brine that did not permeate through the ion exchange beads and left the vessel through 1403 is recirculated back into the ion exchange vessel until the ion exchange beads do not absorb any more lithium.

The ion exchange beads are porous ion exchange beads. The porous ion exchange beads are comprised of ion exchange particles and a polymer matrix. The ion exchange particles are uncoated ion exchange particles comprised of an uncoated $Li_4Ti_5O_{12}$ core. The particles are approximately spherical with a mean diameter of 3 to 5 microns. The polymer matrix is comprised of polyvinylidene difluoride. The porous beads contain porous networks with a controlled distribution of pore sizes providing diffusion channels from the bead surface into the bead interior and to the ion exchange particles. The beads have a 25 micron average diameter.

The brine from which lithium is extracted consists of a natural aqueous chloride solution containing approximately 250 ppm Li, 70,000 mg/L Na, 10,000 mg/L K, 3,000 mg/L Ca, and 2,000 mg/L Mg, and other chemical species including sulfates. When this liquid resource enters the vessel, the pressure is 70 psi. Flow through this ion exchange material results in an outlet flow that contains 50 ppm Li, 70,000 mg/L Na, 10,000 mg/L K, 3,000 mg/L Ca, and 2,000 mg/L Mg, and other chemical species including sulfates.

After lithium uptake by the ion exchange beads ceases, the flow of the brine is terminated, and an alternate phase consisting of air was injected through the inlet (1401) at a pressure of 5 psi, until all the entrained brine is removed from the ion exchange bed (1411) through the outlet (1404). This ensures that the ion exchange beads were devoid of residual brine. Contacting the ion exchange beads with an air alternate phase obviates the need to use water to remove entrained brine from the ion exchange beads.

The lithium-saturated beads were then treated with hydrochloric acid to yield lithium chloride in solution. Lithium in the acidic chloride solution was eluted at a lithium concentration of 1750 mg/L, while the concentration of sodium in the acidic chloride solution was below 400 mg/L.

Figure 15:
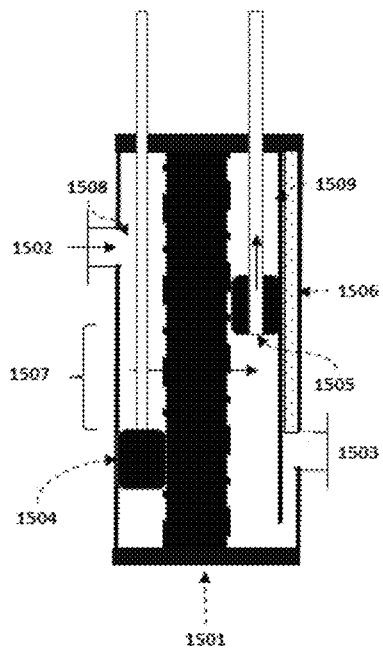
FIG. 15 illustrates a vessels comprising beds of ion-exchange beads contained in a filter bank, wherein an alternate phase comprising air is used to from the ion-exchange bed for lithium extraction by ion exchange.

Example 15: Lithium Extraction with Beds of Packed Ion-Exchange Beads within Filter Banks Formed Using an Air Alternate Phase Ion exchange beads are packed inside a vessel comprising a filter bank (FIG. 15). The internal characteristics of the ion exchange vessel is shown in FIG. 15. The vessel is comprised of a filter bank filled with ion exchange beads arranged along the length of the vessel. Each filter bank acts as an individual ion-exchange compartment. The internal characteristics of the vessel are shown in FIG. 15. The vessel is squared and arranged horizontally, approximately 20 cm long, and has a width and height of approximately 1 m. It is constructed of titanium. The vessel consists of one filter bank that acts as an ion-exchange compartments (1501), and flow channels that distribute the flow to the filter bank and collected the outlet flow from each of the. The thickness of the ion exchange bed is 10 cm. The vessel contains two fluid diversion devices, 1504 and 1505. These are connected to side ports on the vessel and moved in placed by opening the ends of the vessel.

The porous ion exchange beads are comprised of ion exchange particles and a polymer matrix. The ion exchange particles are uncoated ion exchange particles comprised of an uncoated $Li_4Mn_5O_{12}$ core. The particles are approximately spherical with a mean diameter of 5 to 10 microns. The polymer matrix is comprised of polyvinylidene difluoride.

To compact the ion exchange bed into a uniform and compact powder, so as to ensure optimal flow characteristics, fluid diversion devices (1504 and 1505) are used. Said fluid diversion devices direct flow to only certain parts of the ion exchange bed. Fluid comprising an air alternate phase flows into the ion exchange device at a flow rate of 1 scfm, entering said vessel through flanged connection (1502) into a fluid distribution compartment (1508). Fluid encounters a first diversion device (1504), consisting of a solid ethylene propylene diene monomer (EPDM) inflatable plug that slides along the length of the inlet fluid distribution compartment and is inflated with compressed gas. Upon inflation, this fluid diversion device occupies the entire cross-section of the vessel along its longest dimension. Upon encountering said first fluid diversion device, flow of the air alternate phase is diverted to the ion exchange bed (1501) which is contained within the filter cloths of the filter bank. The air alternate phase flows through the ion exchange bed at a velocity of at least 1 msec. Upon crossing the ion exchange bed, fluid exits into an outlet fluid distribution compartment (1509). The flanged outlet (1503) of the vessel is blocked with a gasketed blind flange. This forces air to exit through a pipe contained in a second fluid diversion device (1505) within the outlet fluid distribution compartment. (1509). This second fluid diversion device consists of a solid EPDM plug device that occupies the entire cross-section of the vessel along its longest dimension, and contains a pipe that traverses it and is connected with the fluid compartment. This pipe is connected to the outside of the vessel through a side port. Flow of air does not occur above or below the location of the fluid diversion devices because flow is blocked, forcing flow to occur through the limited section of the vessel 1507. This results in compacting the ion exchange beads in the section 1507.

To prevent fluid from flowing to other areas other vessel, aluminum oxide inert beads are loaded inside sections of the outlet flow distribution compartment where flow is not desired (1506); the size of these beads is between 75 and 200 um. These beads are removed upon completion of the packing process through outlet port 1503.

After one section (1507) of the ion exchange bed is packed, the fluid diversion devices are moved to a different section of the bed by deflating the inflatable packing device (1504) or moving the solid packing device (1505) up along the vessel, until all sections of the vessel have been treated. Six iterations or sections are done on this vessel.

Lithium is extracted from a brine using the beads packed into the vessel as described above. The brine from which lithium was extracted consists of a natural aqueous chloride solution containing approximately 800 ppm Li, 65,000 mg/L Na, 5,000 mg/L K, 5,000 mg/L Ca, and 5,000 mg/L Mg, and other chemical species including sulfates. Flow through this ion exchange material results in an outlet flow that contains 100 ppm Li, 65,000 mg/L Na, 5,000 mg/L K, 5,000 mg/L Ca, and 5,000 mg/L Mg, and other chemical species including sulfates.

Figure 16:
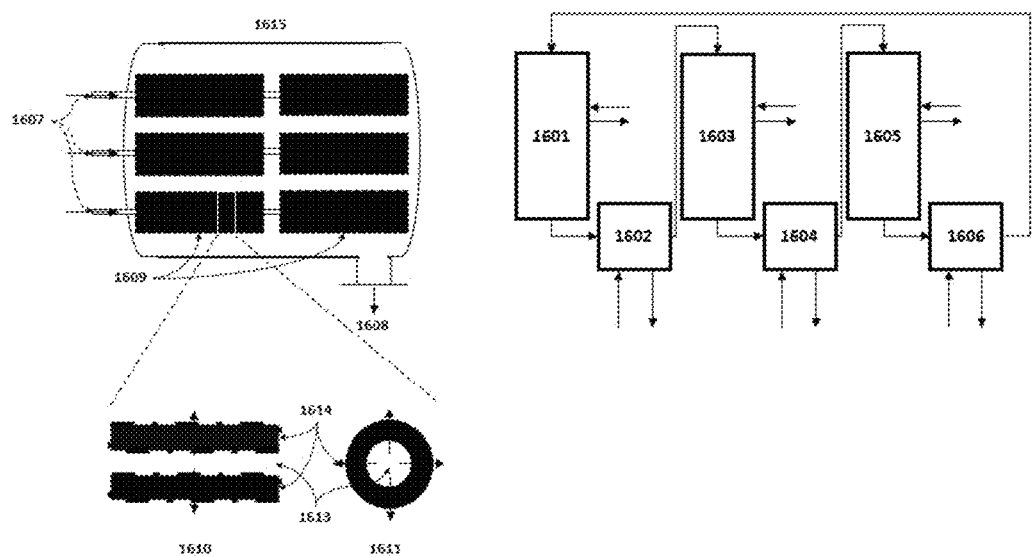
FIG. 16 illustrates a network of vessels comprising multiple radial-flow beds of packed ion exchange beads, wherein an alternate phase comprising air is used to from the ion-exchange bed for lithium extraction by ion exchange.

Example 16: Lithium Extraction Using a Network of Vessels Comprising Vessels Containing Multiple Radial-Flow Packed Ion-Exchange Beds Connected with pH Modulating Units and Contacted with Air Lithium is extracted from a brine using a network of vessels comprising multiple radial-flow packed ion exchange beds (FIG. 16). The vessels in the network are connected by pH modulating tanks.

Each vessel (1615) contains tubular compartments (1609) comprising ion exchange beds (1609). Two of these tubular compartments are connected in series, and three of these two-compartment units are contained within each vessel. Each of the two-compartment unit acts as an individual ion-exchange unit. The internal characteristics of the vessel are shown in FIG. 16. The vessel is cylindrical and arranged horizontally, is approximately 100 cm long, and has a width and height of approximately 50 cm. It is constructed of titanium-lined carbon steel. Each ion-exchange compartment is 40 cm long and 10 cm in diameter.

A side- (1610) and cross sectional- (1611) view of each tubular compartment is shown in FIG. 16. Each compartment comprises a radial flow bed where an annular ion-exchange compartment (1614) surrounds an inner perforated tubular partition along which liquid flows (1613). This inner tubular partition (1613) is defined by a cylinder with a diameter of 2 cm, and is contained within porous titanium walls with average opening of 20 um. The ion exchange bed (1614) is contained within the annular region between this inner tubular partition and the outer wall of the tubular ion-exchange compartment (1609). This outer wall has a diameter of 10 cm and is constructed of porous titanium walls with an average opening of 20 um. Therefore, the total flow path through the annular ion-exchange bed is approximately 4 cm.

The liquid resource flows into the vessel through tubes (1607) that connect to each two-compartment unit, and into the inner tubular partition (1613), from which it flows outwards radially through the ion-exchange bed (1614) and into the main vessel (1615), where it is collected at the bottom of the vessel and exits the vessel through an outlet flange (1608). Flow is driven by pressure, and the total pressure drop between the inlet (1607) and outlet (1608) is 10 psi.

The ion exchange beads are porous ion exchange beads, and are comprised of ion exchange particles and a polymer matrix. The ion exchange particles are uncoated ion exchange particles comprised of an uncoated $Li_4Sn_5O_{12}$ core. The particles are approximately spherical with a mean diameter of 5 microns. The porous beads contain porous networks with a controlled distribution of pore sizes providing diffusion channels from the bead surface into the bead interior and to the ion exchange particles. The beads have a 150 micron average diameter.

The brine from which lithium is extracted consists of a natural aqueous chloride solution containing approximately 1000 ppm Li, 75,000 mg/L Na, 5,000 mg/L Ca, and 5,000 mg/L Mg, and other chemical species including K and chloride.

Three such vessels (1615) are connected to form a network. The vessels are connected via tanks where the pH of the brine is adjusted, as illustrated in FIG. 16. The network consists of ion exchange vessels (1601, 1603, 1605), and mixing tanks for base and brine (1602, 1604, 1606). For the mixing tanks in the brine circuit (1602, 1604, 1606), an aqueous base solution of NaOH is added to increase the pH of the brine to 7.5. The pH of the brine is monitored before and after each mixing tank in the brine circuit to control the rate of addition of aqueous base solution. A filter bag with a characteristic maximum opening of 5 microns is installed at the outlet of each of these tanks.

For the purposes of this example, a flow configuration would be: a liquid resource flows into tank 1602, then into vessel 1603, into tank 1604, into vessel 1605, into tank 1606 from which it leaves the system. Acid is concurrently flowed through vessel 1601.

At any point during the operation of the network of three vessels, lithium is being extracted from brine with two vessels. Brine flows into a first mixing tank (e.g. 1602) at pH of 6.5, and its pH is adjusted to a value of 7.5. This brine is fed to the first ion-exchange vessel (e.g. 1602). The first vessel absorbs (e.g. 1603) most of the lithium, releasing protons; this results in a drop in Li concentration from 1000 to 300 mg/L and a drop in pH to a value of 3.0. Subsequently, in the subsequent mixing tank (e.g. 1604), the pH of said brine is raised to about 7.5, and the brine is flowed into a second column (e.g. 1605) which absorbs remaining lithium, and the Li concentration drops from 300 to 100 g/L.

The third vessel (e.g. 1601) is saturated with lithium from a previous ion-exchange cycle, and is therefore treated with sulfuric acid to yield a lithium sulfate concentrate. The acid solution flows through the ion exchange vessel, where the protons from the acid enter the ion exchange beads and are exchanged for lithium. Lithium is thereby released from the beads and enters the acid solution. The pure lithium sulfate liquid eluate is then collected as the product with a lithium concentration of 1,200 mg/L and a sodium concentration below 250 mg/L.

Lithium sulfate entrained in the ion exchange vessel is removed by injecting an alternate phase consisting of air through the inlet (1607) and collecting the liquid resource through the outlet (1608). This removes all the eluate entrained within the ion exchange bed, resulting in a recovery of liquid enriched eluate volume of 99%, as compared to 90% recovered when pumping is the only available means of removing enriched eluate from the vessel.

When the rate of lithium uptake by the ion exchange beads slows, pumping through the system is terminated. An alternate phase consisting of air is injected through the inlet (1607) at a pressure of 5 psi, until all the entrained brine is removed from the ion exchange beds (1614) through the outlet (1608). This ensures that the ion exchange beads are devoid of residual brine. Contacting the ion exchange beads with an air alternate phase obviates the need to use water to remove entrained brine from the ion exchange beads.

Following this, the flows of brine, water, and acid are redirected such that a new vessel is treated with acid and the others with brine. These system operations are repeated, loading lithium into each column until saturation, and redirecting flow to the next configuration of flows while the saturated column is treated with acid to release lithium. The process extracts lithium from brine and yield a lithium sulfate concentrate.

Figure 17:
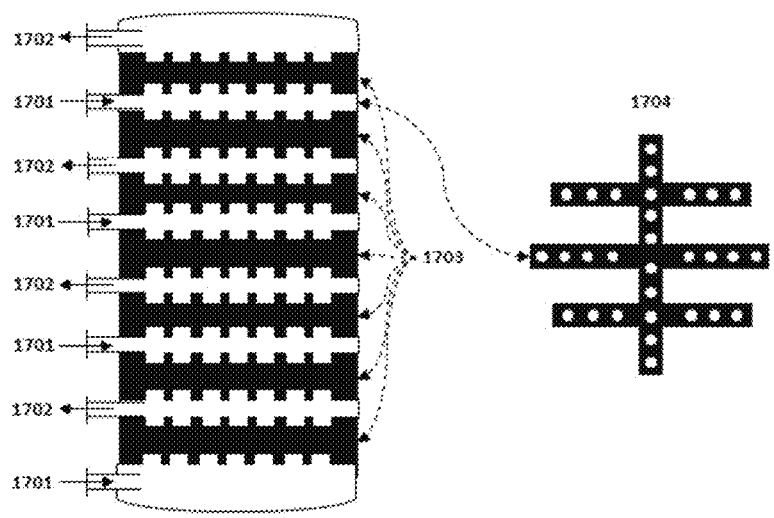
FIG. 17 illustrates a vessels comprising multiple internal flow distributors loaded with ion exchange beads, wherein an alternate phase comprising air is used to from the ion-exchange bed for lithium extraction by ion exchange.

Example 17: Lithium Extraction with a Vessel Comprising Multiple Internal Flow Distributors Contacted with Air Lithium is extracted from a brine using a vessel comprising multiple internal flow distributors. (FIG. 17). The internal characteristics of the vessel are shown in FIG. 17. The vessel is cylindrical and arranged vertically, is approximately 140 cm long, and has a diameter of 30 cm. It is constructed of Hastelloy C276. The vessel is oriented vertically.

The main vessel is loaded ion-exchange beads. Within said vessel, eight flow distributors (detail in 1704) are located and equally distributed along the vessel, 20 cm apart. Four flow distributors deliver brine into the ion-exchange compartment (1701), while four outlet flow distributors (1702) collect liquid that has undergone ion-exchange and removes it from the ion-exchange bed. The flow distributors are composed of polyvinyl chloride pipe that has slits cut along its circumference. Slits are 5 mm apart and have an opening of 50 microns, preventing the fluid from conveying beads out of the ion-exchange compartment.

The liquid resource flows into the vessel from inlet flow distributors (1701), through the ion exchange beads (1703), and out of the vessel through outlet flow distributors (1702) where the fluid exits the vessel. These distributors ensure uniform flow of the liquid resource into and through the ion-exchange bead compartment.

The ion exchange medium is loaded by opening up the top of the vessel through a flanged opening, and closing the vessel. The ion-exchange beads occupy the entirety of the vessel. The flow distributors are submerged within the ion-exchange beads.

The porous ion exchange beads are comprised of ion exchange particles and a polymer matrix. The ion exchange particles are coated ion exchange particles comprised of a $Li_4Mn_5O_{12}$ core with a $SiO_2$ coating. The particles are approximately spherical with a mean diameter of 10 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 200 micron average diameter.

The brine from which lithium is extracted consists of a natural aqueous chloride solution containing approximately 1000 ppm Li, 20,000 mg/L Na, 500 mg/L Ca, and 20,000 mg/L Mg, and other chemical species including K and sulphates. When this liquid resource enters the vessel, the pressure is 10 psi. Flow through this ion exchange material results in an outlet flow that contains approximately 150 ppm Li, 20,000 mg/L Na, 500 mg/L Ca, and 20,000 mg/L Mg, and other chemical species including K and sulphates.

After lithium uptake by the ion exchange beads ceases, the flow of the brine is terminated, and an alternate phase consisting of air is injected through the inlet (1701) at a pressure of 15 psi, until all the entrained brine is removed from the ion exchange bed (1703) through the outlet (1702). This ensures that the ion exchange beads are devoid of residual brine. Contacting the ion exchange beads with an air alternate phase obviates the need to use water to remove entrained brine from the ion exchange beads.

The lithium-saturated beads were then treated with nitric acid to yield lithium nitrate in solution. Lithium in the acidic nitrate solution was eluted at a lithium concentration of 1500 mg/L, while the concentration of sodium in the acidic chloride solution was below 250 mg/L.

Example 18: Lithium Extraction with a Vessel Comprising Fluid Level Controllers Loaded with Ion Exchange Beads, Wherein Liquid Contact is Enhanced by an Air Alternate Phase Lithium is extracted from a brine using a vessel containing ion-exchange beads, where the fluid level in the vessel is controlled to fully submerge said ion exchange beads (FIG. 18).

Figure 18:
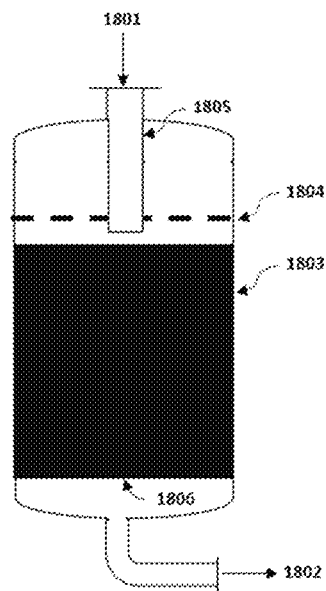
FIG. 18 illustrates a vessel comprising a bed of ion exchange material wherein one or more treatment cycles comprising the modulation of the pressure within the vessel using an alternate phase can be carried out to enhance the recovery of lithium from a lithium resource.

The internal characteristics of the vessel comprising fluid level controllers is shown in FIG. 18. The vessel is cylindrical and arranged vertically, is approximately 110 cm tall, and has a diameter of approximately 20 cm. The vessel is constructed of titanium. The outlet of the vessel comprises a porous Hastelloy partition (1806) with 20 micron openings to prevent escape of solids, including ion exchange beads, allowing only liquid and gas flows to exit the vessel through outlet 1802.

The vessel is loaded with ion exchange beads as a dry powder. The ion-exchange beads (1803) are conveyed into the vessel by mechanically removing the top-dome of the vessel which is attachable to the rest of the vessel via a bolted carbon steel flange. The ion-exchange beads partially fill the volume of the vessel. The height of the ion exchange beads (1803) is 15 cm from the bottom of the vessel.

The porous ion exchange beads comprise coated ion exchange particles and a matrix material, wherein the matrix material comprises a polymer. The ion exchange particles are coated ion exchange particles comprising a $Li_4Mn_5O_{12}$ core with a $MnO_2$ coating. The particles are approximately spherical with a mean diameter of 5.0 microns to 50.0 microns, and the coating thickness is approximately 3.0 nm. The matrix material comprises polyvinyl chloride. The porous beads contain porous networks with a controlled distribution of pore sizes providing diffusion channels from the bead surface into the bead interior and to the ion exchange particles. The beads have a 80 micron average diameter.

Effective contact and wetting of the ion exchange beads by liquids is beneficial for efficient lithium extraction. These liquids include a lithium-containing liquid resource, washing liquids, or an acidic eluent solution, which contact the beads during the ion exchange process. Full penetration of liquids into the pores of the beads is beneficial for efficient utilization of the ion exchange beads, and maximization of lithium extraction performance.

A treatment with an alternate phase is used for the initial wetting of the ion exchange beads by a liquid. In this treatment, water is introduced into the vessel in a manner such that all ion exchange beads are fully submerged in water, wherein the liquid level is 10 cm above the level of the beads inside the vessel. The alternate phase air is introduced into the vessel through 1801 to reach a pressure of 50 psi, and said pressure is maintained for 2 minutes. A valve is then actuated such that all liquid exits thorough outlet 1802, after passing through screen 1806, such that all ion exchange beads are retained within the vessel. Fluid is transported by pressure-driven flow through the ion exchange bed, through the porous partition, and through the bottom outlet of the vessel (1802). The pressure inside the vessel is thus returned to atmospheric pressure, and this atmospheric pressure is maintained for 60 seconds. This cycle of water loading, pressurization, and depressurization is repeated three times. Following the above treatment cycles, the beads are fully wetted and capable of efficiently contacting the process liquids for efficient lithium extraction.

The brine from which lithium is extracted consists of a natural aqueous chloride solution containing approximately 2,000 mg/L Li, 100,000 mg/L Na, 500 mg/L Ca, and 5,000 mg/L Mg, and other chemical species including K, chloride, and sulfate. In a typical ion exchange cycle, flows into the vessel from a top flange (1801) into the top of the vessel, where it flowed through a 5 cm diameter and 10 cm long pipe (1805), to the main fluid level (1804). The fluid level is constantly monitored using an ultrasonic level switch, and the level was adjusted continuously to remain at a height such that the ion-exchange beads are constantly submerged. The liquid level of the tank is maintained at 75 cm from the bottom of the vessel. Control of the fluid level is achieved via an on-off controller that controlled the pump that adds liquid into the tank. The top of the tank is maintained at a constant pressure of 14 psi by addition of liquid into the vessel until the backpressure regulator reached this set pressure and released gas in the tank's headspace The liquid resource is contacted with the ion exchange beads for 90 minutes. After said liquid resource is contacted with the ion exchange material, the contents of the tank are completely drained by maintaining the 14 psi of pressure of the air alternate phase in the top of the vessel, until all the brine exits through the bottom of the vessel (1802). This ensures that the ion exchange beads are devoid of residual brine. The lithium-saturated beads are then treated with hydrochloric acid for 10 minutes to yield an eluant solution that comprises lithium chloride.

The use of an air alternate phase during the initial pressurization-depressurization treatments ensures that the ion exchange beads are fully wetted and capable of efficiently contacting the process liquids for efficient lithium extraction. Lithium recovery levels by the ion exchange beads are thus maintained above a level of 85% after the third ion exchange cycle, wherein an ion exchange cycle is defined by a lithium absorption-lithium elution sequence. In the absence of the initial treatment, ineffective wetting leads to lower surface contact between the process liquids and the ion exchange beads, and lithium recovery only reaches levels of 80% after 15 cycles of ion exchange. Thus, the treatment of with an alternate phase ensures efficient bead utilization.

Figure 19:
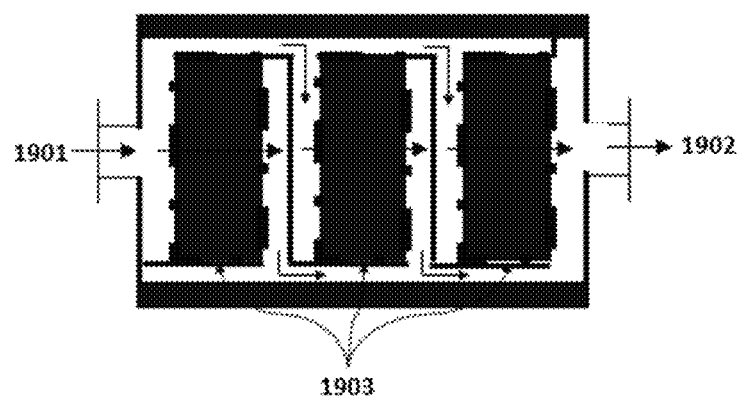
FIG. 19 illustrates a vessel comprising multiple beds of a lithium selective sorbent, wherein the lithium selective sorbent comprises a lithium aluminum intercalate, wherein use of an alternate phase to remove entrained liquids from the beds of sorbent can lead to greater lithium recovery from a liquid resource via lithium extraction therefrom.

Example 19: Lithium Extraction with a Vessel Comprising Filter Banks Loaded with a Lithium Selective Sorbent, Contacted with an Air Alternate Phase Lithium is extracted from a brine using a vessel comprising filter banks, filled with a solid lithium selective sorbent. The filter banks are arranged along the length of the vessel, with parallel flow to and from each filter bank. (FIG. 19). Each filter bank acts as an individual lithium extraction compartment.

The internal characteristics of the vessel are shown in FIG. 19. The vessel is rectangular and arranged horizontally, is approximately 50 cm long, and has a width and height of approximately 20 cm. It is constructed of epoxy-coated carbon steel with ceramic internal divisions. The vessel comprises 3 filter banks that act as lithium extraction compartments (1903) and pipes that distribute the inlet flows to each of the three filter banks and collect the outlet flows from each of the three filter banks. The liquid delivery (e.g., inlet) and collection (e.g., output) systems are independent of each other. Inlet and outlet flow distribution systems connect to each other only through the compartments. The pipes that distribute flow are rectangular with a width and diameter of 2.5 cm.

The compartments (1903) are 15 cm wide and 15 cm tall, with a length of 10 cm. The inlet and outlet of the lithium extraction compartment comprises a polypropylene mesh with 5 micron pore size, to prevent escape of beads. In each compartment, fluid is transported by pressure-driven flow through the sorbent bed, through the polymer support, and into the fluid collection system.

The lithium extraction device is first loaded with a lithium-selective lithium selective sorbent. Said lithium selective sorbent comprises a lithium aluminum intercalate. The lithium aluminum intercalate comprises a lithium-aluminum layered double hydroxide. The intercalate is bound to a matrix material that comprises a polymer. The matrix material comprises polyvinyl chloride. The lithium selective sorbent is in the form of particles having an average diameter of 100 microns.

The brine from which lithium is extracted consists of a natural aqueous chloride solution containing approximately 500 mg/L Li, 80,000 mg/L Na, 5,000 mg/L Ca, and 10,000 mg/L Mg, and other chemical species including K and chloride. Flow of said brine through the lithium selective sorbent results in an outlet flow that contains approximately 150 mg/L Li, 80,000 mg/L Na, 5,000 mg/L Ca, and 10,000 mg/L Mg, and other chemical species including K and chloride.

The liquid resource flows into the vessel from a side flange (1901), where it flows into the flow distribution pipes which deliver flow to each one of the compartments. The liquid flows through the above-mentioned mesh, through the bed of lithium selective sorbent (1903), out of the above-mentioned mesh, and into the outlet flow distribution pipes. Lithium is extracted from said liquid resource during this flow. The collected effluent then exits through a flange (1902) on the other side of the vessel.

After said brine is contacted with the lithium selective sorbent, the contents of the vessel are completely drained by injecting an alternate phase consisting of air through the side flange (2001) and collecting the liquid resource and air through the outlet flange (1902). This removes all the liquid resource inside of the vessel and entrained within the bed of sorbent. Air and the entrained brine are separated in an air-liquid separator.

Flows of brine, air, and eluent (e.g., acid solution) are alternated through said vessel, such that lithium chloride is intercalated onto the lithium selective sorbent from the brine, entrained brine is removed from the vessel by the air alternate phase, and lithium chloride stripped from said sorbent with an aqueous eluent. The cycle is repeated continuously to produce a synthetic lithium eluate purified and enriched in lithium.

The use of an air alternate phase removes brine entrained within the bed of lithium selective sorbent, prior to elution of lithium therefrom with an aqueous eluent. If air is not used, water would be used for removal of said entrained brine, leading to elution of lithium while entrained brine is still present in the bed of sorbent. Thus, the eluted lithium and the entrained brine would become mixed, causing a loss in recovered purified lithium. As such, the use of an air alternate phase enhances the recovery of lithium in the lithium extraction process, while simultaneously reducing the total amount of water required for said process.

Example 20: Lithium Extraction Device Comprising a Filter Press Contacted with Air for More Efficient Solids Disposal Lithium is extracted from a liquid resource using a device comprising filter banks containing ion exchange beads. The filter banks are contained between filter plates that are arranged as a "horizontal stack" that share a common flow distribution manifold.

Figures 20A, 20B, 20C:
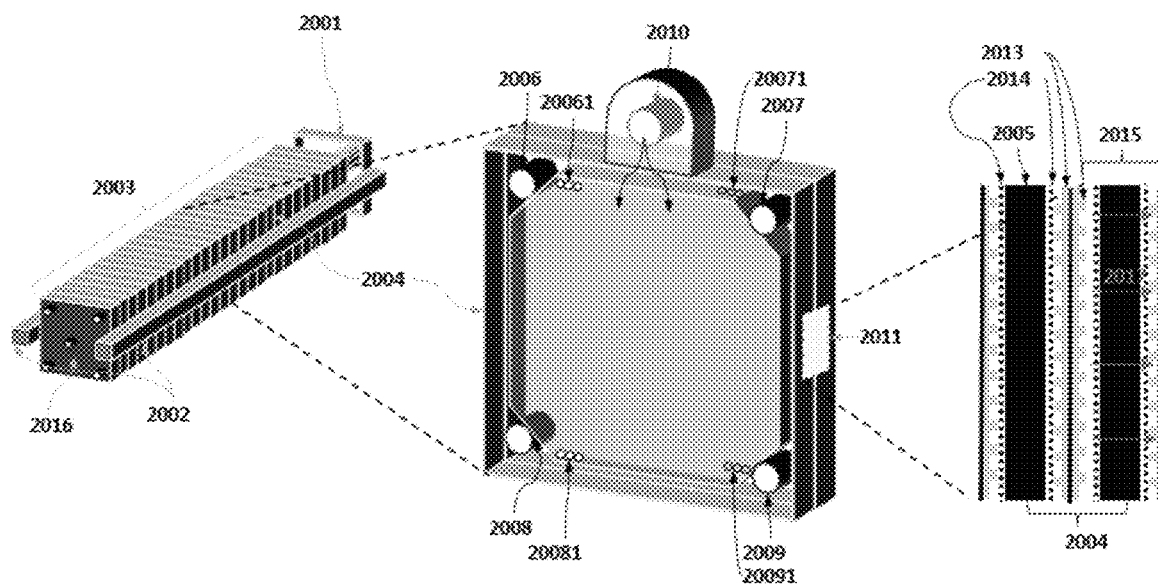
FIG. 20A-20C illustrates a filter press and the filter banks that comprise said filter press, wherein use of an alternate phase to remove entrained liquids from the sorbent and repack the sorbent can lead to greater lithium recovery from a liquid resource via lithium extraction therefrom.

The device is constructed from a filter press (FIG. 20). In this device (FIG. 20A), multiple filter plates (2004) are maintained in a vertical position by structural supports (2002). The plates are pressed together to form a "horizontal stack" of approximately 60 plates (2003). The plates contain filter cloths, and the filter cloth from adjacent plates contact each other to prevent liquid from escaping; however, this contact does not comprise a sealing surface, thereby allowing a low seepage of liquid between the cloths. The filter cloths are constructed of double-weave polyester. The plates can hold a total of approximately 20 L of ion exchange beads. The structural frame of the filter press comprises a hydraulic piston at one end of the device (2001), which applies 300 kN of force on the last plate in the stack, therefore squeezing the filter stack together, and forcing the filter cloths from adjacent plates in contact with each other.

Fluid process connections are located at the opposite end of the device (2016) from said hydraulic piston; these connect to five distinct fluid conduits that direct fluid flow to and from all filter banks. These fluid conduits comprise a sorbent slurry inlet that is approximately 100 mm in diameter (2010), and four fluid flow conduits of approximately 40 mm in diameter (2006, 2007, 2008, 2009). These conduits deliver process streams including water, the liquid resource, an acidic eluent solution, or air, to each of the filter banks simultaneously.

FIG. 20B shows the detail of a filter bank. The filter bank comprises a cake of lithium selective sorbent (2005) contained between filter cloths (2014) supported on two opposing filter plates (2004). The thickness of the sorbent cake contained within this filter bank is approximately 40 mm; the filter cake is approximately a square with a length of about 1000 mm, and its four corners are cut off diagonally to form an octagon. The filter plates are square.

Each of the square's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the four fluid conduits connect to the filter bank through orifices/opening that provide fluid communication to a corner of the sorbent cake, as shown in FIG. 20B. For example, fluid conduit 2006 connects through a conduit that is 50 mm in diameter to five orifices 15 mm in diameter 20061. The configuration and diameter of pipes and orifices 2007 to 20071, 2008 to 20081, and 2009 to 20091 are identical to 2006 and 20061. The sorbent slurry inlet 2010 is present along the entirety of the device, such that port 2010 from one filter bank connects to 2010 of the following filter bank, and such that all filter banks are in fluid communication to the 2010 process connection on the end plate (2016) of the device. The sorbent inlet 2010 is located 5 cm above the chamber that is filled with the lithium-selective sorbent (2005), such that solids flow down into the space 2005 when the device is loaded.

FIG. 20C shows the detail of a cross section (2011) of a filter bank containing the lithium selective sorbent (2005). Each filter bank contains two opposing sides of two filter plates (2004), and the two opposing plates come together to form a filter bank (sorbent cake (2005), filter cloth (2014), flow distributor (2013), and filter plates (2004)), shown together as 2015.

The ion-exchange material (2005) is contained between two filter cloths (2014). The cloths lie flat on a flow distribution surface (2013). This surface contains textured shapes consisting of pips that protrude from said surface (2013), such that an open space is created between the surface of the filter cloth (2014) and the surface of the flow distribution surface (2013). These pips are 5 mm deep.

The lithium extraction device is first loaded with a lithium-selective lithium selective sorbent. The lithium selective sorbent comprises ion-exchange beads. The porous ion exchange beads are comprised of ion exchange particles and a polymer matrix. The ion exchange particles are coated ion exchange particles comprised of a $Li_4Ti_5O_{12}$ core with a $MnO_2$ coating. The particles are approximately spherical with a mean diameter of 5 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 80 micron average diameter.

All filter banks are loaded with a with ion-exchange beads. Flows of brine, water, and acidic eluent are alternated through said filter bank, such that lithium is loaded onto the ion exchange beads from the brine, entrained brine is removed from the filter bank through washing with water, and lithium stripped from said ion-exchange beads with an acidic eluent. The cycle is repeated continuously to produce a synthetic lithium eluate purified and enriched in lithium.

These flows are distributed through the pipe manifold 2008 and 2006 and through orifices 20081 and 20061 flowing into all filter banks simultaneously, across the filter cake from one flow distribution surface to another. Arrow 2017 demonstrates the direction of this flow. Flow is collected simultaneously from all filter banks from orifices 20091 and 20071, pipe manifold 2009 and 2007.

An alternate phase comprising air is introduced into all filter banks when the type of fluid contacting the ion exchange bead is changed. Specifically, air is introduced when fluid is changed from liquid resource to water, from water to eluent, and from enriched eluate to brine. The air displaces liquid entrained within cavities in the lithium extraction device and in the void space between beads in the bed of ion exchange beads. In this manner, the required liquid volumes required to purge the device of the liquid previously present are reduced.

Specifically, contacting a liquid resource with said ion exchange material results in lithium being extracted, and protons are released into solution. After said brine is contacted with the ion exchange material for two hours, flow of brine is ceased. Air is injected through pipe manifold 2006, through orifices 20061, through flow distribution surface 2013 (between the filter cloth 2014 and the surface of the filter plate), through the bed of ion exchange material (2005), through the opposing flow distribution surface, and is finally collected through orifices 20091 and outlet pipe 2009. As such, when water is contacted with the ion exchange beads in order to remove entrained brine from them, this water does not need to remove the additional brine contained within these void spaces or between the ion exchange beads, and can be efficiently used to wash brine entrained within the ion exchange beads.

This air purge process is similarly repeated before the flow of water is switched to eluent, and before the flow of eluent is switched to brine. Using an air purge to remove eluate contained within voids in the ion exchange device has the additional advantage of recovering the eluent product, and avoiding its mixing (and therefore its loss) to the subsequent brine flow.

When the end of the useful life of the ion-exchange beads is reached, the beads must be transported off the production site. The flow of an air alternate phase is used to reduce the moisture content from the ion exchange beads, by contacting said ion exchange beads with air to evaporate the water entrained within the pores of the ion exchange beads. This reduces the total weight of the ion exchange beads that must be transported to an alternate location.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

What is claimed is:

1. A process for extracting lithium from a liquid resource comprising:
   a) contacting a lithium selective sorbent with the liquid resource, wherein the liquid resource comprises lithium ions, and wherein lithium ions in the liquid resource are at least partially absorbed by the lithium selective sorbent to yield an enriched lithium selective sorbent;
   b) contacting said enriched lithium selective sorbent with an eluent such that lithium is at least partially eluted from said enriched lithium selective sorbent to yield an enriched eluate and the lithium selective sorbent; and
   c) contacting an alternate phase with said lithium selective sorbent, said enriched lithium selective sorbent, said liquid resource, said eluent, said enriched eluate, or any combination thereof, wherein the alternate phase is a non-aqueous liquid or a gas.

2. The process of claim 1, wherein the alternate phase of c) at least partially removes the liquid resource from the lithium selective sorbent and/or the enriched lithium selective sorbent following a).

3. The process of claim 1, further comprising contacting at least one of the lithium selective sorbent and the enriched lithium selective sorbent with a wash solution.

4. The process of claim 3, wherein the wash solution contacts the lithium selective sorbent and/or the enriched lithium selective sorbent after the alternate phase has contacted the lithium selective sorbent and/or the enriched lithium selective sorbent, and wherein a reduced amount of the wash solution is required to at least partially remove the liquid resource, the eluent, or the enriched eluate, from the surface of the lithium selective sorbent or the enriched lithium selective sorbent as compared to the process without the use of an alternate phase.

5. The process of claim 3, wherein the alternate phase at least partially removes the wash solution from the lithium selective sorbent and/or the enriched lithium selective sorbent.

6. The process of claim 1, wherein said alternate phase comprises an organic liquid or a gas,
   wherein the organic liquid comprises an alkane, alcohol, ester, ether, oil, or any combination thereof, and
   wherein the gas comprises air, nitrogen, argon, or any combinations thereof.

7. The process of claim 6, wherein the alternate phase is a gas, and wherein the gas is injected at a pressure of 0.01-1000 psig.

8. The process of claim 1, wherein said alternate phase comprises a gas, wherein the gas comprises air, nitrogen, argon, or any combinations thereof.

9. The process of claim 1, wherein lithium extraction occurs in one or more vessels, wherein the one or more vessels comprise i) said lithium selective sorbent housed in a bed and ii) one or more ports for the addition of said liquid resource, said eluent, and said alternate phase.

10. The process of claim 9, wherein the one or more vessels comprises one or more filter banks, and wherein the at least two or more filter banks are aligned in series to form a filter press.

11. The process of claim 1, wherein said lithium selective sorbent and/or said enriched lithium selective sorbent is housed in one or more packed beds.

12. The process of claim 11, wherein contacting the liquid resource and/or the enriched eluate with the alternative phase reduces the time required for the liquid resource and/or the enriched eluate to drain from the one or more packed beds.

13. The process of claim 1, wherein said liquid resource contacts said lithium selective sorbent in a plurality of compartments arranged within a vessel.

14. The process of claim 1, wherein said lithium selective sorbent is a protonated ion exchange material and the enriched lithium selective sorbent is a lithiated ion exchange material.

15. The process of claim 14, wherein said protonated ion exchange material is generated by treating a pre-activated ion exchange material with an acid.

16. The process of claim 15, wherein said pre-activated ion exchange material comprises $LiFePO_4$, $LiMnPO_4$, $Li_2TiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_2TinO_{24}$, $Li_3VO_4$, $Li_2Si_3O_7$, $Li_2CuP_2O_7$, modifications thereof, solid solutions thereof, or a combination thereof.

17. The process of claim 1, wherein said lithium selective sorbent is an adsorbent, wherein the adsorbent comprises a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, Li $Al_2(OH)_6Cl$, combinations thereof, compounds thereof, or solid solutions thereof.

* * * * *

UNITED STATES PATENT AND TRADEMARK OFFICE
CERTIFICATE OF CORRECTION

| | | |
|---|---|---|
| PATENT NO. | : 12,370,468 B2 | Page 1 of 1 |
| APPLICATION NO. | : 18/476195 | |
| DATED | : July 29, 2025 | |
| INVENTOR(S) | : David Henry Snydacker et al. | |

It is certified that error appears in the above-identified patent and that said Letters Patent is hereby corrected as shown below:

In the Claims

In Claim 16 at Column 169 Line 3, the chemical formula $Li_2TinO_{24}$ should be $Li_7Ti_{11}O_{24}$.

Signed and Sealed this
Ninth Day of December, 2025

John A. Squires
*Director of the United States Patent and Trademark Office*